US012575581B2

(12) United States Patent
Killilea et al.

(10) Patent No.: US 12,575,581 B2
(45) Date of Patent: Mar. 17, 2026

(54) BARRIER COATING COMPOSITIONS, WASH COMPOSITIONS, AND OTHER COMPOSITIONS FOR PERISHABLES AND METHODS, SYSTEMS, KITS AND COATED ITEMS RELATING THERETO

(71) Applicant: COMESTAAG LLC, Osceola, WI (US)

(72) Inventors: T. Howard Killilea, North Oaks, MN (US); Andrew A. DeMaster, Pacific Grove, CA (US)

(73) Assignee: ComestaAg LLC, Osceola, WI (US)

( * ) Notice: Subject to any disclaimer, the term of this patent is extended or adjusted under 35 U.S.C. 154(b) by 235 days.

(21) Appl. No.: 18/076,136

(22) Filed: Dec. 6, 2022

(65) Prior Publication Data

US 2023/0112633 A1 Apr. 13, 2023

Related U.S. Application Data

(63) Continuation-in-part of application No. PCT/US2021/036270, filed on Jun. 7, 2021.

(Continued)

(51) Int. Cl.
*A23B 7/16* (2006.01)

(52) U.S. Cl.
CPC .................................... *A23B 7/16* (2013.01)

(58) Field of Classification Search
CPC ......... A23B 7/16; A23B 7/153; A23B 7/0215; A23B 7/00; A23B 7/154

(Continued)

(56) References Cited

U.S. PATENT DOCUMENTS

| | | | |
|---|---|---|---|
| 2,404,373 A | 7/1946 | Harlow |
| 4,335,145 A | 6/1982 | Stanley |

(Continued)

FOREIGN PATENT DOCUMENTS

| | | | |
|---|---|---|---|
| CN | 105613706 A * | 6/2016 |
| CN | 105053168 * | 8/2019 |

(Continued)

OTHER PUBLICATIONS

Amudipe, "Development of Lipid-Based Coatings for the Quality Maintenance of Fruit and Vegetables," Thesis submitted to the University of New South Wales for Doctor of Philosophy, 295 pages (Jun. 1996).

(Continued)

*Primary Examiner* — Changqing Li
(74) *Attorney, Agent, or Firm* — Mueting Raasch Group

(57) ABSTRACT

Barrier coating compositions, wash compositions, and other compositions for perishables and methods, systems, kits, and coated perishables relating thereto are provided. Fresh fruits and vegetables, in particular, can benefit from the teachings of the present disclosure. Preferred barrier coating compositions include an active hydrogen component that preferably includes one or more of a lipid, a polysaccharide, a polypeptide, or a combination thereof. In addition to providing active hydrogen groups, the active hydrogen component preferably functions as a binder and/or barrier component. The barrier coating compositions may include one or more materials to facilitate crosslinking of the resulting coating.

19 Claims, 5 Drawing Sheets
(1 of 5 Drawing Sheet(s) Filed in Color)

Related U.S. Application Data

(60) Provisional application No. 63/195,147, filed on May 31, 2021, provisional application No. 63/138,774, filed on Jan. 18, 2021, provisional application No. 63/065,484, filed on Aug. 13, 2020, provisional application No. 63/045,155, filed on Jun. 28, 2020, provisional application No. 63/035,818, filed on Jun. 7, 2020.

(58) Field of Classification Search
USPC ....... 426/89, 94, 98, 99, 302, 310, 601, 602, 426/611
See application file for complete search history.

(56) References Cited

U.S. PATENT DOCUMENTS

| | | | |
|---|---|---|---|
| 4,726,898 | A | 2/1988 | Mills et al. |
| 4,959,230 | A | 9/1990 | Wyss et al. |
| 5,019,403 | A | 5/1991 | Krochta |
| 5,101,763 | A | 4/1992 | Creason |
| 5,315,879 | A | 5/1994 | Crochon et al. |
| 5,376,391 | A | 12/1994 | Nisperos-Carriedo et al. |
| 5,489,442 | A | 2/1996 | Dunn et al. |
| 6,068,867 | A | 5/2000 | Nussinovitch et al. |
| 6,313,068 | B1 | 11/2001 | Daly et al. |
| 6,401,913 | B1 | 6/2002 | Blanc |
| 6,482,455 | B1 | 11/2002 | Freire et al. |
| 6,539,781 | B1 | 4/2003 | Crezee |
| 6,655,878 | B1 | 12/2003 | de Vos et al. |
| 6,742,647 | B2 | 6/2004 | De Greef |
| 6,847,447 | B2 | 1/2005 | Ozanich |
| 7,228,958 | B2 | 6/2007 | Hendrik De Greef |
| 7,267,743 | B2 | 9/2007 | Borsinger et al. |
| 7,708,822 | B2 | 5/2010 | Lahav et al. |
| 7,776,928 | B2 | 8/2010 | Borsinger et al. |
| 8,061,501 | B2 | 11/2011 | Benedetti |
| 8,424,243 | B1 | 4/2013 | Narciso et al. |
| 8,752,328 | B2 | 6/2014 | Kaiser et al. |
| 9,044,045 | B2 | 6/2015 | Brown et al. |
| 9,073,707 | B2 | 7/2015 | Ruissen et al. |
| 9,163,151 | B2 | 10/2015 | Lock et al. |
| 9,283,173 | B2 | 3/2016 | Lederman |
| 9,363,880 | B2 | 6/2016 | Keener et al. |
| 9,475,643 | B1 | 10/2016 | Odman et al. |
| 9,568,438 | B1 | 2/2017 | Kim et al. |
| 9,648,890 | B2 | 5/2017 | Nussinovitch et al. |
| 9,739,737 | B2 | 8/2017 | Swager et al. |
| 9,789,518 | B2 | 10/2017 | Iino |
| 9,919,345 | B1 | 3/2018 | Lu et al. |
| 10,194,672 | B2 | 2/2019 | Keener et al. |
| 10,253,208 | B2 | 4/2019 | Alcantar et al. |
| 10,271,561 | B2 | 4/2019 | Omenetto et al. |
| 10,330,531 | B2 | 6/2019 | Goldring et al. |
| 10,408,748 | B2 | 9/2019 | Schwartzer et al. |
| 10,421,103 | B2 | 9/2019 | Benedetti |
| 10,481,589 | B1 | 11/2019 | Drouillard |
| 10,502,679 | B2 | 12/2019 | Aphek |
| 10,537,130 | B2 | 1/2020 | Rogers |
| 2005/0122524 | A1 | 6/2005 | Ibarra et al. |
| 2006/0037892 | A1 | 2/2006 | Blanc |
| 2012/0042420 | A1* | 2/2012 | Kaiser ...................... A01N 3/00 106/617 |
| 2012/0251675 | A1* | 10/2012 | Sowa ...................... A23L 3/349 426/310 |
| 2014/0147015 | A1 | 5/2014 | Bajema et al. |
| 2014/0308402 | A1 | 10/2014 | Girard |
| 2016/0231267 | A1 | 8/2016 | Swager et al. |
| 2016/0324174 | A1 | 11/2016 | Grau et al. |
| 2016/0349230 | A1 | 12/2016 | Kirkjan |
| 2017/0156356 | A1 | 6/2017 | Omenetto et al. |
| 2017/0292908 | A1 | 10/2017 | Wilk et al. |
| 2018/0317539 | A1 | 11/2018 | Nabeiro |
| 2019/0217341 | A1 | 7/2019 | Nijland |
| 2019/0281844 | A1 | 9/2019 | Vergara Salinas et al. |
| 2019/0285577 | A1 | 9/2019 | Swager et al. |
| 2019/0340749 | A1 | 11/2019 | Schwartzer et al. |
| 2019/0364916 | A1 | 12/2019 | Jung et al. |
| 2020/0095638 | A1 | 3/2020 | Kuo |
| 2020/0178576 | A1 | 6/2020 | Behrens et al. |
| 2021/0333185 | A1 | 10/2021 | Hayward et al. |

FOREIGN PATENT DOCUMENTS

| | | | | |
|---|---|---|---|---|
| EP | 1 107 000 | B1 | 11/2005 | |
| EP | 3 476 216 | A1 | 5/2019 | |
| GB | 1593856 | * | 11/1976 | |
| GB | 2562275 | A | 11/2018 | |
| JP | 3-272639 | A | 12/1991 | |
| JP | 2001525928 | A1 | 12/2001 | |
| WO | 93/06735 | A1 | 4/1993 | |
| WO | 99/07230 | A1 | 2/1999 | |
| WO | 00/49899 | A1 | 8/2000 | |
| WO | 02/077608 | A2 | 10/2002 | |
| WO | WO-03086047 | A2 * | 10/2003 | ............. A23B 7/154 |
| WO | 2004/026035 | A1 | 4/2004 | |
| WO | 2005/089416 | A2 | 9/2005 | |
| WO | 2006/002671 | A1 | 1/2006 | |
| WO | 2011/017959 | A1 | 2/2011 | |
| WO | 2011/123949 | A1 | 10/2011 | |
| WO | 2012/039597 | A2 | 3/2012 | |
| WO | 2012/141566 | A2 | 10/2012 | |
| WO | 2013/144961 | A1 | 10/2013 | |
| WO | 2014/124128 | A1 | 8/2014 | |
| WO | 2015/017450 | A1 | 2/2015 | |
| WO | 2016/084094 | A1 | 6/2016 | |
| WO | 2016/187581 | A1 | 11/2016 | |
| WO | 2017/048951 | A1 | 3/2017 | |
| WO | 2017/100636 | A1 | 6/2017 | |
| WO | 2017/132281 | A1 | 8/2017 | |
| WO | 2017/172951 | A1 | 10/2017 | |
| WO | 2017/200930 | A1 | 11/2017 | |
| WO | 2018/009846 | A1 | 1/2018 | |
| WO | 2018/094269 | A1 | 5/2018 | |
| WO | 2019/028043 | A1 | 2/2019 | |
| WO | 2019/036686 | A1 | 2/2019 | |
| WO | 2019/104272 | A1 | 5/2019 | |
| WO | 2019/129822 | A1 | 7/2019 | |
| WO | 2019/145932 | A1 | 8/2019 | |
| WO | 2019/169434 | A1 | 9/2019 | |
| WO | 2019/177663 | A1 | 9/2019 | |
| WO | 2020/023319 | A1 | 1/2020 | |
| WO | 2020035361 | A1 | 2/2020 | |
| WO | 2020/051238 | A1 | 3/2020 | |
| WO | 2020/123400 | A1 | 6/2020 | |
| WO | 2020/181228 | A1 | 9/2020 | |
| WO | 2020/247667 | A1 | 12/2020 | |
| WO | 2021/009753 | A1 | 1/2021 | |
| WO | 2021/055818 | A1 | 3/2021 | |
| WO | 2021/092251 | A1 | 5/2021 | |
| WO | 2021/222261 | A1 | 11/2021 | |
| WO | 2021/252403 | A1 | 12/2021 | |

OTHER PUBLICATIONS

Baldwin, "Surface Treatments and Edible Coatings in Food Preservation," Chapter 21, in Handbook of Food Preservation, Second Edition, CRC Press, pp. 477-507 (Jul. 2007).

Baldwin et al., "Edible Coatings and Films to Improve Food Quality," Second Edition, CRC Press, 450 pages (2012).

Bhargava et al., "Fruits and vegetables quality evaluation using computer vision: A review," Journal of King Saud University—Computer and Information Sciences, vol. 33, pp. 243-257 (2021) (Available online Jun. 5, 2018).

U.S. Appl. No. 63/016,074, filed Apr. 27, 2020.

Embuscado et al., "Edible Films and Coatings for Food Applications," Springer, 410 pages (2009).

GRAS Notice (GRN) No. 648, http://www.fda.gov/Food/Ingredients/PackagingLabeling/GRAS/NoticeInventory/default.htm, GRAS Notification for Mixture of Monoacylglycerides, 33 pages (Apr. 7, 2016).

(56) References Cited

OTHER PUBLICATIONS

GRAS Notice (GRN) No. 886, https://www.fda.gov/food/gernerally-recognized-safe-gras/gras-notice-inventory, Apeel Sciences GRAS Notice Submission for a Mixture of Monoacylglycerides Derived from Grape Seed, 45 pages (Oct. 9, 2019).

International Search Report and Written Opinion for Application No. PCT/US2021/036202 mailed Oct. 27, 2021.

International Search Report and Written Opinion for Application No. PCT/US2021/036270 mailed Oct. 28, 2021.

Kerbel et al., "Effects of "Semperfresh" coating on postharvest life, internal atmosphere modification and quality maintenance of 'Granny Smith' apples," J.K. Fellman (ed.), Proceedings of the Fifth International Controlled Atmosphere Research Conference, pp. 247-254, vol. 1-Pome fruits (Jun. 14-16, 1989, Wenatchee, WA).

Kore et al., "Application of Edible Coatings on Fruits and Vegetables," Imperial Journal of Interdisciplinary Research (IJIR), vol. 3, Issue-1, pp. 591-603 (2017).

Lazaro et al., "Color Measurement and Analysis of Fruit with a Battery-Less NFC Sensor," Sensors, 19, 1741; doi:10.3390/s19071741, 21 pages (2019).

Lin et al., "Innovations in the Development and Application of Edible Coatings for Fresh and Minimally Processed Fruits and Vegetables," Comprehensive Reviews in Food Science and Food Safety, vol. 6, pp. 60-75 (2007).

Lu et al., "Comparison of Four Nondestructive Sensors for Firmness Assessment of Apples," www2.atb-potsdam.de/CIGRImageAnalysis/images/images12/table_137_C2309.pdf, 6 pages (2012).

Mahajan et al., "Postharvest treatments of fresh produce," Phil. Trans. R. Soc. A, 372: 20130309, http://dx.doi. org/10.1098/rsta.2013.0309, 19 pages (2014).

Otoni et al., "Recent Advances on Edible Films Based on Fruits and Vegetables—A Review," Comprehensive Reviews in Food Science and Food Safety, vol. 16, pp. 1151-1169 (2017).

Pathare et al., "Colour Measurement and Analysis in Fresh and Processed Foods: A Review," Food Bioprocess Technol., vol. 6, pp. 36-60 (2013).

Quirós-Sauceda et al., "Edible coatings as encapsulating matrices for bioactive compounds: a review," J. Food. Sci. Technol., vol. 51, No. 9, pp. 1674-1685 (Sep. 2014).

Shit et al., Edible Polymers: Challenges and Opportunities, Journal of Polymers, vol. 2014, Article ID 427259, 13 pages, http://dx.doi.org/10.1155/2014/427259 (2014).

Slaughter, Presentation of "Nondestructive Quality Measurement of Horticultural Crops," 20 pages (Publicly known at least as early as Dec. 7, 2021).

Wang et al., "Fruit Quality Evaluation Using Spectroscopy Technology: A Review," Sensors, vol. 15, pp. 11889-11927; doi:10.3390/s150511889 (2015).

Tiwari et al., "Fruit Ripeness Detection with Machine Learning Using Raspberry Pi", IJIRT, vol. 6, issue 1, pp. 781-785 (year: 2019).

Hagenmaier et al., "Gas Permeability of Fruit Coating Waxes", J. Amer. Soc. Hort. Sci. 117(1):105-109 (Year: 1992).

Gongal et al., 2015 "Sensors and Systems for Fruit Detection and Localization: A Review", Computers and Electronic in Agriculture, 116 (2005, pp. 8-19) Year: 2015.

Spraying Fruit on a Conveyor or Washing Fruit. www.pro-fruit.com/product/fruit-and-vegetable-washer-elevator-mill-maximill-3000/. pp. 1-3, Year: 2010.

Non Final Office Action issued on May 9, 2022 for U.S. Appl. No. 17/545,969, filed Dec. 8, 2021, Inventor: Andrew A. DeMaster (39 pages).

* cited by examiner

BARRIER COATING COMPOSITIONS, WASH COMPOSITIONS, AND OTHER COMPOSITIONS FOR PERISHABLES AND METHODS, SYSTEMS, KITS AND COATED ITEMS RELATING THERETO

CROSS-REFERENCE TO RELATED APPLICATIONS

This application claims the benefit of U.S. Provisional Application Ser. No. 63/035,818, titled "Barrier Coating Compositions and Wash Compositions for Perishables and Method and Systems Relating Thereto," filed by DeMaster et al. on Jun. 7, 2020; U.S. Provisional Application Ser. No. 63/045,155, titled "Barrier Coating Compositions, Wash Compositions, and Other Compositions for Perishables and Methods, Systems, Kits, and Coated Items Relating Thereto," filed by DeMaster et al. on Jun. 28, 2020; U.S. Provisional Application Ser. No. 63/065,484, titled "Barrier Coating Compositions, Wash Compositions, and Other Compositions for Perishables and Methods, Systems, Kits, and Coated Items Relating Thereto," filed by DeMaster et al. on Aug. 13, 2020; U.S. Provisional Application Ser. No. 63/195,147 entitled "Selectively Treating Plant Items" filed by DeMaster et. al. on May 31, 2021; U.S. Provisional Application Ser. No. 63/138,774 entitled "Shelf-Life Extender Compositions for Live Plant Items and Methods, Kits, and Coated Live Plant Items Relating Thereto" filed by DeMaster et. al. on Jan. 18, 2021; and is a continuation-in-part of International Application No. PCT/US2021/036270 filed by Killilea et al. on Jun. 7, 2021 and entitled "Barrier Coating Compositions for Perishables and Methods, Kits, and Coated Items Relating Thereto" the entire contents of each of which are herein incorporated by reference.

BACKGROUND OF THE INVENTION

Food spoilage is a major global problem, especially with respect to fresh fruits and vegetables. Studies have estimated that more than 40% of food that is grown is wasted without being consumed. Much of this waste is due to spoilage that occurs in the food supply chain. Such food waste leads to a myriad of problems, including excessive land cultivation for agriculture, which may contribute to climate change and other environmental problems. Moreover, such excessive waste increases food prices, which deprives vulnerable populations sufficient access to nutritious fresh produce.

Fruits and vegetables have natural skins that resist degradation processes and help delay rotting or drying out of the fresh produce prior to consumption. Damage to these natural protective surfaces can result in rapid degradation that can negatively impact the quality and taste of the produce, and even render the produce unfit for consumption. Such damage can occur during any of the multitude of supply chain steps prior to consumption, including, for example, during harvest, during processing at fruit or vegetable processors, during the many transportation steps in the supply chain, during storage, during stocking or display at the retailer, during the purchasing process by the end consumer, and during transport and storage by the end consumer. Moreover, even if the fruit or vegetable is not damaged, spoilage or unsuitable quality degradation can occur due to timing factors in the supply chain. Steps such as air transport and refrigeration can be employed to help avoid such timing-related problems; however, such steps are expensive and are not environmentally friendly. Such issues are also a problem for other agricultural products such as, for example, plant bulbs, seedlings, plant cuttings, fresh-cut flowers, nuts, seeds, and the like.

Coatings have been applied to freshly harvested fruits and vegetables in an attempt to extend shelf-life. While some of these coatings have shown some level of efficacy in extending shelf-life, there is still much room for improvement, both in terms of further extending shelf-life and improving quality. For example, certain polysaccharide-based coatings and certain polypeptide-based coatings have exhibited promising mechanical film properties but have tended to exhibit poor barrier properties. Such lack of barrier properties typically leads to unsuitable mass loss in coated fruits or vegetables due to excessive water vapor loss. In contrast, lipid-based coatings have exhibited promising barrier properties, but have tended to exhibit poor mechanical properties. Moreover, thick wax-based coatings also can lead to flavor problems due to anaerobic fermentation occurring within the produce.

From the foregoing, it will be appreciated that what is needed in the art is a coating composition for perishables exhibiting an improved balance of coating properties.

SUMMARY

The present disclosure provides barrier coating compositions, wash compositions, and other compositions for perishables and methods, systems, and kits, to prolong the shelf-life or duration of freshness or usability of perishables, and particularly edible foods such as fresh fruits and vegetables.

In some embodiments, a barrier coating composition for a perishable item (e.g., an edible perishable item) is provided. The coating composition preferably includes an active hydrogen component ("AHC"); optionally a polyvalent metal crosslinking agent ("PMCA"); and optionally one or more additives selected from a plasticizer, a wax, a lipid, an amino acid, a dispersing agent, an anti-microbial agent, an anti-browning or -yellowing agent (e.g., ascorbic acid or citric acid), a probiotic, a vitamin or other nutrient, an enzyme, a plant hormone or regulator, a colorant, a flavorant, an aromatic, an oxygen-scavenging agent, a compatibilizer, a leveling agent, a wetting agent, an adhesion promoter, a rheology modifier, or an antifoaming agent. The AHC preferably functions as a barrier and/or binder component. Preferred compounds for the AHC include polysaccharides, lipids, polypeptides, and mixtures thereof, having one or more active hydrogen groups.

In some embodiments, a barrier coating composition for a perishable item (e.g., an edible perishable item) is provided that includes an ethylenically unsaturated component that is optionally also an active hydrogen component (AHC). The coating composition may optionally include a PMCA, an AHC (e.g., in addition to the ethylenically unsaturated component in embodiments in which the ethylenically unsaturated component is also an AHC); and/or one or more additives selected from a plasticizer, a wax, a lipid, an amino acid, a dispersing agent, an anti-microbial agent, an anti-browning or -yellowing agent (e.g., ascorbic acid or citric acid), a probiotic, a vitamin, an enzyme, a plant hormone or regulator, a colorant, a flavorant, an aromatic, an oxygen-scavenging agent, a leveling agent, a wetting agent, an adhesion promoter, a compatibilizer, a rheology modifier, or an antifoaming agent. The AHC preferably functions as a barrier and/or binder component. Preferred compounds for the AHC include polysaccharides, lipids, polypeptides, and mixtures thereof, having one or more active hydrogen groups.

In some embodiments, an aqueous barrier coating composition for an edible perishable item (e.g., a fresh fruit or vegetable) is provided that includes: at least 0.2% by weight, based on total solids in the coating composition, of an active hydrogen component comprising a lipid, a polypeptide, a polysaccharide, or a combination thereof, at least 50% by weight of water; optionally a polyvalent metal crosslinking agent; and optionally an antimicrobial agent; where the coating composition is suitable for food-contact, and optionally is edible. The AHC preferably functions as a barrier and/or binder component.

In some embodiments, a barrier coating composition for a perishable item (e.g., an edible perishable item) is provided that includes a mono-ester or mono-ester salt of a hydroxyl-functional compound other than glycerol, optionally one or more additives selected from a plasticizer, a wax, a lipid, an amino acid, a dispersing agent, an anti-microbial agent, an anti-browning or -yellowing agent (e.g., ascorbic acid or citric acid), a probiotic, a vitamin or other nutrient, an enzyme, a plant hormone or regulator, a colorant, a flavorant, an aromatic, an oxygen-scavenging agent, a compatibilizer, a leveling agent, a wetting agent, an adhesion promoter, a rheology modifier, or an antifoaming agent. Preferably, the mono-ester or mono-ester salt of a hydroxyl-functional compound other than glycerol functions as a barrier and/or binder component.

In some embodiments, a barrier coating composition for a perishable item (e.g., an edible perishable item) is provided that includes one or more oligosaccharide or polysaccharide; one or more of a PMCA, peptide, polypeptide, aglycone, phenol and/or polyphenol (e.g., ferulic acid, tannic acid, gallic acid, and the like), citric acid, amino acid or monoester; and optionally one or more additives selected from a plasticizer, a wax, a lipid, an amino acid, a dispersing agent, an anti-microbial agent, an anti-browning or -yellowing agent (e.g., ascorbic acid or citric acid), a probiotic, a vitamin or other nutrient, an enzyme, a plant hormone or regulator, a colorant, a flavorant, an aromatic, an oxygen-scavenging agent, a compatibilizer, a leveling agent, a wetting agent, an adhesion promoter, a rheology modifier, or an antifoaming agent.

In some embodiments, a method is provided that includes causing a coating composition (preferably any of the barrier coating compositions disclosed herein) to be applied to at least a portion of a surface of a perishable item such as, for example, a plant item (e.g., a fresh fruit or vegetable), a seafood, a cultured-cell seafood product, a meat, a cultured-cell meat product, a plant-based meat product, a pharmaceutical, a baked good, a confectionary, or an other prepared food.

In some embodiments, a method is provided that includes coating at least a portion of a surface of a perishable item such as, for example, a plant item, a seafood, a cultured-cell seafood product, a meat, a cultured-cell meat product, a plant-based meat product, a pharmaceutical, a baked good, a confectionary, or an other prepared food with a coating composition (e.g., any of those disclosed herein).

In some embodiments, a perishable item (e.g., a plant item, a seafood, a cultured-cell seafood product, a meat, a cultured-cell meat product, a plant-based meat product, a pharmaceutical, a baked good, a confectionary, or an other prepared food) is provided having at least a portion of a surface coated with a coating (preferably a barrier coating) formed from a coating composition (e.g., any of those disclosed herein).

In some embodiments, a method of coating any substrate disclosed herein is provided, preferably a perishable item (e.g., a plant item, a seafood, a cultured-cell seafood product, a meat, a cultured-cell meat product, a plant-based meat product, a pharmaceutical, a baked good, a confectionary, or an other prepared food), the method comprising: providing a multi-part barrier coating composition including (i) a first part and (ii) a second part. The first part includes an active hydrogen component (AHC). The second part includes one or more compounds reactive with the first part (e.g., an optional polyvalent metal crosslinking agent, PMCA) and/or that facilitates the reaction of the AHC in the first part with one or more ingredients of the first part (e.g., one or more of an enzyme, polypeptide, oligosaccharide, polysaccharide, or a catalyst to facilitate one or more crosslinking reactions). The first and/or second parts optionally include one or more additives selected from a plasticizer, a wax, a lipid, an amino acid, a dispersing agent, an anti-microbial agent, an anti-browning or -yellowing agent (e.g., ascorbic acid or citric acid), a probiotic, a vitamin or other nutrient, an enzyme, a plant hormone or regulator, a colorant, a flavorant, an aromatic, an oxygen-scavenging agent, a compatibilizer, a leveling agent, a wetting agent, an adhesion promoter, a rheology modifier, or an antifoaming agent. The multi-part coating composition is preferably applied on at least a portion of a surface of the perishable item, wherein the first and second parts are combined just prior to application (e.g., subsequent to leaving their respective storage containers such as, e.g., in an inline mixer), during application (e.g., via application of two or more sprays via a single sprayer or multiple sprayers), or after application on the perishable item (e.g., via diffusion and/or penetration in a “wet-on-wet” or “wet-on-dry” coating). In some embodiments, the first and second parts react undergo a chemical reaction on the surface of the perishable item.

In some embodiments, a kit for use by a consumer is provided. The kit preferably includes a coating component that includes (i) a liquid barrier coating composition (e.g., for use in forming a barrier coating on a plant item or food) or (ii) a liquid concentrate or a dry concentrate (e.g., a powder or tablet or pellets) for combining with solvent (e.g., water and/or organic solvent such as, e.g., ethanol) to form a liquid barrier coating composition (e.g., for use in forming a barrier coating on a plant item or food). The kit preferably further includes instructions for one or both of: (a) preparing the liquid barrier coating composition from the dry concentrate or (b) applying the liquid barrier coating composition on a harvested plant item, preferably a whole or minimally processed harvested fruit or vegetable, or another food (e.g., a prepared food such as guacamole, sushi or other processed fresh seafood or meat product, a plant-based meat product, cut or cubed fruit or vegetables, and the like). The kit may optionally include a container (e.g., a bottle, bag, pouch, or other container).

In some embodiments, a kit for use by a consumer is provided that preferably includes a ripening inhibitor, which is typically present in a liquid ripening inhibitor composition or a liquid concentrate or a dry concentrate (e.g., a powder, tablet, or pellets). The kit optionally includes a solvent, which is typically water. The kit preferably includes instructions for one or both of: (a) preparing a liquid ripening inhibitor composition from the ripening inhibitor and solvent, preferably water or (b) applying a ready-to-use liquid ripening inhibitor composition provided in the kit on a harvested or soon-to-be-harvested plant item, preferably a whole or minimally processed harvested fruit or vegetable, or another food (e.g., a prepared food such as guacamole, sushi or other processed fresh seafood or meat product, a cell-cultured seafood or meat product, a plant-based meat product, cut or cubed fruit or vegetables, and the like). The kit may optionally include a container (e.g., a bottle, bag, pouch, or other container).

In some embodiments, a method is provided that includes causing a user (e.g., a restaurant or cafeteria worker or other food-service worker, an individual retail consumer, a farmers market worker, a CSA worker, or a small independent farmer) to apply a liquid barrier coating composition (e.g., any of those disclosed herein) on a food or plant item (e.g., any of the food or plant items referenced herein). The method optionally includes causing the user to apply a wash solution to the food or plant item prior to applying the liquid barrier coating composition.

In some embodiments, a method of coating a plant surface (e.g., of a fresh fruit or vegetable) is provided. The method preferably includes assessing (e.g., measuring or identifying) a characteristic of a plant item, which can optionally comprise assessing two or more different characteristics of a plant item. The method preferably includes adjusting one or both ofa wash characteristic or a coating characteristic (e.g., a crosslinking parameter, coating solids, an amount of applied coating per substrate area, a ripening agent, a ripening inhibitor, etc.) of a plant barrier coating composition as a function of the assessed plant item characteristic (e.g., a carbon dioxide level, an oxygen level, an ethylene level, a sugar level, an acid level, a firmness level, a color indicator or other visual indicator, whether the plant item has been treated with a ripening agent such as ethylene gas, whether the plant item has been treated with a ripening inhibitor such as, e.g., an ethylene receptor antagonist, etc.). A liquid barrier coating composition is preferably applied to at least a portion of a surface of the plant item. The method may be especially useful for high-throughput produce processing/packing lines.

In some embodiments, the present disclosure provides a coating system for coating a plant item. The coating system preferably includes a sensor, more typically a plurality of sensors; and a computing device including at least a processing device and including, or in communication with (e.g., via an internet connection, wired network connection, or wireless network connection), a computer readable storage device, the computing device in communication with the sensor, the computer readable storage device storing data instruction executable by the computing device to cause the computing device to: determine a level of ripeness (or other attribute) of the plant item, and generate a coating instruction for the plant item.

In some embodiments, the present disclosure provides a computer readable storage device storing data instructions that, when executed by a processing device, cause the processing device to perform operations comprising: receive an input from one or more sensors, wherein the input comprises a measurement or identification associated with a plant item to be coated (e.g., any of those previously disclosed herein, preferably an edible fruit or vegetable, more preferably a freshly harvested edible fruit or vegetable); and generate a coating recommendation or instruction.

In some embodiment, the present disclosure provides a method of treating (e.g., coating) fresh fruit or vegetables at a retail point of sale to extend the quality and/or shelf-life. The method preferably includes providing either a liquid composition or a dry or liquid concentrate for use in forming a liquid composition (e.g., any of those disclosed herein). If a dry or liquid concentrate is used the liquid composition is prepared from it. The liquid composition is applied to at least a portion of surfaces of the fruit or vegetables.

In some embodiments, the present disclosure provides a method of coating a plant-based meat product. The method preferably includes providing a plant-based meat product and applying a composition comprising a film-forming component, one of more non-film forming additives, or combination thereof to at least a portion of a surface of the plant-based meat product or inserted into the bulk of the plant-based meat product.

In some embodiments, the present disclosure provides a kit for use by a consumer. The kit preferably includes an absorbent article comprising a wipe, a pad, a sponge, foam, or a cloth impregnated with a liquid composition for use in preserving (e.g., preventing from browning) a food (e.g., a harvested or soon-to-be harvested fresh fruit or vegetable, a cut fresh fruit or vegetable, a prepared food such as guacamole, or another prepared food such as sushi, seafood, a meat product, or a plant-based meat product such as a plant-based meat product front Impossible Meat or Beyond Meat). The kit preferably includes instructions for treating (e.g., wiping, sealing, or wrapping) the food with the absorbent article.

In some embodiments, a factory-applied (e.g., for use at a high throughput produce processing facility) wash solution is provided. The wash solution preferably includes a ripening inhibitor and water.

In some embodiments, the present disclosure provides a method including providing a plant item packaging container. A composition is applied that preferably comprises one or more of: a ripening inhibitor, a plant hormone (e.g., a plant growth regulator), a barrier component (e.g., any of the AHC disclosed herein), or a mixture thereof, to the plant item packaging container, or plant items located inside the packaging container, or both. One or more plant items are placed into the container, which is optionally shipped.

In some embodiments, a disposable article is provided. The disposable article preferably includes a substrate and a coating applied to the substrate, where the coating is formed from a coating composition referenced herein (e.g., a liquid coating composition referenced herein such as an aqueous coating composition referenced herein). The disposable article preferably comprises a disposable food-storage, food-handling, or food-serving article, typically a single-use such article.

The description that follows more particularly exemplifies illustrative embodiments. In several places throughout this description, guidance is provided through lists of examples, which examples may be used in various combinations. In each instance, the recited list serves only as a representative group and should not be interpreted as an exclusive list. Thus, the scope of the present description should not be limited to the specific illustrative structures described herein, but rather extends at least to the structures described by the language of the claims, and the equivalents of those structures. Any of the elements that are positively recited in this description as alternatives may be explicitly included in the claims or excluded from the claims, in any combination as desired. Although various theories and possible mechanisms may have been discussed herein, in no event should such discussions serve to limit the claimable subject matter.

BRIEF DESCRIPTION OF DRAWINGS

This patent or application file contains at least one drawing executed in color. Copies of this patent or patent application publication with color drawing(s) will be provided by the Office upon request and payment of the necessary fee.

DETAILED DESCRIPTION

Figure 1:
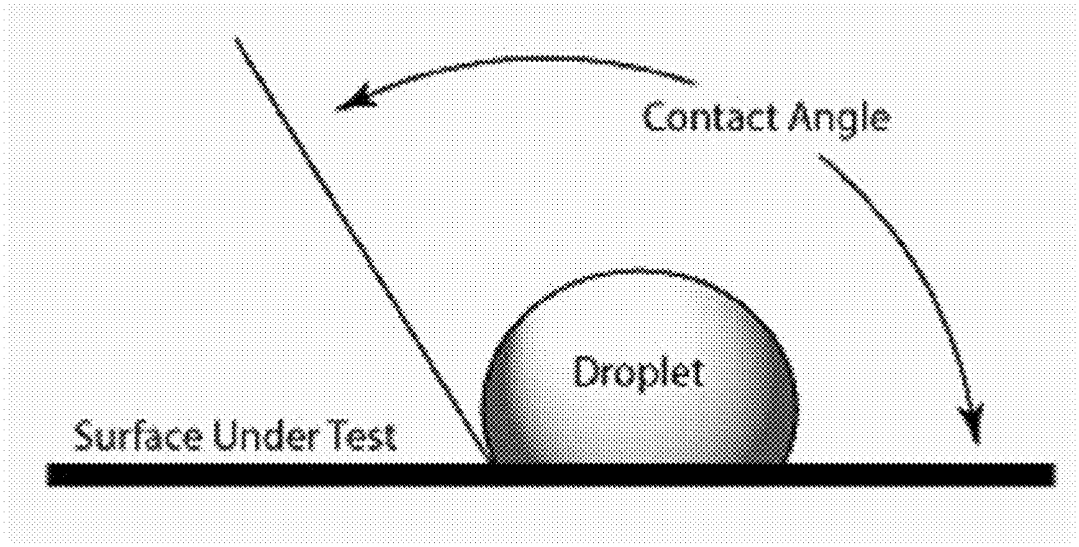
FIG. 1 illustrates measurement of contact angle of a droplet on a surface.

The terms "polymer" and "polymeric material" include, but are not limited to, organic homopolymers, copolymers, such as for example, block, graft, random and alternating copolymers, terpolymers, etc., and blends and modifications thereof. Furthermore, unless otherwise specifically limited, the term "polymer" shall include all possible geometrical configurations of the material. These configurations include, but are not limited to, isotactic, syndiotactic, and atactic symmetries.

Herein, the term "comprises" and variations thereof do not have a limiting meaning where these terms appear in the description and claims. Such terms will be understood to imply the inclusion of a stated step or element or group of steps or elements but not the exclusion of any other step or element or group of steps or elements. By "consisting of" is meant including, and limited to, whatever follows the phrase "consisting of" Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they materially affect the activity or action of the listed elements. Any of the elements or combinations of elements that are recited in this specification in open-ended language (e.g., comprise and derivatives thereof), are considered to additionally be recited in closed-ended language (e.g., consist and derivatives thereof) and in partially closed-ended language (e.g., consist essentially, and derivatives thereof).

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other claims are not useful, and is not intended to exclude other embodiments from the scope of the disclosure.

In this application, terms such as "a," "an," and "the" are not intended to refer to only a singular entity, but include the general class of which a specific example may be used for illustration. The terms "a," "an," and "the" are used interchangeably with the term "at least one."

The phrases "at least one of" and "comprises at least one of" followed by a list refers to any one of the items in the list and any combination of two or more items in the list.

As used herein, the term "or" is generally employed in its usual sense including "and/or" unless the content clearly dictates otherwise.

The term "and/or" means one or all of the listed elements or a combination of any two or more of the listed elements.

Also herein, all numbers are assumed to be modified by the term "about" and in certain embodiments, preferably, by the term "exactly." As used herein in connection with a measured quantity, the term "about" refers to that variation in the measured quantity as would be expected by the skilled artisan making the measurement and exercising a level of care commensurate with the objective of the measurement and the precision of the measuring equipment used. Herein, "up to" a number (e.g., up to 50) includes the number (e.g., 50).

Also herein, the recitations of numerical ranges by endpoints include all numbers subsumed within that range as well as the endpoints and all subranges (e.g., 1 to 5 includes 1, 1.5, 2, 2.75, 3, 3.80, 4, 5, etc. as well as 2 to 5, 1 to 4, 2 to 4, 1.5 to 3, etc.).

As used herein, the terms "room temperature" or "ambient temperature" refers to a temperature of 20° C. to 25° C. If humidity can affect a given parameter measured at room temperature or ambient temperature and a relative humidity is needed, then a relative humidity of 50% should be used, unless indicated otherwise herein.

The term "in the range" or "within a range" (and similar statements) includes the endpoints of the stated range.

The term "skin" as used herein in the context of a fruit or vegetable is used expansively and encompasses rinds, peels, and any other outer endogenous coverings of fruit or vegetables. Depending on the fruit or vegetable, the skin may or may not be edible.

The phrases "free of", "does not include", "does not include any" and the like used herein are not intended to preclude the presence of trace amounts (e.g., parts-per-billion (ppb) or parts-per-trillion (ppt) levels) of the pertinent structure or compound that may be unintentionally present, for example, as environmental contaminants.

As used herein, the terms "harden" and "hardened" are used in their broad contexts as understood by persons of skill in the art. The terms are not intended to require any particular level of rigidity or firmness. Rather, the terms are used for convenience to allow for efficient differentiation between liquid coating compositions and coatings subsequently formed from the liquid coating compositions in which all or substantially all of a liquid carrier is no longer present in the composition (e.g., due to evaporation or other drying or curing). The term may also be used to indicate a continuous or substantially continuous coating formed from a powder coating composition—e.g., by subjecting the applied powder coating composition to heat or other cure conditions.

Unless indicated otherwise, the term "consumer" is used herein to reference an individual consumer (e.g., a so called "retail" consumer that will, for example, use the kit in their home kitchen), a food-service worker (e.g., a kitchen worker such as a restaurant or cafeteria kitchen worker), or a farmer (e.g., a farmers' market worker, a CSA worker, or a small independent farmer or orchardist) that sells produce direct to the public via a community supported agriculture ("CSA") retail program, a farmers' market, or a retail location located on the farm itself.

Unless indicated otherwise, the term "soon-to-be-harvested" refers to a plant item such as a fruit or vegetable that is fully grown or substantially fully grown and market ready or substantially market ready. By way of example, a fruit or vegetable within a day or two prior to harvest is a soon-to-be-harvested plant item.

Unless indicated otherwise, the term "carboxyl-functional compound" as used herein refers to compounds having one or more carboxyl groups (—COOH), one or more salt groups formed from carboxyl groups (typically base-neutralized carboxyl groups), or a combination thereof.

Unless indicated otherwise, the term "hydroxyl-functional compound" as used herein refers to compounds having one or more carboxyl groups (—OH), one or more salt groups formed from hydroxyl groups (typically base-neutralized acid hydroxyl groups, e.g., on ascorbic acid), or a combination thereof.

The term "treatment" is used broadly herein and encompasses both wash compositions and coating compositions. Unless specifically indicated otherwise herein, pure water (e.g., tap water) does not constitute a "wash treatment" or "wash composition".

The term "coating composition" as used herein does not encompass the application of water alone to a substrate to be coated. By way of example, dipping a plant item into tap water or well water does not constitute coating the plant item or applying a coating composition to the plant item. However, by way of further example, an aqueous composition constituting 99% by weight water and 1% by weight of a lipid constitutes a coating composition.

The term "aqueous" is broadly used herein to encompass a substance, solution or system having water as a medium, including, for example, substances, solutions or systems that are water-soluble, water-dispersible, and emulsions, including "oil-in-water" and "water-in-oil" microemulsions, nanoemulsions, microdispersions, nanodispersions, and the like.

The terms "spray" or "sprayed" are used broadly and encompass misting and fogging, as well as droplets with linear or substantially linear paths of travel. The terms also encompass so called "flood coating" in which a heavy spray-like application, which may be so heavy that spray atomization does not occur, is applied via, for example, flood bars, guns, or nozzles and the like often in combination with an air blower, with the excess coating composition typically collected and re-used. (For an example of equipment and techniques for fogging to enable coating of three-dimensional substrate, see, for example, WO2020247667.)

The terms "crosslink" or "crosslinking" are used broadly herein to encompass one or more compounds capable of preferentially interacting or associating with another component of the coating composition such as, for example, via a functional group (e.g., an active hydrogen group) present on the component, which preferably results in one or more desirable coating properties when enough such interactions occur. Such interactions include covalent bonding, chelation, electrostatic complexation, and the like.

Reference throughout this specification to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout this specification are not necessarily referring to the same embodiment of the disclosure. Furthermore, the particular features, configurations, compositions, or characteristics may be combined in any suitable manner in one or more embodiments.

The description that follows more particularly exemplifies illustrative embodiments. In several places throughout the application, guidance is provided through lists of examples, which examples may be used in various combinations. In each instance, the recited list serves only as a representative group and should not be interpreted as an exclusive list. Thus, the scope of the present disclosure should not be limited to the specific illustrative structures described herein, but rather extends at least to the structures described by the language of the claims, and the equivalents of those structures. Any of the elements that are positively recited in this specification as alternatives may be explicitly included in the claims or excluded from the claims, in any combination as desired. Although various theories and possible mechanisms may have been discussed herein, in no event should such discussions serve to limit the claimable subject matter.

In the discussions that follow the terms "plant item", "produce", and "fruit or vegetable" are used for purposes of convenience. While plant items, and particularly fresh fruit and vegetables, are a primary use for compositions, methods, kits, and systems of the present disclosure, it is contemplated that the compositions disclosed herein also have utility with a myriad of other perishable fresh products, and especially edible perishable fresh foods that are not necessarily "plant items" per se. Examples of other perishable items include pharmaceuticals and fresh food items, typically fresh prepared foods, such as fresh dairy items (e.g., cheeses), guacamoles, sushi (e.g., rolls, nigiri, or sashimi) or other processed fresh seafood or meat products (including meats cultured from live seafood or meat cells—e.g., formed seafood products, using processes such as cold extrusion, from cultured cell lines from, e.g., amberjack, mahi mahi, red snapper and/or tuna such as those available from BlueNalu and formed chicken and beef products being developed by Upside Foods, formerly Memphis Meats), plant-based meat products (e.g., plant-based meat products from Impossible Foods or Beyond Meat), cut or cubed fresh fruit or vegetables, confectionaries, and baked goods (e.g., iced donuts and pastries).

In some embodiments, a material may qualify as one or more different recited materials of an embodiment. For example, a component may be both an ethylenically unsaturated component and an AHC. Non-limiting examples of such materials are unsaturated: fatty acids, fatty acid salts, monoglycerides, and diglycerides, and combinations thereof. Unless indicated otherwise herein, such materials should be considered in determining the concentrations or amounts of any material categories in which they fit under. Thus, for example, a coating composition that includes, based on total solids, 10 wt-% of unsaturated fatty acid is considered to be a coating composition that includes 10 wt-% of an ethylenically unsaturated component and 10 wt-% of an active hydrogen component, even if such coating does not include any other ethylenically unsaturated components or active hydrogen components. The discussions herein should be understood to explicitly disclose both "over-lapping" embodiments, e.g., as described above in which an ingredient can fulfill two or more material categories and "non-overlapping" embodiments in which each recited ingredient is fulfilled by a separate ingredient (e.g., where a composition indicated to include both an active hydrogen component and an anti-microbial agent includes at least two ingredients—as opposed to merely one that fulfills both material categories).

In one aspect, the present disclosure provides compositions and methods for providing barrier coatings (including edible such coatings) for perishables such as plant items that preferably exhibit one or more enhanced coating properties that results in longer product shelf-life for coated perishables, enhanced quality of the coated perishables during the shelf-life, and/or the ability to apply less coating composition to achieve a desired level of coating performance, resulting in cost-savings and less opportunity for a consumer to detect the coating material (e.g., via mouth-feel, smell or visual appearance) and potentially form a negative opinion. In some embodiments, such enhanced performance is achieved via crosslinking such as, for example, via enhanced cross-link density compared to conventional barrier coatings for plant items. While not intending to be bound by theory, it is believed that such enhanced crosslinking can lead to one or more enhanced coating properties such as, for example, increased hydrophobicity, decreased water permeability (and thus, e.g., a reduced rate of mass loss for the coated perishable item), increased abrasion resistance, reduced coating brittleness, one or more other increased mechanical properties (e.g., increased tensile strength and the like), reduced oxygen permeability, reduced ethylene permeability, and/or reduced carbon dioxide permeability.

The barrier coating compositions of the present disclosure preferably include one or more of a lipid, an oligosaccharide, a polysaccharide, a peptide, or a polypeptide. Lipids tends to help impart hydrophobicity properties to coatings, which is desirable for barrier coatings, for example, to help resist water vapor permeation and, therefore, mass loss of the coated perishable item due to water loss. Examples of lipids include fatty acids, fatty acid salts, glycerides (e.g., mono- and di-glycerides), oils (e.g., triglycerides), phospholipids, glycolipids, sterols, and waxes. Such hydrophobicity may also help resist premature washing away of the coating. Polysaccharides and polypeptides tend to help impart good mechanical properties to coatings, but can sometimes suffer from poor barrier properties, especially with respect to water. Thus, in some embodiments, barrier coating compositions of the present disclosure are "hybrid" compositions that include: (i) both one or more lipids and one or more polysaccharides and/or polypeptides or (ii) one or more polysaccharides and one or more polypeptides, optionally further one or more lipids. If desired, in certain preferred embodiments, crosslinking may be used to increase the mechanical properties of lipid-based barrier coatings, the barrier properties of polypeptide- and/or polysaccharide-based coatings, and one or both of the barrier and/or mechanical properties of hybrid barrier coatings.

To facilitate efficient application to perishables, the barrier coating composition is typically in liquid form when applied to the perishable item to be protected. Any suitable liquid carrier can be used, although water-based coating compositions are preferred due, at least in part, to cost and ease of handling and application. It can optionally be provided in dry form (e.g., powder, other particulates, and/or or tablet forms) and combined with liquid carrier to form a liquid coating composition prior to application to perishables. It is also contemplated that the perishable item to be protected could be coated with powder (e.g., free flowing finely-divided powder) and the liquid coating composition formed in situ on the perishable item via, for example, endogenous water present on or in the plant item and/or subsequently applied liquid carrier (e.g., misted and/or fogged water, ethanol, or mixtures thereof). Alternatively, to reduce shipping and storage costs prior to application, the barrier coating composition can also be provided as a liquid concentrate that is diluted prior to use via addition of liquid carrier (e.g., water).

Examples of plant items that can benefit from application of compositions of the present disclosure include edible plant items and non-edible plant items, and particularly freshly harvested plant items as well as soon-to-be-harvested plants items (e.g., plant items that are ready-for-harvest or substantially ready-for-harvest). Examples of such plant items may include flowers and other plant cuttings (e.g., plant cuttings for vegetative propagation), seeds, nuts, grains, fruits (including, e.g., berries or whole fruit), vegetables, and minimally processed fruit or vegetables (e.g., cut, sliced, peeled, or cored raw fresh fruit or vegetables). The plant items to be coated may be any portions of a plant that may benefit from coating including, for example, a seed, a bulb, a tuber, a corm, a rhizome, a root, a plant cutting, a plant seedling, or a flower (e.g., a cut flower). Examples of fruits that may benefit from application of compositions of the present disclosure include climacteric and non-climacteric fruit, including, for example, an akee, an apple, an apricot, an avocado, a banana, a blackberry, a blueberry, a carambola, a cherry, a coconut, a cranberry, a citrus fruit (e.g., a lemon, a lime, an orange, a mandarin, or a grape fruit), a cucumber (e.g., an English cucumber), a durian, an eggplant, a fig, a grape, a guava, a kiwi, a lychee, a mango, a melon (e.g., a watermelon, a cantaloupe, a honeydew, or a muskmelon), a nectarine, a *papaya*, a passionfruit, a peach, a peapod, a pear, a persimmon, a pineapple, a pepper (e.g., a bell peppers, a habanero pepper, a jalapeno pepper, a poblano pepper, or a serrano pepper), a plum, a pluot, a pomegranate, a raspberry, a strawberry, a squash (e.g., a pumpkin, an acorn squash, a butternut squash, a spaghetti squash, or a zucchini), a tomato, or an uchuva. Examples of vegetables that may benefit from application of compositions of the present disclosure include asparagus, herbs (e.g., fresh herbs, including herb cuttings, such as fresh basil, curry, cilantro, mint, parsley, rosemary, or thyme), beans (e.g., green beans), broccoli, Brussels sprouts, cabbage, carrots, cauliflower, celery, cilantro, corn, garlic, green onions, lettuce, other leafy greens, leeks, onions, mushrooms, parsley, potatoes, shallots, spinach, sweet potatoes, artichokes, or yams.

The compositions of the present disclosure also have utility for use on processed foods, both plant-based and otherwise. Examples of such processed foods include freshly cut, sliced, cored, and/or peeled raw fruits or vegetables such as, e.g., apple slices, cucumber slices, kiwi slices, mango chunks, pineapple chunks, and the like; sushi such as, e.g., nigiri, sashimi, sushi rolls, and the like; fresh uncooked seafood such as, e.g., scallops, fish (e.g., whole or filleted), shrimp, squid, clams, crab, oysters, abalone, snails, other mollusks, and the like; plant-based meat; other meat products; and the like.

Preferably, the barrier coatings, when present on perishables, will not be perceptible to typical consumers, who are not already aware the perishable has been coated, via one or more, and preferably all, pertinent senses (i.e., touch, taste, smell, and appearance). Thus, the barrier coatings of the present disclosure are preferably clear, or substantially clear, so as not to negatively affect consumer perceptions regarding the quality or appeal of the coated perishable item. Alternatively, if the coating is not clear or substantially clear, it should preferably have an appearance that is substantially matched (e.g., color, gloss and/or sheen) to the surface of the perishable (e.g., fruit or vegetable surface) on which it is was applied. Similarly, the coatings are preferably not overly tacky or slippery, but rather, have a tactile surface feel that is similar to that of the surface of the perishable item prior to coating. For edible embodiments in which the coating will likely be consumed, the dried/hardened coatings preferably do not have a perceptible odor or taste to a typical human consumer when present as a coating on a consumed food. In such edible embodiments, the coating preferably does not perceptibly alter the texture or mouthfeel to a coated food item when being consumed by a typical human consumer.

The barrier coating compositions of the present disclosure preferably includes a barrier component that, in preferred embodiments, includes an active hydrogen component that includes one or more compounds having one or more active hydrogen groups. While not intending to be bound by any theory, the presence of active hydrogen groups can provide various benefits including, for example, polarity, hydrophilicity, water-dispersibility (e.g., neutralized acid or base groups), hydrogen bonding or other preferential interactions (e.g., other Van der Waals bonding), and/or cross-linking sites. In some embodiments, the barrier component is a film-forming component, although in some embodiments it may not be necessary that film coalescence occurs during formation (e.g., hardening under ambient conditions) of the barrier coating to achieve a desired minimum balance of coating properties.

The active hydrogen component (hereinafter "AHC" for short) can be any suitable compound, or combination of compounds, that includes one or more active hydrogen groups such as a monomer or other low-molecular-weight compound (e.g., a compound having a number average molecular weight (Mn) of less than 500, less than 400, less than 300, less than 200, or less than 100 Daltons), an oligomer, a polymer, or any combination thereof. Compounds of the AHC can exhibit any suitable molecular weight. In some embodiments, the compounds of the AHC exhibits an Mn of at least 100, at least 200, at least 300, at least 400, at least 500, at least 1,000, at least 2,000, at least 3,000, at least 4,000, at least 5,000, at least 10,000, at least 15,000, at least 20,000, or at least 50,000. In some embodiments, the compounds of the AHC exhibit Mn of less than 100,000, less than 50,000, less than 20,000, less than 10,000, less than 8,000, less than 6,000, less than 4,000, less than 3,000, less than 2,000, less than 1,000, less than 500, or less than 200. Gel permeation chromatography (GPC) using polystyrene standards is a useful method for determining Mn.

Examples of suitable active hydrogen groups include carboxyl groups (or anhydride groups); hydroxyl groups; amine groups (typically primary or secondary amine groups); any other suitable active hydrogen group having a hydrogen attached to an oxygen atom (O), sulfur atom (S), or nitrogen (N) atom such as, for example, in the groups: $—SH$, $=NH$, $—S(=O)_2(OH)$, $—S(=O)OH$; acid groups including P, O, and H such as phosphonic or phosphinic groups; salt groups thereof (e.g., base-neutralized acid groups); or any combination thereof. Hydroxyl groups and carboxyl groups (including salt groups formed from carboxyl groups such as base-neutralized carboxyl groups) are particularly preferred. In some embodiments, the AHC includes two or more different active hydrogen compounds such as for, example, one or more carboxyl groups or salts thereof and one or more hydroxyl groups. The AHC may also include one or more functional groups other than active hydrogen groups such as, for example, oxirane groups or carbon-carbon double bonds. In some embodiments, one or more active hydrogen groups and/or other functional groups present in the AHC assist with crosslinking of the coating composition.

The one or more active hydrogen groups can be located at any location on the one or more active hydrogen compounds of the AHC, including, for example, at terminal ends (e.g., at an end of a polymer backbone), at pendant locations (e.g., at locations attached at non-terminal locations of a backbone or compound), or combinations thereof. The one or more active hydrogen compounds can include one or more, two or more, three or more, or four or more active hydrogen groups located at pendant locations, and optionally in addition to one or more active hydrogen groups located at terminal backbone locations. In some embodiments, the AHC includes at least one active hydrogen compound that includes two or more different types of active hydrogen compounds, including any combination of the specific active hydrogen groups referenced herein (e.g., one or more hydroxyl groups and one or more carboxyl groups or salt groups thereof, one or more hydroxyl groups and one or more amine groups, one or more amine groups and one or more carboxyl groups or salt groups thereof, and so on).

The coating composition can include any suitable amount of AHC to achieve the desired result. Typically, the AHC will constitute at least about 25 wt-%, at least about 50 wt-%, at least about 60 wt-%, at least about 70 wt-%, at least about 80 wt-%, at least about 85 wt-%, at least about 90 wt-%, at least about 95 wt-%, at least about 96 wt-%, at least about 97 wt-%, at least about 98 wt-%, or 99 wt-% or more, based on the total weight of solids in the coating composition. While the upper amount of AHC present in the coating composition is not restricted, it may be 100 wt-%, less than 100 wt-%, no more than about 99 wt-%, no more than about 98 wt-%, no more than about 97 wt-%, no more than about 96 wt-%, no more than about 95 wt-%, no more than about 90 wt-%, no more than about 80 wt-%, no more than about 70 wt-%, no more than about 60 wt-%, no more than about 50 wt-%, no more than about 40 wt-%, or no more than about 30 wt-%, based on the total weight of solids in the coating composition.

In certain preferred embodiments, the barrier coating composition includes one or more carboxyl-functional active hydrogen compound, optionally in combination with one or more other active hydrogen compound (e.g., non-carboxyl-functional active hydrogen compounds) such as, for example, a hydroxyl-functional compound. In some embodiments, the carboxyl-functional compound does not include any active hydrogen groups other than carboxyl groups or salt groups thereof. In other embodiments, the carboxyl-functional compound includes one or more carboxyl groups in combination with one or more other functional groups (e.g., one or more, two or more, three or more, or four or more non-carboxyl groups such as hydroxyl groups, carbon-carbon double bonds, epoxy groups, amide groups, amine groups, or combinations thereof). The carboxyl-functional compound can include a plurality (e.g., two or more, three or more, or four or more) of carboxyl groups, which may be desirable in some embodiments to increase the extent of crosslinking when used in combination with certain polyvalent metal crosslinking compounds discussed herein. Thus, in some embodiments, one or more polycarboxyl-functional compounds are present in the coating composition. Such polycarboxyl-functional compounds may be, for example, biopolymers, such as edible polysaccharides or polypeptides; fatty acids having two-or more carboxyl groups (e.g., dimer fatty acids), or other lipids having two or more carboxyl groups, preferably edible such lipids in edible embodiments; or mixtures thereof.

Examples of suitable active hydrogen compounds include lipids, oligopeptides, polypeptides, oligosaccharides, polysaccharides, and combinations thereof having one or more active hydrogen groups (e.g., one or more of any of the active hydrogen groups referenced herein). For purposes of convenience, oligopeptides and polypeptides are referred to collectively hereinafter as "polypeptides" and oligosaccharides and polysaccharides are referred to hereinafter collectively as "polysaccharides". The AHC can include a single active hydrogen compound or two or more, three or more, or four or more active hydrogen compounds that are chemically distinct from one another. Examples of such combinations include a combination of a first active hydrogen compound that is carboxyl-functional and a second active hydrogen compound that is not carboxyl-functional, a combination of a first active hydrogen compound that is a lipid and a second active hydrogen compound that is a polysaccharide, a combination of a first active hydrogen compound that is a lipid and a second active hydrogen compound that is a polypeptide, a combination of a first active hydrogen compound that is a polypeptide and a second active hydrogen compound that is a polysaccharide, and so on.

In some embodiments, the AHC includes a first active hydrogen compound having one or more, more typically a plurality of cationic group (e.g., $—NH_3^+$ or $=NH_2^+$) and a second active hydrogen compound having one or more, more typically a plurality of anionic groups (e.g., $—COO^-$). In polypeptides, cationic groups may be provided, for example, by structural units derived from arginine, histidine, and lysine and anionic groups from structural units derived from aspartic acid and glutamic acid. In some embodiments, the AHC includes (i) a polysaccharide having anionic groups and a polypeptide having cationic groups and/or (ii) a polysaccharide having cationic groups and a polypeptide having anionic groups. For example, one such combination is pectin having carboxylate anionic groups and a polypeptide having, for example, structural units with cationic groups formed from arginine, histidine, and/or lysine. While not intending to be bound by theory, it is believed that pairing of such anionic and cationic groups can lead to beneficial electrostatic complexation, for example, between a polypeptide having cationic groups and a polysaccharide having anionic groups, or vice versa, which can lead to improved coating properties.

Active hydrogen compounds having any suitable acid value (i.e., non-zero), if any, may be used. As discussed herein, in some embodiments it may be advantageous to use one or more materials including acid groups (e.g., carboxyl groups or salt groups thereof) to provide, for example, one or more of: cross-linking sites, polarity, or hydrophilicity (including, e.g., water-dispersing groups). In some embodiments, the AHC overall and/or one or more active-hydrogen compounds present in the AHC has an acid value of at least 2, at least 5, at least 8, at least 10, at least 11, at least 12, at least 13, at least 14, at least 15, at least 16, at least 17, at least 18, at least 19, at least 20, at least 25, at least 30, at least 40, at least 50, at least 60, at least 70, at least 80 at least 90, or at least 100 mg KOH per gram of the AHC or per gram of the one or more active-hydrogen compounds present in the AHC. Typically, the AHC overall and/or one or more active hydrogen compounds present in the AHC will have an acid value of less than 400, less than 300, less than 200, less than 150, less than 125, less than 100, less than 50, less than 30, less than 25, less than 20, less than 15, less than 10, less than 8, less than 5, or less than 1 mg KOH per gram of the material. In some embodiments, the AHC overall and/or one or more active hydrogen present in the AHC has an acid value of from at least about 10 to less than about 400, at least about 50 to less than about 300, or at least about 75 to less than about 250 mg KOH per gram of the material. Acid numbers are typically expressed as milligrams of KOH required to titrate a 1 gram sample to a specified end point. Methods for determining acid numbers are well known in the art, and are shown, for example, in ASTM D 974-04 entitled "Standard Test Method for Acid and Base Number by Color-Indicator Titration".

In aqueous embodiments in which the AHC includes carboxyl-functional groups, typically at least some (or all or substantially all) of the carboxyl-functional groups are neutralized with base. Any suitable base can be used, although in some embodiments it may be advantageous to use a fugitive base such as, e.g., a suitable nitrogen-containing volatile base. In embodiments intended for edible end uses, the one or more bases used are preferably safe for use as a direct food-additive (e.g., a base recognized as Generally Recognized as Safe, "GRAS", by the FDA). Examples of suitable fugitive bases include ammonium hydroxide (resulting in ammonia), amines (e.g., morpholine, dimethylethanolamine, and the like), and combinations thereof. In some embodiments, the one or more base is a metallic salt (e.g., NaOH, KOH, $Ca(OH)_2$, $Mg(OH)_2$, etc.), either alone or in combination with a fugitive base. In certain preferred embodiments, a base is used that forms a water-emulsifiable or water-soluble salt with a carboxyl-functional compound (e.g., a fatty acid having 7 or more, 8 or more, or 9 or more carbon atoms). Non-limiting examples of such bases include sodium bases (e.g., NaOH), potassium bases (e.g., KOH), and combination thereof, which may be optionally combined, for example, with non-metallic bases such as ammonia.

The coating composition can include any suitable amount of one or more carboxyl compounds and/or salts thereof. For example, the coating composition may include at least 5 wt-%, at least 10 wt-%, at least 30 wt-%, at least 50 wt-%, at least 70 wt-%, at least 90 wt-%, or at least 99 wt-% weight percent (wt-%) of carboxyl-functional component, based on the weight of total solids in the coating composition. In some embodiments, the carboxyl-functional component is included in an additive amount to enhance one or more coating properties. In other embodiments, the carboxyl-functional component is included in a large amount due to its use as a primary or main coating ingredient on a solids basis.

Active hydrogen compounds having any suitable hydroxyl value (i.e., non-zero), if any, may be used. As discussed herein, in some embodiments it can be advantageous to use one or more materials including hydroxyl groups to provide, for example, one or more of cross-linking sites, polarity or hydrogen bonding. In some embodiments, the AHC overall and/or one or more active-hydrogen compounds present in the AHC has a hydroxyl value of has a hydroxyl value of at least 5, at least 8, at least 10, at least 15, at least 20, at least 25, at least 30, at least 40, at least 50, at least 60, at least 70, at least 80 at least 90, or at least 100 mg KOH per gram of the material. Typically, the AHC overall and/or one or more active hydrogen compounds present in the AHC has a hydroxyl value of less than 400, less than 300, less than 200, less than 150, less than 125, less than 100, less than 50, less than 30, less than 25, less than 20, less than 15, less than 10, less than 5, or less than 1 mg KOH per gram of the material. In some embodiments, the AHC overall and/or one or more active hydrogen compounds present in the AHC has a hydroxyl value of from at least about 5 to less than about 400, at least about 10 to less than about 200, or at least about 20 to less than about 100 mg KOH per gram of the material. Hydroxyl numbers are typically expressed as milligrams of potassium hydroxide (KOH) equivalent to the hydroxyl content of 1 gram of the hydroxyl-containing substance. Methods for determining hydroxyl numbers are well known in the art, and are shown, for example, in ASTM D 1957-86 (Reapproved 2001) entitled "Standard Test Method for Hydroxyl Value of Fatty Oils and Acids".

In some embodiments, the AHC includes more than 50 weight percent ("wt-%") hydroxyl-functional compounds, based on solids. In other embodiments, the AHC includes more than 50 weight percent ("wt-%") of carboxyl-functional compounds, based on solids.

In some embodiments, the AHC includes a carboxyl-functional compound and another active hydrogen compound that is chemically different (e.g., an active hydrogen compound that is not carboxyl-functional, an active hydrogen compound that is carboxyl-functional but is chemically distinct in another respect, and so on).

One or more saturated active hydrogen compounds, one or more unsaturated active hydrogen compounds, or combinations thereof can be included in coating compositions of the present disclosure. In some embodiments, the coating composition includes one or more active hydrogen compound having one or more non-aromatic carbon-carbon double bonds such as one or more aliphatic or cycloaliphatic carbon-carbon double bonds. Examples of preferred unsaturated active hydrogen compounds include unsaturated fatty acids (e.g., mono- or poly-unsaturated fatty acids), esterified compounds of such unsaturated fatty acids (e.g., glycerides), and combinations thereof. Cis double bonds are preferred double bonds for edible coating composition embodiments.

In some embodiments, the coating composition includes one or more of fatty acids or salts of fatty acids, which may be saturated, unsaturated (i.e., may contain one or more non-aromatic carbon-carbon double bonds), or a mixture thereof (i.e., one or more saturated fatty acids and/or salts thereof and one or more unsaturated fatty acids and/or salts thereof). The total fatty acid content of the coating composition, if any is present, typically exhibits an iodine value of less than 400, less than 350, less than 300, less than 250, less than 200, less than 150, than 120, less than 100, less than 70, less than 50, less than 40, less than 30, less than 20, less than 15, less than 10, less than 5, less than 1, or 0 centigrams of iodine per gram of total fatty acid content. In some embodiments, the total fatty acid content of the coating composition, if any is present, exhibits an iodine value of greater than 0, greater than 1, greater than 5, greater than 10, greater than 15, greater than 20, greater than 30, greater than 40, greater than 50, greater than 60, greater than 70, greater than 80, greater than 90, greater than 100, greater than 120, or greater than 150 centigrams of iodine per gram of total fatty acid content. The iodine value corresponding to total fatty acid content of the coating composition can conveniently be determined, for example, based on iodine values of fatty acid feedstock(s) used to make the coating composition and the proportion of such feedstocks relative to one another if more than one is used. In some embodiments, the coating composition does not include any unsaturated fatty acids or salts thereof.

In some embodiments, the coating composition includes one or more glycerides, also commonly referred to as acylglycerols. If desired, the coating composition can include any combination of mono-glycerides (monoacylglycerols such as 1-monoacylglycerols or 2-monoacylglycerols), di-glycerides (diacylglycerols such as 1,3-diacylglycerols or 1,2-diacylglycerols), triglycerides (triacylglycerols), or combinations thereof. Mono-glycerides are preferred glycerides. The total glyceride content in the coating composition, if any is present, typically exhibits an iodine value of less than less than 400, less than 350, less than 300, less than 250, less than 200, less than 150, less than 120, less than 100, less than 70, less than 50, less than 40, less than 30, less than 20, less than 15, less than 10, less than 5, less than 1, or 0 centigrams of iodine per gram of total glyceride content. In some embodiments, the total glyceride content in the coating composition, if any is present, exhibits an iodine value of greater than 0, greater than 1, greater than 5, greater than 10, greater than 15, greater than 20, greater than 30, greater than 40, greater than 50, greater than 60, greater than 70, greater than 80, greater than 90, greater than 100, greater than 120, or greater than 150 centigrams of iodine per gram of total glyceride content. The iodine value corresponding to total glyceride content of the coating composition can conveniently be determined, for example, based on iodine values of glyceride feedstock(s) used to make the coating composition and the proportion of such feedstocks relative to one another if more than one is used. In some embodiments, the coating composition does not include any unsaturated glycerides.

In some embodiments, the total glyceride and fatty acid content in the coating composition, if any of either are present, exhibits an iodine value of less than 250, less than 200, less than 150, less than 120, less than 100, less than 70, less than 50, less than 40, less than 30, less than 20, less than 15, less than 10, less than 5, less than 1, or 0 centigrams of iodine per gram of total glyceride and fatty acid content. In some such embodiments, the total glyceride and fatty acid content of the coating composition exhibits an iodine value, if any, of greater than 0, greater than 1, greater than 5, greater than 10, greater than 15, greater than 20, greater than 30, greater than 40, greater than 50, greater than 60, greater than 70, greater than 80, greater than 90, or greater than 100, greater than 120, or greater than 150 centigrams iodine per gram of total glyceride content. The iodine value corresponding to total glyceride and fatty acid content of the coating composition can conveniently be determined, for example, based on iodine values of glyceride and fatty acid feedstocks used to make the coating composition and the proportion of such feedstocks relative to one another. In some embodiments, the coating composition does not include any unsaturated glycerides or fatty acids.

The lipids (e.g., glycerides, fatty acids, mono-esters of a fatty acid and a hydroxyl-functional compound other than glycerol, etc.) included in the coating composition, if any, can exhibit any suitable peroxide value. Detection of peroxide can provide evidence of rancidity in fats and oils. Peroxide value gives a measure of the extent to which an oil or fat has undergone primary oxidation, which can lead to deterioration that forms off-flavors and off-odors. Peroxide value is useful for assessing the extent to which spoilage has advanced. The American Oil Chemist' Society (AOCS) Official Method Cd 8-53 is an example of a useful method for determining peroxide value. Peroxide values are typically reported as milliequivalents of peroxide oxygen per kg of material tested (meq/kg). In embodiments of the coating composition that are formulated using one or more lipids (e.g., glycerides, mono-esters of a fatty acid and a hydroxyl-functional compound other than glycerol, and/or fatty acids), the lipids included in the coating composition preferably have a peroxide value, if any, of less than 30, less than 20, less than 10, less than 5, less than 4, less than 3, less than 2, less than 1, or less than 0.1 meq/kg.

The overall coating composition (e.g., at the time of application to the perishable item) can have any suitable peroxide value, if any, such as, for example, less than 30, less than 20, less than 10, less than 5, less than 4, less than 3, less than 2, less than 1, or less than 0.1 meq/kg. In some embodiments, the hardened coating after application to a perishable fruit or vegetable (e.g., an avocado or lemon) exhibits a peroxide value, if any, pursuant to the preceding sentence when the coated fruit or vegetable is stored at room temperature conditions (e.g., 25° C. and 50% relative humidity) for 24 hours, 2, days, 3 days, 4 days, 5 days, 6 days, 7 days, 10 days, 14 days, 21 days, or 28 days after coating.

In some embodiments, the coating composition includes, if any, less than 1 wt-%, less than 0.1 wt-%, less than 0.01 wt-%, or less than 0.001 wt-% of material including one or more carbon-carbon double bonds in the trans configuration. In embodiments in which the coating composition is edible and will be deployed in such a manner that it will likely be consumed by a person (e.g., applied on a surface of a processed food or edible surface of a fruit or vegetable), the coating composition is preferably not intentionally formulated using any trans-fat ingredients, although detectable trace amounts may still be present due to, e.g., environmental contamination. In preferred edible embodiments, the coating composition complies with U.S. Food and Drug Administration (FDA) labeling requirements and can be labeled as containing 0 grams of trans fat (i.e., contains less than 0.5 grams of trans fat, if any, in a serving). Preferably, the amount of trans fats, if any, present in the coating composition is sufficiently low such that its application to a food product that qualifies for labeling as containing 0 grams of trans fats per serving does not increase the amount of trans fats per serving to an extent that the coated food can no longer be labeled as containing 0 grams per serving of trans fats.

As discussed above, in some embodiments the AHC includes a saturated or unsaturated fatty acid, both, or salt(s) thereof. The fatty acids can be a short-chain fatty acid (SCFA), medium-chain fatty acid (MCFA), long-chain fatty acid (LCFA), very long-chain fatty acid (VLCFA), or combination thereof. In some embodiments, one or more fatty acids are used that have a carbon chain length (including the carbonyl carbon atom) of 8 or more, 9 or more, 10 or more, 11 or more, 12 or more, 13 or more, 14 or more, 15 or more, 16 or more, 17 or more, or 18 or more carbon atoms. The one or more fatty acids typically have a carbon chain length (including the carbonyl carbon atom) of 25 or less, 22 or less, 20 or less, 19 or less, 18 or less, 17 or less, 16 or less, 15 or less, or 14 or less. In some embodiments, one or more fatty acids are used that have a carbon chain length (including the carbonyl atom) of 12 to 18 (i.e., 12, 13, 14, 15, 16, 17, and/or 18). In some embodiment even-numbered fatty acids are preferred, with C12 and C18 fatty acids being particularly preferred. The AHC may also, or alternatively, include one or more fatty acids having a carbon chain length (including the carbonyl atom) of 7 to 11 (i.e., 7, 8, 9, 10, and/or 11).

Examples of suitable saturated fatty acids for use in the AHC include capronic acid, caprylic acid, capric acid, lauric acid, myristic acid, palmitic acid, stearic acid, arachic acid, behenic acid, and combinations thereof. Preferred saturated fatty acids include myristic acid, palmitic acid, stearic acid, lauric acid, and combinations thereof. In some embodiments, the AHC includes one or more antimicrobial fatty acids or esters thereof, with lauric acid being particularly desirable because it is an antimicrobial agent effective against both bacteria, including gram positive and gram negative bacteria, and fungus.

In some embodiments the AHC includes one or more unsaturated fatty acids, which can be mono-unsaturated fatty acids, polyunsaturated fatty acids, or a combination thereof. Preferred unsaturated fatty acids include one or more or two or more cis carbon-carbon double bonds, and more preferably are free of trans carbon-carbon double bonds. Examples of preferred cis configuration monounsaturated fatty acids include 9-cis-hexadenoic acid (also referred to as palmitoleic acid), 9-cis-octadenoic acid (also referred to as oleic acid), 13-cis-decosenoic acid (also referred to as erucic acid), and combinations thereof, with oleic acid being particularly preferred due to its ample supply and low cost. In some embodiments, for health benefits, it is advantageous to use one or more polyunsaturated fatty acids selected from omega-3-fatty acids, omega-6-fatty acids, or a mixture thereof—typically, one or more isomer of linoleic acid, one or more isomer of linolenic acid, or a combination thereof. In certain edible embodiments, it is preferred to use only isomers of linoleic acid and/or linolenic acid in which all of the carbon-carbon double bonds are in the cis configuration. Other suitable cis configuration polyunsaturated acids may include 5,8,11,14-all-cis-eicosatetraenoic acid (also referred to as arachidonic acid), eicosapentaenoic acid ("EPA", $C_{20}H_{30}O_2$), and docosahexaenoic acid ("DHA", $C_{22}H_{32}O_2$). Examples of preferred polyunsaturated fatty acids include a non-conjugated linoleic fatty acid (preferably a cis, cis isomer), a conjugated linoleic fatty acid (preferably a cis, cis isomer), an alpha-linolenic fatty acid (preferably a cis, cis, cis isomer), a gamma-linolenic fatty acid (preferably a cis, cis, cis isomer), isomers of any of these, or a combination thereof. Examples of feedstock sources of linoleic fatty acid include safflower, sunflower, soya, rapeseed, and canola. Examples of feedstock sources of linolenic acid include flaxseed, walnut, chia, hemp, rapeseed, canola, and *perilla.*

In some embodiments, at least some, a majority, or even all of the fatty acid included in the coating composition is present in an at least partially esterified form (e.g., glyceride form such as described further below). Thus, for example, any of the fatty acids described above can be used in any suitable glyceride form, with mono-glycerides (i.e., fatty acid mono-esters of glycerol) being a preferred glyceride form. Similarly, any of the fatty acids described above can be used in esterified form (e.g., in a monoester) with hydroxyl-functional compounds other than glycerol such as, for example, ascorbic acid.

In some embodiments, the AHC includes one or more, two or more, three or more, or four or more hydroxyl-functional lipids. Examples of suitable hydroxyl-functional lipids include fatty acids that include one or more hydroxyl groups and fatty acid esters that include one or more hydroxyl groups in a fatty acid portion and/or other portion. Examples of hydroxyl-functional fatty acid esters include glycerides having one or more fatty acid structural units (e.g., monoglycerides) or two or more fatty acid structural units (e.g., diglycerides). The AHC can include any of the fatty acids or fatty acid monoglycerides or other monoesters disclosed in WO2020/051238 (by Braden et al.), each of which is incorporated by reference herein, including any of the depicted formulas or structures (see, e.g., Formula I in claims 1 or 2 and the specific compounds depicted in claims 12 or 18).

Examples of suitable monoglycerides include those having the structure of either of the structures of Formula 1a (structure on left) or 1b (structure on right) below:

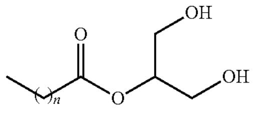

n = 2 - 20

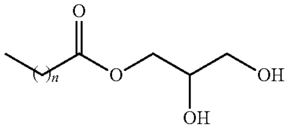

n = 2 - 20

Preferred "n" are as described above for the carbon-chain length of fatty acids (not counting the carbonyl carbon). Although the above structures depict saturated, unsubstituted fatty acid chains, the fatty acid chains may include one or more groups or atoms in place of hydrogen and may include one, two, or three of more carbon-carbon double bonds. For example, in some embodiments, one or more active hydrogen groups (e.g., hydroxyl groups) or other functional groups (e.g., an oxygen atom to form an oxirane group) are present as substituents in place of one or more hydrogen in the depicted —$CH_2$— groups.

2,3-dihydroxypropyl palmitate, 1,3-dihydroxypropan-2-yl palmitate, 2,3-dihydroxypropyl stearate (e.g., CAS Registry No. 123-94-4), 1,3-dihydroxypropan-2-yl stearate (e.g., CAS Registry No. 621-61-4), and mixtures thereof are preferred monoglycerides, and are each shown below:

In some embodiments one or more of the glycerides, preferably monoglycerides, are derived from grape seeds. A representative manufacturing process for preparation of a mixture of monoacylglycerides is provided in FIG. 2.3 of GRAS Notice No. 886, which is accessible online on the FDA's website at https://www.accessdata.fda.gov/scripts/fdcc/?set=GRASNotices&id=886. See also, for example, GRAS Notice No. 648, which is accessible online on the FDA's website at https://www.accessdata.fda.gov/scripts/fdcc/index.cfm?set=GRASNotices&id=648). The EDIPEEL product commercially available from Apeel Sciences of Goleta, California is an example of a commercially available coating product based on such materials, and according to GRAS Notice No. 648 is a mixture of monoacylglycerides and primarily containing 2,3-dihydroxypropyl palmitate and 1,3-dihydroxypropan-2-yl palmitate. In some embodiments, the EDIPEEL product or a similar chemical composition is the base coating composition to which one or more additional ingredients disclosed herein are included (e.g., one or more PMCA, one or more carboxyl-functional active hydrogen compound preferably capable of associating with the PMCA, one or more ripening inhibitor, one or more ethylenically unsaturated component disclosed herein, any other ingredient(s) disclosed herein, or a combination thereof).

In some embodiments, a glyceride is used having one or more fatty acid portions that includes a functional group, preferably a reactive functional group. Examples of suitable functional groups include functional groups including one or more heteroatoms (e.g., O, N, P, S, or Si) or double bonds.

Some specific examples of suitable glyceride compounds are provided below.

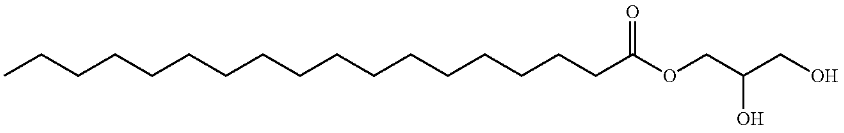

2,3-dihydroxypropyl stearate

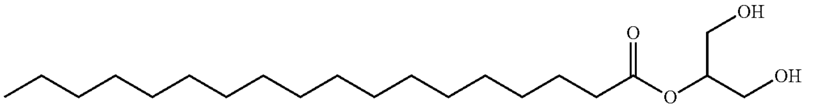

1,3-dihydroxypropan-2-yl stearate

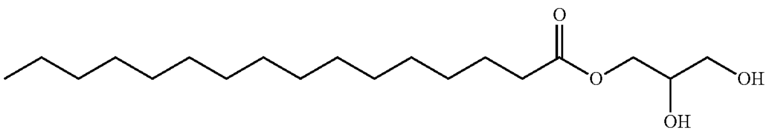

2,3-dihydroxypropyl palmitate

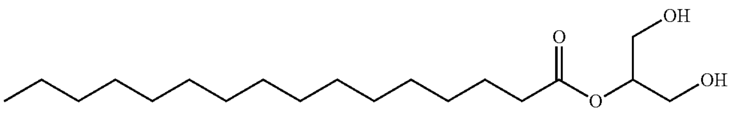

1,3-dihydroxypropan-2-yl palmitate

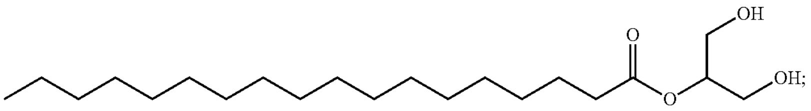
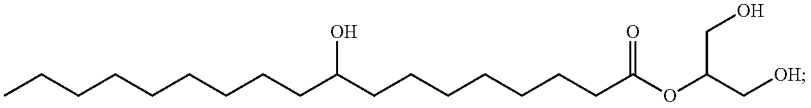
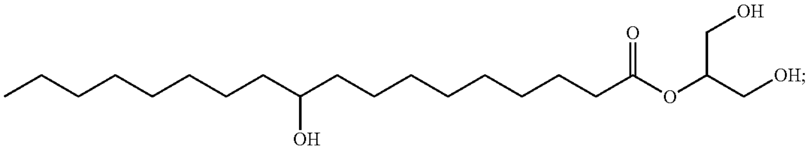
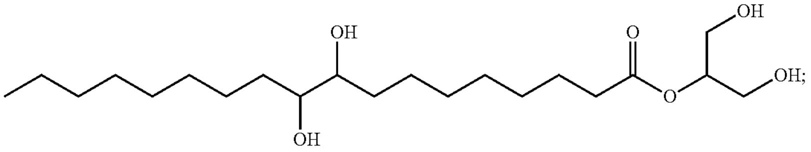
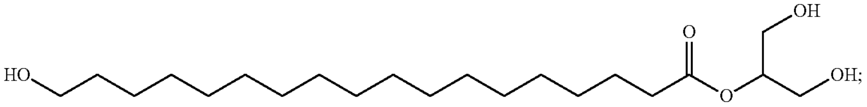
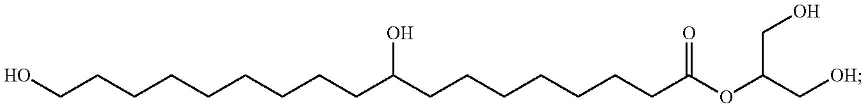
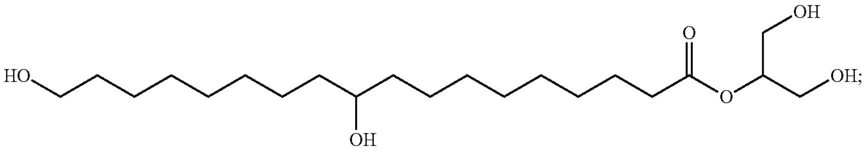
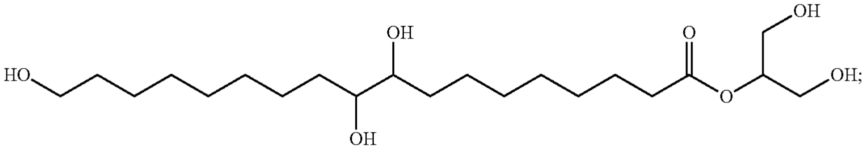
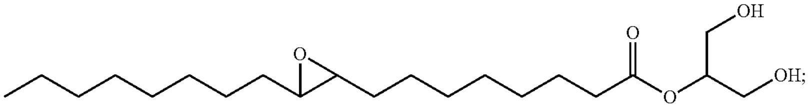
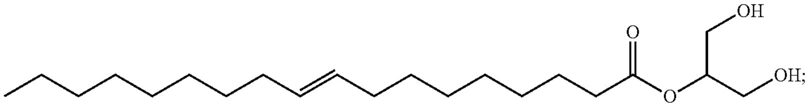
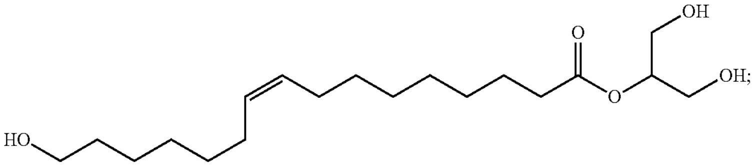
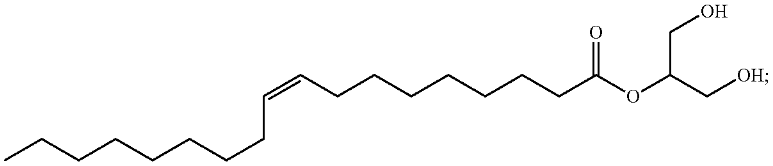
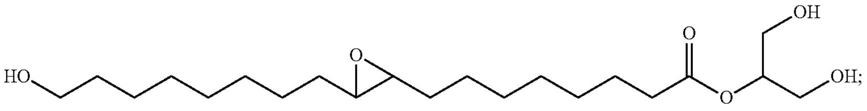

-continued
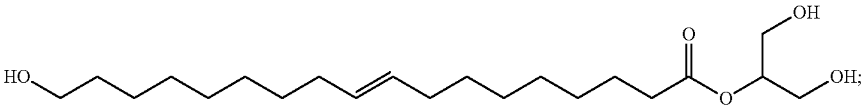
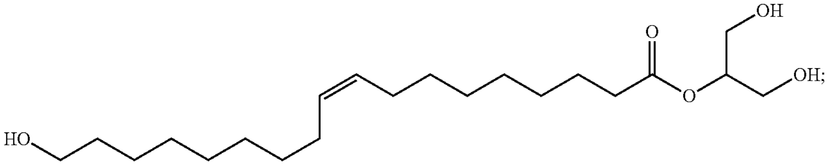
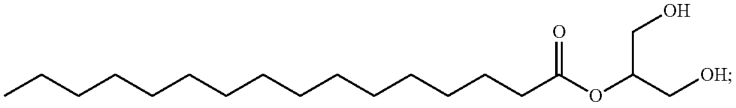
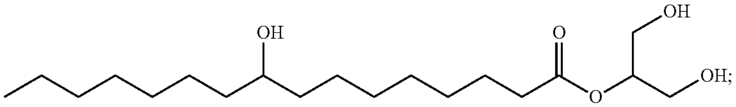
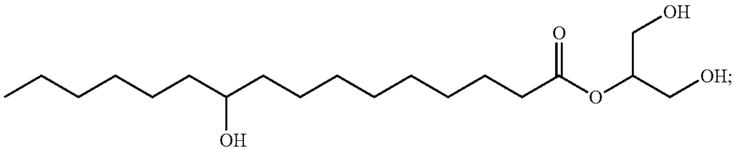
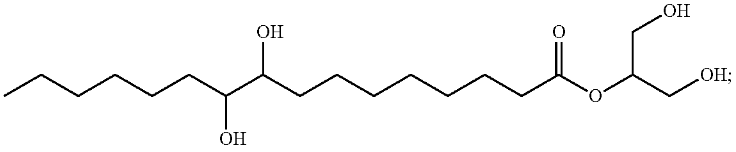
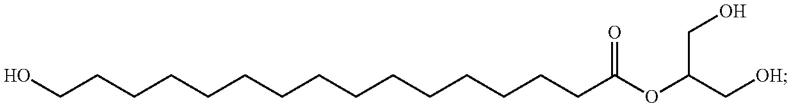
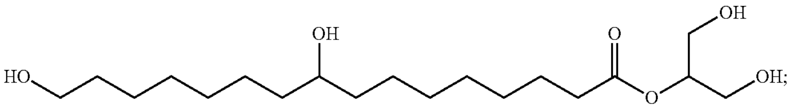
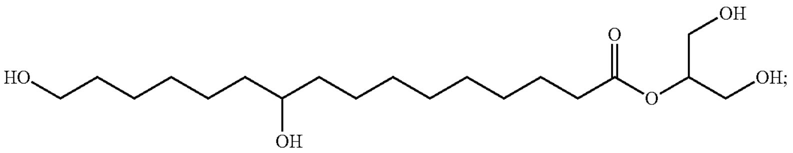
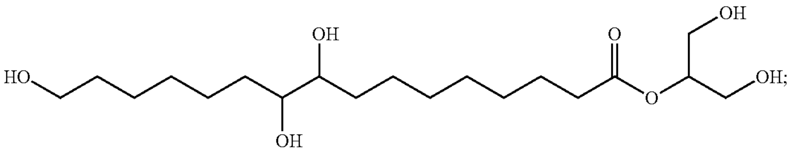
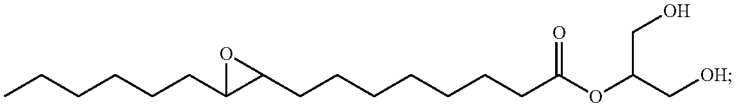
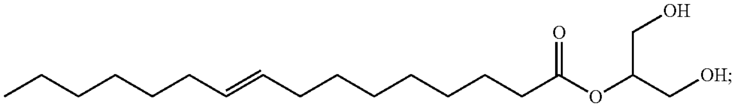
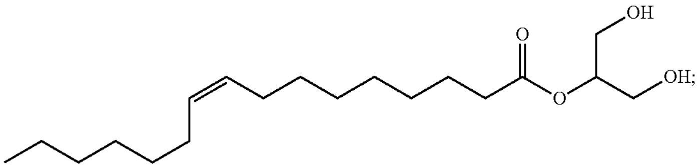

-continued
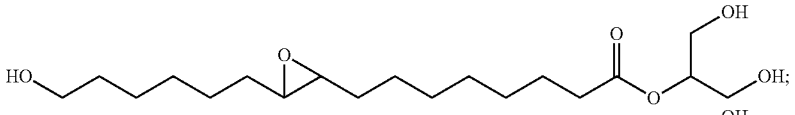
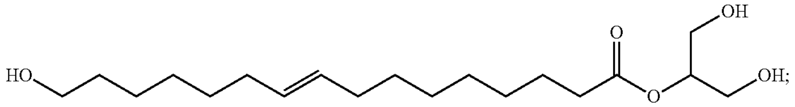
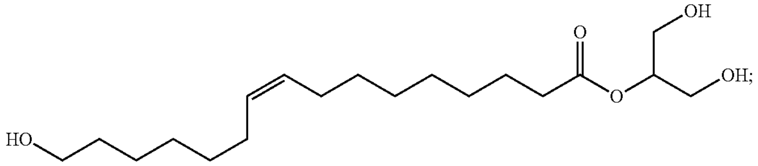
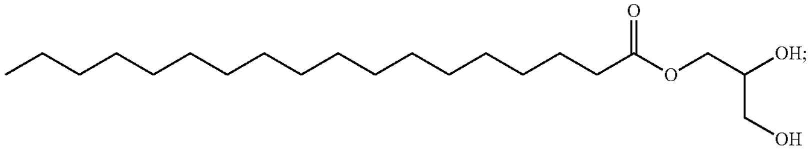
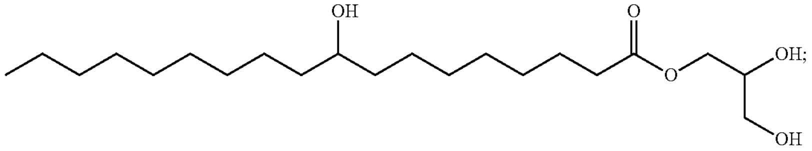
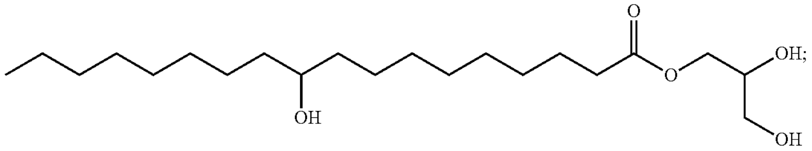
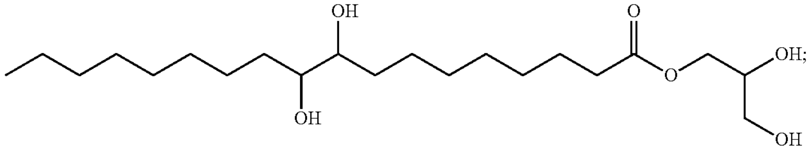
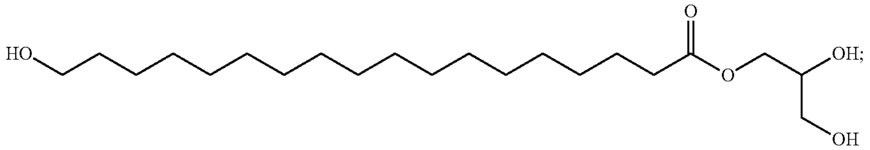
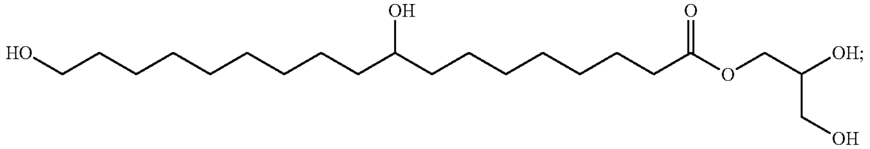
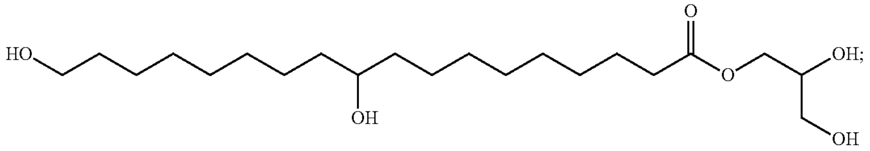
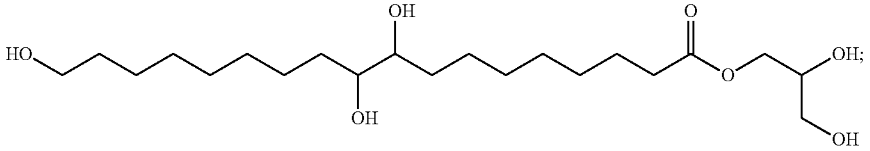
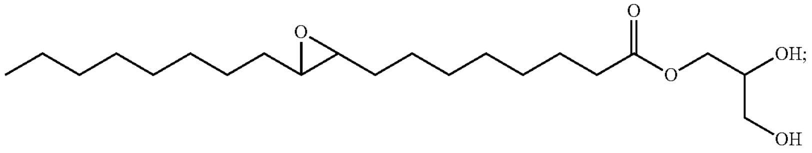

-continued
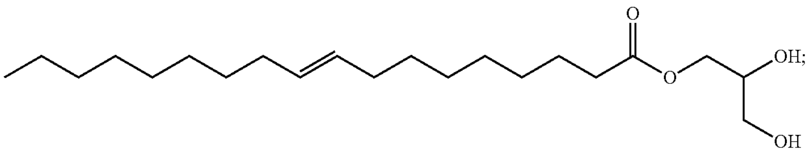
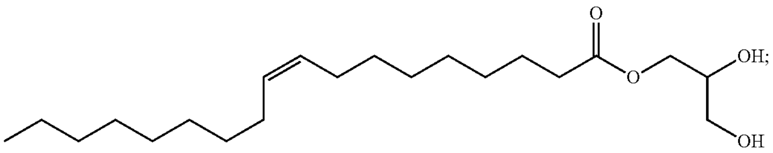
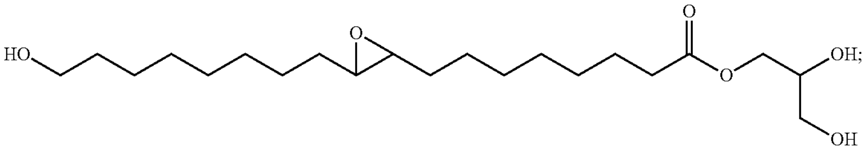
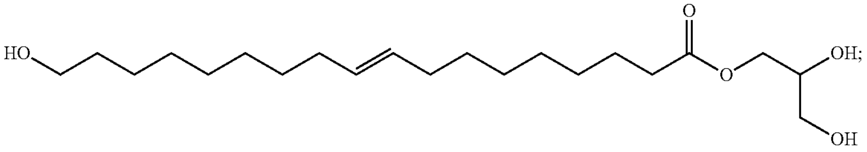
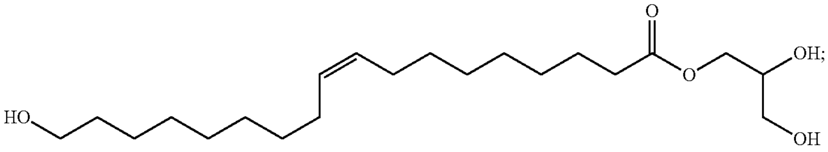
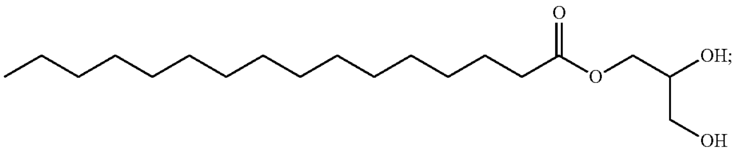
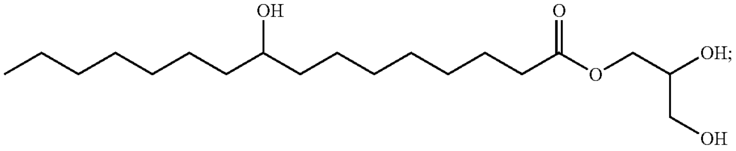
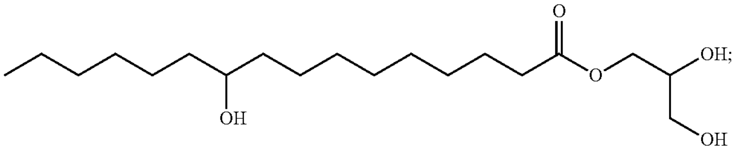
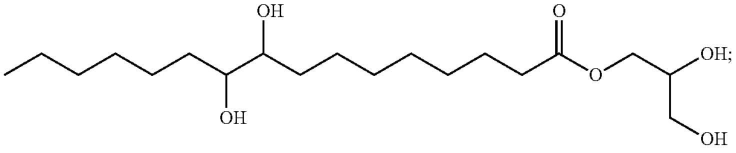
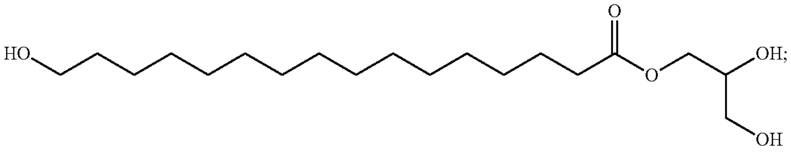
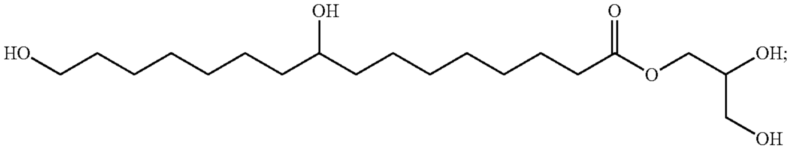

-continued

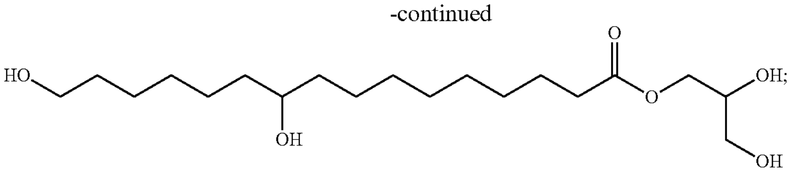

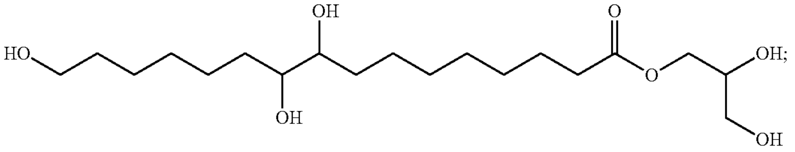

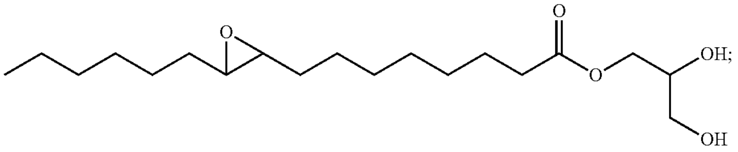

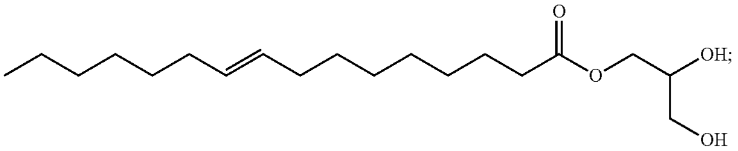

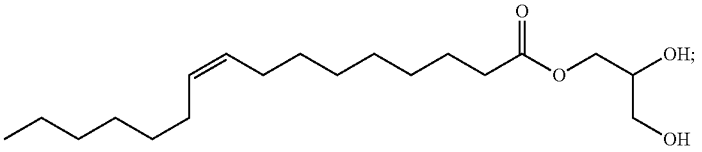

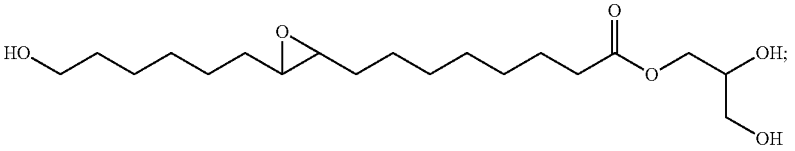

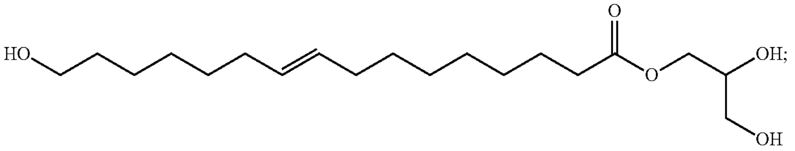

The fatty acids of any of the above glyceride compounds can also be used neat in coating compositions of the present disclosure (i.e., with the —COOH group intact instead of in esterified form with the depicted glycerol) or in salt form. Additionally, or alternatively, any such fatty acids can be used in esterified form (e.g., as a fatty acid mono ester) with any other suitable material other than the depicted glycerol.

In some embodiments, the AHC includes one or more of the fatty acid salts disclosed in WO2020/051238 (by Braden et al.), each of which is incorporated by reference herein, including any of the depicted formulas or structures (see, e.g., Formula II in claims 1 or 2 and the specific compounds referenced in claims 7 or 13), optionally in combination with one or more mono-glycerides.

In some embodiments, the coating composition includes (a) one or more monoesters, typically one or more fatty acid monoesters, more typically one or more monoacylglycerols and/or fatty acid esters of a hydroxyl-functional compound other than glycerol (e.g., ascorbic acid or a salt thereof) and (b) one or more fatty acids and/or salts thereof. In some such embodiments, the coating composition includes more than 50 wt-% of (a), based on the combined weights of (a) and (b). For example, the coating composition can include (a) from 50 to 99 wt-% (e.g., 60 to 95 wt-% or 70 to 90 wt-%) of a first group of compounds selected from one or more monoesters of fatty acids and (b) from 1 to 50 wt-% (e.g., 5 to 40 wt-% or 10 to 30 wt-%) of a second group of compounds selected from one or more fatty acid salts, based on the total combined weight of components (a) and (b). In other such embodiments, the coating composition include more than 50 wt-% of (b) (e.g., from 50 to 99 wt-%, 60 to 95 wt-% or 70 to 90 wt-% of (b)), based on the combined weights of (a) and (b). The total combined amounts of components (a) and (b) in the coating composition typically comprises at least 25 wt-%, at least 50 wt-%, at least 60 wt-%, at least 70 wt-%, at least 80 wt-%, at least 85 wt-%, at least 90 wt-%, at least 95 wt-%, at least 96 wt-%, at least 97 wt-%, at least 98 wt-%, at least 99 wt-%, or at least 99.9 wt-% of the total solids present in the coating composition.

In some embodiments, the coating composition includes one or more mono-, di-, and/or tri-esters (more typically monoesters) of a fatty acid and a hydroxyl-functional compound other than glycerol, where the monoester (and/or di-ester and/or tri-ester) includes one or more, preferably two or more, more preferably three of more active hydrogen groups (e.g., hydroxyl group(s) or any other active hydrogen group(s) disclosed herein). Preferably, the monoester comprises an active hydrogen group capable of forming a salt (e.g., a carboxyl group or an acidic hydroxyl group), with such group preferably located on a structural unit derived from the hydroxyl-functional compound. The hydroxyl-functional compound is preferably one or both of: (i) more polar than glycerol and (ii) more soluble in water than glycerol (e.g., at 25° C.). The hydroxyl-functional compound other than glycerol may be saturated or unsaturated and preferably has three or more active hydrogen groups, more preferably four or more (e.g., for our more hydroxyl groups). In some embodiments, the hydroxyl-functional compound other than glycerol includes a cyclic group (e.g., a 5 or 6 member ring), which may be saturated or unsaturated, and may include one or more heteroatoms (e.g., O, N, P). Ascorbic acid, or a salt thereof, is a preferred example of such a hydroxyl-functional compound other than glycerol. The monoester, which may optionally be a salt (e.g., an ammonium salt), may be derived from any suitable saturated or unsaturated fatty acid, although typically the fatty acid will be a C12 or higher fatty acid. Typically, and especially in water-based coating embodiments, the monoester is derived from a C20 or lower fatty acid (e.g., any of those disclosed herein), preferably C18 or lower, more preferably C12, C14, or C16 or C18. Preferred such monoesters include ascorbyl laurate, ascorbyl myristate, ascorbyl palmitate, ascorbyl stearate, a salt thereof (e.g., an ammonium salt of ascorbyl palmitate and/or an ammonium salt of ascorbyl stearate), or a combination thereof. The coating composition can include any suitable amount of one or more such monoesters. In some embodiments, more than 25 wt-%, more than 50 wt-%, more then 60 wt-%, more than 70 wt-%, more than 80 wt-%, more than 90 wt-%, more than 95 wt-%, more than 99 wt-%, or up to about 100 wt-% of the lipid (or the total solids) present in the coating composition is a monoester (and/or di- and/or tri-ester) of a fatty acid and a hydroxyl-functional compound other than glycerol.

In some embodiments, the coating composition includes, based on the combined weight of glyceride (preferably a glyceride of a saturated or unsaturated fatty acid, more preferably a mono-glyceride of a saturated or unsaturated fatty acid) and carboxyl-functional active hydrogen compound, at least: 0.1, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, or 99 weight percent of one or more carboxyl-functional active hydrogen compounds.

In some embodiments, the coating composition includes, based on the combined weight of glyceride and carboxyl-functional active hydrogen compound, no more than: 99.9, 99, 98, 97, 96, 95, 94, 93, 92, 91, 90, 89, 88, 87, 86, 85, 84, 83, 82, 81, 80, 79, 78, 77, 76, 75, 74, 73, 72, 71, 70, 69, 68, 67, 66, 65, 64, 63, 62, 61, 60, 59, 58, 57, 56, 54, 53, 52, 51, 50, 49, 48, 47, 46, 45, 44, 43, 42, 41, 40, 39, 38, 37, 36, 35, 34, 33, 32, 31, 30, 29, 28, 27, 26, 25, 24, 23, 22, 21, 20, 19, 18, 17, 16, 15, 14, 13, 12, 11, 10, 9, 8, 7, 6, 5, 4, 3, 2, 1, or 0.5 weight percent of one or more carboxyl-functional active hydrogen compounds.

In some embodiments, the barrier coating composition, based on total solids, includes a minority amount of one or more carboxyl-functional active hydrogen compound (i.e., less than 50 weight percent) and exhibits a decreased water vapor permeability relative to an otherwise identical coating omitting the carboxyl-functional active hydrogen compound(s).

In preferred embodiments, the coating composition comprises less than 10 wt-%, less than 5 wt-%, or less than 1 wt-%, if any, of diglycerides, based on the weight of total solids present in the coating composition.

In some embodiments, the coating composition includes less than 10 wt-%, less than 5 wt-%, or less than 1 wt-%, if any, of triglycerides, based on the weight of total solids present in the coating composition.

In some embodiments, the coating composition comprises less than 10 wt-%, less than 5 wt-%, or less than 1 wt-%, if any, of acetylated monoglycerides, based on the weight of total solids present in the coating composition.

In some embodiments, the AHC include one or more polysaccharides, one or more polypeptides, or a combination thereof. Preferred such materials include carboxyl-functional polysaccharides and carboxyl-functional polypeptides, which may optionally contain one or more active hydrogen groups in addition to carboxyl groups or salt groups thereof, with pectin and derivatives thereof and gelatin and derivatives thereof being exemplary such compounds. In some embodiments, the AHC includes one or more carboxyl-functional lipids and one or more carboxyl-functional polysaccharides and/or carboxyl-functional polypeptides.

Examples of polypeptides include gelatin, zein, globulin, albumin, whey protein, casein, hemp protein, brown rice protein, alfalfa protein, chia protein, pea protein, flax protein, fibroin (e.g., silk fibroin), and mixtures thereof. In some embodiments, the AHC includes an amphiphilic polypeptide. In some embodiments, preferred polypeptides are carboxyl-functional polypeptides such as those containing, and more preferably rich in, structural units provided by amino acids such as aspartic acid and/or glutamic acid. In some embodiments, preferred polypeptides are amino- and amide-functional polypeptides such as those containing, and more preferably rich in, structural units provided by amino acids such as arginine, asparagine, glutamine, histidine, lysine, and combinations thereof.

In some embodiments, amino and amide groups may be useful in forming covalent crosslinks via use of enzymes such as, for example, transglutaminase (e.g., food grade plant-derived or microbial-derived transglutaminase). Transglutaminase can form stable covalent linkages via transamidation reactions between compounds having a free amine group (e.g., a primary amine group present on a structural unit formed from lysine) and the amide group ($-(C{=}O)NH_2$) of structural units such as peptide structural units formed from glutamine. Thus, for example, transglutaminase may be used to self-crosslink a polypeptide, may be used to form crosslinks between two different types of polypeptides, and/or may be used to form crosslinks between a polypeptide and a non-polypeptide material such as, for example, a polysaccharide having amine functionality, preferably primary amine functionality (e.g., certain chitosans, alginate amines, dextran amines, and the like). While not intending to be bound by theory, it may also be possible to use transglutaminase to form covalent linkages between a non-polypeptide material having pendant amide groups (e.g., amidated polysaccharides such as amidated pectin) and another material having amine groups, preferably primary amine groups (e.g., amine-functional polypeptides and/or polysaccharides).

Examples of polysaccharides include agar, agarose, agaropectin, pectin, alginate, carrageenan, arabinoxylan, chitosan, *psyllium*, carboxy methyl cellulose, hyaluronic acid, and mixtures thereof. Pectin is an example of a preferred polysaccharide. Polysaccharides included in the coating compositions of the present disclosure can include any suitable side functional groups including, for example, one or more, two or more, or three or more selected from hydroxyl groups, carboxyl groups (or salts or alkyl esters thereof), amine group, and amide groups. Carboxyl-functional polysaccharides are preferred in some embodiments such as, for example, polysaccharides having any of the acid number disclosed herein. The pectin used may be either high methoxy ("HM") pectin having a degree of esterification ("DE") of 50 or above (e.g., 60 or above, 70 or above, 80 or above, etc.) or low methoxy ("LM") pectin having a DE of less than 50 (e.g., less than 40, less than 30, less than 20, less than 10, etc.), or a mixture thereof. The pectin may also be either amidated or non-amidated, or a mixture thereof. While not intending to be bound by theory, an advantage of using pectin in the AHC is pectin can provide a clean mouth feel (e.g., as opposed to a slimy mouth feel), as well enable crosslinking. Preferred pectins for use in food-contact and/or edible embodiments of the present disclosure are derived from edible feedstocks (e.g., apple pomace, citrus peels, plums, or gooseberries).

As discussed above, in some embodiments, the coating composition is a hybrid coating composition that includes one or more lipids and one or more non-lipid oligomers or polymers. In preferred such embodiments, the coating composition includes both a lipid having one or more active hydrogen groups and a non-lipid material (e.g., a non-lipid oligomer or polymer) having one or more, and preferably a plurality, of active hydrogen groups. Preferred non-lipid materials include polypeptides, polysaccharides, and combinations thereof. The one or more lipids (e.g., a saturated or unsaturated: fatty acid, monoglyceride, diglyceride, fatty acid monoester of a hydroxyl-functional compound other than glycerol (e.g., a fatty acid monoester of ascorbic acid or a salt thereof), oil, wax, phospholipid, derivative thereof (e.g., salt thereof), or mixture thereof) are preferably present in the hybrid barrier coating composition in an amount of at least 1 wt-%, at least 2 wt-%, at least 5 wt-%, least 10 wt-%, at least 15 wt-%, at least 20 wt-%, at least 25 wt-%, or at least 30 wt-% to no more than 80 wt-%, no more than 70 wt-%, no more than 60 wt-%, no more than 55 wt-%, no more than 50 wt-%, no more than 45 wt-%, no more than 40 wt-%, no more than 35 wt-%, or no more than 30 wt-%. The one or more non-lipid material (preferably non-lipid oligomer or polymer active hydrogen compounds (e.g., a saturated or unsaturated biopolymer having one or more active hydrogen groups) such as, for example, a polysaccharide (e.g., agar, agarose, agaropectin, pectin, alginate, carrageenan, arabinoxylan, chitosan, carboxy methyl cellulose, hyaluronic acid, and/or *psyllium*), a polypeptide (e.g., gelatin, zein, albumin, globulin, whey protein, casein, hemp protein, brown rice protein, alfalfa protein, chia protein, pea protein, soy protein, silk fibroin, and/or flax protein), or a combination thereof) are preferably present in an amount of at least 20 wt-%, at least 30 wt-%, at least 40 wt-%, at least 45 wt-%, at least 50 wt-%, at least 55 wt-%, at least 60 wt-%, at least 65 wt-%, or at least 70 wt-% to no more than 99 wt-%, no more than 98 wt-%, no more than 95 wt-%, no more than 90 wt-%, no more than 85 wt-%, no more than 80 wt-%, no more than 75 wt-%, to more than 70 wt-%. The above weight percentages (wt-%) for (i) lipid and (ii) non-lipid materials in hybrid coating compositions are based on the total combined amounts of components (i) and (ii) in the coating composition. In preferred such hybrid coating embodiments, the total combined amounts of components (i) and (ii) in the coating composition comprises at least 50 wt-%, at least 60 wt-%, at least 70 wt-%, at least 80 wt-%, at least 85 wt-%, at least 90 wt-%, at least 95 wt-%, at least 96 wt-%, at least 97 wt-%, at least 98 wt-%, at least 99 wt-%, or at least 99.9 wt-% of the total solids present in the coating composition. To ensure good compatibility between the lipid and non-lipid materials, in some embodiments, it may be advantageous to include one or more compatibilizers in the coating composition that show good affinity to both one or more of the lipid and one or more of the non-lipid materials (e.g., polysaccharides and/or polypeptides). For example, a suitable compatibilizer may be a compound (preferably an edible compound in some embodiments) that includes one or more structural portions showing good compatibility with polysaccharides and/or polypeptides and one or more other structural portions showing good compatibility with lipids. For example, such a compatibilizer may have one or more structural portions with polarity properties that are substantially matched to that of the polysaccharide and/or polypeptide and one or more other structural portions have polarity properties that are substantially matched to that of the lipid material.

In certain preferred embodiments, the barrier coating composition includes one or more compounds capable of preferentially interacting or associating with another component of the coating composition such as, for example, via a functional group (e.g., an active hydrogen group) present on the component (e.g., the AHC), which preferably results in one or more desirable coating properties when enough such interactions occur. For example, the interaction or association can be a covalent bond formation, an ionic interaction (e.g., an ionic bond formation such as a salt bridge), or another type of association (e.g., Van der Waals bonding) that may optionally, and preferably in some embodiments, be reversible. For example, in certain preferred embodiments, the coating composition includes one or more compounds capable of coordinating, complexing and/or chelating (hereinafter "coordinating" for brevity) with the AHC via, for example, one or more active hydrogen groups present on the AHC such as hydroxyl groups, carboxyl groups or salts thereof (e.g., carboxylates). Examples of such compounds may include aglycones, phenols and/or polyphenols (e.g., ferulic acid, tannic acid, gallic acid, and the like), acids (e.g., citric acid), amino acids, and polyvalent metal compounds. Preferred polyvalent metal compounds are capable of entering into a "crosslinking" reaction with the AHC, which is reversible in some embodiments. While not intending to be bound by theory, in some embodiments, the crosslinking reaction may be a coordination or chelation that does not result in a covalent linkage. For convenience, herein the polyvalent metal compound is referred to as a "polyvalent metal crosslinking agent" or "PMCA" for short.

In certain preferred embodiments, the PMCA includes a metal atom, such as, e.g., a transition metal atom, in a form (e.g., an oxidation state) capable of coordinating with an active hydrogen group (e.g., a carboxylic acid or carboxylate group) under ambient conditions (e.g., 25° C. and 50% relative humidity) to form a reversible crosslink. Preferred PMCAs include a polyvalent metal atom such as bismuth (Bi), calcium (Ca), cobalt (Co), iron (Fe), magnesium (Mg), manganese (Mn), zinc (Zn), or a combination thereof. Although edible PMCAs are preferred, it is within the scope of the invention, in for example embodiments in which the coating composition is not intended for human consumption, to use PMCAs including polyvalent metals such as, for example, beryllium, cadmium, copper, zirconium, barium, strontium, aluminum, antimony, nickel, tin, tungsten, and the like. The polyvalent atom is preferably present in the PMCA in a form (e.g., an oxidation state) that facilitates crosslinking with the AHC. Although the PMCA can be of any suitable form, it is typically a complex or an oxide of a polyvalent metal. Accordingly, the PMCA may be an organometallic compound, a fully inorganic compound, or a mixture thereof. In some embodiments, the PMCA is a salt. The PMCA may be either soluble or insoluble in water. When insoluble, the PMCA may be provided as finely divided powder, which may optionally be suspended or otherwise dispersed in liquid coating compositions. In some embodiments, the PMCA may be provided as a colloid.

In some embodiments the PMCA is present in a complex, such as a salt, that includes an organic anion. Examples of such organic anions include salts of organic acids, which may be amino acids, such as, e.g., acetate, glutamate, formate, carbonate, bicarbonate, salicylate, glycollate, octoate, benzoate, gluconate, oxalate, lactate, and combinations thereof. In some embodiments, the PMCA includes an amino acid (e.g., glycine or alanine), which may be present in the PMCA as a bidentate ligand.

Zinc is a preferred polyvalent metal. Examples of suitable zinc-containing PMCA include zinc acetate, zinc carbonate, zinc chloride, zinc citrate, zinc hydroxide, zinc gluconate, zinc oxide, zinc picolinate, zinc stearate, zinc sulfate, salt solutions thereof (e.g., ammonia or amine salts such as zinc ammonium carbonate, zinc ammonium acetate, zinc ammonium citrate, and the like), or a derivative or combination thereof.

Examples of calcium-containing PMCA include calcium acetate, calcium carbonate, calcium chloride, calcium citrate, calcium hydroxide, calcium glycinate, calcium glycolate, calcium gluconate, calcium lactate, calcium oxide, calcium phosphate (e.g., calcium mono-phosphate), calcium pyrophosphate, calcium propionate, calcium pyruvate, calcium silicate, tricalcium silicate, calcium sorbate, calcium stearate, calcium sulfate, calcium acid pyrophosphate, a variant thereof (e.g., calcium lactate gluconate), or a combination thereof.

Examples of manganese-containing PMCA include manganese chloride, manganese citrate, manganese gluconate, manganese sulfate, base complexes thereof (e.g., amine or ammonia complexes thereof), or a derivative or combination thereof.

Examples of magnesium-containing PMCA include magnesium carbonate, magnesium chloride, magnesium hydroxide, magnesium oxide, magnesium phosphate, magnesium stearate, magnesium sulfate, or a derivative or combination thereof.

Examples of iron-containing PMCA include ferric ammonium citrate, ferric chloride, ferric citrate, ferric phosphate, ferric pyrophosphate, ferric sulfate, ferrous ascorbate, ferrous carbonate, ferrous citrate, ferrous fumarate, ferrous gluconate, ferrous lactate, ferrous sulfonate, or a derivative or combination thereof.

Examples of bismuth-containing PMCA compounds include multivalent bismuth salts of various anions, including bismuth salts of a metal oxyanion, bismuth salts of organic compounds, and the like. These compounds can include their anhydrous forms as well as various hydrates, including hemihydrate, pentahydrate, and other hydrated forms, along with mixtures and combinations thereof, and the like. Examples of bismuth-containing compounds include bismuth silicate, bismuth magnesium aluminosilicate, bismuth aluminate, bismuth borate, bismuth manganate, bismuth phosphate, bismuth aluminate, bismuth manganate, and mixtures or combinations thereof, bismuth subcarbonate, bismuth subcitrate, bismuth citrate, bismuth titrate, bismuth gallate, bismuth subgallate, bismuth salicylate, bismuth subsalicylate, bismuth hydroxide, bismuth oxide, bismuth trioxide, bismuth nitrate, bismuth subnitrate, and the like, similar bismuth salts, and derivatives of combinations thereof. Bismuth subcitrate, bismuth subsalicylate, and combinations and derivatives thereof are preferred.

Examples of suitable cobalt-containing PMCA compounds include vitamin B12, also known as cobalamin. Other cobalt-containing compounds may also be used, for example, in certain embodiments in which the coating composition will not be directly consumed.

In some embodiments, at least some of the PMCA is present as particles. Suitable particles may have a volume average particle size of greater than about 50, greater than about 100, greater than about 500, greater than about 1,000, or greater than about 2,000 nanometers.

Suitable particles may have volume average particle size of less than about 2,000, less than about 1,000, less than about 500, less than about 100 nanometers, or less than about 50 nanometers. For edible embodiments, the particles are preferably 100 nanometers or larger in size, as indicated by volume average particle size. Laser diffraction analysis is a useful method for measuring particles sizes (e.g., volume particle sizes reported as volume equivalent sphere diameters) and distribution for PMCA particles, with ISO13320 (2020) being an example of testing conditions, with appropriate modifications made if particles below about 100 nanometers are to be measured. In some embodiments, PMCA particles having a volume average particle size sufficiently small to react with the polymer at ambient conditions (e.g., 25° C. and 50% relative humidity) are used. The PMCA particles are preferably sufficiently small so that they are not readily visible to the unaided human eye (e.g., as white particles) in applied coatings disclosed herein.

While not intending to be bound by theory, for embodiments in which the AHC includes one or more acid salt groups (e.g., a base-neutralized carboxylic acid group), it is believed that it is advantageous to select a PMCA including an anion that is a stronger base than the anion of the acid salt group of the AHC. Again, while not intending to be bound theory, it is believed that if the PMCA employs an anion that is a weaker base than the anion of the acid salt group of the AHC, then crosslinking will not occur, or at least not as effectively, between the PMCA and the acid groups present on the AHC. In some embodiments, the conjugate acid of the anion of the PMCA is preferably either volatile or unstable. For example, acetic acid, the conjugate acid of acetate anion, is volatile, and carbonic acid, the conjugate acid of both bicarbonate and carbonate anion, is unstable (e.g., spontaneously decomposes to carbon dioxide and water). PMCA complexes containing bases are preferred in some embodiments, with fugitive bases such as, for example, ammonia and amines being particularly preferred. The bases may be used, for example, to solubilize the polyvalent metal or polyvalent metal complex.

In some embodiments, e.g., coating embodiments in which the coating is likely to be consumed, the PMCA is preferably itself edible (e.g., as a food-grade additive), with all the ingredients used to prepare the PMCA preferably being edible. In edible embodiments, the PMCA s preferably qualifies as a direct food-grade additive under U.S. Food and Drug Administration ("FDA") laws and regulations.

In some embodiments, the coating composition includes a plant extract (e.g., an extract of an edible portion of a plant such as, e.g., a fruit or vegetable), which may be a separate ingredient from the AHC. In some embodiments, some or all of the PMCA is supplied by the plant extract, which may be a cuticle extract (e.g., a fruit cuticle extract). In some embodiments, the plant extract is an extract from an edible portion of a plant and is itself also edible. For example, the plant extract can be a fruit extract, which may be produced from any suitable portion or portions of the fruit. Examples of suitable fruit extracts include extracts of tomatoes (e.g., tomato pomace), grapes (e.g., grape skins or pomace), cranberries (e.g., cranberry skins or pomace), apples (e.g., apple skins or pomace), pomegranates (e.g., pomegranate pomace or peel extract), blueberries, (e.g., blueberry skins or pomace) or combination thereof. Typically, the plant extract will have been processed to concentrate (e.g., on a total solids basis) the amount of PMCA and/or other crosslinking compounds (e.g., polyphenols and other natural endogenous crosslinkers) present relative to the amount present in the unprocessed original plant material from which the plant extract was derived. The extract may also optionally have been processed to remove one or more undesired impurities or other compounds that may, for example, interfere with the desired crosslinking and/or cause one or more undesired organoleptic properties detectable to a typical human consumer. The plant extract may be processed such that the plant extract has concentrated levels of PMCA relative to the original plant material from which it was process such as, for example, 25% more concentrated, 50% more concentrated, 75% more concentration, 100% more concentrated, 200% more concentrated, 300% more concentrated, 400% more concentrated, and so on.

Any suitable portion of the PMCA may be provided by one or more plant extracts. In some embodiments, at least 10 wt-%, at least 20 wt-%, at least 30 wt-%, at least 40 wt-%, at least 50 wt-%, at least 60 wt-%, at least 70 wt-%, at least 80 wt-%, at least 90 wt-%, at least 95 wt-%, or up to 100 wt-% of the PMCA is provided by the plant extract.

Any suitable amount of PMCA may be included in coating compositions of the present disclosure to achieve the desired result. In some embodiments, the coating composition includes one or more PMCA in an amount in an amount of at least 0.1 wt-%, at least 1 wt-%, at least 3 wt-%, at least 7 wt-%, at least 10 wt-%, or at least 15 wt-%, based on the total amount of metal in the one or more PMCA relative to the non-volatile weight of the coating composition.

The coating composition may include any suitable stoichiometry of one or more carboxyl-functional and/or hydroxyl-functional active hydrogen compounds to PMCA.

For example, the coating composition may include at least about 0.1, at least about 0.5, at least about 1, at least about 2, at least about 3, at least about 4, at least about 5, or at least about 10 moles of the AHC (e.g., moles of hydroxyl and/or carboxyl-functional AHC such as fatty acid and/or acid-functional biopolymer) per mole of polyvalent metal in the PMCA. In some embodiments, the coating composition includes less than about 10, less than about 5, less than about 4, less than about 3, less than about 2, less than about 1, or less than about 0.5 moles of the AHC (e.g., moles of hydroxyl and/or carboxyl-functional AHC such as fatty acid and/or acid-functional biopolymer) per mole of polyvalent metal in the PMCA.

In some embodiments, the coating composition includes at least about 0.01, at least about 0.05 at least about 0.1, at least about 0.15, at least about 0.2, at least about 0.25, at least about 0.35, at least about 0.5, at least about 0.6, at least about 0.8, or at least about 1 moles (or equivalents) of the polyvalent metal per mole (or equivalent) of carboxyl groups or salt groups thereof present in the AHC (e.g., per mole of hydroxyl and/or carboxyl groups or salt groups thereof present in the carboxyl-functional AHC such as fatty acids and/or acid-functional biopolymers).

In some embodiments, no more than about 2.0, no more than about 1.5, no more than about 1.0, no more than about 0.75, no more than about 0.70, no more than about 0.5, no more than about 0.45, no more than about 0.35, no more than about 0.3, or no more than about 0.2 moles of the polyvalent metal per mole of carboxyl groups or salt groups thereof present in the AHC (e.g., per mole of carboxyl groups or salt groups thereof present in the carboxyl-functional AHC such as fatty acids and/or acid-functional biopolymers).

Suitable stoichiometries may include a ratio of moles of carboxyl-functional compound(s) and/or salts thereof, preferably capable of coordinating with the PMCA, in the AHC to PMCA of between about 4:1 and about 0.2:1, between about 3:1 and about 0.5:1, more preferably between about 2:1 and 1:1, an most preferably between 1.6:1 and 1:1. In some embodiments, the coating composition includes a ratio of moles of fatty acids and/or salts thereof capable of coordinating with the PMCA to moles of polyvalent metal present in the PMCA pursuant to the above.

In the above discussion, reference was made to moles of polyvalent metal in the PMCA. Generally the moles of polyvalent metal present in the PMCA will be the same as the moles of PMCA present. That is, one mole of PMCA will typically include one mole of polyvalent metal. Depending on the particular PMCA(s) employed, it is possible, however, that this ratio may be other than 1:1 in some embodiments. For example, a PMCA could include two or more atoms of polyvalent metal and, thus, 1 mole of such PMCA would include two or more moles of polyvalent metals.

While not intending to be bound by theory, in some embodiments it is believed that the presence of an efficacious amount of PMCA can enhance one or more properties of a hardened coating. In some embodiments, a coating formed from a coating composition including an efficacious amount of PMCA exhibits a decreased average strain at break (e.g., at least 1% less, at least 2% less, at least 3% less, at least 4% less, at least 5% less, at least 10% less, at least 20% less, at least 30% less, at least 40% less, or at least 50% less) relative to an otherwise identical coating omitting the PMCA.

In another aspect, the present disclosure provides a coating composition in which one or more enhanced coating properties are achieved via inclusion of an ethylenically unsaturated component including one or more carbon-carbon double bonds in the coating composition. While not intending to be bound by theory, it is believed that crosslinking can occur via the carbon-carbon double bonds present, and especially when a suitable metal drier compound is present in the coating composition or on the surface or skin of the perishable item to be coated (e.g., naturally occurring endogenous metals present in a plant or vegetable skin). The ethylenically unsaturated component may be an unsaturated active hydrogen compound such as any of those disclosed herein, or alternatively, the ethylenically unsaturated component may be a compound that is free of active hydrogen groups. More typically, however, the ethylenically unsaturated component will include at least one active hydrogen group such as, e.g., any of those disclosed herein. The ethylenically unsaturated component may comprise a single ethylenically unsaturated compound, or a mixture of two or more chemically different ethylenically unsaturated compounds. The ethylenically unsaturated component can exhibit any suitable iodine value, including any of the iodine values referenced herein previously in the context of the AHC. All of the iodine values disclosed herein in the context of the AHC are specifically incorporated by reference in the context of the ethylenically unsaturated component, but are not reproduced for purposes of brevity.

The barrier coating composition can include any suitable amount of ethylenically unsaturated component to achieve a desired result. When used, the coating composition will typically include, based on total solids, at least 0.1 wt-%, at least 0.5 wt-%, at least 1 wt-%, at least 2 wt-%, at least 3 wt-%, at least 4 wt-%, at least 5 wt-%, at least 6 wt-%, at least 7 wt-%, at least 8 wt-%, at least 9 wt-%, or at least 10 wt-% of ethylenically unsaturated component (e.g., any of the unsaturated materials recited herein such as, e.g., unsaturated fatty acids, salts thereof, or esters thereof). The ethylenically unsaturated component is typically present in the coating composition in an amount of less than 100 wt-%, less than 75 wt-%, less than 50 wt-%, less than 40 wt-%, less than 30 wt-%, less than 20 wt-%, less than 15 wt-%, less than 10 wt-%, less than 9 wt-%, less than 8 wt-%, less than 7 wt-%, less than 6 wt-%, less than 5 wt-%, less than 4 wt-%, less than 3 wt-%, less than 2 wt-%, or less than 1 wt-%, based on total solids present in the coating composition.

In certain preferred embodiments, one or more metal driers are used in combination with the ethylenically unsaturated component. The metal drier may be, for example, any of the PMCA disclosed herein. Metal driers provided by plant extracts, and especially edible plant extracts, may be preferred in some embodiments. If included, the one or more metal driers are preferably included in an efficacious amount. While not intending to be bound by any theory, it is believed the presence of an efficacious amount of metal drier may enhance crosslinking upon coating cure (e.g., by enhancing and/or inducing the formation of crosslinks between aliphatic carbon-carbon double bonds present in the ethylenically unsaturated component). Non-limiting examples of suitable metal driers may include aluminum (Al), antimony (Sb), barium (Ba), bismuth (Bi), calcium (Ca), cerium (Ce), chromium (Cr), cobalt (Co) (e.g., vitamin B12), copper (Cu), iridium (Ir), iron (Fe), lead (Pb), lanthanum (La), lithium (Li), manganese (Mn), Neodymium (Nd), nickel (Ni), rhodium (Rh), ruthenium (Ru), palladium (Pd), potassium (K), osmium (Os), platinum (Pt), sodium (Na), strontium (Sr), tin (Sn), titanium (Ti), vanadium (V), Yttrium (Y), zinc (Zn), zirconium (Zr), any other suitable rare earth metal or transition metal, as well as oxides, salts (e.g., acid salts such as octoates, naphthenates, stearates, neodecanoates, etc.) or complexes of any of these, and mixtures thereof. The amount used will depend, at least partially, upon the particular drier(s) chosen for a particular end use. In general, however, the amount of metal drier present in the coating composition, if any, may suitably be greater than about 10 parts per million ("ppm") by weight, preferably greater than about 25 ppm by weight, and more preferably greater than about 100 ppm by weight, based on the total weight of metal in the metal drier, relative to the total weight of the coating composition. The amount of metal drier may suitably be less than about 10,000 ppm by weight, preferably less than about 1,000 ppm by weight, and more preferably less than about 600 ppm by weight, based on the total weight of metal in the metal drier relative to the total weight of the coating composition. In embodiments in which the coating composition is edible, the metal drier is preferably one of the edible PMCA disclosed herein. In some embodiments, iron metal driers (e.g., any of the polyvalent iron compounds referenced herein) are preferred.

To achieve enhanced coating properties such as, for example, enhanced mechanical properties and/or barrier properties, it may be advantageous to formulate a coating composition that incorporates one or more, or two or more, different modes of crosslinking. For example, in some embodiments, the coating composition may be capable of cross-linking via one or more, or two or more of: (i) interaction of a PMCA compound and active hydrogen groups, (ii) via carbon-carbon double bonds, (iii) via natural crosslinking compounds present in a plant extract included in the coating composition, (iv) via purified or exogenous and/or synthetic crosslinking compounds (e.g., phenolic or polyphenol crosslinking compounds, preferably which are naturally occurring in plant materials, more preferably edible plant materials such as grape skins, such as ferulic acid, tannic acid, and the like optionally in combination with a suitable enzyme(s) to assist in crosslinking) and/or (v) via crosslinking enzymes (e.g., transglutaminase) included in the coating composition.

In a preferred embodiment, the barrier coating comprises (i) one or more AHC binder materials and (ii) one or more of a PMCA, a polypeptide reactive with another ingredient of the AHC, aglycone, a phenol and/or a polyphenol (e.g., ferulic acid, tannic acid, gallic acid, and the like), citric acid, an amino acid or a hydroxyl-functional monoester reactive with another ingredient of the AHC.

In some embodiment, the mole ratio of AHC to crosslinking species that delivers improved shelf-life can be determined by rheology measurements (e.g., using a rheometer). While not intended to be bound by theory, ratios of AHC to crosslinking species can be determined be measuring G' (storage modulus) and G" (loss modulus) and modified such that G' rises faster than G" upon drying, as compared to a system that does not have a crosslinking species.

Bulk rheology experiments exhibit the assembly of the system into a gel network by the onset and growth of elastic properties. In particular, oscillatory rheology can be useful in determining crosslinking of a system. As a system crosslinks the storage modulus (G') increases more rapidly than the loss modulus (G"). A commercial rheometer, such as TA Instruments' Discovery Hybrid 20 rheometer or may be used to measure the storage modulus (G'), loss modulus (G") and tan delta. In some embodiments, the mole ratio of AHC to crosslinking species that delivers improved shelf-life can be determined by rheology measurements (e.g., using a rheometer). While not intended to be bound by theory, ratios of AHC to crosslinking species can be determined be measuring G' and G" and modified such that G' rises faster than G" upon drying as compared to a system that does not have a crosslinking species. In some embodiments, provided crosslinked treatments are characterized by high elasticity. Elasticity or elastic deformation generally measures a tendency of a material to return to its original size and/or shape after a force having been applied to the material and having deformed the material is subsequently removed. In contrast, plastic deformation follows application of enough stress on a material to cause a change in the size and/or shape of the material in a way, such that the material does not recover its original size and/or shape. In some embodiments, mechanical properties include, for example, storage modulus, tangent modulus, plateau modulus, swelling, and/or dynamic modulus. In some embodiments, treatments of the present disclosure may have a storage modulus from about 1 Pascal (Pa) to about 100,000 Pa, from about 1 Pa to about 50,000 Pa, from about 1 Pa to about 25,000 Pa, from about 1 Pa to about 10,000 Pa, from about 1 Pa to about 7,500 Pa, from about 1 Pa to about 5,000 Pa, from about 1 Pa to about 2,500 Pa, from about 1 Pa to about 2,000 Pa, from about 1 Pa to about 1,500 Pa, from about 1 Pa to about 1,000 Pa, from about 1 Pa to about 500 Pa, from about 1 Pa to about 250 Pa, from about 1 Pa to about 100 Pa, from about 100 Pa to about 100,000 Pa, from about 100 Pa to about 50,000 Pa, from about 100 Pa to about 25,000 Pa, from about 100 Pa to about 10,000 Pa, from about 100 Pa to about 7,500 Pa, from about 100 Pa to about 5,000 Pa, from about 100 Pa to about 2,500 Pa, from about 100 Pa to about 2,000 Pa, from about 100 Pa to about 1.500 Pa, from about 100 Pa to about 1,000 Pa, from about 50 Pa to about 500 Pa, or from about 50 Pa to about 400 Pa. Such measurements are preferably conducted at ambient temperature.

In some embodiments, a material may qualify as one or more different recited materials of an embodiment. For example, a component may be both an ethylenically unsaturated component and an active hydrogen component. Non-limiting examples of such materials are unsaturated: fatty acids, fatty acid salts, monoglycerides, and diglycerides, and combinations thereof. Unless indicated otherwise herein, such materials should be considered in determining the concentrations or amounts of any material categories in which they fit under. Thus, for example, a coating composition that includes 10 wt-% of unsaturated fatty acid is considered to be a coating composition that includes 10 wt-% of an ethylenically unsaturated component and 10 wt-% of an active hydrogen component, even if such coating does not include any other ethylenically unsaturated components or active hydrogen components.

In presently preferred embodiments, the coating composition is applied as a liquid coating composition. Such liquid coating compositions may include any suitable amounts of water, if any. In some embodiments, the coating composition is an aqueous coating composition (e.g., aqueous emulsion, dispersion or suspension) that includes, for example, more than 50 wt-%, more than 60 wt-%, more than 70 wt-%, more than 80 wt-%, more than 90 wt-%, more than 95 wt-%, or more than 97 wt-% of water. The use of aqueous coating compositions is preferable for a variety of reasons, including, for example, reduced cost, reduced odors during application, reduced or absent flammability risk, and enhanced ability to recover and re-use for coating. The barrier coating composition may also, or alternatively, include one or more organic solvents, which may be water-miscible organic solvents. Example of suitable organic solvents may include methanol, ethanol (e.g., food-grade ethanol at any suitable proof such as, e.g., about 190 proof), isopropanol, butanol, acetone, ethyl acetate, chloroform, acetonitrile, tetrahydrofuran, diethyl ether, tert-butyl ether, or a combination thereof. Food-grade organic solvents are preferred. Ethanol is a preferred organic solvent, with food-grade ethanol being preferred in some embodiments. In some embodiments, the coating composition includes ethanol in an amount of at least 1 wt-%, at least 5 wt-%, at least 10 wt-%, at least 20 wt-%, or at least 30 wt-%.

The use of an organic-solvent-based coating composition may be advantageous in embodiments in which antimicrobial/sanitization effect via the solvent package itself is desired. In some embodiments, the coating composition is a substantially non-aqueous coating composition that includes, for example, less than 20 wt-% of water, less than 10 wt-% of water, less than 5 wt-% of water, less then 2 wt-% of water, or less than 1 wt-% of water, or includes no intentionally added water. In some embodiments, the coating composition is an emulsion such as, for example, a so called "oil-in-water" emulsion or a "water-in-oil" emulsion, with oil in water being preferred due to cost and VOC considerations. Thus, for liquid coating composition embodiments, the continuous phase may be either organic-solvent-based or water-based. In some embodiments, the composition comprises a miniemulsion (preferably oil-in-water), which is also sometimes referred to as a nanoemulsion. The emulsion may also be modified to include a dispersant or colloid stabilizer (e.g., glycerol, lipid, lecithin, sodium lauryl sulfate, an oligosaccharide, a polysaccharide, or any of the emulsifiers referenced in *Food Emulsifiers and Their Applications*, Springer-Science+Business Media, B. V., 1997, edited by Gerard L. Hasenhuettl and Richard W. Hartel).

The coating composition can include dispersed or suspended particles, which may include at least a portion of the AHC and optionally at least some of the PMCA. In some embodiments, the particles are organic, which may for, example, be colloidal particles and/or polymer particles such as, for example, biopolymer particles, preferably edible biopolymer particles. Typically, the particles have volume average particle sizes of less than about 20 microns, less than about 10 microns, less than about 5 microns, less than about 1 micron, less than about 0.5 micron, or less than about 0.3 microns.

The barrier coating compositions of the present disclosure may also include other optional ingredients that do not adversely affect the coating composition or a dried coating resulting therefrom. Such optional ingredients are typically included in a coating composition to enhance composition esthetics, to enhance composition nutrition or health benefits, to enhance flavor, to facilitate manufacturing, processing, handling, and application of the composition, and to further improve a particular functional property of a coating composition or a dried coating resulting therefrom. Examples of such other optional ingredients that may be included in compositions of the present disclosure include a plasticizer, a wax, an amino acid, a dispersing agent, an anti-microbial agent, an anti-browning or -yellowing agent (e.g., ascorbic acid or citric acid), a probiotic, a vitamin or other nutrient, an enzyme, plant hormone, a colorant, a flavorant, an aromatic, an oxygen-scavenging agent, a compatibilizer, a leveling agent, a wetting agent, an adhesion promoter, or an antifoaming agent.

In some embodiments, the coating composition includes a plasticizer. Any suitable plasticizer may be used. Examples of suitable plasticizers may include glycerol, a fatty acid, an oil (preferably an edible oil, more preferably an edible plant-based oil), sorbitol, a polyalkylene glycol (e.g., a propylene glycol, a polyethylene glycol (e.g., having number average molecular weights of 400 to 10,000), and the like), triethyl citrate, triacetin, diethyl sebacate, dibutyl sebacate, glycol monostearate, or a mixture thereof. The plasticizer can be a polyol such as, for example, a polyol having a molar mass of less than 500 g/mol, less than 400 g/mol, less than 300 g/mol, less than 200 g/mol, or less than 100 g/mol.

Any suitable amount of plasticizer may be used, if any. When used, the coating composition will typically include at least about 2 wt-%, at least about 5 wt-%, at least about 10 wt-%, at least about 15 wt-%, or all least about 20 wt-% of plasticizer, based on the weight of total solids present in the coating composition. The upper amount of plasticizer is not particularly limited. When used, the coating composition will typically include no more than about 50 wt-%, no more than about 40 wt-%, no more than about 30 wt-%, no more than about 20 wt-%, no more than 15 wt-%, or no more than 10 wt-% of plasticizer, based on the weight of total solids present in the coating composition.

In some embodiments, the barrier coating compositions, pretreatment, and/or wash solutions of the present disclosure include one or more of acetic acid, aconitic acid, adipic acid, alginic acid, benzoic acid, citric acid, ferulic acid, hyaluronic acid, lactic acid, malic acid, propionic acid, stearic acid, succinic acid, sulfuric acid, tannic acid, tartaric acid, a salt thereof, or a mixture thereof.

In some embodiments, the barrier coating compositions, pretreatment, and/or wash solutions of the present disclosure include one or more of sodium acetate, sodium alginate, sodium benzoate, sodium bicarbonate, sodium carbonate, sodium citrate, sodium diacetate, sodium hydroxide, sodium hypophosphite, sodium lactate, sodium metasilicate, sodium propionate, sodium sesquicarbonate, sodium tartrate, sodium potassium tartrate, sodium potassium tartrate, sodium thiosulfate, or a combination thereof.

In some embodiments, the barrier coating compositions, pretreatment, and/or wash solutions of the present disclosure include one or more of potassium alginate, potassium bicarbonate, potassium carbonate, potassium chloride, potassium citrate, potassium hydroxide, potassium iodide, potassium iodate, potassium lactate, potassium sulfate, or a combination thereof.

In some embodiments, the barrier coating compositions, pretreatment, and/or wash solutions of the present disclosure includes one or more of ammonium alginate, ammonium bicarbonate, ammonium carbonate, ammonium chloride, ammonium hydroxide, ammonium citrate dibasic, amount phosphate monobasic, ammonium phosphate dibasic, ammonium sulfate, and mixtures thereof.

In some embodiments, the barrier coating compositions, pretreatment, and/or wash solutions of the present disclosure includes one or more of agar, benzoyl peroxide, beta carotene, clove or its derivatives, copper gluconate, copper sulfate, corn silk extract, cuprous iodide, L-cysteine, L-cysteine monohydrochloride, dextrin, diacetylmorphine, dill or its derivatives, ethyl formate, ficin, garlic or its derivatives, gluco delta-lactone, acacia (gum arabic), gum ghatti, guar gum, locust (carob) bean gum, karan gum (sterculia gum), gum tragacanth, hydrogen peroxide, inositol, isopropyl citrate, licorice or licorice derivatives, ground limestone, malt, maltodextrin, malt syrup (malt extract), methylparaben, monosodium phosphate derivatives of mono- and diglycerides, niacin, niacinamide, propyl gallate, propylene glycol, propylparaben, pyridoxine hydrochloride, riboflavin, riboflavin-5'-phosphate (sodium), rue, oil of rue, shea nut oil, sorbitol, stannous chloride (anhydrous or dehydrated), stearyl citrate, corn sugar, corn syrup, thiamine hydrochloride, thiamine mononitrate, α-Tocopherols, triacetin, tributyrin, triethyl citrate, urea, vitamin A, vitamin B12, Vitamin D, beeswax (yellow and white), candelilla wax, carnauba wax, whey, zein, or combinations thereof.

In some embodiments, the barrier coating compositions, pretreatment, and/or wash solutions of the present disclosure includes an essential oil (e.g., any of the essential oils listed in Title 21, Chapter 1, Section 182.20 of The Code of Federal Regulations (CFR), or combinations thereof).

The barrier coating composition may optionally include one or more health boost additives. Examples of such optional additives may include a vitamin; a probiotic; an essential oil; an edible plant extract; a *cannabis* compound or extract such as, for example, a cannabinoid (e.g., cannabidiol ("CBD")); or a combination thereof.

Preferred probiotics are gram positive bacteria that contribute positively to human gastrointestinal health. Examples of such gram positive bacteria may include suitable members of the *Bifidobacterium* genus (e.g., *Bifidobacterium* lactic, *Bifidobacterium bifidum, Bijfdobacterium longum*, and *Bifdobacterium breve*), the *Lactobacillus* genus (e.g., *Lactobacillus acidophilus, Lactobacillus paracasei, Lactobacillus casei, Lactobacillus plantarum, Lactobacillus bulgaricus, Lactobacillus rhamnosus*, and *Lactobacillus salivarius*), the *Saccharomyces* genus, the *Streptococcus* genus, the *Enterococcus* genus, the *Escherichia* genus, the *Bacillus* genus, and combinations thereof.

The coating composition can exhibit any suitable overall acid value. For example, the coating composition can have an acid value of at least 2, at least 3, at least 4, at least 5, at least 6, at least 7, at least 8, at least 9, at least 10, at least 15, at least 20, at least 30, at least 40, at least 50, at least 60, at least 70, at least 80 at least 90, or at least 100 mg KOH per gram of coating composition solids. Typically, the AHC and/or one or more active hydrogen compounds present in the AHC will have an acid value of less than 400, less than 300, less than 200, less than 150, less than 125, less than 100, less than 50, less than 30, less than 20, less than 15, less than 10, less than 5, less than 4, less than 3, less than 2, or less than 1 mg KOH per gram of coating composition solids. In some embodiments, the coating composition has an acid value of from at least about 10 to less than about 400, at least about 25 to less than about 300, or at least about 40 to less than about 250 mg KOH per gram of coating composition solids.

The coating composition can exhibit any pH suitable for a given embodiment. For example, in embodiments in which the coating composition is an aqueous coating composition, the aqueous coating composition exhibits a pH of at least about 2, at least about 3, at least about 4, or at least about 5. In aqueous embodiments, the coating composition typically exhibits a pH of less than about 10.5, less than about 9, less than about 8, or less than about 7. In some embodiments, the coating composition is an aqueous coating composition having a pH of from about 4 to about 9, from about 4.5 to about 8, or from about 5 to about 7.

In organic-solvent-based embodiments, the coating composition may, for example, exhibit a pH of at least about 1, at least about 1.5, at least about 2, at least about 2.5, at least about 3, or at least about 4. In organic-solvent-based embodiments, the coating composition may exhibit a pH of less than about 7, less than about 6, less than about 5, less than about 4.5, or less than about 4. In some organic-solvent-based embodiments, the coating composition exhibits a pH of from about 1.5 to 6, from about 2 to about 5, or more typically from about 2 to about 4.

Any suitable acids and/or bases may be used to achieve a desired pH for the coating composition. One or more pH buffering compounds and/or pH adjusting compounds (e.g., sodium bicarbonate) can be included in the coating composition. To the extent acids or bases are used to achieve the desired coating composition pH, typically a majority, and more typically all or substantially all, of such acids or bases are weak acids or weak bases. It is contemplated that, in some embodiments, strong bases, including substantial amounts of strong bases, may be used such as, for example, NaOH, KOH, or combinations thereof.

In the context of powder or other solid concentrate embodiments (e.g., tablets) capable of forming an aqueous or organic-solvent-based coating composition when combined with liquid carrier, the powder or other solid concentrate is preferably capable of forming such a liquid coating composition having a pH as disclosed above.

The coating composition may also include one or more emulsifiers. Examples of suitable emulsifiers may include lecithin (e.g., lecithin from soy, sunflower, or canola feedstocks), a sucrose ester of fatty acids (see, e.g., the line of food-grade sucrose ester emulsifiers commercially available from Sisterna B.V.), mono- and diglycerides, propylene glycol monoesters, lactylated esters, polyglycerol esters, sorbitan esters, fruit acid esters, acetylated monoglycerides, phosphate esters, an ester of citric acid (e.g., an ester of citric acid and glycerol such as citric acid mono-esterified, di-esterified, or tri-esterified with glycerol; stearyl citrate), a grape seed extract emulsifier, sucrose acetate isobutyrate, dioctyl sodium sulfosuccinate, glycerol monostearate, glycerol monooleate, glycerol palmitostearate, or a combination thereof. In some embodiments, canola lecithin such as that described in GRAS Notice No. 682 (by Cargill) is used. In some embodiments, the emulsifier is a surfactant (e.g., any of those described herein), a fatty acid carboxylic acid salt (e.g., any of those described herein), a phosphate salt (e.g., any of those described herein), or a combination thereof.

In some embodiments, the coating compositions and/or wash solutions of the present disclosure include one or more of the below compounds of Formula 2 for any suitable purpose (e.g., as an emulsifier or rheology modifier).

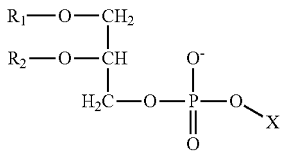

In the above Formula 2, $R_1$ and $R_2$ can each independently be any suitable organic group (e.g., organic groups having 30 or less, 25 or less, 22 or less, 20 or less, 19 or less, 18 or less, 17 or less, 16 or less, 15 or less, or 14 or less carbon atoms) or atom (e.g., hydrogen). In some embodiments, one or both of $R_1$ and $R_2$ are hydrogen. In some embodiments, one or both of $R_1$ and $R_2$ each independently have the structure —C(=O)$R_3$, wherein $R_3$ is a C1 to C30 group (e.g., C1 to C30 saturated or unsaturated carbon chain), more typically C6 to C18 or C12 to C18 group that my optionally include one or more carbon-carbon double bonds and may include one or more functional groups (e.g., —OH groups, epoxy groups, and the like). The $R_1$ and $R_2$ groups may each independently be provided by a fatty acid such as any of the saturated or unsaturated fatty acids referenced herein (e.g., palmitic acid, stearic acid, oleic acid, linoleic acid, linolenic acid, etc.). In some embodiment the depicted —$O^-$ can include a hydrogen such that it is instead an —OH group.

X in Formula 2 can be a hydrogen atom (e.g., such that the compound of Formula 2 is a phosphatidic acid) or an organic group such as, e.g., an alkyl or cycloalkyl group that may include one or more heteroatoms (e.g., O, N, and the like). X can include any suitable number of carbon atoms such as, e.g., 10 or less, 8 or less, 6 or less, 5 or less, 4 or less, 3 or less, or 2 or less. In some embodiments, X includes from 2 to 6 carbon atoms, optionally in combination with one or more heteroatoms.

The below structure is an example of a suitable phosphatidic acid of Formula 2 wherein the depicted —$O^-$ is instead an —OH group.

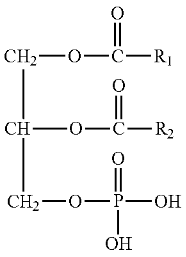

Below is an example of a phosphatidic acid salt of Formula 2

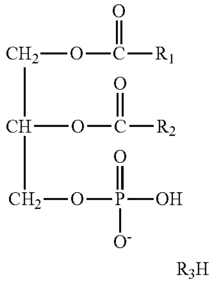

In some embodiments, X in Formula 2 is selected such that the compound has the below structure (e.g., such that the compound of Formula 2 is a phosphatidylcholine).

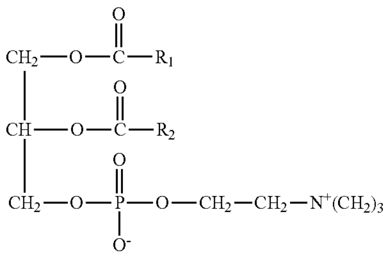

In some embodiments, X in Formula 2 has the below structure (e.g., such that the compound of Formula 2 is a phosphatidylethanolamine).

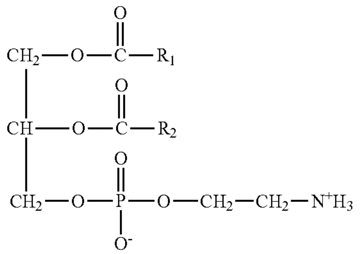

In some embodiments, X in Formula 2 has the below structure (e.g., such that the compound of Formula 2 is a phosphatidylinositol).

X =
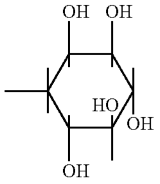

In some embodiments, the composition of the present disclosure includes 2 or more, 3 or more, or 4 or more different compounds of Formula 2. For example, the coating composition can include any suitable combination of one or more phosphatidic acids, one or more phosphatidylcholines, one or more phosphatidylethanolamines, and one or more phosphatidylinositols.

The coating composition of the present disclosure may optionally include one or more adhesion promoters in an efficacious amount (e.g., in an amount sufficient to measurably improve adhesion of a hardened coating to a perishable item and/or to improve one or more other coating properties in which adhesion plays an advantageous role). Examples of suitable compounds and concentrations are those, for example, disclosed later herein the context of adhesion promoting pretreatment compositions. Higher molecular weight adhesion promoting compounds (e.g., monomers, oligomers, and/or polymers) can be used at higher concentrations, if desired. Suitable adhesion promoters includes those described later herein, as well as phospholipids and any other suitable phosphorylated compounds (e.g., phospho-esters), which are preferably edible. While not intending to be bound by theory, it is believed that certain phosphorus-containing compounds can beneficially associate with natural endogenous metal compounds (e.g., iron compounds) present in the plant skin.

In some embodiments, the coating composition may include an oil. Preferably, the one or more oils are not included in an amount that renders the hardened coating excessively oily to the touch. An oil may be included to achieve any desired coating function. For example, in some embodiments, an oil may be included to function as a plasticizer and/or a water-barrier additive. Edible oils are preferred, with edible plant-based oils being particularly preferred to, for example, preserve vegan status of the composition. In some embodiments, the oil is derived from edible seeds. Examples of suitable oils include sunflower seed oil, canola seed oil (also sometimes referred to as rapeseed oil), flax seed oil, safflower seed oil, soybean oil, palm oil, corn oil, cottonseed oil, coconut oil, or combinations thereof. In some embodiments, a citrus oil may be used such as, for example, grapefruit seed oil, lemon oil, orange oil, lime oil, or combinations thereof.

In some embodiments, the barrier coating composition may include a wax. While not intending to be bound by theory, the inclusion of at least some wax may be advantageous to, for example, help mimic the natural performance, appearance, mouth-feel, or touch of the natural cuticle skin present on the exterior surface of fruits and vegetables, which typically include waxes. Examples of suitable waxes may include one or more of paraffin wax, carnauba wax, or beeswax. Edible waxes are preferred, with edible plant-derived waxed (e.g., natural edible waxes present in certain plants) being particularly preferred.

The coating composition, when present as a liquid, can have any suitable amount of solids. The suitable level of solids may vary widely depending upon a variety of factors, including, for example, the expected shelf-life, the sensitivity of the perishable item to be coated to degradation, and the chemistry of the applied coating. Examples of suitable total solids amounts include at least 0.01 wt-%, at least 0.025 wt-%, at least 0.05 wt, at least 0.1 wt-%, at least 0.15 wt-%, at least 0.2 wt-%, at least 0.25 wt-%, 0.5 wt-%, at least 1 wt-%, at least 2 wt-%, at least 3 wt-%, at least 4 wt-%, at least 5 wt-%, at least 6 wt-%, at least 7 wt-%, at least 8 wt-%, at least 9 wt-%, or at least 10 wt-% of total solids (i.e., non-volatiles). The liquid coating composition typically includes less than 50 wt-%, less than 30 wt-%, less than 20 wt-%, less than 15 wt-%, less than 10 wt-%, less than 5 wt-%, less than 4 wt-%, less than 3 wt-%, less than 2 wt-%, less than 1 wt-%, less than 0.75 wt-%, or about 0.5 wt-% or less of total solids. In preferred liquid embodiments, the coating composition includes from 0.1 to 35 wt-%, more typically 0.25 to 10 wt-%, and in some embodiments 0.25 to 5 wt-% or 0.25 to 3 wt-% of total solids. The concentration of total solids may be calculated based on starting materials (e.g., using the solids amount provided by the manufacturer and/or supplier in, for example a technical data sheet) or, alternatively, when starting materials and associated solids are not known, determined using a suitable test method. Standard test methods for use in determining solids and volatiles are well known in the art. An example of a useful test method is ASTM D2369-20, which allows for measuring the total non-volatile content of a liquid sample and, thus, determining total weight percent solids based on starting sample weight. Care should be exercised in the event a composition includes a sensitive material that chars in the test conditions (e.g., certain sensitive biopolymers). In such situations, appropriate adjustments to the test conditions may need to be made such as, for example, use of modified conditions to remove volatiles (e.g., a lower temperature) that avoids charring.

The coating composition may include one or more wetting additives, preferably in efficacious additive amounts, to help improve the wetting out of the surface to be coated. Examples of wetting additives may include monoacylglycerides, lysophospholipids, glycoglycerolipids, glycolipids, ascorbyl esters of a fatty acid, esters of lactic acid, esters of tartaric acid, esters of malic acid, esters of fumaric acid, esters of succinic acid, esters of citric acid, esters of pantothenic acid, sucrose ester of a fatty acid, dioctyl sodium sulfosuccinate, and fatty alcohol derivatives.

The coating composition may include one or more thickeners. When used, the thickener is preferably used in an efficacious amount, for example, to increase the viscosity of the liquid coating composition, increase stability of the liquid coating composition, and/or reduce or prevent tackiness or stickiness of the hardened coating. The one or more thickeners are typically used in an amount of at least 0.1 wt-%, at least 1 wt-%, at least 2 wt-%, or at least 5 wt-%, based on total solids in the coating composition. The one or more thickeners are typically present in an amount of less than 30 wt-%, less than 20 wt-%, less than 10 wt-%, less than 5 wt-%, or less than 1 wt-% of total solids in the coating composition. Examples of thickeners include a polysaccharide (e.g., a starch, a vegetable gum, *psyllium*, or pectin), a polypeptide, or a mixture thereof such as, for example, guar gum, agar-agar, arrowroot starch, cornstarch, katakuri starch, potato starch, sago starch, tapioca, alginin, guar gum, locust bean gum, xantham gum, carrageenan, carboxymethyl cellulose, and mixtures thereof.

In some embodiments, the coating composition includes one or more antimicrobial agents (e.g., in addition to any ethanol that may be present in the coating composition).

Examples of suitable antimicrobial agent include citric acid, malic acid, ascorbic acid, erythorbic acid, sorbic acid, thiodipropionic acid, ascorbyl palmitate, lauric acid, monolaurin, parabens (e.g., methyl and ethyl parabens), nisin, benzoic acid, triclosan, other weak acids or salts thereof, or a combination thereof. In preferred embodiments, an edible antimicrobial agent is used. Preferred antimicrobial agents are GRAS listed for direct or indirect food-contact, more preferably direct food-contact and/or as a direct food-additive). Additional examples of antimicrobial agents that may have utility in compositions of the present invention include clove oil, clove extract, vanilla extract, lemongrass oil, a terpene, a terpenoid, a phenol compound, a spearmint oil, thyme, curcumin, carvacrol, bay leaf oil, peppermint oil, acacia oil, oil of winter green, limonene, eugenol, eucalyptol, menthol, farnecol, carvone, hexanal, thyme oil, dill oil, oregano oil, orange peel oil, neem oil, lemon peel oil, cumin seed extract, rosemary oil, thymol, eugenyl acetate, vanilla oil, citronellal, methyl salicylate, methyl jasmonate, vanilla, and derivatives and combinations thereof. Examples of suitable fungicides, in addition or alternative to the aforementioned antimicrobials, some of which are fungicides, include thiabendazole ("TBZ"), ortho-phenylphenol ("OPP"), sodium ortho-phenylphenate ("SOPP"), enilconazole, fludioxonil, propiconazole, azoxystrobin, difenoconazole, and mixtures thereof. In some embodiments (e.g., plant cutting coatings or treatments), honey may be used as an antimicrobial, with raw honey being preferred for its enhanced antimicrobial activity relative to conventional processed honey. In some embodiments, a selenium-containing antimicrobial agent can be used such as, for example, the SELDOX materials available from SelenBio of Austin, Texas. Preferred selenium-containing antimicrobial agents are organoselenium compounds that are preferably capable of catalytically creating an anti-microbial effect via, for example, reactions between oxygen and thiols. Examples of such selenium-containing antimicrobial agents are provided in U.S. Pat. Nos. 8,236,337 and 9,370,187.

When present, such antimicrobials are typically used in a concentration of at least about 10 part-per-billion (ppb), at least about 50 ppb, at least about 100 ppb, at least about 500 ppb, at least 1 part-per-million (ppm), or at least 10 ppm. The maximum amount can vary widely depending upon the particular antimicrobial compound(s) used, but will typically be less than about 2 wt-%, less than about 1 wt-%, less than about 0.1 wt-%, less than about 100 ppm, less than about 50 ppm, less than about 20 ppm, less than about 10 ppm, or less than about 5 ppm.

To further extend shelf-life of certain fruits or vegetables, coating compositions of the present disclosure (e.g., wash or coating compositions) can include one or more ripening inhibitor compounds. Suitable ripening inhibitors may include ethylene inhibitors such as, for example, ethylene scavengers, ethylene receptor antagonists, or ethylene biosynthesis inhibitors. Examples of specific ripening inhibitors include a terpene (e.g., 3-carene, camphene, caryophyllene, humulene, isoprene, limonene, myrcene, pinene (e.g., alpha pinene and beta pinene), terpinene (e.g., alpha-terpinene), terpinolene, valencene, or a mixture thereof), a derivative thereof (e.g. a terpenoid such as alpha-bisabolol, trans-cinnamaldehyde, carveol, carvone, caryophyllene, cinnamyl alcohol, eucalyptol, estragole, eugenole, geraniol, cis-2-hexene-1-ol, trans-2-hexene-1-ol, linalool, nerolidol (e.g. cis and trans nerolidol, perillaldehyde), or a mixture thereof. In some embodiments, the ripening inhibitor is a cyclic terpene and/or a mono-terpene, with limonene compounds (e.g., d-limonene) being an example of a suitable terpene that is both a cyclic terpene and a mono-terpene. In some embodiments, the ripening inhibitor is a substituted cyclopropene compound such as, for example, 1-methylcyclopropene (which may optionally be encapsulated), a complex thereof (e.g., a complex with a cyclodextrin), or a mixture thereof.

Compositions of the present disclosure (e.g., wash or coating compositions) can include any suitable amount of ripening inhibitor to achieve a desired effect. Typically, the ripening inhibitor, when used, is present in an efficacious amount sufficient to delay ripening, for example, as indicated using a ripening parameter comparison relative to an analogous coated plant item with an otherwise identical coating lacking the ripening inhibitor. Suitable such ripeness parameters include, for example, any of those disclosed herein such as mass loss, firmness, sugar concentration, color parameter, soluble-solids, and the like. When used, the one or more ripening inhibitor is preferably present in the compositions of the present disclosure in an amount sufficient to inhibit ripening as indicated by one or more such ripeness parameter values being at least 1%, at least 2%, at least 3%, at least 4%, at least 5%, at least 6%, at least 7%, at least 8%, at least 9%, or at least 10%, at least 15%, or at least 20% different (e.g., in a direction indicative of a less ripened state) relative to an otherwise identical coating lacking the ripening inhibitor over a given time period (e.g., 1 day, 1 week, 10 days, 2 weeks, 3 weeks, 4 weeks, etc.) after application of the coating to a perishable item (e.g., freshly harvested climacteric fruit or vegetable).

Examples of suitable amounts of ripening inhibitor may include at least 1 ppm, at least 10 ppm, at least 20 ppm, at least 50 ppm, at least 100 ppm, at least 500 ppm, at least 1,000 ppm, at least 2,000 ppm, at least 3,000 ppm, at least 5,000 ppm, or at least 10,000 ppm, based on the amount of total solids in the coating composition. The ripening inhibitor will typically be included in the coating composition in an amount of less than 50,000 ppm, less than 20,000 ppm, less than 10,000 ppm, less than 5,000 ppm, less than 3,000 ppm, less than 2,000 ppm, less than 1,000 ppm, less than 500 ppm, less than 300 ppm, less than 200 ppm, or less than 100 ppm of ripening inhibitor, based on total solids in the coating composition.

When used, a ripening inhibitor is typically used in compositions intended for use with a climacteric fruit or vegetable. While such inhibitors will typically be used on freshly harvested fruits and vegetables, they may also be used in conjunction with minimally processed climacteric fruits or vegetables. Examples of fruits and vegetables that may benefit from use of compositions including ripening inhibitors include apples, apricots, avocado, bananas, broccoli, carnations, carrots, cucumber, eggplant, grapes, green leafy vegetables, pears, plantains, or potatoes.

The coating compositions of the present disclosure can be single part coating compositions or multi-part (e.g., two-part) coating compositions. Multi-part coating compositions may be employed when pot-life stability is a concern. In some embodiments, a multi-part coating composition is employed having at least a first part including the AHC and a second part including one or more compounds reactive with the first part (e.g., under ambient conditions) and/or that facilitates reaction of the first part with one or more compounds present in the first part and/or the second part (e.g., under ambient conditions). Thus, for example, the second part can include any of those compounds disclosed herein such as a PMCA, an enzyme, a catalyst (e.g., transglutaminase), a metal drier, another AHC reactive with the AHC of the first part, or a combination thereof. The first and second parts may be contacted and/or mixed with one another at any suitable time including prior to substrate application (e.g., within 24 hours, within 1 hour, within 30 minutes, within 10 minutes, within 5 minutes, or within 1 minute of substrate application), during application, and/or after application. In some embodiments, the first and second parts are stored in separate containers (e.g., storage tanks) and are combined subsequent to leaving their respective storage containers using, for example, an inline mixer such as a static mixer.

Mixing may additionally or alternatively take place upon application of the first part and the second part to a surface of a perishable item to be treated. While not wishing to be bound by any theory, it is believed that mixing of the first and second parts may be achieved, for example, by intermolecular diffusion driven by concentration gradients, surface tension gradients and/or thermal gradients between the first and second parts upon mixing and/or application to the perishable item surface. In general, application of the first, second and additional parts may be carried out in any order.

In some embodiments, the first and second parts may be applied "wet-on-wet." However, depending on the application technique, a drying step may be included after application of the first, second, or subsequent parts.

In some embodiments, the first and second parts may be separate and applied at the same time to the perishable item using, for example, using two or more separate sprays via a single sprayer (e.g., a sprayer capable of simultaneously spraying two or more separate sprays) or multiple sprayers. In other embodiments, the first and second parts may be combined just prior to spraying, or in the sprayer itself (e.g., in a spray gun), such that both are emitted from the sprayer together in a combined spray.

The coating composition of the present disclosure can be applied to any portion of a surface of a plant item. In some embodiments, the coating composition is applied to at least a portion of a removable skin, such as a removable skin (e.g., removable peel or rind) of a freshly harvested fruit or vegetable. Such skin may be either edible or inedible. Even for certain edible skins, it may not be the practice for consumers in particular locations to consume the skin. For inedible skins (e.g., an avocado peel, a banana peel, etc.) or edible removable skins that are not normally consumed, there may be more freedom to use chemistries that would otherwise be avoided on consumed portions of a fruit or vegetable due to, for example, concerns of taste, mouth-feel, or digestibility. Similarly, for example, for inedible and/or removable skins it may be possible to use ingredients and/or a coating composition that while suitable for indirect food-contact, direct food-contact, and/or as an indirect food-additive, may not be suitable for use as direct food additives under FDA laws and regulations.

In some embodiments, at least a portion of the surface of a plant item to be coated is subjected to one or more pretreatment(s) prior to coating to, for example, improve the performance of the barrier coating (e.g., to extend shelf-life, preserve product quality, reduce mass loss, etc.). Such pre-treatments, may include, for example, one or more washing steps (e.g., detergent rinses, potable water rinses, and the like), one or more sanitization steps, one or more adhesion promotion steps, or a combination thereof. In some embodiments, a single step may include multiple of the aforementioned pretreatments (e.g., combined rinse and sanitization). Examples of sanitization steps include application of high-voltage cold plasma (HVCP) (see, e.g., the teachings of U.S. Pat. Nos. 10,194,672, 9,363,880 and WO2017200930A1), application of ultraviolet light (UV) light or other applied sanitizing energy type, application of an efficacious amount one or more antimicrobial compounds (e.g., in a rinse solution) such as, for example, any of those disclosed herein.

In some embodiments, a surface of the plant item to be coated (e.g., the skins of fresh fruit or vegetables) is subjected to one or more pretreatment steps prior to coating to improve application of the coating composition and/or improve one or more coating properties of the resulting coating. In some embodiments, the surface of the plant item to be coated may be subjected to a plurality of different pretreatment steps which may be the same or different. The pretreatment process may lead to a variety of beneficial outcomes. For example, pretreatment may lead to better wetting out of the surface of the plant item by the liquid coating compositions, thereby enabling formation of a more continuous and/or uniform coating. Alternatively, or additionally, the pretreatment step may lead to enhanced adhesion of the hardened coating to the plant surface, which may lead to a variety of beneficial outcomes such as, for example, enhanced shelf-live for the coated plant item, reduced mass loss, enhanced resistance against the coating being prematurely washed away, enhanced abrasion resistance, and the like.

The pretreatment process may include application of one or more compositions to the surface of the plant item to be coated (e.g., liquid compositions, plasma, or otherwise), application of one more energy forms to such surface (e.g., UV light, electron-beam, or pulsed electric field (PEF)), application of one or more physical forces to such surface (e.g., lightly abrading the plant surface to gently texturize or roughen the surface and/or remove or reduce waxiness without appreciably affecting its overall thickness or integrity), or both in multiple discrete steps and/or combined steps. The pretreatment be combined with a wash or rinse step such that, for example, a pretreatment composition also functions as a wash composition to remove dirt and other contaminants or residuals from the surface of the plant item to be coated. The plant item to be coated may optionally be washed before the pretreatment, after pretreatment, or both before and after the pretreatment.

While not intending to be bound by theory, it is believed that certain pretreatment steps can modify the low-energy surface of certain fruit and vegetable skins (including, e.g., peels and rinds) to make the surfaces more conducive to coating. For example, suitable acidic pretreatment compositions (e.g., having an acidic pH such as less than 3.5, less than 3, less than 2, less than 1.5, and so on) may be used to gently "etch" the surface of the skin without appreciably damaging it in a manner that would compromise the integrity of the skin. Alternatively, alkaline pH chemical-etch solutions may also be used that include one or more bases such as, for example, one or more strong bases such as sodium hydroxide. Enzymatic pretreatments may be used to treat the surface, preferably in a manner that lowers the surface energy or otherwise improves coating application, with examples of suitable enzymes including cutinase, pectinase, and mixtures thereof. Applied energy forms such as, e.g., UV and electron-beam (e-beam) may also be used to gently etch the surface. While not intending to be bound by theory, it may be advantageous to use a higher strength (e.g., more intense) and/or longer duration of such applied energy than that typically used for fruit or vegetable sanitization.

In some embodiments, the pretreatment composition includes one or more phosphorus-containing compounds in an efficacious amount to achieve a desired result (e.g., mildly "etch" the surface of the plant skin, lower the surface energy of the plant skin (e.g., as indicated by a decrease in the contact angle of deionized water disposed on the treated skin), improve wetting out of the plant skin, and/or improve coating adhesion). While not intending to be bound by theory, phosphorus acids may function as adhesion promoters through associating with metal-containing compounds present on the plant item and/or as a mild etching compound when present in a suitable amount. Examples of suitable phosphorus acids may include a phosphinic acid ($H_3PO_2$), a phosphonic acid ($H_3PO_3$), or a phosphoric acid ($H_3PO_4$), or a combinations thereof. The one or more phosphorus acids can be used in any suitable amount to achieve a desired result, such as, for example, 0.005 wt-% or greater, 0.01 wt-% or greater, 0.05 wt-% or greater, or 0.1 wt-% or greater. The upper amount of phosphorus acid should be selected to avoid unsuitable degradation to the surface of the plant item, the quality of the plant item, and/or the equipment of the processing line and should preferably factor in exposure duration. Typically, the phosphorus acid, if used, is present in pretreatment compositions in an amount of less than 5 wt-%, less than 1 wt-%, less than 0.05 wt-%, or less than 0.02, based on total solid such as resin solids weight of the coating. The above acid concentrations reflect the amount of the acid itself, and not the combined amount of acid and solvent (water and/or organic solvent), if used, which may be present in the acid feedstock used to formulate the pretreatment composition.

The perishable item to be coated may also be subjected to one or more sanitization steps prior to coating, simultaneous to coating, after coating, or combinations thereof. Chemical sanitization, non-chemical sanitization, or combinations thereof, may be used. Examples of non-chemical sanitization include, for example, application of ultraviolet (UV) light (e.g., with wavelengths from 100 to 400 nanometers) to the perishable such as, for example, non-ionizing artificial UV-C light (100 to 280 nanometers wavelength, preferably 200 to 280 nanometer wavelength for enhanced antimicrobial effect). Other forms of sterilizing irradiation may also be used, if desired. For example, three sources of radiation are approved by the FDA for use on a variety of foods: gamma ray, x-ray, and electron-beam, although labeling requirements may apply and also render the treated foods ineligible for organic status. When used, such sanitization steps are preferably of a duration and/or intensity to substantially reduce (e.g., reduce by at least 50%, at least 75%, at least 90%, at least 95%, or at least 99%) or appreciably eliminate one or more of: (i) the overall microbial load of *Escherichia coli* (*E. coli*), if any is present, (ii) the overall microbial load of *Salmonella*, if any is present, or (ii) the overall microbial load. A reduction in such loads is in the context of a reduction of viable cell counts present.

Typically, the pretreatment composition will be water-based, but it may optionally contain organic solvent (e.g., any of those disclosed herein), and may even be organic-solvent-based in some embodiments. The pretreatment composition may even include any of the PMCA disclosed herein (e.g., in any of the concentrations disclosed herein), which may function, for example, as an adhesion promoter to improve adhesion of the barrier coating composition and/or improve one or more other properties of the barrier coating. The pretreatment composition may include one or more adhesion promoter compounds such as, for example, certain phosphorus-containing compounds such as, for example, phosphorus acid and other suitable phosphorylated compounds. At least for inedible plant items, as well as perhaps on inedible skins of fruit or vegetables assuming the compound does not pose an unsuitable risk to edible portions of the fruit or vegetable, certain silicon-containing adhesion promoter compounds (e.g., silane coupling agents such as, for example, those used in food or beverage packaging coatings—see, e.g., U.S. Pat. No. 9,163,151) may also be used in an efficacious amount.

The surface of the plant item to be coated may also be plasma treated to, for example, mildly etch the plant skin as described above and/or lower its surface energy. As previously discussed, plasma treatment in the form of high voltage cold plasma (HVCP) treatment is already known for use with fruits and vegetables for purposes of its antimicrobial effect. See, for example, the materials, processes, and equipment disclosed in U.S. Pat. Nos. 10,194,672, 9,363, 880, and WO2017200930. Thus, sanitizing may also be a benefit of plasma treatment and it may be used for that purpose as well, in addition to or instead of modifying adhesion and/or surface energy. In some embodiments, however, the particular plasma treatment is selected to achieve a desire level of etching and/or surface energy modification of the plant skin. In this regard, plasma etching or cleaning processes known for such purposes (with respect to metal or plastic substrates) in the industrial coating space may, for example, be employed, with appropriate modifications due to the differing nature of the plant skins to be treated. Surface energy modifications resulting from plasma treatment may be temporary. In some embodiments, suitable plasma treatment results in a measurable decrease in the contact angle of a droplet of deionized water relative to the plant surface (e.g., a decrease in such contact angle of at least 1°, at least 2°, at least 3°, at least 4°, at least 5°, at least 6°, at least 7°, at least 8°, at least 9°, at least 10°, at least 11°, at least 12°, at least 13°, at least 14°, or 15° or more). FIG. 1 is a representative diagram illustrating measurement of contact angle of a droplet of deionized water on a surface (e.g., fruit or vegetable skin). As depicted in FIG. 1, the contact angle is measured based on a line that is tangent to the surface of a droplet at the point that the droplet contacts a supporting substrate ("surface under test" in FIG. 1).

An optical tensiometer and image analysis software may be used to precisely determine the contact angle of the droplet relative to the surface being tested. An example of a useful optical tensiometer equipped with image analysis software is the DCA-100 contact angle tensiometer manufactured by First Ten Angstroms, Inc. of Portsmouth, Virginia, USA. Such an optical tensiometer may be used, for example, to measure the static contact angle of a 10 microliter sessile drop of room temperature deionized water (or other liquid to be tested) measured 30 seconds after application at room temperature. Unless specifically indicated otherwise, all contact angles referenced herein are static contact angles (as, opposed, e.g., to dynamic contact angles such as advancing or receding contact angles). Typically, contact angles are reported as the average value of at least six separate measurements.

The compositions (e.g., barrier coating compositions or wash compositions) of the present disclosure may be sprayable to facilitate application.

In some embodiments, the composition comprises a powder, which is preferably capable of being combined with a liquid carrier (e.g., any of the liquid carriers recited herein) to form a liquid coating composition, which may be sprayable. In some such embodiments, the powder is capable of being combined with an aqueous carrier liquid to form an aqueous coating composition, preferably a homogenous or substantially homogeneous aqueous coating composition. Such powder concentrates can be formed using any suitable method including, for example, combining powder ingredients or spray drying a liquid coating composition (e.g., an aqueous coating composition) to produce a powder Provided in the below table are concentrations of compounds that may be present in compositions of the present disclosure in some embodiments. The below compound concentrations can be considered independent of one another or in combination with one or more listed in the table. Stated otherwise, a given composition may comply with one or more, a plurality, or all of the concentration ranges listed in a given column or columns of the below table. Preferred compositions comply with the listed heavy metal concentrations and more preferably are non-detect for such heavy metals. Such heavy metals, if present, e.g., in trace amounts, were typically naturally present in one or more of the feedstocks and were not intentionally added.

| Compound or Parameter | Concentration or value, if any, in some embodiments | Concentration or value, if any, in some embodiments | Concentration or value, if any, in some embodiments |
|---|---|---|---|
| Free Glycerol | ≤0.2 wt-% | | non-detectable |
| Free Fatty Acid | ≤0.5 wt-% | | non-detectable |
| Monoacylglycerides | ≤91 wt-% | | non-detectable |
| 1,3-Bis(benzyloxy)propan-2-yl esters of fatty acids* | ≤2 wt-% | ≤0.1 wt-% | non-detectable |
| Diacylglycerides | ≤7 wt-% | ≤2 wt-% | ≤1 wt-% or non-detectable |
| Total Fatty Acid Esters | ≥99 wt-% | | |
| Acetonitrile | ≤5 parts-per million (ppm) | ≤3 ppm | non-detectable |
| Toluene | ≤5 ppm | ≤3 ppm | non-detectable |
| Hexane | ≤25 ppm | ≤3 ppm | non-detectable |
| Palladium | ≤0.1 ppm | ≤0.05 ppm | non-detectable |
| Arsenic | ≤0.2 ppm | ≤0.05 ppm | non-detectable |
| Lead | ≤0.1 ppm | ≤0.05 ppm | non-detectable |
| Cadmium | ≤1 ppm | ≤0.1 ppm | non-detectable |
| Mercury | ≤1 ppm | ≤0.5 ppm | non-detectable |
| Ethyl acetate | ≤100 ppm | ≤30 ppm | non-detectable |
| Peroxide value | <30 meq/kg | ≤10 meq/kg | ≤1 meq/kg |
| Pesticides | <1 ppm or <0.1 ppm | <10 parts-per-billion (ppb) or <1 ppb | non-detectable |

In preferred embodiments, the organic constituents of the coating composition are substantially, or more preferably exclusively, provided by bio-renewable materials. In such embodiments, the coating composition preferably contains 20 wt-% or less, 10 wt-% or less, 5 wt-% or less, 1 wt-% or less, 0.1 wt-% or less, 0.01 wt-% or less, if any, of petrochemical-derived organic materials. In preferred embodiments, at least 50 wt-%, at least 60 wt-%, at least 70 wt-%, at least 80 wt-%, at least 90 wt-%, at least 95 wt-%, at least 99 wt-%, at least 99.9 wt-%, or about 100 wt-% of the total organic content of the barrier coating composition is provided by bio-renewable materials. The content of carbon-14 (C-14) is indicative of the age of a bio-based material. C-14, which has a half-life of about 5,700 years, is found in bio-renewable materials, but not in fossil fuels. Thus, "bio-renewable materials" refer to organic materials in which all, or substantially all, of the carbon comes from non-fossil biological sources.

The terms "biorenewable" and "biosourced" as used herein preferably means materials where the level of carbon-14 isotopes in the material is comparable to the mean level of C-14 isotopes in atmospheric $CO_2$ (e.g., as measured by ASTM D6866). Comparable means the value is within +/−6% of the value of the reference sample (described herein or in the standard test method used), more preferably within +/−5%, most preferably within +/−4%. The percentage differences for comparable properties refers to fractional differences between the material tested and the reference where the property is measured in the same units in the same way (i.e., if the value to be compared is also measured as a percentage it does not denote an absolute difference).

More preferred biorenewable materials are those comprising at least a minimum amount of the C-14 isotope such that the C-14 level in the material satisfies one or more of the values as described herein. C-14 levels can be determined by measuring its decay process (disintegrations per minute per gram carbon or dpm/gC) through liquid scintillation counting. In some embodiments, the one or more active hydrogen compounds of the AHC comprise at least about 1.5 dpm/gC (disintegrations per minute per gram carbon) of carbon-14, more preferably at least 2 dpm/gC, most preferably at least 2.5 dpm/gC, and especially at least 4 dpm/gC.

In some embodiments, the edible compositions of the present disclosure are free (viz., non-detect) or substantially free (less than 50 ppm, less than 10 ppm, less than 1 ppm, less than 100 ppb, less than 10 ppb, or less than 1 ppb) of inorganic nanoparticles (e.g., inorganic particles having a largest dimension of between 1 and 100 nanometers). Measurement of the largest dimension of particles can be determined, for example, using transmission electron microscopy (TEM). The presence of such nanoparticles can be avoided, for example, through careful ingredient selection and feedstock origin and quality. For example, certain food-grade titanium dioxide and silicon dioxide feedstocks include amounts of inorganic nanoparticles.

As already discussed, in certain preferred embodiments, the coating compositions disclosed herein yield hardened clear, or at least substantially clear coatings. Preferred such coatings are free of eye-visible haze (i.e., haze visible to the unaided human eye under typical representative viewing conditions). In some embodiments, the coating is free of haze in testing pursuant to ASTM D1003. The hardened coating is preferably free of particulates and agglomerates visible to the unaided (20/20) human eye. In some embodiments, the coating composition is preferably free, or substantially free, of particles having a maximum dimension of greater than about 50 microns, greater than about 30 microns, greater than about 20 microns, greater than about 15 microns, greater than about 10 microns, greater than about 5 microns, greater than about 1 micron, or greater than about 0.1 microns.

In some embodiments, the hardened coatings are sufficiently optically transparent so as to prevent the coatings from being detectable by the human eye. For example, the coatings can have an average transmittance of at least about 60%, at least about 65%, at least about 70%, at least about 80%, at least about 85%, at least about 90%, at least about 95%, or at least about 99%) for light in the visible range such as, e.g., sunlight (i.e., the portion of the solar spectrum having a wavelength between 400 nanometers and 700 nanometers). As used herein, "transmittance" is defined as the ratio of transmitted light power to incident light power. As used herein, "average transmittance" refers to the average value of the transmittance over the entire area of the coating. Because transmittance typically decreases with coating thickness, the coatings can be made thin enough to allow for sufficient transmittance of visible light while still being thick enough to serve as a barrier to mass/moisture loss, as previously described. For example, the protective coatings may have an average thickness of less than 2 microns, less than 1.5 microns, less than 1 micron, or less than 0.5 microns.

In some embodiments, the methods, compositions, and/or equipment of the present disclosure may be used to achieve a more standard and/or desired visual appearance across a run of treated produce or other perishables. For example, a coating composition including a particular amount of dye and/or colorant may be applied to produce a treated produce lot or other perishables lot with less variation in visual appearance across individual items and/or an overall more desirable appearance on average for individual items.

The thickness of the coating employed may vary depending upon, for example, the perishable item to be coated, the desired aesthetic properties of the coating, cost considerations, and the desired level of coating performance. Typically, the coating will be of substantially uniform thickness. Examples of typical coating thickness include average thicknesses of less than about than about 200 microns, less than about 75 microns, less than about 20 microns, less than about 15 microns, less than about 10 microns, less than about 9 microns, less than about 8 microns, less than about 7 microns, less than about 6 microns, less than about 5 microns, less than about 4 microns, less than about 3 microns, less than about 2 microns, or less than about 1.5 microns. The coating will typically be used at an average coating thickness of at least about 0.01 micron, at least about 0.100 micron, at least about 0.5 micron, at least about 1 micron, at least about 1.5 microns, at least about 2 microns, at least about 2.5 microns, or at least about 3 microns.

In some embodiments, it may be desirable to employ a coating on a perishable item having a non-uniform coating thickness throughout. For example, it may be desirable two have two or more hardened coating portions having different average coating thickness. In some embodiments, at least a portion of the hardened coating is at least 5%, at least 10%, at least 15%, at least 20%, at least 25%, at least 50%, at least 75%, or 100% or more thicker than the coating thickness present on other portions of coated perishable item. For example, a thicker coating portion may be selectively positioned over portions of a perishable item that are more prone to damage (e.g., bruising or abrasion) and/or more susceptible to spoilage initiation. In some embodiments, the selectively applied coating is applied on and/or around a stem portion of a perishable plant item (e.g., a stem and/or calyx button of a fruit such as an avocado). While not intending to be bound by theory, it has been observed that for certain fruits (e.g., avocado), over-ripening and spoilage tends to occur first in portions of the plant flesh adjacent to the stem area. In the case of avocados, this may be due, at least in part, to the transition/interface between the fruit skin and the stem area and, for example, shrinkage of the skin which may open up a gap in the interphase area and allow for increased ingress of oxygen, water vapor, ethylene gas, and/or microbial agents (e.g., biotic stressors). Although not presently preferred, it is also contemplated that, in some embodiments, coating composition may be selectively applied to one or more portions of a perishable item (e.g., that are relatively more susceptible to spoilage and/or spoilage initiation), with one or more other portions left uncoated to minimize the overall amount of applied coating and save on material costs.

In addition to, or as an alternative to a thicker coating portion, a chemically-different coating from other coating portion(s) may be selectively applied on a portion of a perishable item such as, for example, a portion of a plant item (e.g., freshly harvested fruit or vegetable) that is relatively more susceptible to damage or spoilage initiation. As compared to one or more other coating applied on perishable item, the selectively applied chemically-different coating may, for example, have an increased barrier property relative to oxygen, carbon dioxide, and/or water vapor transmission; an increased amount of antimicrobial agent; an increased amount of ripening inhibitor; an increased abrasion resistance; an increased mechanical strength (e.g., tensile strength); an increased flexibility; etc. In some embodiments, one or more additional layers of the coating composition are selectively applied on one or more portions of the perishable item to achieve the thicker hardened coating thickness. The one or more additional layers may be formed using a same or a chemically-different coating composition than: (a) that used to provide a base coating layer over which the one or more additional layers are disposed or alternatively or (b) that used to provide a top coat layer applied over the one or more additional layers. Thus, in some embodiments, the one or more additional layers of coating are applied first to the perishable item. The one or more additional layers may be applied at any suitable point or time in the supply chain. For example, for fresh produce, the one or more additional layer may be applied at a fruit or vegetable processor as part of a fruit or vegetable packing process.

Similarly, as already discussed, hardened coatings formed from coating compositions of the present disclosure preferably do not exhibit off-aromas that could detract from consumers' perceptions of the quality of the coated plant item. The absence of such detectable off-aromas by the typical person is particularly desirable when the plant item is edible and intended for consumption by consumers. Thus, in preferred embodiments, coated plant items (e.g., coated fresh fruit or vegetable) do not exhibit any negative off-aromas, relative to otherwise identical uncoated control plant items, that reproducibly detectable in a statistically significant manner by a panel of human testers reasonably representative of the general population. Moreover, in certain preferred embodiments, such coated plant items do not exhibit any negative off-aromas, relative to otherwise identical uncoated control plant items, that are reproducibly detectable in a statistically significant manner by a panel of expert human testers having particularly sensitive olfactory detection capabilities and skills.

Edible hardened coatings of the present disclosure, when present on edible portions of fresh fruits or vegetables (or other foods such as any of those referenced herein), preferably do not exhibit any negative off-flavors (e.g., that are detectable in a statistically significant manner by a panel of human testers representative of the general population similar to that described above for olfactory testing). Moreover, in certain preferred embodiments, such coated edible portions of fresh fruits or vegetables (or other foods such as any of those referenced herein) do not exhibit any negative off-flavors, relative to otherwise identical uncoated control plant items, that are reproducibly detectable in a statistically significant manner by a panel of expert human testers having particularly sensitive and trained palates.

Such aroma and/or flavor organoleptic testing should preferably occur after a period of storage for the coated fruit or vegetable that is representative of the minimum time lag typical in the typical produce grocery supply chain for that particular fruit or vegetable between coating and purchase by consumers. For example, it would not generally be appropriate to coat a fresh fruit or vegetable and immediately after hardening of the coating subject it to organoleptic panel testing. Moreover, the pertinent time period between coating and organoleptic panel testing may be substantially different between different fruits and vegetables (e.g., strawberries and avocados) due to differences in the supply chain (e.g., typical duration of shipping, storage, and/or retail display prior to purchase). At a minimum, sufficient time should be allowed for any volatiles (e.g., fugitive bases such as ammonia) that may be present in the liquid coating composition, but would not typically still be present in a detectable amount to the human olfactory senses after purchase by a typical retail grocery consumer (e.g., a consumer of Costco, Target, Kroegers, Walmart, and the like), to substantially volatilize off so as not to skew the testing results in a manner that is not representative of a typical end retail consumer experience in the produce retail grocery supply chain for a particular fresh produce item.

When hardened, coating compositions of the present disclosure preferably do not exhibit any objectionable mouth-feel (e.g., that is detectable in a statistically significant manner by a panel of human testers representative of the general population using pertinent controls).

In some embodiments, the hardened coatings of the present disclosure can be appreciably removed from a plant surface (e.g., at least 50%, at least 60%, at least 70%, at least 80%, at least 90%, at least 95%, or at least 99% removed, on a mass basis) by soaking in a suitable volume of water (e.g., immersing a coated fresh fruit or vegetable for 10 minutes in 2 liters of room-temperature deionized water). In some embodiments, some light brushing using, for example, a soft bristled fruit or vegetable cleaning brush may help facilitate obtaining such removal amounts. In some embodiments, a small amount of dish soap may be used to facilitate coating removal, with the dish soap subsequently rinsed away prior to consumption. In some embodiments, an aqueous wash solution including a suitable amount (e.g., a dilute amount such as 5% or less, more typically 3% or less, or about 1 to about 3%) of a food-safe base (typically a weak food-safe base) may be used to facilitate removal of certain hardened coatings of the present disclosure, preferably under normal ambient conditions. For example, certain reversibly cross-linked hardened coatings of the present disclosure can be removed (e.g., certain of those using PMCA's such as zinc-containing PMCAs and carboxyl-functional AHC) from coated skins of fresh fruits and vegetable prior to consumption using a 3% solution of ammonium hydroxide in water.

Hardened coatings of the present disclosure are preferably capable of reducing the mass loss of perishable items over a commercially pertinent time period, and particularly plant items such as fresh fruits and vegetables, cut flowers, and plant cuttings. For example, hardened coatings of the present disclosure preferably reduce the mass loss rate of a given perishable item by at by at least 10%, 15%, 20%, 25%, 30%, 35%, 40%, 45%, 50%, 55%, 60%, 65%, 70%, 75%, 80%, 85%, 90% or greater compared to untreated analogous perishable items. As used herein, the term "mass loss rate" refers to the rate at which the product loses mass (e.g., by releasing water and other volatile compounds). The mass loss rate is typically expressed as a percentage of the original mass per unit time (e.g., percent per day) and may be determined by weighing a coated perishable plant item at different time points. Examples of pertinent time periods for assessing mass loss rate include just prior to coating (to establish a baseline mass for the uncoated perishable), immediately after coating and hardening of the coating composition (to establish a baseline mass for the coated perishable item such that the hardened coating weight can be determined), 24 hours after coating, 48 hours after coating, 72 hours after coating, 96 hours after coating, 120 hours after coating, 7 days after coating, 10 days after coating, 14 days after coating, 21 days after coating, and 28 days after coating. The pertinent time periods for assessing mass loss rate may vary widely depending upon the particular perishable item coated. For example, an overall testing time period for mass loss rate may be much longer for a relatively long shelf-life perishables such as fresh avocados compared to relatively short shelf-life perishables such as fresh strawberries. Useful freshly harvested plant items for assessing mass loss of coating compositions include any of those disclosed herein, and especially avocados, blueberries, cherries, strawberries, lemons, and limes (e.g., finger limes).

Hardened coatings of the present disclosure preferably exhibit a mass loss factor of at least 1.1, at least 1.2, at least 1.3, at least 1.4, at least 1.5, at least 1.6, at least 1.7, at least 1.8, at least 1.9, at least 2.0, at least 2.2, at least 2.4, at least 2.6, at least 2.8, at least 3.0. As used herein, the term "mass loss factor" is defined as the ratio of the average mass loss rate of uncoated produce (measured for a control group) to the average mass loss rate of the corresponding coated produce at a given time. Hence a larger mass loss factor corresponds to a greater reduction in average mass loss rate for the coated produce.

The coating compositions of the present disclosure may function to reduce the amount of humidity generated by coated perishables (e.g., plant items such as fresh fruits and vegetables, cut flowers, and plant seedings) during storage. The term "storage" is used broadly herein, and includes also any time the produce is in transit during shipping. In storage, such coated plant items will typically be stored in close proximity to one another such as, for example, in filled boxes, bins, crates or other storage or shipping containers. Preferred hardened coatings of the present disclosure are capable of reducing the humidity generated during storage by at least 1%, 2%, 3%, 4%, 5%, 10%, 15%, 20%, 25%, 30%, 35%, 40%, 45%, 50%, 55%, 60%, 65%, 70%, 75%, 80%, 85%, 90% or greater compared to untreated analogous plant items. Thus, for example, plant items (e.g., avocados, strawberries, or lemons) coated with preferred hardened coating compositions of the present disclosure may exhibit a reduced respiration rate relative to analogous uncoated plant items. Such hardened coatings may reduce respiration rate by at least 10%, 15%, 20%, 25%, 30%, 35%, 40%, 45%, 50%, 55%, 60%, 65%, 70%, 75%, 80%, 85%, 90% or greater compared to untreated analogous plant item (e.g., untreated avocados, untreated strawberries, or untreated lemons from same harvest). As used herein, the term "respiration rate" refers to the rate at which the product releases carbon dioxide ($CO_2$), and more specifically is the volume of $CO_2$ (at standard temperature and pressure) released per unit time per unit mass of the product. The respiration rate is typically expressed as ml $CO_2$/kg-hour. The respiration rate of the product can be measured by placing the product in a closed container of known volume that is equipped with a $CO_2$ sensor, recording the $CO_2$ concentration within the container as a function of time, and then calculating the rate of $CO_2$ release required to obtain the measured concentration values.

In some embodiments, a hardened coating formed from the coating composition, exhibits a contact angle with deionized water (disposed on a surface of the hardened coating) of greater than about 80, preferably greater than about 90, more preferably greater than about 95, and even more preferably greater than about 100.

Liquid coating composition of the present disclosure can exhibit any suitable contact angle for a given perishable item to be coated. To suitably wet out typical fruit and vegetable skins, the liquid coating composition preferably exhibits a contact angle of less than about 80, less than about 70, less than about 65, less than about 60, less than about 55, less than about 50, less than about 45, or less than about 40, when disposed on a surface of carnauba wax. Similarly, the liquid coating composition preferably exhibits a contact angle of less than about 80, less than about 70, less than about 65, less than about 60, less than about 55, less than about 50, less than about 45, or less than about 40, when disposed on a surface of paraffin wax. Similarly, the liquid coating composition preferably exhibits a contact angle of less than about 80, less than about 70, less than about 65, less than about 60, less than about 55, less than about 50, less than about 45, less than about 40, or less than about 35, when disposed on a surface of candelilla wax.

The present disclosure also provides a wash solution. The wash solution may be used, for example, to wash the perishable item to be coated. The wash solution may be formulated, for example through inclusion of one or more active agents, to do one or more of: (i) remove dirt or other surface contaminates that may interfere with the quality of the perishable item and/or ability to efficiently apply and form a high-performing coating on the perishable item; (ii) inhibit ripening of a fruit or vegetable; (iii) sanitize the surface portions of the perishable item; or any combination of (i), (ii) and (iii). The was solution may include any of the ripening inhibitors previously disclosed herein, including in any of the amounts previously disclosed herein.

The wash solution may have any suitable pH. For example, the wash solution may have a pH of at least about 9.5 or at least about 11. For suitable wash solutions having such alkaline pHs see, for example, the wash solutions described in U.S. Pat. No. 6,831,050 or U.S. Pat. No. 6,662,813. Typically, the wash solution has a pH of less than about 12.5. In some embodiments, the wash solution has a neutral or acidic pH such as, for example, a pH of 7 or less, 6 or less, 5 or less, 4 or less, or 3 or less.

Preferred wash solutions are no-rinse wash solutions that do not require any rinse steps. Preferred wash solutions for use with fruits and vegetable are edible, preferably no-rinse edible wash solutions. An example of a suitable no-rinse wash solution for fruits and vegetables is the Antimicrobial Fruit and Vegetable Treatment (AFVT) wash solution product sold by Ecolab.

The wash solution typically includes one or more antimicrobial agents. In some embodiments, the wash solution includes an antimicrobial agent (e.g., sodium dodecylbenzenesulfonate ("SDBS", CAS Number 25155-30-0), which is preferably present in the wash solution at a concentration of less than 111 milligrams per kilogram of wash solution, more preferably the wash solution includes SDBS in an amount of about 76 to about 111 ppm. In same or different embodiments, the wash solution includes lactic acid (e.g., in an amount of about 100 to about 5,000 ppm, about 750 to about 2,500 ppm, about 1,000 ppm to about 1,500 ppm, or about 1,061 ppm to about 1,391 ppm). In some such embodiments, the wash solution includes lactic acid and sodium dodecylbenzenesulfonate as active ingredients, preferably each in an efficacious amount.

The wash solution may include one or more of citric acid, limonene, ethanol, potassium hydroxide, sodium citrate, decyl glycoside, caprylyl/myristyl glycoside, calcium ascorbate, glycerin, potassium sorbate, or a combination thereof.

The wash solution may be an aqueous solution, which may optionally include one or more organic solvents such as, for example, water-miscible solvents such as ethanol. In other embodiments, the wash solution is organic-solvent-based that includes, for example, no more than a de minimus (e.g., less than 2 wt-%) amount of water, if any.

In another aspect, the present disclosure provides methods, equipment, and systems for selecting or modifying a coating composition based on one or more observed (e.g., measured) characteristics of a plant item. Such an approach allows for better tailoring of the properties of the coating composition to the type and/or condition (e.g., level of ripeness) of the plant item to be coated. In so doing, a better outcome can be achieved (e.g., enhanced shelf-life, enhanced aesthetics, enhanced flavor profiles, and the like) for the coated plant item as compared to a conventional coating process that utilizes, for example, a single fixed coating composition. In addition, the amount of applied coating material can be optimized for cost-savings by only applying the amount of coating composition required to achieve the desired result.

In another aspect, the present disclosure provides a kit for use in preserving the quality and/or shelf-life of a perishable item. The kit may include one or both of a wash solution and a coating component.

The barrier coating compositions of the present disclosure may have utility in other end uses as well such as, for example, any end use that contacts edible products and requires, or could benefit from, a water-resistant coating. Such end uses may include, for example, food and beverage packaging (e.g., having one or more fibrous substrate), serving, or handling articles, including disposable such articles. Examples of such articles may include household or kitchen utensils and containers, paper wraps (e.g., butcher paper for wrapping cheeses, raw meats, raw seafood, lunch meats, take-out ready-to-eat foods, etc.), paper plates, paper cups, paper cup lids, paper baking cups, paper bowls, paper trays for domestic purposes, biodegradable paper pulp-based plates, biodegradable paper pulp-based cups, biodegradable paper pulp-based bowls, food separators (e.g., separators positioned between packaged pre-cut cheese slices), fast food bags, french fry cartons, frozen food packages, drink boxes, beverage cartons, aseptic cartons for liquid foods, cereal boxes, cake mix boxes or other boxes for dry goods, cigarette or cigar containers or wrappers or any other containers or wrappers for tobacco or *cannabis* products, confectionary containers, baked good containers, serving cones or pouches for hot foods, snow-cone or shave-ice cups, clamshell containers, oyster pails, or other takeout food containers, fast-food wrappers or bags, fresh fruit or vegetable boxes or packages, and the like. In such end uses, the coating compositions of the present disclosure may provide a food-contact-safe alternative to more conventional petrochemical-derived wax and/or polymer coatings or films, thereby avoiding, for example, the use of certain conventional feedstocks for such coatings such as styrene and paraffin. The barrier coating compositions of the present disclosure may be perceived by some consumers, and especially consumers increasingly wary of chemical compositions derived from conventional petrochemical-derived feedstocks, as being more "natural", "wholesome", "safe", and/or "sustainable". This may be particularly the case for edible embodiments of the barrier coating compositions of the present disclosure. Moreover, such articles bearing compositions of the present disclosure may be more carbon-neutral than conventional such articles.

Such disposable articles are often single-use articles in which the articles are used once in a food-handling, food-storage, and/or food-serving capacity and then disposed of The barrier coating compositions of the present disclosure may be present on an interior surface of such articles (e.g., those contacting food or beverages), an exterior surface of such articles, or a combination thereof.

The substrate of such articles is typically fibrous in nature. Any suitable fibers may be used, with cellulose fibers being preferred. Suitable source for cellulose fibers may include, for example, wood and/or non-wood fiber sources such as grasses, cereal straws, corn stalks, bamboo, bagasse, flax, hemp, jute, kenaf, cotton, sisal, abaca, or combinations thereof. The cellulose fibers may be cellulose fiber, recycled cellulose fiber (e.g., from recycled wastepaper), or a combination thereof. In some embodiments, the fibrous substrate is formed from pulp fiber (e.g., wood pulp fiber or other plant pulp fiber).

In some embodiments, the fibrous substrate comprises one or more paperboard layers (e.g., the substrate can be formed from single ply or multi-ply paperboard stock). The one or more paperboard layers may be, for example, unbleached kraft paperboard or bleached paperboard (e.g., solid bleached sulfate paperboard). The fibrous substrate may be flexible. In some embodiments, the substrate is one or more layers of paper. Examples of flexible paper substrates include parchment paper (also referred to as "baking paper"), kraft paper, and butcher paper.

As previously discussed, the barrier coating compositions of the present disclosure may be used to coat cheese and cheese products. For example, the coating may be in addition to, or a replacement for, conventional cheese coatings (e.g., non-edible wax coatings such a paraffin-based wax coatings) and/or packaging (e.g., plastic wraps and the like). When used in combination with a conventional cheese coating, a coating composition of the present disclosure may be applied to: (i) an exterior surface of the cheese prior to application of a conventional cheese coating, (ii) an exterior surface of a conventional cheese coating present on a cheese or cheese product, or (iii) both (i) and (ii). Alternatively, the coating compositions of the present disclosure may be used in place of a conventional cheese coating or used to coat a cheese or cheese product that does not typically have any applied coatings.

Examples of cheeses that may benefit from coatings of the present disclosure include fresh unripened cheeses (e.g., no rind cheeses typically having 19-24% fat such as ricotta, mozzarella, cheese curds, cream cheese and the like), aged fresh cheeses (e.g., wrinkled white to grey-blue rind cheeses typically having 19-24% fat), soft white rind cheeses (e.g., white fuzzy rind cheeses such as Camembert, Brie de Meaux, Chaource, Chévre, and the like, typically having 24-26% fat, but sometimes as high as about 45% fat for double or triple cream type cheeses), semi-soft cheeses (e.g., fine to thick grey-brown rind or orange and sticky cheeses, typically 26-28% fat, such as Edam, Munster, Reblochon, Port Salut, Raclette, St. Nectaire, and the like, typically having 26-28% fat), hard cheeses (e.g., crusty, grey often polished, waxed or oiled cheeses such as Cheddar, Pecorino, Beaufort, Machengo, Gruyere, Parmesan, and the like, typically having 28-34% fat), blue mold cheeses (e.g., gritty, rough sometimes sticky rind cheeses such as Stilton, Gorgonzola, Roquefort, Picos de Europa, and the like, typically having 28-34% fate), and flavor added cheeses (e.g., typically having 28-34% fat with examples including Gouda with cumin, Lancaster with chives, Pecorino with Truffles, and the like). Further examples of specific cheeses, in addition to those already referenced above, which may benefit from coatings of the present disclosure include Brie, Colby, Colby-Jack, Feta, Gjetost, Havarti, Limburger, Monterey-Jack, Parmigiano-Reggiano, Provolone, Swiss, and cheeses of the style of any of the specific named regional cheeses referenced previously. Other cheese that may benefit from the coatings include processed cheese products such as cheese slices (e.g., American cheese slices), cheese cubes (e.g., bite-size cheese cubes), cheese sticks, and mini-cheese wheels (e.g., single-serving-sized cheese wheels such as BABYBEL brand mini-cheese wheels). In some embodiments, coating composition of the present disclosure allow for the production of a coated cheese product having enhanced quality and/or shelf-life without the use of any petrochemical-derived feedstocks (e.g., paraffins or polyethylenes). The coating may have a coating thickness pursuant to that described for plant-based items herein. However, it is contemplated that thicker coatings (e.g., having an average thickness greater than about 20 microns, greater than about 25 microns, greater than about 30 microns, greater than about 35 microns, or greater than about 40 microns) can also be used, if desired, in view of the longer shelf-life expectations of certain cheeses.

As already discussed herein, the compositions of the present disclosure may be used to coat plant items other than foods such as, for example, plant cuttings and cut flowers. Because such plant items will not be consumed, there is more flexibility to use coating chemistries that are not approved and/or suitable for ingestion by humans. Plant cuttings and cut flowers can suffer from similar shelf-life shortening and quality degradative processes as fruit and vegetables, including, for example, mass loss, biotic stressors (especially fungus-related), and ethylene-mediated processes. The use of coatings and/or other treatments on plant cuttings and cut flowers may also, for example, allow the items to be shipped and/or stored at higher temperatures without unsuitably degrading. Alternatively, or additionally, the use of coatings and/or other treatments on plant cuttings and cut flowers may also extend the shelf-life and/or enhance quality under a given set of conditions, thereby enabling more flexibility in the supply chain and/or reduced waste loss. In the case of cut flowers, the longer shelf-life may allow for a longer potential display time for the end consumer. As for plant cuttings, the longer shelf-life may allow for additional storage time before sticking, which may be especially valuable at high production times of year when plant cutting inventories are high and transportation, labor, or planting resources constrained. Alternatively, or additionally, the use of coatings on plant cutting and cut flowers may also reduce the need for plastic packaging, such as bags or wraps, for packing purposes during shipment, thereby reducing the amount of plastic consumed in the supply chain. In addition, for plant cuttings, it is believed that applied compositions of the present disclosure can help reduce transport-related quality issues such as, for example, the occurrence of leaf browning/yellowing.

The barrier coating compositions of the present disclosure may also be useful for adhesive purposes, such as, for example, to provide an adhesive backer compound for plant or vegetable labels or stickers applied directly to the skin of fruit or vegetables.

In commerce, a first party that manufactures compositions (e.g., barrier coating compositions, wash solutions, or other treatments) may not directly treat a perishable item with a composition (e.g., form a coating over a product from the composition), but may instead direct a second party (e.g., a produce processor or packer) to apply composition to a perishable item (e.g., by marketing the composition for such use and selling the composition to the second party). That is, even if the first party does not treat a perishable item pursuant to the methods and compositions described herein, the first party may still cause a composition of the present disclosure to be applied to a perishable item by providing instructions or recommendations as described above, including, for example, by marketing the composition for such use. Such instructions or recommendations, even if limited only to a marketing suggestion to use the composition to coat or otherwise treat perishable items, is considered to cause the composition to be used to coat or treat the perishable item.

As already discussed herein, coatings can be applied to certain fruits and vegetables to help delay or accelerate their rate of ripening. However, various fruits and vegetables ripen at different rates, and even produce harvested at the same time can ripen at different rates. Sensors can be utilized to determine the ripeness of a fruit or vegetables as indicated by one or more ripeness parameters such as, e.g., its ethylene concentration, but even with this knowledge, the coating system is incapable of taking maximal advantage of this information without a decision-making functionality such as a suitable algorithm. If the ideal coating parameters are selected by hand for each piece of food product, this process might take too long to be cost-effective and is more subjective to human error. The advantage to an automated process with a sensor and algorithm, is it allows for application of a coating optimized relative to the state of the actual food product item to be coated, thereby optimizing the effectively of the coating relative to the particular food product. This is in contrast to existing processes which apply coatings in bulk over the whole harvest, and typically across harvests using a "one-size-fits-all" type of approach for a given food type or food class, and has the potential to result in some fruits and vegetables that still ripen too quickly or others that take too long to ripen.

Accordingly, the present disclosure also provides coating treatment systems and methods for selecting or modifying a coating composition based on one or more observed (e.g., measured) characteristics of a plant item to be coated. Such an approach allows for better tailoring of the properties of the coating composition to the type and/or condition (e.g., level of ripeness) of the plant item to be coated. In so doing, a better outcome can be achieved as compared to conventional coating processes that utilize a single "one-size-fits-all" coating composition such as, for example, enhanced shelf-life, enhanced aesthetics, enhanced flavor profiles, and/or delayed or accelerated ripening (for certain plant items) and the like for the coated perishable item. In addition, the amount of applied coating material can be optimized for cost-savings by only applying the amount of coating composition required to achieve the desired result. In preferred embodiments, the methods, equipment, and systems are suitable for use in high-throughput agricultural product processing lines such as, for example, used in produce packing houses.

Although not as efficient, it is also contemplated that one or more steps of the method may also be done in a non-automated step such as, for example, in a manual step. For example, one or more of measurements associated with a perishable item may be conducted by an operator using, for example, a hand-held sensor. Additionally, or alternatively, one or more measurements may be taken in a laboratory, for example, by testing a chemical (e.g., a concentration) or physical (e.g., a firmness or contact angle) property of a perishable item. Such one or more measurements taken via a non-automated technique may then be entered by an operator into a user interface associated with the coating treatment system.

Figure 2:
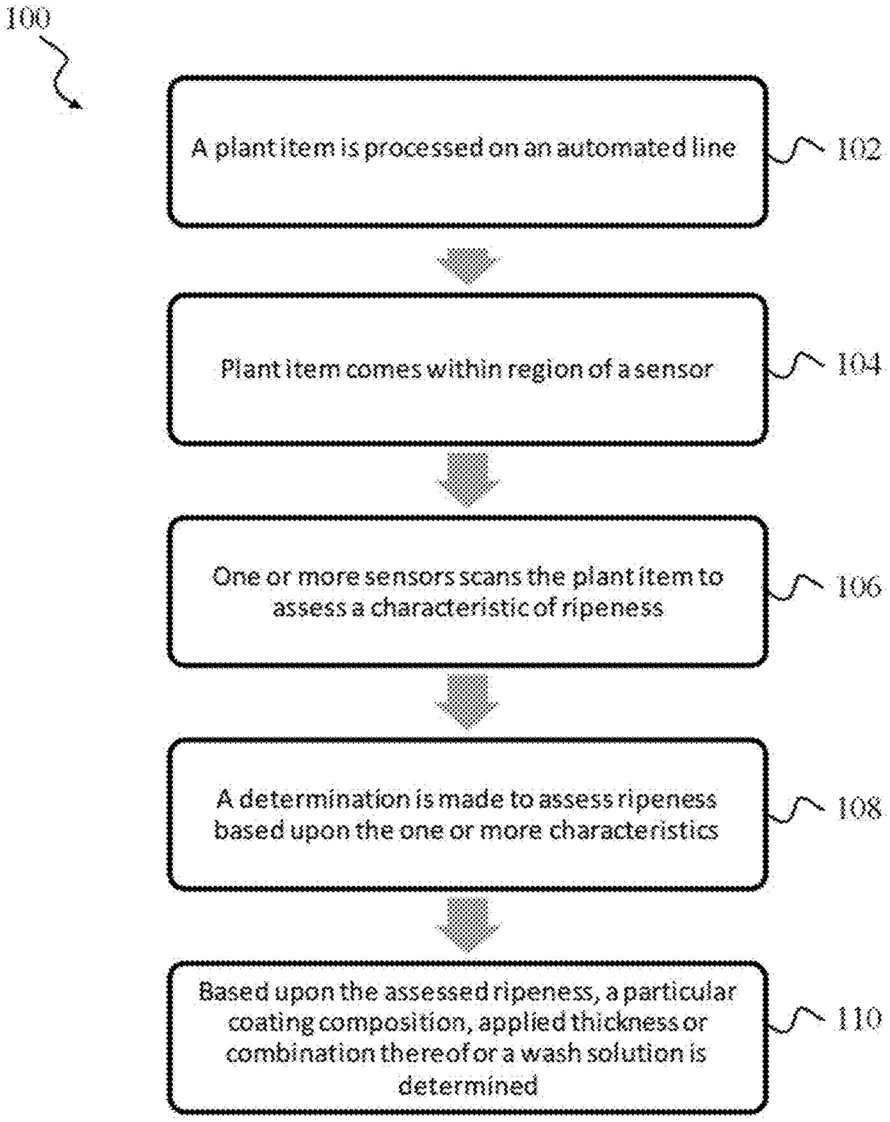
FIG. 2 a flowchart illustrating an exemplary method for coating perishable items (e.g., fresh produce) in an at least partially automated process in accordance with some embodiments.

FIG. 2 is a flow chart illustrating an example method 100 for treating perishable items such as plant items (e.g., fresh fruit, fresh vegetables, plant cuttings for vegetative reproduction, and cut flowers). In this example, method 100 includes operations 102, 104, 106, 108, 110, and 112. Example method 100 may be performed by a fully automated, or at least partially automated, coating treatment system, which preferably includes multiple components that are in data communication with one another to provide improved overall performance.

As illustrated by operation 102, a plant item is present in an at least partially automated line, for example, of a fresh fruit or vegetable packing line. Typically, at least some processing will have occurred (e.g., wet or dry dumping, debris removal, leaf and/or stem or stalk removal, washing, water or mechanical transport and the like) prior to a plant item coming within proximity of one or more sensors in operation 104. Typically, a transporter (e.g., conveyor belts; auger or screw conveyors; and/or wheel, diabolos, cups, brush rollers, holders, or clamping conveyor systems) moves the plant item into the sensing zone of the one or more sensor. In operation 106, the one or more sensors collect information (e.g., via measuring or identifying) relating to one or more characteristics associated with the plant item. Examples of such characteristics include an acid level (e.g., total acid, ascorbic acid, etc.), a sugar level (e.g., a degrees Brix, commonly abbreviated as Bx°), a ratio of sugar to acid, a level of soluble solids, a color parameter (e.g., a color intensity, a fraction of surface area that is a particular color, etc.), a visible indicator, a gas amount (e.g., an internal or emitted gas amount such as, e.g., carbon dioxide, ethylene, oxygen, or water vapor), or a combination thereof. The sensors may be in a static location or may move, for example, to allow for the plant item to be in the sensor's sensing zone for a longer period of time.

In operation 108, a determination is made based upon the one or more characteristics. In preferred embodiments, the determination relates to the ripeness and/or quality of the plant item such as, for example, the extent of ripeness and/or the quality (e.g., grade) of the plant item. In operation 110, a treatment decision for the plant item is made as a function of the determination. Examples of such treatment decisions include adjusting one or both of a wash characteristic or a coating characteristic. Operations 108 and 110 are typically made by a computing device in communication with the one or more sensors, which typically includes a processing device and a computer readable storage device. In operation 112, the decision is implemented with respect to the plant item. Examples of such implemented decisions include one or more of the following: application of a coating having a particular coating chemistry to the plant item (e.g., presence or amount of crosslinking component(s); presence or amount of barrier ingredient(s) such as water-barrier, ethylene-barrier, oxygen-barrier, and/or the like barrier ingredients; presence or amount of active ingredient(s) such as, e.g., ripening inhibitor(s) and/or ripening accelerator(s) or adjuvant(s); presence or amount of antimicrobial agent(s); presence or amount of flavorant(s)); application of a coating at a particular determined coating thickness to the plant item; application of a wash solution having a particular chemistry to the plant item (e.g., presence or amount of antimicrobial agent(s), presence or amount of ripening-related active ingredients such as ripening inhibitor(s), ripening accelerator(s), or ripening-related adjuvant(s)); and the like.

The coating system preferably includes one or more sensors capable of providing one or more signal outputs, more typically a plurality of sensors, and one or more coating applicators for applying the coating composition to a perishable item. In some embodiments, the sensor is configured to output a signal carrying a value of a measurement associated with the perishable item to be coated. For example, the sensor may be configured to identify, measure, or both identify and measure a ripeness or quality parameter associated with a plant item, or population of plants items, to be coated. The coating systems may include two or more different types of sensors, which may be configured to measure a same or different parameter associated with a perishable item or population of perishable items.

The coating system may be a high-throughput industrial processing line, or one or more portions thereof, for treating and/or packing plants items such as freshly harvested plant items, including any of those disclosed herein, and particularly fruits, vegetables, cut flowers, or plant cuttings. Any suitable coating applicators, or combination thereof, capable of applying a desired coating weight to preferably form a coating, which is preferably an at least substantially continuous coating, may be employed. Examples of suitable applicators for liquid coating compositions include curtain or wash coaters, dip coaters, spray coaters (e.g., spray or misting bars, spray or misting guns or nozzles, and the like), and combinations thereof. As used herein, the terms "spray" and "spraying" also encompass mist and misting, respectively. The coating composition may optionally be subjected to an electric charge or voltage just prior to and/or during spray application to modify one or more properties of the spray applied coating composition such as, for example, to increase one or more reactivities. (See, for example, U.S. Pat. No. 10,537,130 for equipment, methods, and materials.)

The perishable item to be coated may be rotating as the coating composition is applied to facilitate coating of the desired surface portions. In some embodiments, the coating system is configured such that the plant item or other perishable is coated while simultaneously rotating and being transported in a direction of travel, such as for, example in the direction of travel of a transporter such as, for example, a conveyor belt or drive. An example of equipment for causing such rotation during coating is provided in WO2019/028043 (Holland et al.), which describes a conveyor apparatus for simultaneously transporting and rotating fresh produce during coating.

The coating treatment system typically further includes one or more tanks for holding one or more wash or coating compositions to be applied. More typically, the coating treatment system includes a plurality tanks. For example, at least one tank may hold a base coating composition and another tank can hold a composition for modifying the base coating composition as a function of one or more measured properties. Additionally, or alternatively, the coating treatment system may include a plurality of tanks each holding a chemically different coating composition such that the system can select, and optionally further modify, a coating composition to be applied based on one or more measured properties. One or more mixing vessels or devices may be present in the system to facilitate the modification or formation of a coating composition, preferably providing sufficient mixing to produce an at least substantially homogenous composition.

The one or more tanks are preferably in liquid communication (e.g., via piping) with one or more spray applicators, with the coating treatment system configured to supply the coating product from the one or more tanks to the one or more applicators. Typically, one or more valves, and optionally one or more pumps, are present to facilitate liquid transmission. In some embodiments, the system includes one or more of a treatment controller that controls the operation of the respective systems and interfaces with the control system), positioning system electronics configured to receive signals usable to determine the ripeness of a food product, and a computing device including at least a processing device and a computer readable storage device, the computing device in data communication with the sensor. In preferred embodiments, the computer readable storage device stores data instructions executable by the computing device to cause the computing device to: identify the ripeness of a food product, at least some the products having different ripeness concentrations from each other based on various measurable concentration (e.g. an acid level (e.g., total acid, ascorbic acid, etc.), a sugar level (e.g., a degrees Brix, commonly abbreviated as Bx°), a ratio of sugar to acid, a level of soluble solids, a color parameter (e.g., a color intensity, a fraction of surface area that is a particular color, etc.), a visible indicator, a gas amount (e.g., an internal or emitted gas amount such as, e.g., carbon dioxide, ethylene, oxygen, or water vapor); determine an ideal coating or wash solution composition or both; cause a mix system to prepare the coating or wash solution or both; determine the current concentration of the coating or wash solution in the applicator; determine that the applicator contains the correct coating or wash solution concentration for the food products ripeness; and automatically treat the food product using an ideal coating or wash solution concentration.

As described further below, in another aspect, the present disclosure provides a kit for treating a perishable item. In preferred embodiments, the kits include a coating component, instructions, and optionally a container. In some embodiments, the kit includes a container in the form of a spray container which are well known in the art, for purposes of applying composition of the present disclosure. In some embodiments, the spray container includes a trigger spray mechanism and is referred to as a "trigger sprayer." See, e.g., the trigger spray mechanisms described in U.S. Pat. Nos. 4,082,223, 4,161,288, 4,558,821, 4,434,917, 4,819,835, 6,869,027, 7,017,833, 8,322,630, 10,159,997.

Trigger sprayers are well-known in the art. Trigger sprayers utilize a handheld reservoir and typically a manual pump. The reservoir may hold any liquid desired to be sprayed in a stream, fine droplets, foam or mist. The pump is activated by an articulating trigger. The user squeezes the trigger with his or her hand, typically retracting the trigger from a forward resting position to a rearward dispensing position. The motion of the trigger causes pumping of the liquid from the container reservoir and ultimate spraying thereof. The characteristics of the spray, e.g., stream, droplets, mist, are determined by several parameters and operating characteristics of the pump. For example, the nozzle geometry, piston bore, piston stroke and pump efficiency will all affect the spray characteristics. The liquid rheology, surface tension, etc. can affect the spray characteristics.

Exemplary Embodiments

1A. A barrier coating composition for a perishable item (e.g., an edible perishable item) comprising:
- an active hydrogen component (AHC);
- an optional polyvalent metal crosslinking agent (PMCA); and
- optionally one or more additives selected from a plasticizer, a wax, a lipid, an amino acid, a dispersing agent, an anti-microbial agent, an anti-browning or -yellowing agent (e.g., ascorbic acid or citric acid), a probiotic, a vitamin or other nutrient, an enzyme, a plant hormone or regulator, a colorant, a flavorant, an aromatic, an oxygen-scavenging agent, a compatibilizer, a leveling agent, a wetting agent, an adhesion promoter, a rheology modifier, or an antifoaming agent.

1B. A barrier coating composition for a perishable item (e.g., an edible perishable item) comprising:
- an ethylenically unsaturated component that is optionally also an active hydrogen component (AHC);
- an optional polyvalent metal crosslinking agent (PMCA);
- an optional AHC (e.g., in addition to the ethylenically unsaturated component in embodiments in which the ethylenically unsaturated component is also an AHC); and
- optionally one or more additives selected from a plasticizer, a wax, a lipid, an amino acid, a dispersing agent, an anti-microbial agent, an anti-browning or -yellowing agent (e.g., ascorbic acid or citric acid), a probiotic, a vitamin, an enzyme, a plant hormone or regulator, a colorant, a flavorant, an aromatic, an oxygen-scavenging agent, a leveling agent, a wetting agent, an adhesion promoter, a compatibilizer, a rheology modifier, or an antifoaming agent.

1C. A method comprising:
- causing the coating composition of embodiment 1A, 1B, 1G, or 1H (or any other coating composition disclosed herein) to be applied to at least a portion of a surface of a perishable item such as, for example, a plant item, a seafood, a cultured-cell seafood product, a meat, a cultured-cell meat product, a plant-based meat product, a pharmaceutical, a baked good, a confectionary, or an other prepared food.

1D. A method comprising:
- coating at least a portion of a surface of a perishable item such as, for example, a plant item, a seafood, a cultured-cell seafood product, a meat, a cultured-cell meat product, a plant-based meat product, a pharmaceutical, a baked good, a confectionary, or an other prepared food with a coating composition of embodiment 1A, 1B, 1G, or 1H (or any other coating composition disclosed herein).

1E. A perishable item (e.g., a plant item, a seafood, a cultured-cell seafood product, a meat, a cultured-cell meat product, a pharmaceutical, a baked good, a confectionary, or an other prepared food) having at least a portion of a surface coated with a coating formed from a coating composition of embodiment 1A, 1B, 1G, or 1H (or any other coating composition disclosed herein).

1F. A method of coating any substrate disclosed herein, preferably a perishable item (e.g., a plant item, a seafood, a cultured-cell seafood product, a meat, a cultured-cell meat product, a plant-based meat product, a pharmaceutical, a baked good, a confectionary, or an other prepared food), the method comprising:
- providing a multi-part barrier coating composition comprising:
- (i) a first part comprising an active hydrogen component (AHC); and
- (ii) a second part comprising one or more compounds reactive with the first part (e.g., an optional polyvalent metal crosslinking agent, PMCA) and/or that facilitates the reaction of the AHC in the first part with one or more ingredients of the first part (e.g., one or more of an enzyme, polypeptide, oligosaccharide, polysaccharide, or a catalyst to facilitate one or more crosslinking reactions);
- wherein the first and/or second parts optionally includes one or more additives selected from a plasticizer, a wax, a lipid, an amino acid, a dispersing agent, an anti-microbial agent, an anti-browning or -yellowing agent (e.g., ascorbic acid or citric acid), a probiotic, a vitamin or other nutrient, an enzyme, a plant hormone or regulator, a colorant, a flavorant, an aromatic, an oxygen-scavenging agent, a compatibilizer, a leveling agent, a wetting agent, an adhesion promoter, a rheology modifier, or an antifoaming agent;
- applying the multi-part coating composition on at least a portion of a surface of the perishable item, wherein the first and second parts are combined just prior to application (e.g., subsequent to leaving their respective storage containers such as, e.g., in an inline mixer), during application (e.g., via application of two or more sprays via a single sprayer or multiple sprayers), or after application on the perishable item (e.g., via diffusion and/or penetration in a "wet-on-wet" or "wet-on-dry" coating).

1F'. The method of embodiment 1F, wherein the first and second parts react undergo a chemical reaction on the surface of the perishable item.

1G A barrier coating composition for a perishable item (e.g., an edible perishable item) comprising: a mono-ester or mono-ester salt of a hydroxyl-functional compound other than glycerol, and optionally one or more additives selected from a plasticizer, a wax, a lipid, an amino acid, a dispersing agent, an anti-microbial agent, an anti-browning or -yellowing agent (e.g., ascorbic acid or citric acid), a probiotic, a vitamin or other nutrient, an enzyme, a plant hormone or regulator, a colorant, a flavorant, an aromatic, an oxygen-scavenging agent, a compatibilizer, a leveling agent, a wetting agent, an adhesion promoter, a rheology modifier, or an antifoaming agent.

1H. A barrier coating composition for a perishable item (e.g., an edible perishable item) comprising:
- one or more oligosaccharide or polysaccharide;
- one or more of a PMCA, peptide, polypeptide, aglycone, phenol and/or polyphenol (e.g., ferulic acid, tannic acid, gallic acid, and the like), citric acid, amino acid or monoester; and
- optionally one or more additives selected from a plasticizer, a wax, a lipid, an amino acid, a dispersing agent, an anti-microbial agent, an anti-browning or -yellowing agent (e.g., ascorbic acid or citric acid), a probiotic, a vitamin or other nutrient, an enzyme, a plant hormone or regulator, a colorant, a flavorant, an aromatic, an oxygen-scavenging agent, a compatibilizer, a leveling agent, a wetting agent, an adhesion promoter, a rheology modifier, or an antifoaming agent.

2. The coating composition, method, or perishable item of any preceding embodiment, wherein the polyvalent metal crosslinking agent (PMCA) is included in the coating composition.

3a. The coating composition, method, or perishable item of embodiment 2, wherein the PMCA, is present in an amount of at least 0.1%, at least 0.5%, at least 1%, at least 3%, at least 7%, at least 10%, or at least 15%, based on the total amount (i.e., weight) of metal in the PMCA relative to the non-volatile weight of the coating composition.

3b. The coating composition, method, or perishable item of embodiment 2, wherein the PMCA, is present in a ratio of moles of AHC to moles of polyvalent metal (present in the PMCA) of between 4:1 and 0.2:1, preferably between 3:1 and 0.5:1, more preferably between 2:1 and 1:1, an most preferably between 1.6:1 and 1:1. In some embodiments, the coating composition includes a ratio of moles of fatty acid capable of coordinating with the PMCA to moles of polyvalent metal (present in the PMCA) pursuant to the above.

4. The coating composition, method, or perishable item of any preceding embodiment, wherein the PMCA comprises calcium (Ca), cobalt (Co), iron (Fe), magnesium (Mg), manganese (Mn), zinc (Zn), or a combination thereof.

4.1 The coating composition, method, or perishable item of embodiment 4, wherein the PMCA comprises manganese (e.g., manganese chloride, manganese citrate, manganese gluconate, manganese sulfate, or a mixture thereof).

4.2 The coating composition, method, or perishable item of embodiment 4, wherein the PMCA comprises magnesium (e.g., magnesium carbonate, magnesium chloride, magnesium hydroxide, magnesium oxide, magnesium phosphate, magnesium stearate, magnesium sulfate, or a combination thereof).

4.3 The coating composition, method, or perishable item of embodiment 4, wherein the PMCA comprises iron (e.g., ferric ammonium citrate, ferric chloride, ferric citrate, ferric phosphate, ferric pyrophosphate, ferric sulfate, ferrous ascorbate, ferrous carbonate, ferrous citrate, ferrous fumarate, ferrous gluconate, ferrous lactate, ferrous sulfonate, or a mixture thereof).

5. The coating composition, method, or perishable item of any preceding embodiment, wherein the PMCA includes a metal atom in a form (e.g., oxidation state) capable of ionically reacting (e.g., reversibly chelating or coordinating) with an active hydrogen group (e.g., a carboxylic acid group or a salt group thereof) under ambient conditions (e.g., 25° C. and 50% relative humidity) to form a reversible crosslink.

6. The coating composition, method, or perishable item of any preceding embodiment, wherein the PMCA comprises particles.

7. The coating composition, method, or perishable item of embodiment 6, wherein the particles have a volume average particle size of less than about 2,000, less than about 1,000, less than about 500, less than about 100, or less than about 50 nanometers.

8. The coating composition, method, or perishable item of embodiment 6 or 7, wherein the particles have a volume average particle size of greater than about 50, greater than about 100, greater than about 500, greater than about 1,000, or greater than about 2,000 nanometers.

9. The coating composition, method, or perishable item of embodiments 6 to 8, wherein the particles have a volume average particle size sufficiently small to react with the AHC at ambient conditions (e.g., 25° C. and 50% relative humidity).

10. The coating composition, method, or perishable item of any preceding embodiment, wherein the PMCA comprises a salt.

11. The coating composition, method, or perishable item of any preceding embodiment, wherein the PMCA comprises an organometallic compound.

12. The coating composition, method, or perishable item of embodiment 11, wherein the organometallic compound comprises a complex (e.g., a salt) of a polyvalent metal (e.g., Ca, Co, Fe, Mg, Mn, or Zn) and an organic acid compound.

13. The coating composition, method, or perishable item of embodiment 12, wherein the organometallic compound includes both a polyvalent metal and an amino acid.

14. The coating composition, method, or perishable item of embodiment 13, wherein the organometallic compound comprises a bidentate amino acid (e.g., glycine or alanine).

15. The coating composition, method, or perishable item of any preceding embodiment, wherein the PMCA comprises zinc.

16. The coating composition, method, or perishable item of embodiment 15, wherein PMCA comprises zinc acetate, zinc chloride, zinc citrate, zinc hydroxide, zinc gluconate, zinc picolinate, zinc stearate, zinc sulfate, or a derivative or combination thereof.

17. The coating composition, method, or perishable item of embodiment 15, wherein the PMCA comprises zinc oxide or a derivative thereof.

18. The coating composition, method, or perishable item of any preceding embodiment, wherein the PMCA comprises calcium.

19. The coating composition, method, or perishable item of embodiment 18, wherein the PMCA comprises calcium acetate, calcium carbonate, calcium chloride, calcium citrate, calcium hydroxide, calcium glycinate, calcium glycolate, calcium gluconate, calcium lactate, calcium oxide, calcium phosphate (e.g., calcium mono-phosphate), calcium pyrophosphate, calcium propionate, calcium pyruvate, calcium silicate, tricalcium silicate, calcium sorbate, calcium stearate, calcium sulfate, calcium acid pyrophosphate, a variant thereof (e.g., calcium lactate gluconate), or a mixture thereof.

20. The coating composition, method, or perishable item of any preceding embodiment, wherein the PMCA is a food-grade additive, more preferably a direct food-grade additive under FDA laws and regulations.

21. The coating composition, method, or perishable item of any preceding embodiment, wherein the coating composition includes a plant extract (e.g., an extract of an edible portion of a plant such as, e.g., a fruit or vegetable).

22. The coating composition, method, or perishable item of embodiment 21, wherein the plant extract is a separate ingredient from the AHC.

23. The coating composition, method, or perishable item of embodiment 21 or 22, wherein the plant extract comprises a fruit extract.

24. The coating composition, method, or perishable item of any of embodiments 21 to 23, wherein the plant extract comprises a plant cuticle extract (e.g., a fruit cuticle extract).

25. The coating composition, method, or perishable item of any of embodiments 21 to 24, wherein the plant extract comprises an extract of tomatoes (e.g., tomato pomace), grapes (e.g., grape skins or pomace), cranberries (e.g., cranberry skins or pomace), apples (e.g., apple skins or pomace), pomegranates (e.g., pomegranate pomace or peel extract), blueberries, (e.g., blueberry pomace) or a combination thereof.

26. The coating composition, method, or perishable item of any of embodiments 21 to 25, wherein the plant extract has been processed to concentrate (e.g., on a total solids basis) the amount of PMCA and/or other crosslinking compounds present relative to the amount present in the unprocessed original plant material from which the plant extract was derived. The extract may also optionally have been processed to remove one or more undesired impurities or other compounds that may, e.g., interfere with the desired crosslinking and/or cause one or more undesired organoleptic properties detectable to a typical human consumer.

27. The coating composition, method, or perishable item of any of embodiments 21 to 26, wherein at least some (e.g., at least 10 wt-%, at least 20 wt-%, at least 30 wt-%, at least 40 wt-%, at least 50 wt-%, at least 60 wt-%, at least 70 wt-%, at least 80 wt-%, at least 90 wt-%, at least 95 wt-%, or up to 100 wt-%) of the PMCA (or metal drier—see embodiment 190) is provided by the plant extract.

28. The coating composition, method, or perishable item of any preceding embodiment, wherein the composition comprises a liquid coating composition.

29. The coating composition, method, or perishable item of embodiment 28, wherein the composition comprises an aqueous coating composition that includes, for example, more than 50 wt-%, more than 60 wt-%, more than 70 wt-%, more than 80 wt-%, more than 90 wt-%, more than 95 wt-%, more than 96 wt-%, more than 97 wt-%, more than 98 wt-%, or more than 99 wt-% of water.

30. The coating composition, method, or perishable item of embodiment 28 or 29, wherein the composition includes one or more organic solvent (e.g., one or more food-grade organic solvents).

31. The coating composition, method, or perishable item of embodiment 30, wherein the organic solvent comprises methanol, ethanol, isopropanol, butanol, acetate, ethyl acetate, chloroform, acetonitrile, tetrahydrofuran, diethyl ether, tert-butyl ether, or a combination thereof.

32. The coating composition, method, or perishable item of any of embodiments 28 to 31, wherein the coating composition includes ethanol (e.g., at least 1 wt-%, at least 5 wt-%, at least 10 wt-%, at least 20 wt-%, at least 30 wt-%, at least 50 wt-%, at least 75 wt-%, etc.) such as, e.g., food-grade ethanol (e.g., about 190 proof food-grade ethanol).

33. The coating composition, method, or perishable item of any of embodiments 28 to 32, wherein the composition comprises a substantially non-aqueous coating composition that includes, for example, less than 20 wt-% of water, less than 10 wt-% of water, less than 5 wt-% of water, less then 2 wt-% of water, or less than 1 wt-% of water, or includes no intentionally added water.

34. The coating composition, method, or perishable item of any of embodiments 28 to 33, wherein the composition comprises an emulsion (e.g., "oil-in-water" or "water-in-oil", preferably oil-in-water; that is the continuous phase may optionally be either organic-solvent-based or water-based).

35. The coating composition, method, or perishable item of embodiment 34, wherein the composition comprises a mini-emulsion (preferably oil-in-water), which is also sometimes referred to as a nanoemulsion.

36. The coating composition, method, or perishable item of any of embodiments 28 to 35, wherein the composition includes dispersed or suspended particles (e.g., having volume average particle sizes of less than 20 microns, less than 10 microns, less than 5 microns, less than 1 microns, less than 0.5 microns, or less than 0.3 microns).

37. The coating composition, method, or perishable item of any of embodiments 28 to 32, wherein the composition comprises an aqueous emulsion, dispersion or suspension.

38. The coating composition, method, or perishable item of any of embodiments 28 to 37, wherein the PMCA comprises a dissolved PMCA.

39. The coating composition, method, or perishable item of any of embodiments 28 to 38, wherein a substantial amount (e.g., more than 20 wt-%, more than 35 wt-%, more than 50 wt-%, more than 75 wt-%, more than 90 wt-%, more than 95 wt-%, or more than 99 wt-%) of the PMCA is in solution (e.g., dissolved) in the liquid coating composition.

40. The coating composition, method, or perishable item of embodiment 38 or 39, wherein at least some, or all or substantially all, of the PMCA is provided by a solution of a zinc ammonium carbonate.

41. The coating composition, method, or perishable item of any of embodiments 28 to 40, wherein the liquid coating composition is a sprayable coating composition.

42. The coating composition, method, or perishable item of any of embodiments 1 to 27, wherein the composition comprises a powder, which is preferably capable of being combined with a liquid carrier (e.g., any of the liquid carriers referenced herein, including those of any preceding embodiment, including, for example: (i) an aqueous carrier that optionally includes water-miscible organic solvent or (ii) an organic-solvent-based carrier such as, e.g., ethanol) to form a liquid coating composition.

43. The coating composition, method, or perishable item of embodiment 42, wherein the powder is capable of being combined with an aqueous carrier liquid (e.g., water or any aqueous carrier referenced herein, including those of any preceding embodiment) to form an aqueous coating composition (e.g., a homogenous or substantially homogeneous aqueous coating composition).

44. The coating composition, method, or perishable item of embodiment 43, wherein the powder is a capable of being combined with the aqueous carrier liquid to form a sprayable coating composition.

45. The coating composition, method, or perishable item of any preceding embodiment, wherein the AHC includes one or more carboxyl groups; hydroxyl groups; amine groups; or any other suitable active hydrogen group having a hydrogen attached to an oxygen (O), sulfur (S), or nitrogen (N) atom, e.g., as in the groups —SH, ═NH, $—NH_2$, $—S(═O)_2(OH)$, —S(═O)OH, or acid groups including P, O, and H such as phosphonic or phosphinic groups; salt groups thereof (e.g., base-neutralized acid groups); or any combination thereof.

46a. The coating composition, method, or perishable item of any preceding embodiment, wherein the AHC (e.g., hydroxyl and/or carboxyl-functional compound) comprises a monomer (or other low-molecular-weight compound), an oligomer, a polymer, or a combination thereof.

46b. The coating composition, method, or perishable item of any preceding embodiment, wherein the AHC (e.g., hydroxyl- and/or carboxyl-functional compound) comprises at least about 25 wt-%, at least about 50 wt-%, at least about 60 wt-%, at least about 70 wt-%, at least about 80 wt-%, at least about 85 wt-%, at least about 90 wt-%, at least about 95 wt-%, at least about 96 wt-%, at least about 97 wt-%, at least about 98 wt-%, or 99 wt-% or more, based on the total weight of solids in the coating composition.

46c. The coating composition, method, or perishable item of any preceding embodiment, wherein the AHC comprises less than 100 wt-%, no more than about 99 wt-%, no more than about 98 wt-%, no more than about 97 wt-%, no more than about 96 wt-%, no more than about 95 wt-%, no more than about 90 wt-%, no more than about 80 wt-%, no more than about 70 wt-%, no more than about 60 wt-%, no more than about 50 wt-%, no more than about 40 wt-%, or more than about 30 wt-%, based on the total weight of solids in the coating composition.

47. The coating composition, method, or perishable item of any preceding embodiment, wherein the AHC comprises one or more carboxyl-functional compounds.

48. The coating composition, method, or perishable item of embodiment 47, wherein the carboxyl-functional compound does not include any active hydrogen groups other than carboxyl groups or salt groups thereof.

49. The coating composition, method, or perishable item of any of embodiments 1A to 47, wherein the AHC includes two or more different active hydrogen groups (e.g., one or more hydroxyl group and one or more carboxyl groups or salt groups thereof).

50. The coating composition, method, or perishable item of embodiment 47, wherein carboxyl-functional compound includes one or more active hydrogen groups other than carboxyl groups or salt groups thereof (e.g., any of the other active hydrogen groups recited herein, including, e.g., any preceding embodiment).

51. The coating composition, method, or perishable item of any preceding embodiment, wherein the AHC comprises a combination (e.g., mixture) of two or more active hydrogen compounds that are chemically distinct from one another (e.g., a combination of a first active hydrogen compound that is carboxyl-functional and a second active hydrogen compound that is not carboxyl-functional, a combination of a first active hydrogen compound that is a lipid and a second active hydrogen compound that is a polysaccharide, a combination of a first active hydrogen compound that is a lipid and a second active hydrogen compound that is a polysaccharide, a combination of a first active hydrogen compound that is a polypeptide and a second active hydrogen compound that is a polysaccharide, and so on).

52. The coating composition, method, or perishable item of any preceding embodiment, wherein the coating composition comprises a combination of:

(i) one or more lipids (e.g., a saturated or unsaturated: fatty acid, monoglyceride, diglyceride, oil, wax, phospholipid, derivative thereof (e.g., salt thereof), or mixture thereof), wherein the one or more lipids are preferably present in an amount of at least 1 wt-%, at least 2 wt-%, at least 5 wt-%, least 10 wt-%, at least 15 wt-%, at least 20 wt-%, at least 25 wt-%, or at least 30 wt-% to no more than 80 wt-%, no more than 70 wt-%, no more than 60 wt-%, no more than 55 wt-%, no more than 50 wt-%, no more than 45 wt-%, no more than 40 wt-%, no more than 35 wt-%, or no more than 30 wt-%; and (i) one or more non-lipid oligomer or polymer active hydrogen compounds (e.g., a saturated or unsaturated biopolymer having one or more active hydrogen groups) such as, for example, a polysaccharide (e.g., pectin, alginate, carrageenan, or chitosan), a polypeptide (e.g., gelatin, zein, globulin, albumin, whey protein, casein, hemp protein, brown rice protein, alfalfa protein, chia protein, pea protein, silk fibroin, or flax protein), or a combination thereof, wherein the one or more non-lipid oligomer or polymer active hydrogen compounds are preferably present in an amount of at least 20 wt-%, at least 30 wt-%, at least 40 wt-%, at least 45 wt-%, at least 50 wt-%, at least 55 wt-%, at least 60 wt-%, at least 65 wt-%, or at least 70 wt-% to no more than 99 wt-%, no more than 98 wt-%, no more than 95 wt-%, no more than 90 wt-%, no more than 85 wt-%, no more than 80 wt-%, no more than 75 wt-%, to more than 70 wt-%;

wherein the above weight percentages (wt-%) are based on the total combined amounts of components (i) and (ii) in the coating composition.

53. The coating composition, method, or perishable item of embodiment 52, wherein the total combined amounts of components (i) and (ii) in the coating composition comprises at least 50 wt-%, at least 60 wt-%, at least 70 wt-%, at least 80 wt-%, at least 85 wt-%, at least 90 wt-%, at least 95 wt-%, at least 96 wt-%, at least 97 wt-%, at least 98 wt-%, at least 99 wt-%, or at least 99.9 wt-% of the total solids present in the coating composition.

54. The coating composition, method, or perishable item of any preceding embodiment, wherein the AHC comprises a combination of a carboxyl-functional compound and another active hydrogen compound that is chemically different (e.g., an active hydrogen compound that is not carboxyl-functional, an active hydrogen compound that is carboxyl-functional but is chemically distinct in another respect, and so on).

55. The coating composition, method, or perishable item of any preceding embodiment, wherein the AHC comprises a hydroxyl-functional compound.

56. The coating composition, method, or perishable item of embodiment 55, wherein the hydroxyl-functional compound comprises one or more of any of the fatty acid monoglycerides disclosed in WO2020/051238 (by Braden et al.), each of which is incorporated by reference herein, including any of the depicted formulas or structures (see, e.g., Formula I in claims 1 or 2 and the specific compounds depicted in claims 12 or 18 of WO2020/051238).

57. The coating composition, method, or perishable item of any preceding embodiment, wherein the AHC comprises a salt of a carboxyl-functional compound and a base.

57'. The coating composition, method, or perishable item of any preceding embodiment, wherein the AHC comprises a salt of a hydroxyl-functional compound and a base.

58. The coating composition, method, or perishable item of embodiment 57, wherein the AHC comprises one or more of the fatty acid salts disclosed in WO2020/051238 (by Braden et al.), each of which is incorporated by reference herein, including any of the depicted formulas or structures (see, e.g., Formula II in claims 1 or 2 and the specific compounds referenced in claims 7 or 13).

59a. The coating composition, method, or perishable item of any of embodiments 56 to 58, wherein the composition comprises (a) from 50 to 99 wt-% (e.g., 60 to 95 wt-% or 70 to 90 wt-%) of a first group of one or more compounds selected from one or more monoesters of fatty acids (e.g., fatty acid monoglycerides) and (b) from 1 to 50 wt-% (e.g., 5 to 40 wt-% or 10 to 30 wt-%) of a second group of one or more compounds selected from one or more fatty acid salts, based on the total combined weight of components (a) and (b).

59b. The coating composition, method, or perishable item of any of embodiments 56 to 58, wherein the composition comprises (a) from 50 to 99 wt-% (e.g., 60 to 95 wt-% or 70 to 90 wt-%) of a first group of one or more compounds selected from one or more fatty acid salty and (b) from 1 to 50 wt-% (e.g., 5 to 40 wt-% or 10 to 30 wt-%) of a second group of one or more compounds selected from one or more monoesters of fatty acids (e.g., fatty acid monoglycerides), based on the total combined weight of components (a) and (b).

60. The coating composition, method, or perishable item of embodiment 59a or 59b, wherein the total combined amounts of components (a) and (b) in the coating composition comprises at least 50 wt-%, at least 60 wt-%, at least 70 wt-%, at least 80 wt-%, at least 85 wt-%, at least 90 wt-%, at least 95 wt-%, at least 96 wt-%, at least 97 wt-%, at least 98 wt-%, at least 99 wt-%, or at least 99.9 wt-% of the total solids present in the coating composition.

61. The coating composition, method, or perishable item of any preceding embodiment, wherein the composition comprises less than 10 wt-%, less than 5 wt-%, or less than 1 wt-%, if any, of diglycerides, based on the weight of total solids present in the coating composition.

62. The coating composition, method, or perishable item of any preceding embodiment, wherein the composition comprises less than 10 wt-%, less than 5 wt-%, or less than 1 wt-%, if any, of triglycerides, based on the weight of total solids present in the coating composition.

63. The coating composition, method, or perishable item of any preceding embodiment, wherein the composition comprises less than 10, less than 5 wt-%, or less than 1 wt-%, if any, of acetylated monoglycerides, based on the weight of total solids present in the coating composition.

64. The coating composition, method, or perishable item of any of embodiments 57 to 63, wherein the base comprises a base safe for use as a direct food-additive (e.g., a base recognized as GRAS by the US Food and Drug Administration).

65. The coating composition, method, or perishable item of any of embodiments 57 to 64, wherein the base comprises a fugitive base.

66. The coating composition, method, or perishable item of any of embodiment 64 or 65, wherein the base comprises ammonium hydroxide or an amine (e.g., morpholine).

67. The coating composition, method, or perishable item of any of embodiments 57 to 66, wherein the base comprises a metallic salt (e.g., NaOH, KOH, $Ca(OH)_2$, $Mg(OH)_2$, etc.), either alone or in combination with a fugitive base. In certain preferred embodiments, a base is used that forms a water-emusifiable or water-soluble salt with a hydroxyl or carboxyl-functional compound (e.g., a fatty acid having 7 or more, 8 or more, or 9 or more carbon atoms). Non-limiting examples of such bases include sodium bases (e.g., NaOH), potassium bases (e.g., KOH), and combination thereof, which may be optionally combined, for example, with non-metallic bases such as ammonia.

68. The coating composition, method, or perishable item of any embodiments 47 to 67, wherein the hydroxyl or carboxyl-functional component includes one or more (e.g., two or more, three or more, four or more, and so on) carboxyl groups present as non-terminal, pendant groups.

69. The coating composition, method, or perishable item of embodiments 47 to 68, wherein the hydroxyl or carboxyl-functional component comprises a polysaccharide, a polypeptide, a lipid, a derivative thereof (e.g., a salt thereof), or a mixture thereof.

70. The coating composition, method, or perishable item of any embodiments 47 to 69, wherein the hydroxyl or carboxyl-functional component comprises a polysaccharide, and wherein the polysaccharide comprises pectin or a derivative thereof.

71. The coating composition, method, or perishable item of embodiments 47 to 70, wherein the hydroxyl or carboxyl-functional component comprises a polypeptide, and wherein the polypeptide comprises gelatin or a derivative thereof.

72. The coating composition, method, or perishable item of embodiments 47 to 71, wherein the hydroxyl or carboxyl-functional derivative comprises an amphiphilic polypeptide.

73. The coating composition, method, or perishable item of any preceding embodiment, wherein the AHC has an acid value of at least 2, at least 5, at least 10, at least 20, at least 30, at least 40, at least 50, at least 60, at least 70, at least 80 at least 90, or at least 100 mg KOH per gram of the AHC.

74. The coating composition, method, or perishable item of any preceding embodiment, wherein the AHC has an acid value of less than 400, less than 300, less than 200, less than 150, less than 125, less than 100, less than 50, less than 30, less than 20, less than 10, less than 5, or less than 1 mg KOH per gram of the AHC.

75. The coating composition, method, or perishable item of any preceding embodiment, wherein the AHC has an acid value of from at least 10 to less than 400, at least 50 to less than 300, or at least 75 to less than 250 mg KOH per gram of the AHC.

76. The coating composition, method, or perishable item of any preceding embodiment, wherein the AHC has a hydroxyl value of at least 5, at least 10, at least 20, at least 30, at least 40, at least 50, at least 60, at least 70, at least 80 at least 90, or at least 100 mg KOH per gram of the AHC.

77. The coating composition, method, or perishable item of any preceding embodiment, wherein the AHC has a hydroxyl value of less than 400, less than 300, less than 200, less than 150, less than 125, less than 100, less than 50, less than 30, less than 20, less than 10, less than 5, or less than 1 mg KOH per gram of the AHC.

78. The coating composition, method, or perishable item of any preceding embodiment, wherein the AHC has a hydroxyl value of from at least 5 to less than 400, at least 10 to less than 200, or at least 20 to less than 100 mg KOH per gram of the AHC.

79. The coating composition, method, or perishable item of any preceding embodiment, wherein the composition includes at least about 0.5, at least about 1, at least about 2, at least about 3 or at least about 4 moles of the AHC (e.g., moles of hydroxyl-functional biopolymer, fatty acid monoester of ascorbic acid and/or a salt thereof, fatty acid and/or acid-functional biopolymer) per mole of polyvalent metal.

80. The coating composition, method, or perishable item of any preceding embodiment, wherein the composition includes less than about 4, less than about 3, less than about 2, less than about 1, or less than about 0.5 moles of the AHC (e.g., moles of hydroxyl-functional biopolymer, fatty acid monoester of ascorbic acid and/or a salt thereof fatty acid and/or acid-functional biopolymer) per mole of polyvalent metal.

81. The plant coating composition, method, or perishable item of any preceding embodiment, wherein the composition includes at least 0.01, at least 0.05 at least, 0.1, at least 0.15, at least 0.2, at least 0.25, at least 0.35, at least 0.5, at least 0.6, at least 0.8, at least 1.0 moles of the polyvalent metal per mole of hydroxyl and/or carboxyl groups or salt groups thereof present in the AHC (e.g., per mole of carboxyl groups or salt groups thereof present in fatty acids and/or acid-functional biopolymers).

82. The coating composition, method, or perishable item of any preceding embodiment, wherein the composition includes no more than 2.0, no more than 1.5, no more than 1.0, no more than 0.75, no more than 0.70, no more than 0.5, no more than 0.45, no more than 0.35, no more than 0.3, no more than 0.2 moles of the polyvalent metal per mole of hydroxyl and/or carboxyl groups or salt groups thereof present in the AHC (e.g., per mole of carboxyl groups or salt groups thereof present in fatty acids and/or acid-functional biopolymers).

In the above discussion in embodiments 79-82, reference is made to moles of polyvalent metal. Generally, the moles of polyvalent metal will be the same as the moles of the PMCAs. That is 1 mole of PMCA will typically include one mole of polyvalent metal. Depending on the particular polyvalent metal crosslinker agent(s) employed, it is possible, however, that this ratio may be other than 1:1 in some embodiments. For example, a PMCA could include two or more atoms of polyvalent metal and, thus, 1 mole of such PMCA would include two or more moles of polyvalent metals.

83. The coating composition, method, or perishable item of any preceding embodiment, wherein the composition includes at least 5 wt-%, at least 10 wt-%, at least 30 wt-%, at least 50 wt-%, at least 70 wt-%, at least 90 wt-%, or at least 99 wt-% weight percent (wt-%) of carboxyl-functional component, based on the weight of total solids in the coating composition. In some embodiments, the carboxyl-functional component is included in an additive amount to enhance one or more coating properties. In other embodiments, the carboxyl-functional component is included in a large amount due to its use as a primary or main coating ingredient on a solids basis.

84. The coating composition, method, or perishable item of any preceding embodiment, wherein the coating composition includes a plasticizer.

85. The coating composition, method, or perishable item of embodiment 84, wherein the plasticizer comprises a polyol, preferably a polyol having a molar mass of less than 500 g/mol, less than 400 g/mol, less than 300 g/mol, less than 200 g/mol, or less than 100 g/mol.

86. The coating composition, method, or perishable item of embodiment 84 or 85, wherein the plasticizer comprises glycerol, a fatty acid, an oil (preferably an edible oil, more preferably an edible plant-based oil), sorbitol, propylene glycol, triethyl citrate, or a mixture thereof.

87. The coating composition, method, or perishable item of any of embodiments 84 to 86, wherein the coating composition includes at least about 2 wt-%, at least about 5 wt-%, at least about 10 wt-%, or all least about 20 wt-% of plasticizer, based on the weight of total solids present in the coating composition.

88. The coating composition, method, or perishable item of any of embodiments 84 to 87, wherein the coating composition includes no more than about 50 wt-%, no more than about 40 wt-%, no more than about 30 wt-%, or no more than about 20 wt-% of plasticizer, based on the weight of total solids present in the coating composition.

89. The coating composition, method, or perishable item of any preceding embodiment wherein the composition includes a saturated or unsaturated fatty acid (e.g., as the AHC (e.g., embodiment 1A), as the plasticizer, as the ethylenically unsaturated component (e.g., embodiment 1B) and/or as another component of the coating composition) such as, e.g., a short-chain fatty acid (SCFA), medium-chain fatty acid (MCFA), long-chain fatty acid (LCFA), very long-chain fatty acid (VLCFA), or combination thereof.

90. The coating composition, method, or perishable item of embodiment 89, wherein the saturated or unsaturated fatty acid has a carbon chain length (including the carbonyl carbon atom) of 8 or more, 9 or more, 10 or more, 11 or more, 12 or more, 13 or more, 14 or more, 15 or more, 16 or more, 17 or more, or 18 or more carbon atoms.

91. The coating composition, method, or perishable item of embodiment 89 or 90, wherein the saturated or unsaturated fatty acid has a carbon chain length (including the carbonyl carbon atom) of 25 or less, 22 or less, 20 or less, 19 or less, 18 or less, 17 or less, 16 or less, 15 or less, or 14 or less.

92. The coating composition, method, or perishable item any preceding embodiment, wherein the composition includes a saturated or unsaturated fatty acid having a carbon chain length (including the carbonyl atom) of 14 to 18 (i.e., 14, 15, 16, 17, and/or 18).

93. The coating composition, method, or perishable item any preceding embodiment, wherein the composition includes a saturated or unsaturated fatty acid having a carbon chain length (including the carbonyl atom) of 7 to 13 (i.e., 7, 8, 9, 10, 11, 12, and/or 13).

94. The coating composition, method, or perishable item of any of embodiments 89 to 93, wherein the fatty acid comprises a saturated fatty acid (optionally in combination with one or more other plasticizers such as, e.g., an unsaturated fatty acid, glycerol, or an oil).

95. The coating composition, method, or perishable item of embodiment 94, wherein the saturated fatty acid comprises capric acid, lauric acid, myristic acid, palmitic acid, stearic acid, or a combination thereof.

96. The coating composition, method, or perishable item of any of embodiments 89 to 95, wherein the fatty acid comprises an unsaturated fatty acid, which preferably include one or more cis carbon-carbon double bond, and more preferably is free of trans carbon-carbon double bonds.

97. The coating composition, method, or perishable item of embodiment 96, wherein the unsaturated fatty acid comprises a mono-unsaturated fatty acid.

98. The coating composition, method, or perishable item of embodiment 96, wherein the unsaturated fatty acid comprises a polyunsaturated fatty acid.

99. The coating composition, method, or perishable item of embodiment 98, wherein the polyunsaturated fatty acid comprises an omega-3-fatty acid, an omega-6-fatty acid, or a mixture thereof.

100. The coating composition, method, or perishable item of embodiment 98 or 99, wherein the polyunsaturated fatty acid comprises a non-conjugated linoleic fatty acid (preferably a cis, cis isomer), a conjugated linoleic fatty acid (preferably a cis, cis isomer), an alpha-linolenic fatty acid (preferably a cis, cis, cis isomer), a gamma-linolenic fatty acid (preferably a cis, cis, cis isomer), isomers of any of these, or a combination thereof.

101. The coating composition, method, or perishable item of any of embodiments 89 to 100, wherein at least some, a majority, or even all of the fatty acid is present in esterified form.

102. The coating composition, method, or perishable item of embodiment 101, wherein the fatty acid is present as a portion of a glyceride (e.g., a fatty acid mono-, di-, or tri-ester of glycerol).

103. The coating composition, method, or perishable item of embodiment 102, wherein the glyceride comprises a monoglyceride.

104. The coating composition, method, or perishable item of embodiment 103, wherein the mono-glyceride comprises one or more of the below compounds:

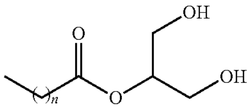

n = 2 - 20

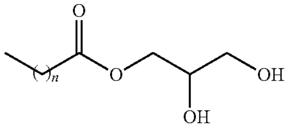

n = 2 - 20

105a. The coating composition, method, or perishable item of any of embodiments 102 to 104, wherein the glyceride comprises 2,3-dihydroxypropyl palmitate, 1,3-dihydroxy-propan-2-yl palmitate, or a mixture thereof. (https://www.accessdata.fda.gov/scripts/fdcc/index.cfm?set=GRASNotices&id=648)

105b. The coating composition, method, or perishable item of any of embodiments 102 to 105a, wherein the glyceride comprises 2,3-dihydroxypropyl stearate (e.g., CAS Registry No. 123-94-4) or 1,3-dihydroxpropan-2-yl stearate (e.g., CAS Registry No. 621-61-4), or a mixture thereof. In some embodiments one or more of the glycerides are derived from grape seeds. A representative manufacturing process for preparation of a mixture of monoacylglycerides is provided in FIG. 2.3 of GRAS Notice No. 886 (https://www.accessdata.fda.gov/scripts/fdcc/?set=GRASNotices&id=886).

106. The coating composition, method, or perishable item of any of preceding embodiment, wherein the total fatty acid content of the coating composition, if any, exhibits an iodine value of less than 250, less than 200, less than 150, than 120, less than 100, less than 70, less than 50, less than 40, less than 30, less than 20, less than 15, less than 10, less than 5, less than 1, or 0 centigrams of iodine per gram of total fatty acid contents.

107. The coating composition, method, or perishable item of any preceding embodiment, wherein the total fatty acid content of the coating composition, if any, exhibits an iodine value of greater than 0, greater than 1, greater than 5, greater than 10, greater than 15, greater than 20, greater than 30, greater than 40, greater than 50, greater than 60, greater than 70, greater than 80, greater than 90, greater than 100, greater than 120, or greater than 150 centigrams of iodine per gram of total fatty acid contents.

108. The coating composition, method, or perishable item of any preceding embodiment, wherein the total glyceride content in the coating composition, if any, exhibits an iodine value of less than 250, less than 200, less than 150, less than 120, less than 100, less than 70, less than 50, less than 40, less than 30, less than 20, less than 15, less than 10, less than 5, less than 1, or 0 centigrams of iodine per gram of total glyceride content.

109. The coating composition, method, or perishable item of any preceding embodiment, wherein the total glyceride content of the coating composition, if any, exhibits an iodine value of greater than 0, greater than 1, greater than 5, greater than 10, greater than 15, greater than 20, greater than 30, greater than 40, greater than 50, greater than 60, greater than 70, greater than 80, greater than 90, or greater than 100, greater than 120, or greater than 150 centigrams of iodine per gram of total glyceride content.

110. The coating composition, method, or perishable item of any preceding embodiment, wherein the total glyceride and fatty acid content in the coating composition, if any, exhibits an iodine value, if any, of less than 250, less than 200, less than 150, less than 120, less than 100, less than 70, less than 50, less than 40, less than 30, less than 20, less than 15, less than 10, less than 5, less than 1, or 0 centigrams of iodine per gram of total glyceride and fatty acid content.

111. The coating composition, method, or perishable item of any preceding embodiment, wherein the total glyceride and fatty acid content of the coating composition, if any, exhibits an iodine value, if any, of greater than 0, greater than 1, greater than 5, greater than 10, greater than 15, greater than 20, greater than 30, greater than 40, greater than 50, greater than 60, greater than 70, greater than 80, greater than 90, or greater than 100, greater than 120, or greater than 150 centigrams iodine per gram of total glyceride content.

112. The coating composition, method, or perishable item of any preceding embodiment, wherein the total glyceride and fatty acid content in the coating composition, if any, exhibits an iodine value, if any, of less than 250, less than 200, less than 150, less than 120, less than 100, less than 70, less than 50, less than 40, less than 30, less than 20, less than 15, less than 10, less than 5, less than 1, or 0 centigrams of iodine per gram of total glyceride and fatty acid content.

113. The coating composition, method, or perishable item of any preceding embodiment, wherein the coating composition exhibits an iodine value, if any, of less than 250, less than 200, less than 150, less than 100, less than 70, less than 50, less than 40, less than 30, less than 20, less than 15, less than 10, less than 5, or less than 1 centigrams of iodine per gram of solids in the coating composition.

114. The coating composition, method, or perishable item of any preceding embodiment, wherein the coating composition exhibits an iodine value, if any, of greater than 0.1, greater than 1, greater than 2, greater than 3, greater than 4, greater than 5, greater than 6, greater than 7, greater than 8, greater than 9, greater than 10, greater than 15, greater than 20, greater than 30, greater than 40, greater than 50, greater than 60, greater than 70, greater than 80, or greater than 90 or greater than 100, greater than 120, or greater than 150 centigrams iodine per gram of solids in the coating composition.

115. The coating composition, method, or perishable item of any preceding embodiment, wherein the composition includes, based on the combined weight of glyceride (preferably a glyceride of a saturated or unsaturated fatty acid, more preferably a mono-glyceride of a saturated or unsaturated fatty acid) and carboxyl-functional active hydrogen compound, at least: 0.1, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, or 99 weight percent of carboxyl-functional active hydrogen compound.

116. The coating composition, method, or perishable item of any preceding embodiment, wherein the composition includes, based on the combined weight of glyceride and carboxyl-functional active hydrogen compound, includes no more than: 99.9, 99, 98, 97, 96, 95, 94, 93, 92, 91, 90, 89, 88, 87, 86, 85, 84, 83, 82, 81, 80, 79, 78, 77, 76, 75, 74, 73, 72, 71, 70, 69, 68, 67, 66, 65, 64, 63, 62, 61, 60, 59, 58, 57, 56, 54, 53, 52, 51, 50, 49, 48, 47, 46, 45, 44, 43, 42, 41, 40, 39, 38, 37, 36, 35, 34, 33, 32, 31, 30, 29, 28, 27, 26, 25, 24, 23, 22, 21, 20, 19, 18, 17, 16, 15, 14, 13, 12, 11, 10, 9, 8, 7, 6, 5, 4, 3, 2, 1, or 0.5 weight percent of carboxyl-functional active hydrogen compound.

117. The coating composition, method, or perishable item of any of embodiments 115 or 116, wherein the composition includes a minority amount of carboxyl-functional active hydrogen compound (i.e., any of the carboxyl-functional active hydrogen compound concentrations of embodiments 115 or 116 that is less than 50 weight percent), and wherein the coating composition exhibits a decreased water vapor permeability relative to an otherwise identical coating omitting the carboxyl-functional active hydrogen compound.

118. The coating composition, method, or perishable item of any preceding embodiment, wherein the AHC comprises a glyceride of a fatty acid (e.g., a fatty acid mono-, di-, or tri-ester of glycerol).

119. The coating composition, method, or perishable item of embodiment 118, wherein the glyceride of a fatty acid comprises a monoglyceride (i.e., fatty acid mono-ester of glycerol).

120. The coating composition, method, or perishable item of embodiment 118 or 119, wherein a fatty acid portion of the glyceride includes a reactive functional group (e.g., a carbon-carbon double bond, an epoxy group, a hydroxyl group, a carboxyl group, etc.), or optionally a plurality of reactive functional groups that are the same or different.

121. The coating composition, method, or perishable item of any preceding embodiment, wherein the composition includes a saturated or unsaturated fatty acid, or a salt thereof, wherein the fatty acid includes a reactive functional group other than the carboxyl group (or salt group thereof) and any carbon-carbon double bonds that may be present.

122. The coating composition, method, or perishable item of embodiment 121, wherein the other reactive functional group comprises one or more of a hydroxyl group, an epoxy group, amine group or a carboxyl group.

123. The coating composition, method, or perishable item of any preceding embodiment, wherein the coating composition includes an oil (e.g., as a plasticizer, a water-barrier additive, or other coating ingredient), more preferably an edible oil, and even more preferably and edible plant-based oil.

124. The coating composition, method, or perishable item of embodiment 123, wherein the oil comprises an oil derived from edible seeds.

125. The coating composition, method, or perishable item of embodiment 124, wherein the oil comprises sunflower seed oil, canola seed oil (also sometimes referred to as rapeseed oil), flax seed oil, safflower seed oil, soybean oil, palm oil, corn oil, cottonseed oil, coconut oil, or combinations thereof.

126. The coating composition, method, or perishable item of embodiment 123, wherein the oil comprises a citrus oil (e.g., grapefruit seed oil, lemon oil, orange oil, lime oil, etc.)

127. The coating composition, method, or perishable item of any preceding embodiment, wherein the coating compositions includes a wax.

128. The coating composition, method, or perishable item of embodiment 127, wherein the wax comprises one or more of paraffin wax, carnauba wax, or beeswax.

129. The coating composition, method, or perishable item of embodiments 27 to 128, wherein the liquid coating composition includes at least 0.01 wt-%, at least 0.025 wt-%, at least 0.05 wt-%, at least 0.1 wt-%, at least 0.15 wt-%, at least 0.2 wt-%, at least 0.5 wt-%, at least 1 wt-%, at least 2 wt-%, at least 3 wt-%, at least 4 wt-%, at least 5 wt-%, at least 6 wt-%, at least 7 wt-%, at least 8 wt-%, or at least 9 wt-%, or at least 10 wt-% of total solids (i.e., non-volatiles). (The concentration of total solids may be calculated based on starting materials or, alternatively, when starting materials and associated solids are not known, determined using a suitable test method to remove volatile content and quantity the mass of residual solids.)

130. The coating composition, method, or perishable item of embodiments 27 to 129, wherein the liquid coating composition includes less than 50 wt-%, less than 30 wt-%, less than 25 wt-%, less than 20 wt-%, less than 19 wt-%, less than 18 wt-%, less than 17 wt-%, less than 16 wt-%, less than 15 wt-%, less than 14 wt-%, less than 13 wt-%, less than 12 wt-%, less than 11 wt-%, less than 10 wt-%, less than 9 wt-%, less than 8 wt-%, less than 7 wt-%, less than 6 wt-%, less than 5 wt-%, less than 4 wt-%, less than 3 wt-%, less than 2.5 wt-%, or less than 2 wt-% of total solids.

131. The coating composition, method, or perishable item of any of embodiments 27 to 130, wherein the coating composition includes from 0.1 to 35 wt-%, more typically 0.25 to 25 wt-%, and in some embodiments 0.5 to 20 wt-%, or 1 to 10 wt-% of total solids.

132. The coating composition, method, or perishable item of any preceding embodiment, wherein the coating composition includes, based on total coating solids, at least 0.1 wt-%, at least 0.5 wt-%, at least 1 wt-%, at least 2 wt-%, at least 3 wt-%, at least 4 wt-%, at least 5 wt-%, at least 6 wt-%, at least 7 wt-%, at least 8 wt-%, at least 9 wt-%, or at least 10 wt-% of ethylenically unsaturated component (e.g., any of the unsaturated materials recited herein such as, e.g., unsaturated fatty acids, salts thereof, or esters thereof).

133. The coating composition, method, or perishable item of any preceding embodiment, wherein the coating composition includes, based on total coating solids, less than 100 wt-%, less than 75 wt-%, less than 50 wt-%, less than 40 wt-%, less than 30 wt-%, less than 20 wt-%, less than 15 wt-%, less than 10 wt-%, less than 9 wt-%, less than 8 wt-%, less than 7 wt-%, less than 6 wt-%, less than 5 wt-%, less than 4 wt-%, less than 3 wt-%, less than 2 wt-%, or less than 1 wt-% for ethylenically unsaturated component (e.g., any of the unsaturated materials recited herein such as, e.g., unsaturated fatty acids, salts thereof, or esters thereof).

134(a). The coating composition, method, or perishable item of any preceding embodiment, wherein the coating composition includes an adhesion promoter, preferably in an amount, based on a total coating solids, of at least about 0.001 wt-%, at least about 0.01 wt-%, at least about 0.05 wt-%, at least about 0.1 wt-%, at least about 0.5 wt-%, or at least about 1 wt-%.

134(b). The coating composition, method, or perishable item of any preceding embodiment, wherein the coating composition includes an adhesion promoter preferably in an amount, based on total coating solids, of less than about 40 wt-%, less than about 20 wt-%, less than about 10 wt-%, less than about 5 wt-%, or less than about 1 wt-%.

135. The coating composition, method, or perishable item of embodiment 134, wherein the adhesion promoter comprises phosphoric acid, a phospholipid, any other suitable phosphorylated edible compound, or a combination thereof.

136. The coating composition, method, or perishable item of any preceding embodiment, wherein the coating composition includes a wetting additive (e.g., monoacylglycerides, lysophospholipids, glycoglycerolipids, glycolipids, ascorbyl esters of a fatty acid, esters of lactic acid, esters of tartaric acid, esters of malic acid, esters of fumaric acid, esters of succinic acid, esters of citric acid, esters of pantothenic acid, sucrose ester of a fatty acid, dioctyl sodium sulfosuccinate, and fatty alcohol derivatives).

137. The coating composition, method, or perishable item of any preceding embodiment, wherein the coating composition includes an antimicrobial agent (e.g., an antibacterial agent, an antiviral agent, an anti-parasite agent, and or/a fungicide).

138. The coating composition, method, or perishable item of embodiment 137, wherein the antimicrobial agent comprises citric acid, malic acid, ascorbic acid, erythorbic acid, sorbic acid, thiodipropionic acid, ascorbyl palmitate, bismuth, lauric acid, other weak acids or salts thereof (e.g., GRAS listed for direct or indirect food-contact, more preferably direct food-contact), honey (e.g., unfiltered raw honey), or a combination thereof.

139. The coating composition, method, or perishable item of any preceding embodiment, wherein the hardened coating, or a perishable item coated with a hardened coating formed from the coating composition, reduces the mass loss rate by at by at least 10%, 15%, 20%, 25%, 30%, 35%, 40%, 45%, 50%, 55%, 60%, 65%, 70%, 75%, 80%, 85%, 90% or greater compared to untreated analogous perishable item. As used herein, the term "mass loss rate" refers to the rate at which the product loses mass (e.g. by releasing water and other volatile compounds). The mass loss rate is typically expressed as a percentage of the original mass per unit time (e.g. percent per day).

140. The coating composition, method, or perishable item of any preceding embodiment, wherein the hardened coating, or a perishable item coated with a coating formed from the coating composition, exhibits a mass loss factor of at least 1.1, at least 1.2, at least 1.3, at least 1.4, at least 1.5, at least 1.6, at least 1.7, at least 1.8, at least 1.9, at least 2.0, at least 2.2, at least 2.4, at least 2.6, at least 2.8, at least 3.0. As used herein, the term "mass loss factor" is defined as the ratio of the average mass loss rate of uncoated produce (measured for a control group) to the average mass loss rate of the corresponding coated produce at a given time. Hence a larger mass loss factor corresponds to a greater reduction in average mass loss rate for the coated produce.

141. The coating composition, method, or perishable item of any preceding embodiment, wherein the coating, or a perishable item coated with a coating formed from the coating composition, reduces the humidity generated during storage by at least 1%, 2%, 3%, 4%, 5%, 10%, 15%, 20%, 25%, 30%, 35%, 40%, 45%, 50%, 55%, 60%, 65%, 70%, 75%, 80%, 85%, 90% or greater compared to untreated analogous perishable item.

142. The coating composition, method, or perishable item (e.g., avocados, strawberries, or lemons) of any preceding embodiment, wherein the coating, or a perishable item (e.g., avocados, strawberries, or lemons) coated with a coating formed from the coating composition, wherein the coating reduces the respiration rate by at least 10%, 15%, 20%, 25%, 30%, 35%, 40%, 45%, 50%, 55%, 60%, 65%, 70%, 75%, 80%, 85%, 90% or greater compared to untreated analogous perishable item (e.g., untreated avocados, untreated strawberries, or untreated lemons from same harvest). As used herein, the term "respiration rate" refers to the rate at which the product releases CO2, and more specifically is the volume of CO2 (at standard temperature and pressure) released per unit time per unit mass of the product. The respiration rate is typically expressed as ml CO2/kg hour. The respiration rate of the product can be measured by placing the product in a closed container of known volume that is equipped with a CO2 sensor, recording the CO2 concentration within the container as a function of time, and then calculating the rate of CO2 release required to obtain the measured concentration values.

143. The coating composition, method, or perishable item of any preceding embodiment, wherein the hardened coating, or a hardened coating formed from the coating composition, exhibits a contact angle with deionized water (disposed on a surface of the hardened coating) of greater than about 80°, preferably greater than about 90°, more preferably greater than about 95°, and even more preferably greater than about 100°. 144. The coating composition, method, or perishable item of any of embodiments 28 to 143, wherein the liquid coating composition exhibits a contact angle of less than about 80°, less than about 70°, less than about 65°, less than about 60°, less than about 55°, less than about 50°, less than about 45°, or less than about 40°, when disposed on a surface of carnauba wax.

145. The coating composition, method, or perishable item of any of embodiments 28 to 144, wherein the liquid coating composition exhibits a contact angle of less than about 80°, less than about 70°, less than about 65°, less than about 60°, less than about 55°, less than about 50°, less than about 45°, or less than about 40°, when disposed on a surface of paraffin wax.

146. The coating composition, method, or perishable item of any of embodiments 28 to 145, wherein the liquid coating composition exhibits a contact angle of less than about 80°, less than about 70°, less than about 65°, less than about 60°, less than about 55°, less than about 50°, less than about 45°, less than about 40°, or less than about 35°, when disposed on a surface of candelilla wax.

147. The coating composition, method, or perishable item of any preceding embodiment, wherein the coating composition includes a polyvalent metal crosslinker compound, and wherein a coating formed from the coating composition exhibits a decreased average strain at break (e.g., at least 1% less, at least 2% less, at least 3% less, at least 4% less, at least 5% less, at least 10% less, at least 20% less, at least 30% less, at least 40% less, or at least 50% less) relative to an otherwise identical coating omitting the polyvalent metal crosslinker compound.

148. The coating composition, method, or perishable item of any preceding embodiment, wherein the coating composition includes an ethylenically unsaturated component (e.g., an unsaturated fatty acid or salt thereof, an unsaturated fatty acid mono-ester, di-ester, or tri-ester (e.g., of glycerol)), derivative thereof, or mixture thereof), and wherein a coating formed from the coating composition exhibits a decreased average strain at break (e.g., at least 1% less, at least 2% less, at least 3% less, at least 4% less, at least 5% less, at least 10% less, at least 20% less, at least 30% less, at least 40% less, or at least 50% less) relative to an otherwise identical coating omitting the polyvalent metal crosslinker compound.

149. The coating composition, method, or perishable item of any preceding embodiment, wherein the coating composition includes a polyvalent metal crosslinker compound, and wherein an air-dried coating (24 hours at 23+/−2° C. and 50+/−5% humidity) formed from the coating composition exhibits an increased gel fraction (e.g., at least 0.1% greater, at least 0.5% greater, at least 1% greater, at least 2% greater, at least 3% greater, at least 4% greater, at least 5% greater, at least 6% greater, at least 7% greater, at least 8% greater, at least 9% greater, at least 10% greater, at least 11% greater, at least 12% greater, at least 13% greater, at least 14% greater, at least 15% greater, at least 16% greater, at least 17% greater, at least 18% greater, at least 19% greater, or at least 20% greater) relative to an otherwise identical coating omitting the polyvalent metal crosslinker compound.

150. The coating composition, method, or perishable item of any preceding embodiment, wherein the coating composition includes an ethylenically unsaturated component (e.g., an unsaturated fatty acid or salt thereof, an unsaturated fatty acid mono-ester, di-ester, or tri-ester (e.g., of glycerol)), derivative thereof, or mixture thereof), and wherein an air-dried coating (24 hours at 23+/−2° C. and 50+/−5% humidity) formed from the coating composition exhibits an increased gel content (e.g., at least 0.1% greater, at least 0.5% greater, at least 1% greater, at least 2% greater, at least 3% greater, at least 4% greater, at least 5% greater, at least 6% greater, at least 7% greater, at least 8% greater, at least 9% greater, at least 10% greater, at least 11% greater, at least 12% greater, at least 13% greater, at least 14% greater, at least 15% greater, at least 16% greater, at least 17% greater, at least 18% greater, at least 19% greater, or at least 20% greater) relative to an otherwise identical coating omitting the ethylenically unsaturated component.

151. The coating composition, method, or perishable item of any preceding embodiment, wherein the coating composition includes a polyvalent metal crosslinker compound, and wherein an air-dried coating (7 days at 23+/−2° C. and 50+/−5% humidity) formed from the coating composition exhibits an increased water-insoluble content (e.g., at least 0.1% greater, at least 0.5% greater, at least 1% greater, at least 2% greater, at least 3% greater, at least 4% greater, at least 5% greater, at least 6% greater, at least 7% greater, at least 8% greater, at least 9% greater, at least 10% greater, at least 11% greater, at least 12% greater, at least 13% greater, at least 14% greater, at least 15% greater, at least 16% greater, at least 17% greater, at least 18% greater, at least 19% greater, or at least 20% greater) relative to an otherwise identical coating omitting the polyvalent metal crosslinker compound.

152. The coating composition, method, or perishable item of any preceding embodiment, wherein the coating composition includes an ethylenically unsaturated component (e.g., an unsaturated fatty acid or salt thereof, an unsaturated fatty acid mono-ester, di-ester, or tri-ester (e.g., of glycerol)), derivative thereof, or mixture thereof), and wherein an air-dried coating (24 hours at 23+/−2° C. and 50+/−5% humidity) formed from the coating composition exhibits an increased water-insoluble content (e.g., at least 0.1% greater, at least 0.5% greater, at least 1% greater, at least 2% greater, at least 3% greater, at least 4% greater, at least 5% greater, at least 6% greater, at least 7% greater, at least 8% greater, at least 9% greater, at least 10% greater, at least 11% greater, at least 12% greater, at least 13% greater, at least 14% greater, at least 15% greater, at least 16% greater, at least 17% greater, at least 18% greater, at least 19% greater, or at least 20% greater) relative to an otherwise identical coating omitting the ethylenically unsaturated component.

153. The method or perishable item of any of embodiments 1C to 152, wherein the perishable item comprises a freshly harvested plant item.

154. The method or perishable item of any of embodiments 1C to 153, wherein the perishable item comprises a seed, a bulb, a tuber, a corm, a rhizome, a root, a plant cutting, a plant seedling, or a flower (e.g., a cut flower).

155. The method or perishable item of any of embodiment 1C to 153, wherein the perishable item comprises an edible plant item.

156. The method or perishable item of any of embodiment 1C to 154, wherein the perishable item comprises a fruit (typically a freshly harvested fruit), a vegetable (typically a freshly harvested vegetable), a grain, or a seed. Such fruit or vegetables will typically be whole fruits or vegetables, although in some embodiments the coating composition may be applied to freshly cut or sliced fruits or vegetables (e.g., apple slices, cucumber slices, kiwi slices, mango chunks, pineapple chunks, and the like).

157. The method or perishable item of any of embodiments 1C to 153, 155, and 156, wherein the perishable item comprises a fruit such as, e.g., an akee, an apple, an apricot, an avocado, a banana, a blackberry, a blueberry, a carambola, a cherry, a coconut, a cranberry, a citrus fruit (e.g., a lemon, a lime, an orange, a mandarin, or a grapefruit), a cucumber (e.g., an English cucumber), a durian, an eggplant, a fig, a grape, a guava, a kiwi, a lychee, a mango, a melon (e.g., a watermelon, a cantaloupe, a honeydew, or a muskmelon), a nectarine, a *papaya*, a passionfruit, a peach, a peapod, a pear, a persimmon, a pineapple, a pepper (e.g., a bell peppers, a habanero pepper, a jalapeno pepper, a poblano pepper, or a serrano pepper), a plum, a pluot, a pomegranate, a raspberry, a strawberry, a squash (e.g., a pumpkin, an acorn squash, a butternut squash, a spaghetti squash, or a zucchini), a tomato, or an uchuva.

158. The method or perishable item of embodiment 157, wherein the perishable item comprises berries.

159. The method or perishable item of embodiment 157 or 158, wherein the fruit comprises a whole fruit.

160. The method or perishable item of and of embodiments 157 to 159, wherein the fruit comprises a climacteric fruit.

161. The method or perishable item of any of embodiments 157 to 159, wherein the fruit comprises a non-climacteric fruit.

162. The method or perishable item of any of embodiments 153 to 157, wherein the perishable item comprises a vegetable such as, e.g., asparagus, basil, beans (e.g., green beans), broccoli, Brussel sprouts, cabbage, carrots, cauliflower, celery, cilantro, corn, garlic, green onions, lettuce, leeks, onions, mushrooms, parsley, potatoes, shallots, spinach, sweet potatoes, artichokes, or yams.

163. The method or perishable item of any of embodiments 153 to 162, wherein the coating composition is applied to at least a portion of a removable skin (e.g., removable peel).

164. The method of perishable item of any of embodiments 153 to 162, wherein the coating composition is applied to at least a portion of an inedible skin (e.g., an avocado peel, a banana peel, etc.).

165. The method or perishable item of any of embodiments 1C to 164, wherein the perishable item to be coated is treated with UV light prior to coating, after coating, or both.

166. The method or perishable item of any of embodiments 1C to 165, wherein the hardened coating is clear. Preferably the hardened clear coating is free of eye-visible haze. In some embodiments, the hardened coating is free of haze in testing pursuant to ASTM D1003.

167. The method or perishable item of any of embodiment 1C to 166, wherein the hardened coating is free of particulates and agglomerates visible to the unaided (20/20) human eye. In some embodiments, the coating composition is preferably free, or substantially free, of particles having a maximum dimension of greater than 20 microns, treated than 15 microns, or greater than 10 microns.

168. The coating composition, method, or perishable item of any preceding embodiment, where the coating, or a hardened coating from the coating composition, is crosslinked.

169. The coating composition, method, or perishable item of embodiment 168, where the coating, or a hardened coating from the coating composition, wherein the crosslinking is reversible.

170. The coating composition, method, or perishable item of any preceding embodiment, wherein the coating, or a hardened coating formed from the coating composition, can be removed (preferably readily removed under normal ambient conditions) from a plant surface using an aqueous composition including a suitable amount of base (e.g., 3% ammonium hydroxide in water).

171. The coating composition, method, or perishable item of any preceding embodiment, wherein the coating composition includes a dimer fatty acid.

172. The coating composition, method, or perishable item of any preceding embodiment, wherein the coated perishable item, or a plant item having a coating formed the coating composition, is edible and the coating does not exhibit any off-aromas (e.g., that are detectable in a statistically significant manner by a panel of human testers representative of the general population).

173. The coating composition, method, or perishable item of any preceding embodiment, wherein the coated perishable item, or a plant item having a coating formed the coating composition, is edible and the coating does not exhibit any off-flavors (e.g., that are detectable in a statistically significant manner by a panel of human testers representative of the general population).

174. The coating composition, method, or perishable item of any preceding embodiment, wherein the coated perishable item, or a plant item having a coating formed the coating composition, is edible and the coating does not exhibit any objectionable mouth-feel (e.g., that is detectable in a statistically significant manner by a panel of human testers representative of the general population.

175. The coating composition, method, or perishable item of any preceding embodiment, wherein the coating composition includes sodium bicarbonate.

176a. The coating composition, method, or perishable item of any of embodiments 1A to 32 or 34 to 175, wherein the coating composition comprises an aqueous coating composition, and wherein the aqueous coating composition exhibits a pH of at least about 2, at least about 3, at least about 4, or at least about 5.

176b. The coating composition, method, or perishable item of any of embodiments 1A to 32, 34 to 175, or 176a wherein the coating composition comprises an aqueous coating composition, and wherein the aqueous coating composition exhibits a pH of less than about 10.5, less than about 9, less than about 8, or less than about 7.

176c. The coating composition, method, or perishable item of embodiments 176a or 176b, wherein the aqueous coating composition exhibits a pH of from about 4 to about 9, from about 4.5 to about 8, or from about 5 to about 7.

177a. The coating composition, method, or perishable item of any of embodiments 1A to 28, 30 to 36, or 38 to 175, wherein the coating composition comprises an organic-solvent-based coating composition, and wherein the organic-solvent-based coating composition exhibits a pH of at least about 1, at least about 1.5, at least about 2, at least about 2.5, at least about 3, or at least about 4.

177b. The coating composition, method, or perishable item of any of embodiments 1A to 32, 34 to 175, or 177a, wherein the coating composition comprises an organic-solvent-based coating composition, and wherein the organic-solvent-based coating composition exhibits a pH of less than about 7, less than about 6, less than about 5, less than about 4.5, or less than about 4.

177c. The coating composition, method, or perishable item of embodiments 177a or 177b, wherein organic-solvent-based coating composition exhibits a pH of from about 1.5 to 6, from about 2 to about 5, or more typically from about 2 to about 4.

For embodiments 176a to 176c or 177a to 177c, in the context of powder embodiments capable of forming an aqueous of organic-solvent-based liquid coating composition (see, e.g., embodiments 42 to 44), the powder should preferably be capable of forming one or more such coating compositions.

178. The coating composition, method, or perishable item of any of embodiments 176a to 177c, wherein to the extent acids or bases are used to achieve the desired coating composition pH, typically a majority, and more typically all or substantially all, of such acids or bases are weak acids or weak bases. In some embodiments, strong bases, including substantial amounts of strong bases, may be used such as, for example, NaOH, KOH, or combinations thereof.

179. The coating composition, method, or perishable item of any of embodiments 1A to 32, 34 to 176c, or 178, wherein the coating composition includes an emulsifier (e.g., one or more anionic emulsifiers (e.g., ionic, cationic, amphoteric, or zwitterionic), one or more non-ionic emulsifiers, or a combination thereof).

180. The coating composition, method, or perishable item of embodiment 179, wherein the emulsifier comprises one or more of lecithin (e.g., lecithin from soy, sunflower, or canola feedstocks), a sucrose ester of fatty acids (see, e.g., the line of food-grade sucrose ester emulsifiers commercially available from Sisterna B.V.), an ester of citric acid (e.g., an ester of citric acid and glycerol such as citric acid mono-esterified, di-esterified, or tri-esterified with glycerol; stearyl citrate), a grape seed extract emulsifier, sucrose acetate isobutyrate, dioctyl sodium sulfosuccinate, glycerol monostearate, glycerol monooleate, glycerol palmitostearate, or a combination thereof. In some embodiments, canola lecithin such as that described in GRAS Notice No. 682 (Cargill) is used.

181. The coating composition, method, or perishable item of embodiment of 179, wherein the emulsifier comprises a surfactant (e.g., any of those described herein), a fatty acid carboxylic acid salt (e.g., any of those described herein), a phosphate salt (e.g., any of those described herein), or a combination thereof.

182. The coating composition, method, or perishable item of any preceding embodiment, wherein the coating composition includes one or more of acetic acid, aconitic acid, adipic acid, alginic acid, benzoic acid, citric acid, lactic acid, malic acid, propionic acid, stearic acid, succinic acid, sulfuric acid, tannic acid, tartaric acid, a salt thereof, or a mixture thereof.

183. The coating composition, method, or perishable item of any preceding embodiment, wherein the coating composition includes one or more of sodium acetate, sodium alginate, sodium benzoate, sodium bicarbonate, sodium carbonate, sodium citrate, sodium diacetate, sodium hydroxide, sodium hypophosphite, sodium lactate, sodium metalsilicate, sodium propionate, sodium sesquicarbonate, sodium tartrate, sodium potassium tartrate, sodium potassium tartrate, sodium thiosulfate, or a combination thereof.

184. The coating composition, method, or perishable item of any preceding embodiment, wherein the coating composition includes one or more of potassium alginate, potassium bicarbonate, potassium carbonate, potassium chloride, potassium citrate, potassium hydroxide, potassium iodide, potassium iodate, potassium lactate, potassium sulfate, or a combination thereof.

185. The coating composition, method, or perishable item of any preceding embodiment, wherein the coating composition includes one or more of ammonium alginate, ammonium bicarbonate, ammonium carbonate, ammonium chloride, ammonium hydroxide, ammonium citrate dibasic, amount phosphate monobasic, ammonium phosphate dibasic, ammonium sulfate, and mixtures thereof.

186. The coating composition, method, or perishable item of any preceding embodiment, wherein the coating composition includes one or more of benzoyl peroxide, beta carotene, clove or its derivatives, copper gluconate, copper sulfate, corn silk extract, cuprous iodide, L-cysteine, L-cysteine monohydrochloride, dextrin, diacetylmorphine, dill or its derivatives, ethyl formate, ficin, garlic or its derivatives, gluco delta-lactone, acacia (gum arabic), gum ghatti, guar gum, locust (carob) bean gum, karan gum (sterculia gum), gum tragacanth, hydrogen peroxide, inositol, isopropyl citrate, licorice or licorice derivatives, ground limestone, malt, maltodextrin, malt syrup (malt extract), methylparaben, monosodium phosphate derivatives of mono- and diglycerides, niacin, niacinamide, propyl gallate, propylene glycol, propylparaben, pyridoxine hydrochloride, riboflavin, riboflavin-5'-phosphate (sodium), rue, oil of rue, shea nut oil, sorbitol, stannous chloride (anhydrous or dehydrated), stearyl citrate, corn sugar, corn syrup, thiamine hydrochloride, thiamine mononitrate, α-Tocopherols, triacetin, tributyrin, triethyl citrate, urea, vitamin A, vitamin B12, Vitamin D, beeswax (yellow and white), candelilla wax, carnauba wax, whey, zein, or combinations thereof.

187. The coating composition, method, or perishable item of any of the preceding embodiment, wherein the coating composition includes an essential oil (e.g., any of the essential oils listed in Title 21, Chapter 1, Section 182.20 of The Code of Federal Regulations (CFR), or combinations thereof).

188. The method or perishable item of any of the preceding embodiment, wherein all, or substantially all (e.g., at least 70%, at least 80%, at least 90%, at least 95%, at least 96%, at least 97%, at least 98%, at least 99%, at least 99.9%), of the exterior surfaces of the perishable item are coated with the coating composition. For example, in some such embodiments, all, or substantially all (e.g., at least 70%, at least 80%, at least 90%, at least 95%, at least 96%, at least 97%, at least 98%, at least 99%, at least 99.9%), of the surfaces overlying or defining edible portions of the perishable item are coated with the coating composition.

189. The coating composition, method, or perishable item of any preceding embodiment, wherein the PMCA comprises vitamin B12, also known as cobalamin.

190. The coating composition, method, or perishable item of any preceding embodiment (and especially embodiment 1B and any embodiments referencing embodiment 1B), wherein the coating compositions includes one or more so called "metal driers" to, for example, enhance cure of the coating composition. If included, the one or more "metal driers" are preferably included in an efficacious amount. While not intending to be bound by any theory, it is believed that the presence of an efficacious amount of one or more metal driers may enhance crosslinking upon coating cure (e.g., by enhancing and/or inducing the formation of crosslinks between aliphatic carbon-carbon double bonds present in the ethylenically unsaturated component). Non-limiting examples of suitable metal driers may include aluminum (Al), antimony (Sb), barium (Ba), bismuth (Bi), calcium (Ca), cerium (Ce), chromium (Cr), cobalt (Co) (e.g., vitamin B12), copper (Cu), iridium (Ir), iron (Fe), lead (Pb), lanthanum (La), lithium (Li), manganese (Mn), Neodymium (Nd), nickel (Ni), rhodium (Rh), ruthenium (Ru), palladium (Pd), potassium (K), osmium (Os), platinum (Pt), sodium (Na), strontium (Sr), tin (Sn), titanium (Ti), vanadium (V), Yttrium (Y), zinc (Zn), zirconium (Zr), any other suitable rare earth metal or transition metal, as well as oxides, salts (e.g., acid salts such as octoates, naphthenates, stearates, neodecanoates, etc.) or complexes of any of these, and mixtures thereof. The amount used will depend, at least partially, upon the particular drier(s) chosen for a particular end use. In general, however, the amount of metal drier present in the coating composition, if any, may suitably be greater than about 10 parts per million ("ppm") by weight, preferably greater than about 25 ppm by weight, and more preferably greater than about 100 ppm by weight, based on the total weight of metal in the metal drier, relative to the total weight of the coating composition. The amount of metal drier may suitably be less than about 10,000 ppm by weight, preferably less than about 1,000 ppm by weight, and more preferably less than about 600 ppm by weight, based on the total weight of metal in the metal drier relative to the total weight of the coating composition. In some embodiments, the PMCA of any preceding embodiment is used as the metal drier. In embodiments in which the coating composition is edible, the metal drier is preferably one of the edible PMCAs referenced herein. In some embodiments, iron metal driers (e.g., any of the polyvalent iron compounds referenced herein) are preferred.

191a. The coating composition, method, or perishable item of any preceding embodiment, wherein an air-dried coating (7 or 14 days at 23+/−2° C. and 50+/−5% humidity) formed from the coating composition exhibits an increased water or isopropanol, or both, double rub resistance in one or more of the conditions referenced in the below test method, relative to a pertinent reference coating (e.g., an otherwise identical coating formed from a coating composition omitting one or both of the PMCA, if present in the coating composition to be evaluated, or the ethylenically unsaturated component, if present in the coating composition to be evaluated).

191b. The coating composition, method, or perishable item of embodiment 191a, wherein the coating composition includes the PMCA, and wherein a 25 micron thick (or other suitably thick coating such as a 50, 75, or 100 micron thick coating) air-dried coating (14 days at 23+/−2° C. and 50+/−5% humidity) formed from the coating composition exhibits one or both of an increased water or isopropanol double rub resistance (e.g., an increase of 1 or more, 2 or more, 3 or more, 4 or more, 5 or more, 6 or more, 7 or more, 8 or more, 9 or more, 10 or more, 11 or more, 12 or more, 13 or more, 14 or more, 15 or more, 16 or more, 17 or more, 18 or more, 19 or more, or 20 or more double rubs) relative to an otherwise identical reference coating omitting the PMCA.

191c. The coating composition, method, or perishable item of embodiment 191a or 191b, wherein the coating composition includes the ethylenically unsaturated component, and wherein a 25 micron thick (or other suitably thick coating such as a 50, 75, or 100 micron-thick coating) air-dried coating (14 days at 23+/−2° C. and 50+/−5% humidity) formed from the coating composition exhibits one or both of an increased water or isopropanol double rub resistance (e.g., an increase of 1 or more, 2 or more, 3 or more, 4 or more, 5 or more, 6 or more, 7 or more, 8 or more, 9 or more, 10 or more, 11 or more, 12 or more, 13 or more, 14 or more, 15 or more, 16 or more, 17 or more, 18 or more, 19 or more, or 20 or more double rubs) relative to an otherwise identical reference coating omitting the ethylenically unsaturated component.

192a. The coating composition, method, or perishable item of any preceding embodiment, wherein an air-dried coating (7 or 14 days at 23+/−2° C. and 50+/−5% humidity) formed from the coating composition exhibits an increased film hardness relative to a pertinent reference coating (e.g., an otherwise identical coating formed from a coating composition omitting one or both of the PMCA, if present in the coating composition to be evaluated, or the ethylenically unsaturated component, if present in the coating composition to be evaluated).

192b. The coating composition, method, or perishable item of embodiment 192a, wherein the coating composition includes the PMCA, and wherein a 25 micron thick (or other suitably thick coating such as 50, 75, or 100 micron-thick coating) air-dried coating (14 days at 23+/−2° C. and 50+/−5% humidity) formed from the coating composition exhibits an increased film hardness (e.g., an increase of 1% or more, 2% or more, 3% or more, 4% or more, 5% or more, 6% or more, 7% or more, 8% or more, 9% or more, 10% or more, 11% or more, 12% or more, 13% or more, 14% or more, 15% or more, 16% or more, 17% or more, 18% or more, 19% or more, 20% or more, 30% or more, 40% or more, or 50% or more) relative to an otherwise identical reference coating omitting the PMCA.

192c. The coating composition, method, or perishable item of embodiment 192a or 192b, wherein the coating composition includes the ethylenically unsaturated component, and wherein a 25 micron thick (or other suitably thick coating such as a 50, 75, or 100 micron-thick coating) air-dried coating (14 days at 23+/−2° C. and 50+/−5% humidity) formed from the coating composition exhibits an increased film hardness (e.g., an increase of 1% or more, 2% or more, 3% or more, 4% or more, 5% or more, 6% or more, 7% or more, 8% or more, 9% or more, 10% or more, 11% or more, 12% or more, 13% or more, 14% or more, 15% or more, 16% or more, 17% or more, 18% or more, 19% or more, 20% or more, 30% or more, 40% or more, or 50% or more) relative to an otherwise identical reference coating omitting the ethylenically unsaturated component.

193. The coating composition, method, or perishable item of any preceding embodiment, wherein the coating composition exhibits an increase (e.g., an increase of 1% or more, 2% or more, 3% or more, 4% or more, 5% or more, 6% or more, 7% or more, 8% or more, 9% or more, 10% or more, 11% or more, 12% or more, 13% or more, 14% or more, 15% or more, 16% or more, 17% or more, 18% or more, 19% or more, 20% or more) in the below Viscosity Change Test relative to a pertinent reference coating (e.g., an otherwise identical coating formed from a coating composition omitting one or both of the PMCA, if present in the coating composition to be evaluated, or the ethylenically unsaturated component, if present in the coating composition to be evaluated).

195. The coating composition, method, or perishable item of any preceding embodiment, wherein the coating composition includes a health boost additive.

196. The coating composition, method, or perishable item of any preceding embodiment wherein the coating composition include one or more of a vitamin; a probiotic; an essential oil; an edible plant extract; a *cannabis* compound or extract such as, for example, a cannabinoid (e.g., cannabidiol ("CBD")); or a combination thereof.

197. The method or perishable item of any preceding embodiment, wherein the coating is disposed on the perishable item with an average thickness of less than about 20 microns, less than about 10 microns, less than about 9 microns, less than about 8 microns, less than about 7 microns, less than about 6 microns, less than about 5 microns, less than about 4 microns, less than about 3 microns, less than about 2 microns, or less than about 1.5 microns.

198. The method or perishable item of any preceding embodiment, wherein the coating is disposed on the perishable item with an average thickness of at least about 0.01 micron, at least about 0.100 micron, at least about 0.5 micron, at least about 1 micron, at least about 1.5 microns, or at least about 2 microns.

199. The method or perishable item of any preceding embodiment, wherein the coating is disposed on the perishable item with an average thickness of about 10 nm, about 20 nm, about 30 nm, about 40 nm, about 50 nm, about 100 nm, about 150 nm, about 200 nm, about 250 nm, about 300 nm, about 350 nm, about 400 nm, about 450 nm, about 500 nm, about 550 nm, about 600 nm, about 650 nm, about 700 nm, about 750 nm, about 800 nm, about 850 nm, about 900 nm, about 950 nm, 1,000 nm, about 1,100 nm, about 1,200 nm, about 1,300 nm, about 1,400 nm, about 1,500 nm, about 1,600 nm, about 1,700 nm, about 1,800 nm, about 1,900 nm, about 2,000 nm, about 2, 100 nm, about 2,200 nm, about 2,300 nm, about 2,400 nm, about 2,500 nm, about 2,600 nm, about 2,700 nm, about 2,800 nm, about 2,900 nm, or about 3,000 nm, inclusive of all ranges there between.

200. The coating composition, method, or perishable item of any preceding embodiment, wherein the perishable item comprises a plant item (e.g., a fruit or vegetable) and the coating composition includes a ripening inhibitor.

201. The coating composition, method, or perishable item of embodiment 200, wherein the ripening inhibitor comprises an ethylene inhibitor (e.g., an ethylene scavenger, ethylene receptor antagonist or an ethylene biosynthesis inhibitor).

202. The coating composition, method, or perishable item of embodiment 201, wherein the ripening inhibitor comprises a terpene (e.g., 3-carene, camphene, caryophyllene, humulene, isoprene, limonene, myrcene, pinene (e.g. alpha pinene and beta pinene), terpinene (e.g., alpha-terpinene), terpinolene, valencene, or a mixture thereof), a derivative thereof (e.g. a terpenoid such as alpha-bisabolol, trans-cinnamaldehyde, carveol, carvone, caryophyllene, cinnamyl alcohol, eucalyptol, estragole, eugenole, geraniol, cis-2-hexene-1-ol, trans-2-hexene-1-ol, linalool, nerolidol (e.g. cis and trans nerolidol, perillaldehyde), or a mixture thereof.

203. The coating composition, method, or perishable item of embodiment 202, wherein the ripening inhibitor comprises limonene, typically d-limonene.

204. The coating composition, method, or perishable item of embodiment 203, wherein the ripening inhibitor comprises a mono-terpene.

205. The coating composition, method, or perishable item of any of embodiments 200 to 204, wherein the terpene comprises a cyclic terpene.

206. The coating composition, method, or perishable item of any of embodiment 200 to 205, wherein the ripening inhibitor comprises 1-methylcyclopropene (which may optionally be encapsulated), a complex thereof (e.g., a complex with a cyclodextrin), or a mixture thereof.

207. The coating composition, method, or perishable item of any of embodiments 200 to 206, wherein the coating composition includes, based on total solids, at least 1 ppm, at least 10 ppm, at least 20 ppm, at least 50 ppm, at least 100 ppm, at least 500 ppm, at least 1,000 ppm, at least 2,000 ppm, at least 3,000 ppm, at least 5,000 ppm, or at least 10,000 ppm of ripening inhibitor.

208. The coating composition, method, or perishable item of any of embodiments 200 to 207, wherein the coating composition includes, based on total solids, less than 50,000 ppm, less than 20,000 ppm, less than 10,000 ppm, less than 5,000 ppm, less than 3,000 ppm, less than 2,000 ppm, less than 1,000 ppm, less than 500 ppm, less than 300 ppm, less than 200 ppm, or less than 100 ppm of ripening inhibitor.

209. The method or perishable item of any of embodiments 200 to 208, wherein the plant item is a climacteric fruit.

210. The method or perishable item of any of embodiments 200 to 209, wherein the plant item is selected from apples, apricots, avocado, bananas, broccoli, carnations, carrots, cucumber, eggplant, grapes, green leafy vegetables, pears, plantains, or potatoes.

211. The method or perishable item of any of embodiments 200 to 210, wherein the ripening inhibitor is present in an efficacious amount sufficient to delay ripening (e.g., as indicated using a ripening parameter comparison relative to an analogous coated plant item with an otherwise identical coating lacking the ripening inhibitor).

212. The method or perishable item of embodiment 211, wherein the ripeness parameter (e.g., any of those disclosed herein such as, e.g., mass loss, firmness, sugar concentration, color parameter, soluble-solids, and the like) is at least 1%, at least 2%, at least 3%, at least 4%, at least 5%, at least 6%, at least 7%, at least 8%, at least 9%, or at least 10%, at least 15%, or at least 20% different (e.g., in a direction indicative of a less ripened state) relative to an otherwise identical coating lacking the ripening inhibitor over a time period (e.g., 1 day, 1 week, 10 days, 2 weeks, 3 weeks, 4 weeks, etc.) after application of the coating to a plant item.

213. The method or perishable item of any preceding embodiment, wherein the perishable item (e.g., a plant item such as a fruit or vegetable) has one or both of (i) a thicker coating (e.g., at least 5%, at least 10%, at least 15%, at least 20%, at least 25%, at least 50%, at least 75%, or 100% or more thicker than the coating thickness present on other portions of the perishable item) or (ii) a chemically-different coating that is selectively applied on a portion of the perishable item, e.g., a portion of the perishable item that is relatively more susceptible to spoilage initiation.

214. The method or perishable item of embodiment 213, wherein one or more additional layers of the coating composition are applied on the portion of the perishable item to achieve the thicker coating thickness.

215. The method or perishable item of embodiment 214, wherein the one or more additional layers are formed using a same or a chemically-different coating composition than: (a) that used to provide a base coating layer over which the one or more additional layers are disposed or alternatively or (b) that used to provide a top coat layer applied over the one or more additional layers.

216. The method or perishable item of any of embodiments 213 to 215, wherein the perishable item includes the chemically-different coating, and wherein the chemically different coating has, relative to another coating on the perishable item, a higher barrier property (e.g., relative to oxygen, carbon dioxide, and/or water vapor transmission), an increased inhibition property (e.g., due to the inclusion of a higher concentration of ripening inhibitor), an increased concentration of antimicrobial agent, greater flexibility, greater mechanical strength, and/or greater abrasion resistance.

217. The method or perishable item of any of embodiments 213 to 216, wherein the selectively applied coating is applied on and/or around a stem portion of a plant item (e.g., a stem and/or calyx button of a fruit such as an avocado). While not intending to be bound by theory, it has been observed that for certain fruits (e.g., avocado), over-ripening and spoilage tends to occur first in portions of the plant flesh adjacent to the stem area. In the case of avocados, this may be due, at least in part, due to the transition/interface between the fruit skin and the stem area and, e.g., shrinkage of the skin which may open up a gap in the interphase area and allow for increased ingress of oxygen, water vapor, ethylene gas, and/or microbial agents.

218. The method or perishable item of any of embodiments 213 to 217, wherein the selectively applied coating is applied to a portion of a plant item known to be particularly susceptible to bruising or abrasion.

219. The method or perishable item of any of embodiments 213 to 218, wherein the one or more additional layers of coating are applied first to the perishable item.

220. The method of perishable item of any of embodiment 213 to 219, wherein the one or more additional layers of coating are applied as part of a fruit packing process at a fruit processor.

221. The method or perishable item of any preceding embodiment, wherein a wash solution is used to clean and/or treat the perishable item (e.g., plant item) prior to application of the coating compositions, and wherein the wash solution includes a ripening inhibitor.

222. The method or perishable item of embodiment 221, wherein the ripening inhibitor comprises an ethylene inhibitor (e.g., an ethylene scavenger, ethylene receptor antagonist or an ethylene biosynthesis inhibitor).

223. The method, or perishable item of embodiment 220 or 221, wherein the ripening inhibitor in the wash solution comprises a terpene (e.g., trans-cinnamaldehyde, caryophyllene, cinnamyl alcohol, estragole, eugenole, cis-2-hexene-1-ol, trans-2-hexene-1-ol, humulene, isoprene, limonene, linalool, myrcene, perillalcohol, or pinene), a terpinene (e.g., alpha-terpinene), a terpinolene, or a mixture thereof), a derivative thereof (e.g., a terpenoid), or a mixture thereof.

224. The method or perishable item of embodiment 223, wherein the ripening inhibitor in the wash solution comprises limonene, typically d-limonene.

225. The method or perishable item of embodiment 224, wherein the ripening inhibitor in the wash solution comprises a mono-terpene.

226. The method or perishable item of any of embodiments 221 to 225, wherein the terpene in the wash solution comprises a cyclic terpene.

227. The method or perishable item of any of embodiments 221 to 226, wherein the wash solution has a pH of at least about 9.5 or at least about 11. (See, e.g., the wash solutions described in U.S. Pat. No. 6,831,050 or U.S. Pat. No. 6,662,813.)

228. The method or perishable item of any of embodiments 221 to 227, wherein the wash solution has a pH of less than about 12.5.

229. The method or perishable item of any of embodiments 221 to 228, wherein the wash solution is a no-rinse wash solution (see, e.g., the Antimicrobial Fruit and Vegetable Treatment (AFVT) wash solution product from Ecolab).

230. The method or perishable item of any of embodiments 221 to 229, wherein the wash solution is edible.

231. The method or perishable item of any of embodiments 221 to 230, wherein the wash solution includes an antimicrobial agent (e.g., sodium dodecylbenzenesulfonate ("SDBS", CAS Number 25155-30-0)), which is preferably present in the wash solution at a concentration of less than 111 milligrams per kilogram of wash solution, more preferably the wash solution includes SDBS in an amount of about 76 to about 111 ppm).

232. The method or perishable item of any of embodiments 221 to 231, wherein the wash solution includes lactic acid (e.g., in an amount of about 100 to about 5,000 ppm, about 750 to about 2,500 ppm, about 1,000 ppm to about 1,500 ppm, or about 1,061 ppm to about 1,391 ppm.)

233. The method or perishable item of any of embodiments 221 to 232, wherein the wash solution includes lactic acid and sodium dodecylbenzenesulfonate as active ingredients, preferably each in an efficacious amount.

234. The method or perishable item of any of embodiments 221 to 226 or 228 to 233, wherein the wash solution has a neutral or acidic pH (e.g., pH of 7 or less, 6 or less, 5 or less, 4 or less, or 3 or less).

235. The method or perishable item of any of embodiments 221 to 234, wherein the wash solution includes one or more of citric acid, limonene, ethanol, potassium hydroxide, sodium citrate, decyl glycoside, caprylyl/myristyl glycoside, calcium ascorbate, glycerin, potassium sorbate, or a combination thereof.

236. The method or perishable item of any of embodiments 221 to 235, wherein the wash solution is aqueous, optionally including one or more organic solvents such as ethanol.

237. The wash solution of any of embodiments 221 to 236.

238. A coating system including the barrier plant coating compositions of any preceding embodiment and the wash solution of any of embodiments 221 to 237.

239. The coating composition, method, or perishable item of any preceding embodiment, wherein one or more lipids and preferably all lipid materials included in the coating composition have a peroxide value, if any, of less than 30, less than 20, less than 10, less than 5, less than 4, less than 3, less than 2, less than 1, or less than 0.1 meq/kg lipid material.

240. The coating composition, method, or perishable item of any preceding embodiment, wherein the coating composition exhibits a peroxide value, if any, of less than 30, less than 20, less than 10, less than 5, less than 4, less than 3, less than 2, less than 1, or less than 0.1 meq/kg.

241. The coating composition, method, or perishable item of any preceding embodiment, wherein the coating composition or wash solution includes one or more compounds of the below Formula 2:

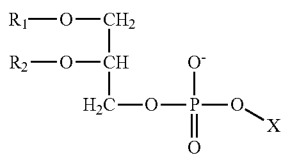

wherein:

$R_1$ and $R_2$ are each independently any suitable organic group (e.g., a saturated or unsaturated organic group having 30 or less, 25 or less, 22 or less, 20 or less, 19 or less, 18 or less, 17 or less, 16 or less, 15 or less, or 14 or less carbon atoms) or atom (e.g., hydrogen); and X is hydrogen or an organic group such as, e.g., an alkyl or cycloalkyl group that may optionally include one or more heteroatoms (e.g., O, N, and the like), wherein when X is an organic group it typically includes from 2 to 6 carbon atoms optionally in combination with one or more heteroatoms.

242. The coating composition, method, or perishable item of embodiment 241, wherein one or both of $R_1$ and $R_2$ each independently have the structure —C(═O)$R_3$, wherein $R_3$ is independently a C1 to C30 group (e.g., C1 to C30 i saturated or unsaturated carbon chain), more typically C6 to C18 or C12 to C18 group that my optionally include one or more carbon-carbon double bonds and may include one or more functional groups (e.g., —OH groups, epoxy groups, and the like as substituents).

243. The coating composition, method, or perishable item of embodiment 241 or 242, wherein one or both of $R_1$ and $R_2$ are independently provided by a saturated or unsaturated fatty acid (e.g., any of those referenced herein such as palmitic acid, stearic acid, oleic acid, linoleic acid, linolenic acid, etc.).

244. The coating composition, method, or perishable item of any of embodiments 241 to 243, wherein the compound of Formula 2 comprises one or more phosphatidic acids, one or more phosphatidylinositol, one or more phosphatidylcholine, one or more phosphatidylethanolamine, or a mixture thereof.

245. The method or perishable item of any of embodiments 1C to 154, 165 to 171, 175 to 194, 197 to 208, 213 to 219, and 221 to 244, wherein the perishable item comprises a plant cutting for subsequent vegetative reproduction to form a new plant or a cut flower or a plant liner (i.e., a plant cutting that has been rooted).

246. The method or perishable item of embodiment 245, wherein the perishable item comprises either (i) a plant cutting for forming a new plant having a stem portion with a cut end and a plurality of leaves, preferably four or more leaves or (ii) a cut flower, and wherein at least a cut stem end (and all optionally the leaves) is covered with the coating composition or a hardened coating formed from the coating composition.

247. The method or perishable item of embodiment 245 or 256, wherein the plant cutting does not include any roots.

248. The method or perishable item of any of embodiments 245 to 247, wherein the plant cutting or plant liner comprises a cutting or liner selected from: an *Aster*, a Boxwood, a Chrysanthemums, a *Poinsettia*, a *Lantana*, a *Bracteantha*, a *Calibrachoa*, a *Dahlia*, a *Dipladenia*, a Heliotrope, a *Geranium*, a *Pelargonium*, a *Mandevilla*, an *Argyranthemum*, a *Lavandula*, an *Aubrieta*, a *Verbena*, an *Impatiens*, a *Vinca*, a *Lobelia*, a *Nemesia*, a *Diascia*, an *Osteospermum*, a *Penstemon*, a *Scaevola*, an Ivy, an Authurium, a *Kalanchoe*, a Rose, a Callus, a Carnation, a *Petunia*, a cactus, a conifer, or the like.

249. The coating composition, method, or perishable item of any preceding embodiment, wherein the coating composition includes a thickener (e.g., in an additive amount efficacious for increasing viscosity, reducing or preventing tackiness or stickiness, and/or increasing stability of the coating composition such as less than 30 wt-%, less than 20 wt-%, less than 10 wt-%, or less than 5 wt-% of total solids).

250. The coating composition, method, or perishable item of embodiment 249, wherein the thickener comprises a polysaccharide (e.g., a starch, a vegetable gum, or pectin), a polypeptide, or a mixture thereof).

251. The coating composition, method, or perishable item of embodiment 250, wherein the thickener comprises guar gum, agar-agar, arrowroot starch, cornstarch, katakuri starch, potato starch, sago starch, tapioca, alginin, guar gum, locust bean gum, xantham gum, carrageenan, carboxymethyl cellulose, and mixtures thereof.

252. The coating composition, method, or perishable item of any preceding embodiment, wherein the antifoaming agent is present and comprises one or more of a silicone antifoaming agent (e.g., a polydimethylsiloxane), a non-silicone antifoaming agent, or a combination thereof.

253. The coating composition, method, or perishable item of any preceding embodiment, wherein the coating composition includes at least about 25 parts-per-billion (ppb) of fungicide, more typically at least about 50 ppb.

254. The coating composition, method, or perishable item of any preceding embodiment, wherein the coating composition includes a fungicide, and wherein the fungicide is present in an amount of no more than about 100 parts-per-million (ppm), no more than about 10 ppm, or more typically no more than about 1 ppm.

255. The coating composition, method, or perishable item of any preceding embodiment, wherein the coating composition includes an antifoaming agent (e.g., polydimethylsiloxane) in an amount of at least 0.005, at least 0.01, at least 0.05, or at least 0.1 wt-%.

256. The coating composition, method, or perishable item of any preceding embodiment, wherein the coating composition includes an antifoaming agent (e.g., e.g., polydimethylsiloxane), wherein the antifoaming agent is present in an amount of less than about 1, less than about 0.5, less than about 0.25, or less than about 0.1 wt-%.

257. The coating composition, method, or perishable item of any preceding embodiment, wherein the AHC comprises one or more of lauric acid, a salt of lauric acid, or an ingredient (e.g., an alkyl ester such as, e.g., an acyl glyceride such as monolaurin) including one or more structural units derived or derivable from lauric acid. In such embodiments, the coating composition preferably includes at least about 5, at least about 10, at least about 25, at least about 50, or at least about 75 wt-%, based on total solids, of one or more such compounds.

258. The coating composition, method, or perishable item of any preceding embodiment, wherein the coating composition includes one or more of: coconut milk, coconut water, dehydrated coconut milk, dehydrated coconut water, a coconut milk extract (e.g., with one or more compounds removed or reduced other than water), a coconut water extract (e.g., with one more compounds removed or reduced other than water), or a combination thereof.

259. The coating composition, method, or perishable item of any preceding embodiment, wherein the coating composition includes one or more polypeptides (e.g., gelatin, zein, globulin, albumin, whey protein, casein, hemp protein, brown rice protein, alfalfa protein, chia protein, pea protein, or flax protein).

260. The coating composition, method, or perishable item of embodiments 259, wherein the polypeptide comprises a globulin (e.g., a globulin of the legumin-type (11S) or vicodin-type (7S) globulin families, which are present, e.g., in pea protein), an albumin, or a mixture thereof (e.g., a mixture that comprises 50% or more (e.g., about 50-60%) of globulin and 50% or less (e.g., about 15-25%) of albumin).

261. The coating composition, method, or perishable item of embodiment 259, wherein the polypeptide is provided by, or derived from, a legume extract or isolate (e.g., a pea protein extract or isolate).

262. The coating composition, method, or perishable item of any preceding embodiment, wherein the coating composition includes an ingredient derived from *psyllium* (e.g., a *psyllium* polysaccharide composition).

263. The coating composition, method, or perishable item of any preceding embodiment, wherein the coating composition includes a polysaccharide including xylose structural units, arabinose structural units, or combinations thereof. In some such embodiments, the polysaccharide is a branched (e.g., highly branched) polysaccharide that includes a main backbone chain including xylose structural units to which arabinose and xylose side chain structural units are attached.

264. The coating composition, method, or perishable item of any preceding embodiment, wherein the coating composition includes a fiber, more typically an at least partially water-soluble fiber (e.g., dextrin such as partially or fully water-soluble dextrin, including food-grade dextrin).

265. The coating composition, method, or perishable item of any preceding embodiment, wherein the AHC comprises polyvinyl alcohol (PVOH), which may be edible in some embodiments (see, e.g., Grass Notice No. 767 on www.fda.gov).

266. The coating composition, method, or perishable item of any preceding embodiment, wherein the coating composition does not include any ingredients derived from animals (e.g., meat, fish, fowl, animal by-products (including silk or dyes form insects), egg or egg products, milk or milk products, honey or bee products, or clarified or finished with any animal products).

267. The coating composition, method, or perishable item of embodiment 266, wherein the coating composition is eligible for certified vegan status (i.e., fully complies with the 2020 certification standards of vegan.org for use of their trademarked "Certified Vegan" logo.).

268. The coating composition, method, or perishable of any of embodiments 1 to 32, 34 to 176, or 178 to 267, wherein the composition is an aqueous coating composition, preferably suitable for use on an edible perishable item, comprising:

- at least 0.2 wt-%, based on total solids in the coating composition, of an active hydrogen component comprising a lipid, a polypeptide, a polysaccharide, or a combination thereof,
- at least 50 weight percent of water;
- optionally a polyvalent metal crosslinking compound (e.g., any of those described in a previous embodiment and in any concentration disclosed in a previous embodiment); and
- optionally an antimicrobial agent (e.g., any of those described in a previous embodiment and in any concentration disclosed in a previous embodiment);
- where the coating composition is suitable for food-contact, and optionally is edible.

269. The coating composition, method, or perishable of embodiment 268, wherein the active hydrogen component includes a lipid that comprises a monoester of a fatty acid and a hydroxyl-functional compound other than glycerol, and wherein the monoester has one or more, preferably two or more, more preferably three or more active hydrogen groups (e.g., hydroxyl groups).

270. The coating composition, method, or perishable of embodiment 268 or 269, wherein the active hydrogen component includes a lipid that comprises a monoester of a fatty acid and a hydroxyl-functional compound, and wherein the monoester comprises an active hydrogen group capable of forming a salt, preferably located on the structural unit derived from the hydroxy-functional compound.

271. The coating composition, method, or perishable of embodiment 269 or 270, wherein the hydroxyl-functional compound is one or both of: (i) more polar than glycerol and (ii) more soluble in water than glycerol.

272. The coating composition, method, or perishable of any of embodiments 269 to 271, wherein the hydroxyl-functional compound is unsaturated.

273. The coating composition, method, or perishable of any of embodiments 269 to 272, wherein the hydroxyl-functional compound has three or more active hydrogen group, preferably four or more active hydrogen groups (e.g., four or more hydroxyl groups).

274. The coating composition, method, or perishable of any of embodiments 269 to 273, wherein the hydroxyl-functional compound comprises ascorbic acid.

275. The coating composition, method, or perishable of any of embodiments 269 to 274, wherein the monoester is derived from a C12 or higher fatty acid.

276. The coating composition, method, or perishable of any of embodiments 269 to 275, wherein the monoester is derived from a C20 or lower fatty acid, preferably C18 or lower, more preferably C12, C14, C16 or C18.

277. The coating composition, method, or perishable of any of embodiments 269 to 276, wherein the monoester comprises a salt (e.g., an ammonium monoester salt).

278. The coating composition, method, or perishable of any of embodiments 269 to 277, wherein the monoester comprises ascorbyl laurate, ascorbyl myristate, ascorbyl palmitate, ascorbyl stearate, a salt thereof (e.g., an ammonium salt of ascorbyl palmitate and/or an ammonium salt of ascorbyl stearate), or a combination thereof.

279. The coating composition, method, or perishable of any of embodiments 269 to 278, wherein more than 50 wt-%, more then 60 wt-%, more than 70 wt-%, more than 80 wt-%, more than 90 wt-%, more than 95 wt-%, more than 99 wt-%, or up to about 100 wt-% of the lipid present in the coating composition is the monoester of a fatty acid and a hydroxyl-functional compound other than glycerol.

280. The coating composition, method, or perishable of any preceding embodiment, wherein the coating composition, based on total solids, includes at most 10 wt-%, at most 5 wt-%, at most 2 wt-%, at most 1 wt-%, or at most 0.1 wt-%, if any, wax.

281. The coating composition, method, or perishable of any preceding embodiment, wherein the coating composition, based on total solids, includes at most 10 wt-%, at most 5 wt-%, at most 2 wt-%, at most 1 wt-%, or at most 0.1 wt-%, if any, compounds having an alkyl chain of 26 or more.

282. The coating composition, method, or perishable of any preceding embodiment, wherein the coating composition, based on total solids, includes at most 10 wt-%, at most 5 wt-%, at most 2 wt-%, at most 1 wt-%, or at most 0.1 wt-%, if any, monoester compounds not having an active hydrogen group (e.g., monoesters of a fatty acid and fatty alcohol).

283. The coating composition, method, or perishable of any preceding embodiment, wherein the coating composition includes a particular amount of dye and/or colorant.

284. The coating composition, method, or perishable of embodiment 283, wherein the dye and/or colorant provides a more standard and/or desired visual appearance across a run of treated produce.

285. The coating composition of embodiments 283 or 284 wherein the dye and/or colorant provides a treated produce lot with less variation in visual appearance across individual product items and/or an overall more desirable appearance on average for individual produce items.

Embodiment 286: Suitable barrier compositions can be prepared by combining the following:

- 50-99% by weight on solids of an acid-functional hydrophobic compound such as, for example, linoleic acid (Omega fatty acid), oleic acid, linolenic acid, capric acid, myristic acid, palmitic acid, stearic acids and mixtures;
- 0-50% by weight on solids of an acid chelating metal such as for example zinc, calcium, or magnesium. Such metals may also come from the incorporation of fruit skins or other fruit extracts;
- 0-50% by weight on solids of a crosslinking agent capable of causing a reaction of unsaturation groups present on the acid-functional hydrophobic compound such as, for example iron, or manganese;
- 0-50% by weight on solids of a neutralizing base such as, for example, ammonia, potassium, sodium, or calcium to render the mixture ability to form an emulsion with water;
- 0-50% by weight on solids of an emulsifying agent such as, for example, lecithin or sodium lauryl sulfate to render the mixture ability to form an emulsion with water;
- 0-50% by weight on solids of additives to provide improved fruit surface wetting, flexibility, adhesion such as, for example, phospholipids, mono, di, and tri glycerides, or amino acids; and
- 0-50% by weight on solids a hydrophilic material, to optimize vapor transmission such as for example glycerin or lecithin.

Embodiment 287: Suitable barrier compositions can be prepared by combining the following:

- 90-100% by weight of a mixture of 8.6 parts by weight on solids of linoleic acid and 1 part by weight on solids of zinc metal crosslinking agent (e.g., in the form of zinc ammonium carbonate); and
- 0-10% by weight an emulsifying compound.

This mixture can be emulsified in water or mixed with ethanol and applied by dip or spray onto a plant surface to yield improved barrier properties to water and/or oxygen.

Embodiment 288: Suitable barrier compositions can be prepared by combining the following:

90-100% by weight a mixture of

| Component | Run 1 | Run 2 | Rim 3 | Rim 4 |
|---|---|---|---|---|
| Linoleic acid | 2 moles | 2 moles | 2 moles | 2 moles |
| Zinc metal crosslinking agent | 1.2 mole of Zn | 1 mole of Zn | 0.75 moles of Zn | 0.5 moles of Zn; |

and 0-10% by weight an emulsifying compound.

This mixture can be emulsified in water or mixed in ethanol and applied by dip or spray onto a plant surface to yield improved barrier properties to water and/or oxygen.

Embodiment 289: Suitable barrier compositions can be prepared by combining the following:

90-100% by weight a mixture of

| Component | Run 1 | Run 2 | Run 3 | Run 4 |
|---|---|---|---|---|
| Linoleic acid | 2 moles | 2 moles | 2 moles | 2 moles |
| Zinc metal crosslinking agent | 1.2 mole of Zn | 1 mole of Zn | 0.75 moles of Zn | 0.5 moles of Zn, |

- 0-10% by weight an emulsifying compound, and
- 100 ppm of an oxidative metal drier (which is preferably edible).

This mixture can be emulsified in water or mixed in ethanol and applied by dip or spray onto a plant surface to yield improved barrier properties to water and oxygen.

Embodiment 290: Suitable barrier compositions can be prepared by combining the following:

85-95% by weight a mixture of

| Component | Run 1 | Rim 2 | Run 3 | Run 4 |
|---|---|---|---|---|
| Linoleic acid | 2 moles | 2 moles | 2 moles | 2 moles |
| Zinc metal crosslinker | 1.2 mole of Zn | 1 mole of Zn | 0.75 moles of Zn | 0.5 moles of Zn, |

0-10% by weight an emulsifying compound, and

5% plant extract (preferably edible) providing oxidative metal drier.

This mixture can be emulsified in water or mixed in ethanol and applied by dip or spray onto a plant surface to yield improved barrier properties to water and oxygen.

Embodiment 291: Based upon fruit ripeness as determined by an optical sensor, suitable barrier compositions can be prepared by combining the following to optimize ripening time:

Part A containing linoleic acid and optionally 5-10% an emulsifying agent and water or ethanol Part B containing a zinc metal crosslinker Depending on fruit ripeness, more or less Part B is added to Part A to increase or decrease barrier properties. Fruit that is riper will require less Part B.

Embodiment 292: Based upon fruit ripeness as determined by an optical sensor, suitable barrier compositions can be prepared by combining the following to optimize ripening time:

Part A containing linoleic acid and optionally 5-10% an emulsifying agent and water or ethanol Part B containing a zinc metal crosslinker and a hydrophilic component such as glycerine or lecithin.

Depending on fruit ripeness, more or less Part B is added to Part A to increase or decrease barrier properties and increase hydrophilicity. Fruit that is riper will require less Part B.

Embodiment 293: Based upon fruit ripeness as determined by an optical sensor, suitable barrier compositions can be prepared by combining the following to optimize ripening time:

Part A containing mixtures of the Runs below:

| Component | Ran 1 | Run 2 | Run 3 | Run 4 |
|---|---|---|---|---|
| Linoleic acid | 2 moles | 2 moles | 2 moles | 2 moles |
| Zinc metal crosslinking agent | 1.2 mole of Zn | 1 mole of Zn | 0.75 moles of Zn | 0.5 moles of Zn; |

and

Part B containing a hydrophilic component such as glycerine, lecithin, sucrose, sorbitol, or corn syrup.

Depending on fruit ripeness, more or less Part B is added to Part A to increase or decrease barrier properties and increase hydrophilicity. Fruit that is riper will require less Part B.

Embodiment 294: Fruit is placed in a plastic sandwich bag. A spray bottle containing a liquid plant barrier coating of lipids and glycerolipids is sprayed onto the fruit and the bag sealed. The fruit will stay fresher longer than fruit not sprayed with the barrier coating.

Embodiment 295: A spray bottle containing a plant barrier coating of lipids and glycerolipids is sprayed onto freshly made guacamole. The guacamole will discolor slower than comparative guacamole not sprayed with the barrier coating.

Embodiment 296: A spray bottle containing a plant barrier coating of lipids and glycerolipids is sprayed onto freshly made sushi roll (e.g., a California roll). The sushi roll will dry out slower (e.g., show a lower rate of mass loss) than a comparative sushi roll not sprayed with the barrier coating.

Embodiment 297: Suitable barrier compositions can be prepared by combining the following:

50-100% by weight a mixture of:

| Component | Run 1 | Run 2 | Run 3 | Run 4 |
|---|---|---|---|---|
| Linoleic acid | 2 moles | 2 moles | 2 moles | 2 moles |
| Zinc metal crosslinking agent | 1.2 mole of Zn | 1 mole of Zn | 0.75 moles of Zn | 0.5 moles of Zn; |

0-50% by weight of a glyceride which may comprise 2,3-dihydroxypropyl palmitate, 1,3-dihydroxypropan-2-yl palmitate, or a mixture thereof (See, e.g., GRAS Notice No. 648, https://www.accessdata.fda.gov/scripts/fdcc/index.cfmn?set=GRASNotices&id-648); and 0-10% by weight an emulsifying compound.

This mixture can be emulsified in water or mixed in ethanol and applied by dip or spray onto a plant surface to yield improved barrier properties to water and oxygen.

Embodiment 298: Suitable barrier compositions can be prepared by combining the following:

50-100% by weight a mixture of

| Component | Run 1 | Run 2 | Run 3 | Run 4 |
|---|---|---|---|---|
| Linoleic acid | 2 moles | 2 moles | 2 moles | 2 moles |
| Zinc metal crosslinker | 1.2 mole of Zn | 1 mole of Zn | 0.75 moles of Zn | 0.5 moles of Zn; |

and 0-50% by weight a glyceride which may comprise 2,3-dihydroxypropyl stearate (e.g., CAS Registry No. 123-94-4) or 1,3-dihydroxpropan-2-yl stearate (e.g., CAS Registry No. 621-61-4), or a mixture thereof. In some embodiments one or more of the glycerides are derived from grape seeds. A representative manufacturing process for preparation of a mixture of monoacylglycerides is provided in FIG. 2.3 of GRAS Notice No. 886 (https:/www.accessdata.fda.gov/scripts/fdcc/?set=GRASNotices&id=886), and 0-10% by weight an emulsifying compound This mixture can be emulsified in water or mixed in ethanol and applied by dip or spray onto a plant surface to yield improved barrier properties to water and oxygen.

Embodiment 299: Suitable barrier compositions can be prepared by combining the following:

50-100% by weight a mixture of:

| Component | Run 1 | Run 2 | Run 3 | Run 4 |
|---|---|---|---|---|
| Linoleic acid | 2 moles | 2 moles | 2 moles | 2 moles |
| Zinc metal crosslinking agent | 1.2 mole of Zn | 1 mole of Zn | 0.75 moles of Zn | 0.5 moles of Zn; |

0-50% by weight a glyceride which may comprise a fatty acid mono-, di-, or tri-ester of glycerol; and 0-10% by weight an emulsifying compound.

This mixture can be emulsified in water or mixed in ethanol and applied by dip or spray onto a plant surface to yield improved barrier properties to water and oxygen.

Embodiment 300: Suitable barrier compositions can be prepared by combining the following:

50-100% by weight a mixture of

| Component | Run 1 | Run 2 | Run 3 | Run 4 |
|---|---|---|---|---|
| Linoleic acid | 2 moles | 2 moles | 2 moles | 2 moles |
| Zinc metal | 1.2 mole | 1 mole | 0.75 moles | 0.5 moles |
| crosslinking agent | of Zn | of Zn | of Zn | of Zn; |

0-50% by weight a polysaccharide such as pectin (including HM, LM and mixtures of), starch, cellulose, chitin, chitosan, alginic acid, and/or salts thereof, or glycogen; and 0-10% by weight an emulsifying compound.

This mixture can be emulsified in water or mixed in ethanol and applied by dip or spray onto a plant surface to yield improved barrier properties to water and oxygen.

Embodiment 301: Suitable barrier compositions can be prepared by combining the following:

50-100% by weight a mixture of:

| Component | Run 1 | Run 2 | Run 3 | Run 4 |
|---|---|---|---|---|
| Linoleic acid | 2 moles | 2 moles | 2 moles | 2 moles |
| Zinc metal | 1.2 mole | 1 mole | 0.75 moles | 1. moles |
| crosslinking agent | of Zn | of Zn | of Zn | of Zn; |

0-50% by weight an amino-acid-based compound such as gelatin or other compound comprising of one or more amino acids (e.g., alanine, arginine, asparagine, aspartic acid, cysteine, glutamine, glutamic acid, glycine, histidine, isoleucine, leucine, lysine, methionine, phenylalanine, proline, serine, threonine, tryptophan, tyrosine, valine, asparagine/aspartic acid, and/or glutamine/glutamic acid); and 0-10% by weight an emulsifying compound.

This mixture can be emulsified in water or mixed in ethanol and applied by dip or spray onto a plant surface to yield improved barrier properties to water and oxygen.

Embodiment 302: Suitable barrier compositions can be prepared by combining the following:

50-100% by weight a mixture of:

| Component | Run 1 | Run 2 | Run 3 | Run 4 |
|---|---|---|---|---|
| Linoleic acid | 2 moles | 2 moles | 2 moles | 2 moles |
| Zinc metal | 1.2 mole | 1 mole | 0.75 moles | 0.5 moles |
| crosslinking agent | of Zn | of Zn | of Zn | of Zn: |

0-50% by weight an isolated protein such as soy protein, whey protein, or casein protein; and 0-10% by weight an emulsifying compound.

This mixture can be emulsified in water or mixed in ethanol and applied by dip or spray onto a plant surface to yield improved barrier properties to water and oxygen.

Embodiment 303: Suitable barrier compositions can be prepared by combining the following:

50-100% by weight a mixture of:

| Component | Run 1 | Run 2 | Run 3 | Run 4 |
|---|---|---|---|---|
| Linoleic acid | 2 moles | 2 moles | 2 moles | 2 moles |
| Zinc metal | 1.2 mole | 1 mole | 0.75 moles | 0.5 moles |
| crosslinking agent | of Zn | of Zn | of Zn | of Zn; |

and 0-10% by weight of an emulsifying compound.

This mixture can be emulsified in water or mixed in ethanol and applied by dip or spray onto a plant-based meat surface (e.g. a surface of a plant-based meat product from Beyond Meat, Impossible Foods, MorningStar Farms, Gardein, Tofurky, Boca Burger, Smithland Pure Farmland, Happy Little Plants, Raised & Rooted, Good Catch, or Sweet Earth Foods) to yield improved barrier properties to water and oxygen.

Embodiment 304: Suitable barrier compositions can be prepared by combining the following:

a glyceride which may comprise 2,3-dihydroxypropyl palmitate, 1,3-dihydroxypropan-2-yl palmitate, or a mixture thereof (See, e.g., GRAS Notice No. 648, https://www.accessdata.fda.gov/scripts/fdcc/index.cfm?set=GRASNotices&id=648);

and an optional emulsifying compound.

This mixture can be emulsified in water or mixed in ethanol and applied by dip or spray onto a plant-based meat surface (e.g., a surface of a plant-based meat product from Beyond Meat, Impossible Foods, MorningStar Farms, Gardein, Tofurky, Boca Burger, Smithland Pure Farmland, Happy Little Plants, Raised & Rooted, Good Catch, or Sweet Earth Foods) to yield improved barrier properties to water and oxygen.

Embodiment 305: Suitable barrier compositions can be prepared by combining the following:

a glyceride which may comprise 2,3-dihydroxypropyl stearate (e.g., CAS Registry No. 123-94-4) or 1,3-dihydroxpropan-2-yl stearate (e.g., CAS Registry No. 621-61-4), or a mixture thereof. In some embodiments one or more of the glycerides are derived from grape seeds. A representative manufacturing process for preparation of a mixture of monoacylglycerides is provided in FIG. 2.3 of GRAS Notice No. 886 (https://www.accessdata.fda.gov/scripts/fdcc/?set=GRASNotices&id=886); and optionally an emulsifying compound This mixture can be emulsified in water or mixed in ethanol and applied by dip or spray onto a plant-based meat surface (e.g., a surface of a plant-based meat product from Beyond Meat, Impossible Foods, MorningStar Farms, Gardein, Tofurky, Boca Burger, Smithland Pure Farmland, Happy Little Plants, Raised & Rooted, Good Catch, or Sweet Earth Foods) to yield improved barrier properties to water and oxygen.

B1. A kit for use by a consumer comprising:

a coating component comprising: (i) a liquid barrier coating composition (e.g., for use in forming a barrier coating on a plant item or food) or (ii) a liquid concentrate or a dry concentrate (e.g., a powder or tablet) for combining with solvent (e.g., water and/or organic solvent such as, e.g., ethanol) to form a liquid barrier coating composition (e.g., for use in forming a barrier coating on a plant item or food);

instructions for one or both of: (a) preparing the liquid barrier coating composition from the dry concentrate or (b) applying the liquid barrier coating composition on a harvested plant item, preferably a whole or minimally processed harvested fruit or vegetable, or another food (e.g., a prepared food such as guacamole, sushi or other processed fresh seafood or meat product, a plant-based meat product, cut or cubed fruit or vegetables, and the like); and optionally, a container (e.g., a bottle, bag, pouch, or other container).

B1'. A kit for use by a consumer comprising:

a ripening inhibitor, typically present in a liquid ripening inhibitor composition or a liquid concentrate or a dry concentrate (e.g., a powder or tablet);

optionally a solvent, which is typically water;

instructions for one or both of: (a) preparing a liquid ripening inhibitor composition from the ripening inhibitor and solvent, preferably water or (b) applying a ready-to-use liquid ripening inhibitor composition provided in the kit on a harvested or soon-to-be-harvested plant item, preferably a whole or minimally processed harvested fruit or vegetable, or another food (e.g., a prepared food such as guacamole, sushi or other processed fresh seafood or meat product, a cell-cultured seafood or meat product, a plant-based meat product, cut or cubed fruit or vegetables, and the like); and optionally, a container (e.g., a bottle, bag, pouch, or other container).

B2. The kit of embodiment B1 or B1', wherein the liquid barrier coating composition or liquid ripening inhibitor composition has a viscosity at room temperature of less than about 100 centipoise, preferably less than about 50 centipoise for sprayable compositions. (Viscosity in centipoise can be measured, for example, using a Brookfield LVTD #2 spindle, 60 rpm at the designated temperature (e.g., 25° C.).)

B3. The kit of embodiment B1 or B2, wherein the liquid barrier coating composition or liquid ripening inhibitor composition has a viscosity at room temperature that is more than about 2 centipoise, preferably more than about 10 centipoise when at rest, bu. t preferably thin enough under shear to permit easy dispensing, especially from consumer-type spray containers.

B4. The kit of any of embodiments B1 to B3, wherein the liquid barrier coating composition or liquid ripening inhibitor composition is sprayable.

B5. The kit of any of embodiments B1 to B4, wherein the kit includes a spray container (e.g., a plastic, glass, and/or metal spray container).

The compositions can be packaged in any suitable materials and housings known to one skilled in the art. It may be packaged as a concentrate in suitable containers or in ready-to-use dispensing systems. Thus, they can be packaged in aerosol form in conventional aerosol containers or in liquid form in trigger pump spray bottles and squeeze bottles or pump spray bottles to produce an aerosol or spray stream using a pump mechanism to build the necessary pressure to produce the aerosol or spray stream. The compositions can also be impregnated into substrates, including but not limited to, wipes, pads, sponges, foams, and cloths.

B5a. The kit of embodiment B5, wherein the spray container holds about 4 liter or less, about 3 liters or less, about 2 liters or less, about 1.5 liters or less, or about 1 liter or less of liquid product.

B5b. The kit of embodiment B5 or B5a, wherein the spray container holds at least about 100 milliliters (ml), at least about 250 ml, at least 500 ml, or at least 750 ml of liquid product.

B5c. The kit of embodiment B5, B5a, or B5b, wherein the spray container, or a portion thereof (e.g., a bottle for storing liquid product to be dispensed), comprises (e.g., is formed from) a polymer material such as, for example, Low-Density Polyethylene (LDPE), High-Density Polyethylene (HDPE), Polypropylene (PP), Polyethylene Terephthalate (PET), another polyolefin or polyester, or a combination thereof.

B6. The kit of any of embodiment B5 to B5c, wherein the spray container includes a valve.

B7. The kit of any of embodiments B5 to B6, wherein the spray container includes a manual spray pump (e.g., a container cap that include a spray pump) or other suitable means for producing a spray or mist.

B8. The kit of any of embodiments B5 to B7, wherein the spray container includes a trigger-type spray pump. See, e.g., the trigger spray mechanisms described in U.S. Pat. Nos. 4,082,223, 4,161,288, 4,558,821, 4,434,917, 4,819,835, 6,869,027, 7,017,833, 8,322,630, 10,159,997.

B9. The kit of any of embodiments B3 to B8, wherein the spray container is empty.

B10. The kit of any of embodiments B3 to B9, wherein the spray container contains the liquid barrier coating composition or the liquid ripening inhibitor composition (e.g., the container is fully filled).

B11. The kit of any of embodiments B3 to B10, wherein the spray container contains the dry or liquid concentrate (e.g., the container is partially filled).

B12. The kit of embodiment B11, wherein the spray container includes a head space and a fill indicia (e.g., a fill-line), and wherein the kit includes instructions to fill the container to the fill indicia with solvent.

B13. The kit of embodiment B12, wherein the solvent comprises water (e.g., tap-water).

B14. The kit of any of embodiments B1 to B13, wherein some or all of the instructions are present on the spray container (e.g., on a label or directly printed on the container), are attached to the spray container, are otherwise associated with the spray container or the kit (e.g., on a website associated with the spray container or another part of the kit, preferably via some indicia present on the spray container or another part of the kit), or a combination thereof.

B15. The kit of any of embodiments B1 to B14, wherein the coating component comprises any of the compositions disclosed herein (e.g., any of the compositions disclosed above in embodiments 1A to 208, 239 to 244, or 249 to 267) or the liquid ripening inhibitor composition comprises any of the compositions disclosed herein (e.g., any of the compositions of embodiments 221 to 238).

B16. The kit of any of embodiments B1 to B15, wherein the coating component comprises any of the coating compositions disclosed in WO2015/017450 (Rogers et al.), WO2016/187581 (Perez et al.), WO2017/048951 (Kaun et al.), WO2017/100636 (Perez et al.), WO2017/132281 (Holland et al.), WO2017/172951 (Rogers et al.), WO2018/009846 (Kaun et al.), WO2018/094269 (Bakus et al.), WO2019/028043 (Holland et al.), WO2019/036686 (Frazier et al.), WO2020//023319 (Hegel at. al.), or WO2020/051238 (by Braden et al.).

B17. The kit of any of embodiments B1 to B16, wherein the liquid barrier coating composition or the liquid ripening inhibitor composition is edible.

B18. The kit of embodiment B17, wherein an air-dried coating formed from the liquid coating composition is edible.

B19. The kit of embodiment B17 or B18, wherein the coating component comprises a composition in accordance with GRAS Notice No. 648 or GRAS Notice No. 886.

B20. The kit of any preceding embodiment B1 to B19, wherein the kit includes a recommendation for a wash solution to use to wash the plant item (e.g., fruit or vegetable) before coating, after coating, or both.

B21. The kit of any preceding embodiment B1 to B19, wherein the kit includes a wash solution, which may be a sanitizing solution, and is preferably capable of removing a coating formed from the liquid barrier coating composition from the plant item.

B21a. The kit of embodiment B20 or B21, wherein the wash solution is the liquid ripening inhibitor composition.

B22. The kit of any preceding embodiment, wherein the wash solution is a fruit or vegetable wash solution. Examples of commercially available fruit or vegetable wash solutions include the VEGGIE WASH line of consumer produce wash products from Beaumont Products, Inc., the FIT ORGANIC line of consumer produce wash products, the PURELY ESSENTIAL produce wash product from Environne, and the Antimicrobial Fruit and Vegetable Treatment (AFVT) line of food-service-worker produce wash products from Ecolab.

B23. The kit of any of embodiments B20 to B22, wherein the wash solution has a pH of at least about 9.5 or at least about 11. (See, e.g., the wash solutions described in U.S. Pat. No. 6,831,050 or U.S. Pat. No. 6,662,813.) B24. The kit of any of embodiments B20 to B23, wherein the wash solution has a pH of less about 12.5.

B25. The kit of any of embodiments B20 to B24, wherein the wash solution is a no-rinse wash solution (see, e.g., the Antimicrobial Fruit and Vegetable Treatment (AFVT) wash solution product from Ecolab).

B26. The kit of any of embodiments B20 to B25, wherein the wash solution is edible.

B27. The kit of any of embodiments B20 to B26, wherein the wash solution includes an antimicrobial agent (e.g., sodium dodecylbenzenesulfonate (“SDBS”, CAS Number 25155-30-0)), which is preferably present in the wash solution at a concentration of less than 111 milligrams per kilogram of wash solution, more preferably the wash solution includes SDBS in an amount of about 76 to about 111 ppm).

B28. The kit of any of embodiments B20 to B27, wherein the wash solution includes lactic acid (e.g., in an amount of about 100 to about 5,000 ppm, about 750 to about 2,500 ppm, about 1,000 ppm to about 1,500 ppm, or about 1,061 ppm to about 1,391 ppm.) B29. The kit of any of embodiments B20 to B28, wherein the wash solution includes lactic acid and sodium dodecylbenzenesulfonate as active ingredients, preferably each in an efficacious amount.

B30. The kit of any of embodiment B20 to B22 or B26 to B29, wherein the wash solution has a neutral or acidic pH (e.g., pH of about 7 or less, 6 or less, 5 or less, 4 or less, or 3 or less).

B31. The kit of any of embodiments B20 to B30, wherein the wash solution includes one or more of citric acid, limonene, ethanol, potassium hydroxide, sodium citrate, decyl glycoside, caprylyl/myristyl glycoside, calcium ascorbate, glycerin, potassium sorbate, or a combination thereof.

B32. The kit of any of embodiments B1 to B31, wherein the instructions include instructions to wash the plant item (preferably fruit or vegetable) prior to, after, or both prior to and after, application of the liquid barrier coating composition.

B33. The kit of any of embodiments B1 to B32, wherein the instructions include instructions to place the plant item in a bag or pouch, or other container, after coating or prior to coating to facilitate application of the liquid coating composition.

B34. The kit of any of embodiment Bi to B33, wherein the kit includes a produce handler to facilitate one or more of washing or coating the plant item (preferably fruits or vegetables).

B35. The kit of any of embodiments B1 to B33, wherein the kit includes a recommendation for a produce handler to facilitate one or more of washing or coating the plant item (preferably fruits or vegetables).

B36. The kit of any of embodiments B34, wherein the produce handler comprises the container (e.g., bag or pouch).

B37. The kit of any of embodiment B1 to B35, wherein the container (e.g., bag or pouch) is included in the kit.

B38. The kit of embodiment B37, wherein the kit includes a plurality of bags or pouches.

B39. The kit of any of embodiments B34 to B38, wherein the bag or pouch or produce handler contains the coating component or the ripening inhibitor.

B40. The kit of any of embodiments B34 to B39, wherein some or all of the instructions are present on the produce handler or the bag or pouch (e.g., on a label or directly printed thereon), are attached to the produce handler or the bad or pouch, are otherwise associated with the produce handler or the bag or pouch (e.g., on a website associated with the handler or bag or pouch, preferably via some indicia (e.g., a website address or a website identifier that can be accessed via a camera of a mobile computing device such as a tablet, mobile phone, or smart watch)), or a combination thereof.

B41. The kit of embodiment B39 or B40, wherein the kit includes instructions for adding solvent to the produce handler or bag or pouch (e.g., water, ethanol, or combination thereof) to form the liquid barrier coating composition or liquid ripening inhibitor composition, and wherein the produce handler or bag or pouch optionally includes an indicia (e.g., a fill-line) to assist the user in adding an appropriate amount of solvent.

B42. The kit of any of embodiments B36 to B40, wherein the bag or pouch or produce handler is configured for storing:

(i) whole fresh fruit or vegetables, (ii) cut (e.g., sliced, cubed, peeled, cored, etc.) fresh fruit or vegetables, or (iii) both of the above.

B43. The kit of any of embodiment B1 to B42, wherein the instructions provide guidance for adding an ingredient other than solvent to the coating component or ripening inhibitor.

B44. The kit of embodiment B43, wherein the ingredient is a health boost additive.

B45. The kit of embodiment B43 or B44, wherein the ingredient comprises a vitamin; a probiotic; an essential oil; an edible plant extract; a *cannabis* compound or extract such as, for example, a cannabinoid (e.g., cannabidiol (“CBD”)); or a combination thereof.

B46. The kit of embodiment B45, where the ingredient is included in the kit.

B47. The kit of any of embodiments B1 to B46, wherein the instructions provide guidance for applying the coating composition to a prepared food (e.g., by spraying the liquid barrier coating composition on a surface of the prepared food).

B48. The kit of any of embodiments B1 to B47, wherein the instructions provide guidance to apply the liquid barrier coating composition or liquid ripening inhibitor composition on a surface of a knife to be used to cut a food (e.g., a fruit or vegetable).

B49. The kit of any of embodiments B1 to B48, wherein the kit includes a wipe, a pad, a sponge, foam, or a cloth impregnated with the liquid barrier coating composition or the liquid ripening inhibitor composition.

B50. The kit of any of embodiments B21 to B49, wherein the kit includes a wipe, a pad, a sponge, foam, or a cloth impregnated (e.g., soaked) with the wash solution.

B51. The kit of embodiment B50, wherein the wipe, pad, sponge, foam, or cloth releases at least 50%, at least 65%, at least 75%, at least 80%, at least 85%, or at least 90% of the wash solution when fully squeezed in a hand using a typical hand-pressure.

B52. The kit of embodiment B50 or B51, wherein the wipe, pad, sponge, foam, or cloth comprises fibers.

B53. The kit of any of embodiments B50 to B52, wherein the wipe, pad, sponge, foam, or cloth comprises a woven, non-woven, or knit fabric.

B54. The kit of any of embodiments B50 to B53, wherein the wipe, pad, sponge, foam, or cloth comprises polyester, polyolefin (e.g., polypropylene, nylon, cotton, rayon, acrylic, or a combination thereof.

B55. The kit of any of embodiment B5 to B54, wherein the spray container includes: (i) an adjustable tip with two or more spray settings or (ii) two or more removable spray tips of differing spray configurations.

B56. The kit of any of embodiment B1 to B55, wherein the instructions include guidance to apply a thicker coating on certain foods than other foods (e.g., application of more coating composition on a food more prone to rapid ripening, drying out, or other spoilage).

B57. The kit of any of embodiments B1 to B56, wherein the kit includes a ready-to-use liquid barrier coating composition and/or ready-to-use liquid ripening inhibitor composition.

B58. The kit of any of embodiment B1 to B57, wherein the instructions provide guidance for making a produce handler to facilitate application of the liquid barrier coating composition and/or the liquid ripening inhibitor composition to food.

B59. The kit of any of embodiments B1 to B58, wherein the instructions provide guidance to spray a wrap (e.g., a plastic wrap such as saran wrap), a food (e.g., a cut fruit or vegetable or other prepared food such as sushi, seafood, a meat, a meat product, a cell-cultured meat product, or a plant-based meat product such as a plant-based meat product front Impossible Meat or Beyond Meat), or both, prior to wrapping the food with the wrap.

B60. The kit of any embodiment B1 to B59, wherein the instructions provide guidance to accelerate ripening of a plant or food item.

B61. The kit of any embodiment B1 to B60 wherein the barrier coating accelerates ripening of a plant or food item.

B62. The kit of any of embodiments B1' to B61, wherein the kit includes a dispenser for dispensing a volume (e.g., a small volume such as a drop) of the ripening inhibitor.

B63. The kit of embodiment B62, wherein the dispenser is configured to dispense a drop at a time (e.g., an eye dropper).

C1. A method comprising:

causing a user (e.g., a restaurant or cafeteria worker or other food-service worker, an individual retail consumer, a farmers market worker, a CSA worker, or a small independent farmer) to apply a liquid barrier coating composition (e.g., any of those disclosed herein such as, e.g., any of those referenced in embodiments A1 to 251) on a food or plant item (e.g., any of the food or plant items referenced herein), and optionally causing the user to apply a wash solution to the food or plant item prior to applying the liquid barrier coating composition.

C2. The method of embodiment C1, wherein the food or plant item comprises a harvested fruit or vegetable (or alternatively a soon-to-be harvested fruit or vegetable).

C3. The method of embodiment C1, wherein the food or plant item comprises a prepared food (e.g., guacamole, cut (e.g., sliced, cubed, peeled, and/or cored) fruit or vegetable, sushi or fresh seafood, plant-based meat, or meat product).

C4. The method of any of embodiments C1 to C3, wherein the food comprises an uncooked seafood (e.g., scallops, fish (e.g., whole or filleted), mollusks (including any recited hereinafter), shrimp, squid, clams, crab, oysters, abalone, snails, and the like).

C5. The method of any of embodiments C1 to C4, wherein the plant item comprises a non-edible plant item that has been harvested or will soon be harvested such as, for example, flowers and other plant cuttings (e.g., plant stem cutting or leaf cuttings for use in vegetatively propagating new plants).

C6. The method of any of embodiments C1 to C5, wherein causing comprises marketing a barrier coating product (e.g., the liquid barrier coating composition or a dry or liquid concentrate for use in forming the liquid barrier coating composition) to the user for the end use.

C7. The method of any of embodiment C1 to C5, wherein causing comprises providing an instruction on a barrier coating composition product or kit containing such product or otherwise communicating an instruction regarding the barrier coating product to a user (e.g., on a website, technical data sheet, safety data sheet, or the like).

C8. The method of embodiment C6 or C7, wherein the marketing includes providing an indication to coat any of the plant items or food product referenced herein with the liquid barrier coating composition.

C9. The method of any of embodiments C1 to C7, wherein causing comprises indicating that the liquid barrier coating composition either prior to application, after application to form a coating, or both is food-contact-safe and/or edible.

C10. The method of any of embodiments C1 to C8, further comprising causing the user to wash a plant item prior to coating using a wash solution (e.g., a wash solution other than just tap water such as, e.g., any of the wash solutions referenced herein).

C11. The method of C1 to C10, wherein the method includes causing the user to coat (and optionally wash prior to coating) a food (e.g., a fruit or vegetable) prior to harvest (e.g., a day prior to harvest, the day of harvest, or immediately prior to harvest).

C12. The method of C1 to C11, wherein the method includes causing the user to coat (and optionally wash prior to coating) a plant item (e.g., a flower or other plant cutting) prior to harvest (e.g., a day prior to harvest, the day of harvest, or immediately prior to harvest).

C13. The method of any of embodiments C1 to C12, wherein the user comprises a farmer, e.g., a small independent produce farmer such as a farmers market farmer, a CSA farmer, or an orchard grower.

C14. The method of any of embodiments C1 to C11, wherein the user is a food-service kitchen worker (e.g., a restaurant or cafeteria kitchen worker).

C15. The method of any of embodiments C1 to C12, wherein the user comprises an in-person, or "brick-and-mortar", retail consumer and/or online retail consumer (e.g., a retail customer of a retailer such as Amazon, Target, Walmart, Costco, Sam's Club, Lowes, Home Depot, Ace Hardware, a grocery store, an online subscription box service, or a plant nursery).

C16. The method of any of embodiments C1 to C14, wherein the user comprises a customer or potential customer of a direct-to-consumer sales or marketing organization or a direct-to-consumer multi-level marketing organization (e.g., Amway, Avon Products Inc., Norwex, Pampered Chef, Herbalife, Tupperware, infomercial providers, home shopping television networks (e.g., QVC), and the like).

C17. The method of embodiment C16, wherein causing includes providing and/or facilitating a personal demonstration and/or home party to the customer and/or potential customer.

C18. The method of any embodiment C1 to C17, wherein the user accelerates ripening of a plant or food item.

C19. The method of any embodiment C1 to C18, wherein the liquid barrier coating accelerates ripening of a plant or food item.

C20. The method of any of embodiments C1, C5 to C10, C12, or C13, wherein the liquid barrier composition includes one or more of a fungicide or plant hormone or regulator.

D1. A method of coating a plant surface comprising: assessing (e.g., measuring or identifying) a characteristic of a plant item, which can optionally comprise assessing two or more different characteristics of a plant item; adjusting one or both of a wash characteristic or a coating characteristic (e.g., a crosslinking parameter, coating solids, an amount of applied coating per substrate area, a ripening agent, a ripening inhibitor, etc.) of a plant barrier coating composition as a function of the assessed plant item characteristic (e.g., a carbon dioxide level, an oxygen level, an ethylene level, a sugar level, an acid level, a firmness level, a color indicator or other visual indicator, whether the plant item has been treated with a ripening agent such as ethylene gas, whether the plant item has been treated with a ripening inhibitor such as, e.g., an ethylene receptor antagonist, etc.); and applying a liquid barrier coating composition to at least a portion of a surface of the plant item.

D1a. The method of embodiment D1, wherein the coating characteristic is adjusted.

D2. The method of embodiment D1 or D1a, further comprising hardening (e.g., drying) the liquid barrier coating composition to form a coating (preferably wherein all or substantially all of any liquid carrier has been removed).

D3. The method of embodiment D2, wherein the step, or steps, of hardening the coating composition comprises one or more of: storing, drying, heating (i.e., above ambient temperature), UV curing, or e-beam curing.

D4. The method of any of embodiments D1 to D3, wherein assessing the plant item characteristic comprises measuring or identifying a characteristic associated with a sample of plant items, preferably a representative sample of plant items, from a population of harvested plant items, and coating the population of harvested plant items with the liquid barrier coating composition selected or modified based on the one or more characteristics.

D5. The method of any of embodiments D1 to D4, wherein the assessed plant item characteristic is an indicator of ripeness level.

D6. The method of any of embodiments D4 or D5, wherein the assessed plant item characteristic comprises an acid level (e.g., total acid, ascorbic acid, etc.), a sugar level (e.g., a degrees Brix, commonly abbreviated as Bx°), a ratio of sugar to acid, a level of soluble solids, a color parameter (e.g., a color intensity, a fraction of surface area that is a particular color, etc.), a visible indicator, a gas amount (e.g., an internal or emitted gas amount such as, e.g., carbon dioxide, ethylene, oxygen, or water vapor), vitamin content, internal color (e.g., for certain tomatoes or mangos), lycopene content (e.g., for tomatoes), prevalence of cotyledons (e.g., for certain beans or onions), wall thickness (e.g., for bell peppers), starch content, or a combination thereof.

D7. The method of any of embodiments D1 to D6, wherein adjusting the coating characteristic comprises selecting a particular coating composition out of a plurality of chemically-different coating composition options (e.g., a coating composition inventory).

D8. The method of any of embodiments D1 to D6, wherein adjusting the coating characteristic comprises modifying a base coating composition.

D9. The method of any of embodiments D1 to D7, wherein the coating composition is selected or modified to include an additive.

D10. The method of any of embodiments D9, wherein the coating composition is selected or modified to include a concentration of a particular additive (e.g., any of those disclose herein such as, for example, a cross-linking related agent (e.g., a PMCA, an ethylenically unsaturated component, and/or an AHC preferably reactive with the polyvalent metal crosslinking reaction), an adhesion promoter, a wetting agent, etc.).

D11. The method of any of embodiments D1 to D6 or D8 to 10, wherein adjusting a coating characteristic comprises combining two or more chemically different parts.

D12. The method of any of embodiment D11, wherein the two or more chemically different parts are combined in a particular ratio.

D13. The method of embodiment D11 or D12, wherein one of the parts is a base coating composition and the other of the one or more parts is a modifier component (e.g., to add an additive to the base coating composition that is not present in the base coating composition, to increase a concentration of an ingredient present in the base coating composition, or to dilute (i.e., decrease) a concentration of an ingredient present in the base coating composition).

D14. The method of any of embodiments D1 to D13, wherein the average chain length of carbon atoms in a fatty acid portion (e.g., in a free fatty acid or salt thereof and/or fatty acid chain of a mono-, di-, or tri-glyceride or other esterified fatty acid compound) of the coating composition is increased or decreased.

D15. The method of embodiment D10 or D14, wherein a first coating part includes a first fatty acid portion and a second coating part includes a second fatty acid portion, and wherein a carbon chain length (including the carbonyl carbon) of the first fatty acid portion differs from a carbon chain length (including the carbonyl carbon) of the second fatty acid portion by at least 1, at least 2, at least 3, at least 4, at least 5, at least 6, at least 7, at least 8, or 9 or more carbon atoms.

D16. The method of embodiment D14 or D15, wherein the average chain length of carbon atoms in the coating composition is adjusted to a desired level by blending the at least first and second coating parts in a particular ratio.

D17. The method of any of embodiments D1 to D16, wherein the coating composition is selected or modified to provide a coating (preferably a continuous or substantially continuous hardened coating) on the harvested plant items that has an increased permeability (e.g., 1% or more, 2% or more, 3% or more, 4% or more, 5% or more, 7% or more, 10% or more, 12% or more, 15% or more, 20% or more, 25% or more, 30% or more, 35% or more, 40% or more, 45% or more, 50% or more, 60% or more, 70% or more, 80% or more, 90% or more, 100% or more, 150% or more, 200% or more, 250% or more, or 300% or more) to one or more, two or more, three or more, or all of: water vapor, oxygen, carbon dioxide, or ethylene gas relative to a reference coating (e.g., a coating formed from an appropriate base coating composition).

D18. The method of any of embodiments D1 to D17, wherein the coating composition is selected or modified to provide a coating (preferably a continuous or substantially continuous hardened coating) on the harvested plant items that has a decreased permeability (e.g., 1% or less, 2% or less, 3% or less, 4% or less, 5% or less, 7% or less, 10% or less, 12% or less, 15% or less, 20% or less, 25% or less, 30% or less, 35% or less, 40% or less, 45% or less, 50% or less, 60% or less, 70% or less, 80% or less, 90% or less, or 95% or less to one or more, two or more, three or more, or all of water vapor, oxygen, carbon dioxide, or ethylene gas relative to a reference coating (e.g., a coating formed form an appropriate base coating composition).

D19. The method of any of embodiments D1 to D18, wherein the coating composition is selected or modified to provide a greater amount of crosslinking.

While not intending to be bound by theory, a greater amount of crosslinking is believed to decrease one or more permeabilities (e.g., water vapor, oxygen, carbon dioxide, or ethylene gas permeabilities) or solubilities (e.g., water solubility) of a hardened coating formed from the coating composition in most instances.

D20. The method of embodiment D19, wherein the coating composition is selected or modified to provide an increased amount of one or more crosslinking-related agents such as, for example, an ethylenically unsaturated component (preferably any of those disclosed herein, e.g., in embodiments A1 to 267, such as an unsaturated fatty acid or salt thereof or fatty acid ester such as, e.g., an unsaturated mono-glyceride), an AHC (preferably any of those disclosed herein, e.g., in embodiments A1 to 267, such as a dimer fatty acid or other carboxyl-functional active hydrogen compound), or a metal compound (preferably any of the polyvalent metal crosslinking compounds disclosed herein, e.g., in embodiments A1 to 267, such as an iron, calcium, manganese, or zinc compound, or plant edible extract containing one or more such compounds).

D21. The method of embodiment D19 or D20, wherein the amount of crosslinking is increased by an amount that causes the water-solubility of a coating formed from the coating composition (preferably a continuous or substantially continuous hardened coating) to decrease by at least 0.1%, at least 0.5%, at least 1%, at least 2%, at least 3%, at least 4%, at least 5%, at least 6%, at least 7%, at least 8%, at least 9%, at least 10%, at least 15%, at least 20%, at least 25%, at least 30%, at least 40%, at least 50%, at least 60%, at least 70%, or at least 80%.

D22. The method of any of embodiments D19 to D21, wherein a hardened coating formed from the coating composition exhibits an increased gel fraction (e.g., at least 0.1% greater, at least 0.5% greater, at least 1% greater, at least 2% greater, at least 3% greater, at least 4% greater, at least 5% greater, at least 6% greater, at least 7% greater, at least 8% greater, at least 9% greater, at least 10% greater, at least 11% greater, at least 12% greater, at least 13% greater, at least 14% greater, at least 15% greater, at least 16% greater, at least 17% greater, at least 18% greater, at least 19% greater, or at least 20% greater) relative to an otherwise identical coating formed under identical conditions from a coating composition omitting the polyvalent metal crosslinker compound.

D23. The method of any of embodiments D1 to D18, wherein the coating composition is selected or modified to provide a reduced amount of crosslinking.

D24. The method of embodiment D23, wherein the coating composition is selected or modified to include a decreased amount of one or more crosslinking-related agents such as, for example, an ethylenically unsaturated component (preferably any of those disclosed herein, e.g., in embodiments A1 to 267, such as an unsaturated fatty acid or salt thereof or unsaturated fatty acid ester such as, e.g., an unsaturated mono-glyceride), an AHC (preferably any of those disclosed herein, e.g., in embodiments A1 to 267, such as a dimer fatty acid or other carboxyl-functional active hydrogen compound), or a metal compound (preferably any of the polyvalent metal crosslinking compounds disclosed herein, e.g., in embodiments A1 to 267, such as an iron, calcium, manganese, or zinc compound, or plant edible extract containing one or more such compounds).

D25. The method of any of embodiments D1 to D24, wherein the plant item comprises a harvested plant item.

D26. The method of any of embodiments D1 to D25, wherein the plant item comprises a seed, a bulb, a tuber, a corm, a rhizome, a root, a plant cutting, a plant seedling, or a flower (e.g., a cut flower).

D27. The method of any of embodiments D1 to D26, wherein the plant item comprises an edible plant item.

D28. The method of any of embodiments D1 to D27, wherein the edible plant item comprises a fruit (typically a freshly harvested fruit), a vegetable (typically a freshly harvested vegetable), a grain, or a seed.

D29. The method of embodiment D28, wherein the edible plant item comprises a fruit such as, e.g., an akee, an apple, an apricot, an avocado, a banana, a blackberry, a blueberry, a carambola, a cherry, a coconut, a cranberry, a citrus fruit (e.g., a lemon, a lime, an orange, a mandarin, or a grape fruit), a cucumber (e.g., an English cucumber), a durian, an eggplant, a fig, a grape, a guava, a kiwi, a lychee, a mango, a melon (e.g., a watermelon, a cantaloupe, a honeydew, or a muskmelon), a nectarine, a *papaya*, a passionfruit, a peach, a peapod, a pear, a persimmon, a pineapple, a pepper (e.g., a bell peppers, a habanero pepper, a jalapeño pepper, a poblano pepper, or a serrano pepper), a plum, a pluot, a pomegranate, a raspberry, a strawberry, a squash (e.g., a pumpkin, an acorn squash, a butternut squash, a spaghetti squash, or a zucchini), a tomato, or an uchuva.

D30. The method of embodiment D29, wherein the fruit comprises a whole fruit.

D31. The method of embodiment D29 or D30, wherein the fruit comprises a climacteric fruit.

D32. The method of embodiment D29 or D30, wherein the fruit comprises a non-climacteric fruit.

D33. The method of any of embodiments D1 to D28, wherein the edible harvested plant item comprises a vegetable such as, e.g., asparagus, basil, beans (e.g., green beans), broccoli, Brussels sprouts, cabbage, carrots, cauliflower, celery, cilantro, corn, garlic, green onions, lettuce, other leafy greens, leeks, onions, mushrooms, parsley, potatoes, shallots, spinach, sweet potatoes, or yams.

D34. The method of any of embodiments D27 to D33, wherein the coating composition is applied to at least a portion of a removable skin (e.g., removable peel).

D35. The method of any of embodiments D27 to D33, wherein the coating composition is applied to at least a portion of an inedible skin (e.g., an avocado peel, a banana peel, etc.).

D36. The method of any of embodiments D1 to D35, wherein the plant item to be coated is treated with UV light prior to coating.

D37. The method of any of embodiments D1 to D36, wherein applying the coating composition comprises spraying (which can comprise misting) the coating composition onto the plant item (preferably a freshly harvested plant item).

D38. The method of embodiment D37, wherein the coating composition is sprayed onto the plant item using any of the methods or equipment disclosed in WO2015/017450 (Rogers et al.), which is incorporated herein by reference in its entirety.

D39. The method of any of embodiments D1 to D36, wherein applying the coating composition onto the plant item comprises dipping the plant item into the liquid barrier coating composition (e.g., dipping once, twice, or three or more times, with optional hardening between one or more applications of the coating composition).

D40. The method of any of embodiments D1 to D36, wherein applying the liquid barrier coating composition to the plant item comprises coating the plant item using a curtain (or "waterfall") coating process. Typically, such curtain coating processes entail transporting the plant item through a flowing curtain of the liquid barrier coating composition to coat the plant item.

D41. The method of any of embodiments D1 to D36, wherein applying the liquid barrier coating composition to the plant item comprises brushing or rolling the coating composition onto the plant item.

D42. The method of any of embodiments D1 to D41, wherein a roller-containing conveyor and/or dispensing and/or inspection system is used (see, e.g., the systems of WO2019/028043 (Holland et al.) or WO2020023319 (Hegel at. al.), each of which is incorporated herein by reference in its entirety).

D43A. The method of any of embodiments D1 to D42, wherein prior to coating, a gloss coating characteristic of the liquid plant barrier coating composition is modified or a liquid barrier coating composition having a particular gloss coating characteristic is selected, preferably such that a hardened coating formed from the coating composition on the plant items exhibits a gloss that is substantially similar to that exhibited by the plant item prior to coating (e.g., a gloss within 30%, within 20%, within 15%, within 10%, or within 5% of a gloss of a surface of the plant item prior to coating), wherein the gloss is measured at one or more angles such as, for example, 60°. An example of a piece of equipment for assessing the glossiness (e.g., at 60°) of the surface of plant items (e.g., fruit and vegetables) is the Elcometer 400 Nova-Curve glossmeter for curved surfaces (commercially available from Elcometer of Nova, Michigan).

D43B. The method of any of embodiments D1 to D42, wherein after coating, a gloss of the hardened coating on the plant item is changed (e.g., to be within 30%, within 20%, within 15%, within 10%, or within 5% of a gloss of a surface of the plant item prior to coating), wherein the gloss is measured at one or more angles such as, for example, 60°. An example of a piece of equipment for assessing the glossiness (e.g., at 60°) of the surface of plant items (e.g., fruit and vegetables) is the Elcometer 400 Nova-Curve glossmeter for curved surfaces (commercially available from Elcometer of Nova, Michigan).

D44. The method of embodiment D43B, wherein the gloss of the coating is changed via brushing the coating, typically after hardening (e.g., to be within 30%, within 20%, within 15%, within 10%, or within 5% of the glossiness of surface plant item prior to coating), see, e.g., the equipment and methods of U.S. Pat. No. 9,648,890 (Nussinovitch et al.), which is incorporated herein by reference in its entirety.

D45. The method of any of embodiment D1 to D44, wherein the coating composition is selected or modified to provide a coating composition having a desired pH level (e.g., as a function of the type of the plant item to be coated and/or the condition of the plant item to be coated).

D46. The method of any of embodiments D1 to D45, wherein the liquid barrier coating composition applied to the plant item, or a base coating composition used to form the liquid barrier coating composition, is any of the coating compositions of embodiments 1A to 208, 239 to 244, or 249 to 267.

D47. The method of any of embodiment D1 to D46, wherein a sensor (or a plurality of sensors: e.g., 2 or more, 3 or more, 4 or more, 5 or more, and so on, of the same or different sensor types) is used to assess a plant characteristic (or a plurality of plant characteristics) of the plant item, which is preferably one or more ripeness parameters, one or more quality parameters, or a combination thereof.

D48. The method of embodiment D47, wherein the sensor is a firmness sensor, more preferably a non-destructive firmness sensor (e.g., a sensor for measuring a level of firmness of a fruit or vegetable without damaging the fruit or vegetable).

D49. The method of embodiment D48, wherein the hardness sensor comprises an acoustical firmness sensor, an impact measurement firmness sensor, or a sensor capable of doing both. An example of a commercially available firmness sensor with both acoustical firmness and impact firmness measurement capabilities is the AFS sensor from Aweta G&P B.V. of Pinjacker, Netherlands. See also, e.g., U.S. Pat. No. 6,539,781, which discusses sensing methods and sensors for measuring the firmness of produce such as fruit via tapping of the produce.

D50. The method of any of D47 to D49, wherein the sensor is capable of providing an output indicative of an internal or external gas concentration of the plant item. See, e.g., U.S. Pat. No. 9,739,737 (Swager et. al) and U.S. Pub. No. 2016/0231267 (Swager et al.), each of which is incorporated herein by reference in its entirety, for discussion of sensors and methods for measuring the amount of ethylene gas associated with a plant item.

D51. The method of any of embodiments D47, wherein the sensor is capable of providing an output indicative of a color parameter and/or other visible characteristic of the plant item (e.g., a color parameter indicative of a level of fruit or vegetable ripeness such as, for example, a hue angle).

D52. The method of any of embodiments D47 to D451, wherein the sensor comprises an optical sensor.

D53. The method of embodiment 52, wherein the optical sensor comprise an image acquisition device (e.g., a still and/or video camera).

D54. The method of any of embodiments D47 to D53, wherein the sensor comprises a spectrophotometer.

D55. The method of any of embodiments D47 to D54, wherein the sensor comprises a photo-acoustic sensor (e.g. the Sensor Sense EDT-300 device or the Gasera F10 device)

capable of measuring a gas concentration, preferably one or more of an ethylene gas concentration, an oxygen concentration, or a carbon dioxide concentration.

D56. The method of any of embodiments D47 to D55, wherein the sensor comprises a catalytic sensor capable of measuring a gas concentration, preferably one or more of an ethylene gas concentration, an oxygen concentration, or a carbon dioxide concentration. For example, the ETH1010 instrument (commercially available from Fluid Analytics LLC of Cle Elum, Washington) is capable of measuring ethylene gas concentration associated with fresh produce via catalytic sensing.

D57. The method of any of embodiments D47 to D56, wherein the sensor comprises an infrared sensor. In some embodiment the infrared sensor is configured to measure infrared light reflected off the plant item (e.g., infrared light emitted by a near infrared reflectance (NIR) device and reflected from the plant item). For discussion of such sensors and sensing methods see, for example, U.S. Pat. No. 10,408,748 (Schwartzer et al.) and U.S. Pub. No. 2019/0340749 (Schwartzer et al.), each of which are incorporated by reference in its entirety.

D58. The method of any of embodiment D47 to D57, wherein the sensor comprises a gloss meter.

D59. The method of any of embodiments D47 to D58, wherein two or more, three or more, or four or more different sensor types are used to assess multiple plant characteristics associated with the plant item.

D60. The method of any of embodiments, D47 to D59, wherein an output of the sensor, or optionally outputs of a plurality of sensors, is provided to a processing device (e.g., a computer processor).

D61. The method of embodiment D60, wherein the processing device processes the output and provides a coating composition recommendation (e.g., a selection of a coating composition or a recommendation or instruction for a modification of a base coating composition).

D62. The method of embodiment D61, wherein the coating composition recommendation comprises an instruction for a coating composition to be formed from multiple separate components (e.g., by combining two or more feedstock compositions in a particular ratio based on the coating composition recommendation) to, for example, vary the amount of crosslinking in the final coating and/or the level of hydrophobicity of the final coating and/or increase or decrease any of the other coating characteristics referenced herein.

D63. The method of embodiment D61 or D62, wherein the coating composition recommendation comprises an instruction affecting a thickness of a coating applied on the plant item.

D64. The method of any of embodiments D61 to D63, wherein a plant item is coated pursuant to the coating composition recommendation.

D65. The method of any of embodiments D1 to D64, wherein all, or substantially all (e.g., at least 70%, at least 80%, at least 90%, at least 95%, at least 96%, at least 97%, at least 98%, at least 99%, at least 99.9%), of the exterior surfaces of the plant item are coated with the coating composition.

D66. The method of and of embodiments D1 to D65, wherein all, or substantially all (e.g., at least 70%, at least 80%, at least 90%, at least 95%, at least 96%, at least 97%, at least 98%, at least 99%, at least 99.9%), of the surfaces overlying or defining edible portions of the plant item are coated with the coating composition.

D67. The method of any of embodiments D47 to D66, wherein the one or more sensors are selected from metal-oxide gas sensor(s), electrochemical gas sensor(s), conducting/composite polymer gas sensor(s), photoacoustic gas sensor(s), piezoelectric gas sensors(s), infrared gas sensor(s), photoionization detector gas sensor(s), or combinations thereof.

D68. The method or plant item of any of embodiments D1 to D67, wherein the coating is disposed on the plant item with an average dry coating thickness of less than about 20 microns, less than about 10 microns, less than about 9 microns, less than about 8 microns, less than about 7 microns, less than about 6 microns, less than about 5 microns, less than about 4 microns, less than about 3 microns, less than about 2 microns, or less than about 1.5 microns.

D69. The method or plant item of any of embodiments D1 to D68, wherein the coating is disposed on the plant item with an average dry coating thickness of at least about 0.01 micron, at least about 0.100 micron, at least about 0.5 micron, at least about 1 micron, at least about 1.5 microns, at least about 2 microns.

D70. The method or plant item of any of embodiments D1 to D69, wherein the coating is disposed on the plant item with average dry coating thickness of about 10 nm, about 20 nm, about 30 nm, about 40 nm, about 50 nm, about 100 nm, about 150 nm, about 200 nm, about 250 nm, about 300 nm, about 350 nm, about 400 nm, about 450 nm, about 500 nm, about 550 nm, about 600 nm, about 650 nm, about 700 nm, about 750 nm, about 800 nm, about 850 nm, about 900 nm, about 950 nm, 1,000 nm, about 1,100 nm, about 1,200 nm, about 1,300 nm, about 1,400 nm, about 1,500 nm, about 1,600 nm, about 1,700 nm, about 1,800 nm, about 1,900 nm, about 2,000 nm, about 2,100 nm, about 2,200 nm, about 2,300 nm, about 2,400 nm, about 2,500 nm, about 2,600 nm, about 2,700 nm, about 2,800 nm, about 2,900 nm, or about 3,000 nm, inclusive of all ranges therebetween.

D71. The method of any of embodiments D1 to D70, wherein the coating composition is selected or modified to include an increase in hydrophilicity (e.g., as indicated by a decrease in contact angle that deionized water exhibits with a hardened coating formed from the coating composition).

D72. The method of any of embodiments D1 to D71, wherein the coating composition is selected or modified to include an increase in hydrophilic material (e.g. glycerol, lipid, lecithin, sodium lauryl sulfate, etc.).

D73. The method of any of embodiments D1 to D72, wherein the coating composition is selected or modified to include an increase in plasticizer.

D74. The method of embodiments D73, wherein the plasticizer comprises a polyol, preferably a polyol having a molar mass of less than 500 g/mol, less than 400 g/mol, less than 300 g/mol, less than 200 g/mol, or less than 100 g/mol.

D75. The method of embodiments D73 or D74, wherein the plasticizer comprises glycerol, a fatty acid, an oil (preferably an edible oil, more preferably an edible plant-based oil), sorbitol, propylene glycol, triethyl citrate, triacetin, polyethylene glycols (e.g., having number average molecular weights of 400 to 10,000), diethyl sebacate, dibutyl sebacate, glycol monostearate, or a mixture thereof.

E1. A computer readable storage device storing data instructions that, when executed by a processing device, cause the processing device to perform operations comprising: receive an input from one or more sensors, wherein the input comprises a measurement or identification associated with a plant item to be coated (e.g., any of those previously disclosed herein such as, e.g., in any of embodiments D1 to D75, preferably an edible fruit or vegetable, more preferably a harvested edible fruit or vegetable); and generate a coating recommendation or instruction.

E2. The computer readable storage device of embodiment E1, wherein the instruction further causes the processing device to output the coating recommendation or instruction.

E3. The computer readable storage device of embodiment E1 or E2, wherein the generated recommendation or instruction comprises a modification for a base coating composition (see, e.g., any of the base coating compositions referenced in embodiment series "D").

E4. The computer readable storage device of any of embodiments E1 to E3, wherein the generated recommendation or instruction relates to crosslinking of a liquid barrier coating composition (e.g., an edible such coating composition) for coating a plant item (e.g., a fruit or vegetable).

E5. The computer readable storage device of any of embodiments E1 to E4, wherein the generated recommendation or instruction relates to a coating thickness of a coating to be applied to a plant item.

E6. The method of any of embodiment E1 to E5, wherein the generated instruction or recommendation relates to a liquid barrier coating composition to be formed from multiple separate components (e.g., by combining two or more feedstock compositions in a particular ratio based on the coating composition recommendation) to, for example, vary the amount of crosslinking in the final coating and/or the level of hydrophobicity of the final coating and/or increase or decrease any of the other coating characteristics referenced herein.

E7. The computer readable storage device of any of embodiments E1 to E6, wherein the generated recommendation or instruction relates to selection of a barrier coating composition from a plurality of options (e.g., from an inventory of different coating compositions).

E8. The computer readable storage device of any of embodiments E1 to E7, wherein the instructions further cause the at least one processing device to identify the type of plant item to be coated.

E9. The computer readable storage device of any of embodiments E1 to E8, wherein the instructions further cause the at least one processing device to receive an input identifying a projected sell date or sell date range for the coated product, wherein the coating recommendation or instruction is generated based, at least in part, on the projected consumer sales date or sales date range. By way of example, an earlier projected sell date may make it feasible or desirable to use a thinner coating and/or less crosslinked coating.

E10. The computer readable storage device of any of embodiments E1 to E9, wherein the instructions further cause the at least one processing device to receive an input identifying a projected sell date or sell date range for the coated product, wherein the coating recommendation or instruction is generated based, at least in part, on the projected sell date or sell date range.

E11. The computer readable storage device of any of embodiments E10, wherein the instructions further cause the at least one processing device to receive an input identifying a desired level of ripeness or quality at sale. By way of example, customers of certain fruit markets or Asian grocery markets may desire a fruit or vegetable that is ripe on the sale date and ready for immediate consumption, whereas, in contrast, a customer at a bulk grocery market (e.g., Costco or Sam's Club) may desire a less ripe fruit or vegetable on the date of sale. By way of example, cultural differences in customers and their expectation of the level of ripeness at sale and/or when the fruit or vegetable are consumed may also be factored in.

F1. A coating system for coating a plant item comprising:
- a sensor, more typically a plurality of sensors; and
- a computing device including at least a processing device and including, or in communication with (e.g., via an internet connection, wired network connection, or wireless network connection), a computer readable storage device, the computing device in communication with the sensor, the computer readable storage device storing data instruction executable by the computing device to cause the computing device to:
  - determine a level of ripeness of the plant item, and
  - generate a coating instruction for the plant item.

F2. The coating system of embodiment F1, wherein the coating system is configured to interact with an industrial processing line for processing plant items (e.g., a fruit or vegetable processing line of a fruit or vegetable packing house).

F3. The coating system of embodiments F1 or F2, wherein the coating system comprises a portion of an industrial processing line for processing plant items.

F4. The coating system of embodiment F2 or F3, wherein the industrial processing line is an industrial processing line for processing freshly harvested produce (e.g., fruit or vegetables, including any of those referenced herein).

F5. The coating system of embodiment F4, wherein the industrial processing line is configured for processing one or more of: apples, avocados, asparagus, bananas, blueberries, cherries, citrus fruit (e.g., a lemon, a lime, an orange, a mandarin, or a grapefruit), cucumbers (e.g., English cucumbers), garlic, green beans, or strawberries.

F6. The coating system of embodiment F5, wherein the industrial processing line is configured for processing avocados.

F7. The coating system of F2 or F3, wherein the industrial processing line is an industrial processing line configured for processing plant cuttings for re-rooting and/or replanting.

F8. The coating system of F2 or F3, wherein the industrial processing line is configured for processing cut flowers.

F9. The coating system of F2 or F3, wherein the industrial processing line is configured for processing nuts (e.g., almonds, cashews, chestnuts, hazelnuts, macadamia nuts, pecans, pine nuts, pistachios, or walnuts).

F10. The coating system of F2 or F3, wherein the industrial processing line is configured for processing leafy greens (e.g., loose-leaf lettuce such as spring greens or spinach).

F11. The coating system of any of embodiments F1 to F10, wherein the coating system includes an applicator for applying a liquid barrier coating composition.

F11'. The coating system of F11, wherein the coating system is configured such that the plant item (e.g., freshly a harvested fruit or vegetable) is rotating as the applicator applies the liquid barrier coating composition to the plant item.

F11". The coating system of F11', wherein the coating system is configured such that the plant item is simultaneously rotating while being transported (e.g., in the direction of travel of a conveyor, typically a longitudinal direction) as the applicator applies the liquid barrier coating composition to the plant item. See, for example, WO2019/028043 (Holland et al.), which describes a conveyor apparatus for simultaneously transporting and rotating produce during coating.

F12. The coating system of any of embodiments F11, F11', or F11", wherein the applicator comprises a spray applicator (e.g., a spray bar, a mister bar, and/or a series of spray and/or misting devices such as nozzles, bars, or guns).

F13. The coating system of embodiment F12, wherein the spray applicator is configured to spray coat a fresh fruit or vegetable.

F14. The coating system of any of embodiments F11, F11', or F11", wherein the applicator comprises a curtain coater or wash coater.

F15. The coating system of any of embodiments F11, F11', or F11", wherein the applicator includes a reservoir for dipping a plant item into a liquid barrier coating composition for purposes of coating the plant item.

F16. The coating system of any of embodiments F1 to F15, wherein the coating system includes a drier (e.g., for drying a liquid barrier coating composition applied to the plant item to form a hardened coating thereon). Examples of suitable driers include devices (e.g.., one or more blowers and/or air knives) configured to apply a moving volume of air or other gasses (e.g., nitrogen gas and/or air and nitrogen mixtures) onto the coated plant item to facilitate removal of solvent (i.e., hardening) from the applied coating composition.

F17. The coating system of any of embodiments F1 to F16, wherein the sensor is configured to output (e.g., transmit) a signal carrying a value of a measurement.

F18. The coating system of any of embodiments F1 to F17, wherein the coating system includes a plurality of sensors.

F19. The coating system of embodiment F18, wherein the coating system includes two or more different types of sensors.

F20. The coating system of any of embodiments F1 to F19, wherein the sensor is configured to identify, measure, or both identify and measure a ripeness or quality parameter of a plant item.

F21. The coating system of embodiment F20, wherein the quality parameter comprises an external property of the plant item (e.g., a size, a shape, a mass, a volume, a density, an appearance, a color, the presence or absence of visual blemishes) and/or an internal property (e.g., composition, flavor, aroma, a concentration, etc.)

F22. The coating system of any of embodiments F1 to F20, wherein the sensor is configured to identify a fruit or vegetable type.

F23. The coating system of any of embodiments F1 to F22, wherein the sensor comprises a firmness sensor, more preferably a non-destructive firmness sensor (e.g., a sensor for measuring a level of firmness of a fruit or vegetable without damaging the fruit or vegetable).

F24. The coating system of embodiment F23, wherein the firmness sensor comprises an acoustical firmness sensor, an impact measurement firmness sensor, or a sensor capable of doing both. An example of a commercially available firmness sensor with both acoustical firmness and impact firmness measurement capabilities is the AFS sensor from Aweta G&P B.V. of Pinjacker, Netherlands. See also, e.g., U.S. Pat. No. 6,539,781, which discusses sensing methods and sensors for measuring the firmness of produce such as fruit via tapping of the produce.

F25. The coating system of any of embodiments F1 to F24, wherein the sensor is configured to provide an output indicative of an internal or external gas concentration of the plant item. See, e.g., U.S. Pat. No. 9,739,737 (Swager et. al) and U.S. Pub. No. 2016/0231267 (Swager et al.), each of which is incorporated herein by reference in its entirety, for discussion of sensors and methods for measuring the amount of ethylene gas associated with a plant item.

F26. The coating system of any of embodiments F1 to F25, wherein the sensor is configured to provide an output indicative of a color parameter and/or other visible characteristic of the plant item (e.g., a color parameter indicative of a level of fruit or vegetable ripeness such as, for example, a hue angle).

F27. The coating system of any of embodiments F1 to F26, wherein the sensor comprises an optical sensor.

F28. The coating system of any of embodiments F27, wherein the optical sensor comprises an image acquisition device (e.g., a still and/or video camera).

F29. The coating system of any of embodiments F1 to F28, wherein the sensor comprises a spectrophotometer.

F30. The coating system of any of embodiments F1 to F29, wherein the coating system includes one or more sensors selected from metal-oxide gas sensor(s), electrochemical gas sensor(s), conducting/composite polymer gas sensors(s), photoacoustic gas sensor(s), piezoelectric gas sensors(s), infrared gas sensor(s), photoionization detector gas sensor(s), or combinations thereof.

F31. The coating system of any of embodiment F1 to F30, wherein the sensor is configured to measure an acid level (e.g., total acid, ascorbic acid, etc.), a sugar level (e.g., a degrees Brix, commonly abbreviated as Bx°), a ratio of sugar to acid, a level of soluble solids, a color parameter (e.g., a color intensity, a fraction of surface area that is a particular color, etc.), a visible indicator, a gas amount (e.g., an internal or emitted gas amount such as, e.g., carbon dioxide, ethylene, oxygen, or water vapor), or a combination thereof.

F32. The coating system of any of embodiments F1 to F31, wherein the coating system is configured to communicate with a user interface.

F33. The coating system of embodiment F32, wherein the system includes a user interface.

F34. The coating system of embodiment F32 or F33, wherein the user interface comprises a mobile computing device such as, e.g., a tablet (e.g., an iPad tablet) or mobile phone.

F35. the coating system of embodiment F32 or F33, wherein the user interface comprises a personal computer.

Figure 3:
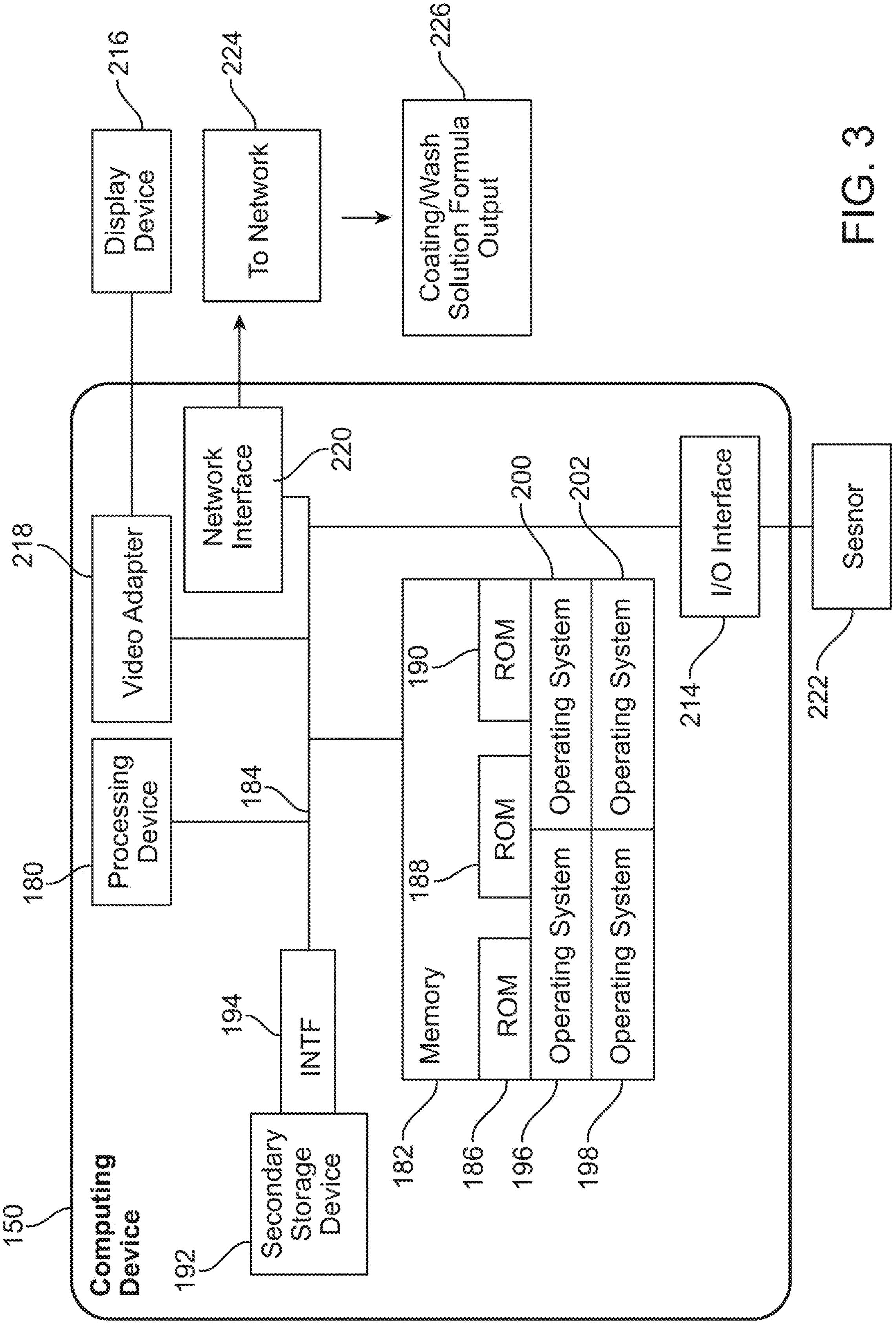
FIG. 3 is a schematic block diagram illustrating an exemplary architecture of a computing device that can be used to implement aspects of the present disclosure.

The embodiments E1 to E11 and F1 to F35 are further illustrated by FIG. 3. FIG. 3 illustrates an exemplary architecture of a computing device that can be used to implement (e.g., as part of or in conjunction with a coating system such as any of those described in embodiments F1 to F35) aspects of the present disclosure, including any of the plurality of computing devices described herein. The computing device illustrated in FIG. 3 can be used to execute the operating system, application programs, and software described herein. By way of example, the computing device will be described below as the computing device 150.

The computing device 150 includes, in some embodiments, at least one processing device 180, such as a central processing unit (CPU). A variety of processing devices are available from a variety of manufacturers, for example, Intel or Advanced Micro Devices (AMD). In this example, the computing device 150 also includes a system memory 182, and a system bus 184 that couples various system components including the system memory 182 to the processing device 180. The system bus 184 is one of any number of types of bus structures including a memory bus, or memory controller; a peripheral bus; and a local bus using any of a variety of bus architectures.

Examples of computing devices suitable for the computing device 150 include a server computer, a desktop computer, a laptop computer, a tablet computer, a mobile computing device (such as a smart phone, an iPod® or iPad® mobile digital device, or other mobile devices), or other devices configured to process digital instructions.

The system memory 182 includes read only memory 186 and random access memory 188. A basic input/output system 190 containing the basic routines that act to transfer information within computing device 150, such as during start up, is typically stored in the read only memory 186.

The computing device 150 also includes a secondary storage device 192 in some embodiments, such as a hard disk drive, for storing digital data. The secondary storage device 192 is connected to the system bus 184 by a secondary storage interface 194. The secondary storage devices 192 and their associated computer readable media provide nonvolatile storage of computer readable instructions (including application programs and program modules), data structures, and other data for the computing device 150.

Although the exemplary environment described herein employs a hard disk drive as a secondary storage device, other types of computer readable storage media are used in other embodiments. Examples of these other types of computer readable storage media include flash memory cards, digital video disks (DVDs), compact disc read only memories, digital versatile disk read only memories, random access memories, or read only memories. Some embodiments include non-transitory media. Additionally, such computer readable storage media can include local storage or cloud-based storage.

A number of program modules can be stored in secondary storage device 192 or memory 182, including an operating system 196, one or more application programs 198, other program modules 200 (such as the software engines described herein), and program data 202. The computing device 150 can utilize any suitable operating system, such as Microsoft Windows™ Google Chrome™, Apple OS, and any other operating system suitable for a computing device.

In some embodiments, a user provides inputs to the computing device 150 through one or more input devices 204. Examples of input devices 204 include a keyboard 206, mouse 208, microphone 210, and touch sensor 212 (such as a touchpad or touch sensitive display). Other embodiments include other input devices 204. The input devices are often connected to the processing device 180 through an input/output interface 214 that is coupled to the system bus 184. These input devices 204 can be connected by any number of input/output interfaces, such as a parallel port, serial port, game port, or a universal serial bus. Wireless communication between input devices and the interface 214 is possible as well, and includes infrared, BLUETOOTH® wireless technology, 802.11a/b/g/n, cellular, or other radio frequency communication systems in some possible embodiments.

In this example embodiment, a display device 216, such as a monitor, liquid crystal display device, projector, or touch sensitive display device, is also connected to the system bus 184 via an interface, such as a video adapter 218. In addition to the display device 216, the computing device 150 can include various other peripheral devices (not shown), such as speakers or a printer.

When used in a local area networking environment or a wide area networking environment (such as the Internet), the computing device 150 is typically connected to the network 112 through a network interface 220, such as an Ethernet interface. Other possible embodiments use other communication devices. For example, some embodiments of the computing device 150 include a modem for communicating across the network.

The computing device 150 typically includes at least some form of computer readable media. Computer readable media includes any available media that can be accessed by the computing device 150. By way of example, computer readable media include computer readable storage media and computer readable communication media.

Computer readable storage media includes volatile and nonvolatile, removable and non-removable media implemented in any device configured to store information such as computer readable instructions, data structures, program modules or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the computing device 150. Some embodiments include non-transitory media. Additionally, such computer readable storage media can include local storage or cloud-based storage. Computer readable storage media does not include computer readable communication media.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The computing device illustrated in FIG. 3 is also an example of programmable electronics, which may include one or more such computing devices, and when multiple computing devices are included, such computing devices can be coupled together with a suitable data communication network so as to collectively perform the various functions, methods, or operations disclosed herein.

An example of a representative manufacturing process for use, for example, in relation to Embodiment series D, E, and F in accordance with some embodiments of the present disclosure is provided below:

1. A plant item is unloaded onto a packing line and ultimately enters a conveyor.
2. Optional: The plant item (e.g., freshly harvested fruit or vegetable) passes within region of one or more sensors that analyzes one or more characteristics of the plant item's ripeness or another attribute.
3. One or more sensors transmit ripeness and/or other attribute data for the particular plant item into the I/O interface. Examples of sensor data include acid level (e.g., total acid, ascorbic acid, etc.), a sugar level (e.g., a degrees Brix, commonly abbreviated as Bx°), a ratio of sugar to acid, a level of soluble solids, a color parameter (e.g., a color intensity, a fraction of surface area that is a particular color, etc.), a visible indicator, a gas amount (e.g., an internal or emitted gas amount such as, e.g., carbon dioxide, ethylene, oxygen, or water vapor), or a combination thereof.
4. The computing device, which can optionally reside within the enterprise, the cloud, or a hybrid enterprise/cloud determines ripeness and/or another attribute of the particular plant item and outputs a particular coating composition recommendation, applied thickness recommendation, or combination thereof, or a recommended wash solution from a plurality of chemically-different coating composition or wash solution options (e.g., a coating or wash solution composition inventory).

5. A sanitizer and optionally, a particular wash solution determined by the computing device is applied to the plant items based on the plant item's ripeness and/or other attributes.
6. Optional: The plant item passes within region of one or more sensors that analyzes one or more characteristics of the plant item's ripeness
7. One or more sensors transmit ripeness data into the I/O interface. Examples of sensor data include acid level (e.g., total acid, ascorbic acid, etc.), a sugar level (e.g., a degrees Brix, commonly abbreviated as Bx°), a ratio of sugar to acid, a level of soluble solids, a color parameter (e.g., a color intensity, a fraction of surface area that is a particular color, etc.), a visible indicator, a gas amount (e.g., an internal or emitted gas amount such as, e.g., carbon dioxide, ethylene, oxygen, or water vapor), or a combination thereof.
8. The computing device, which can reside within the enterprise, the cloud, or a hybrid enterprise/cloud system determines ripeness and outputs a particular coating composition, applied thickness or combination thereof from a plurality of chemically-different coating compositions (e.g., a coating composition inventory).
9. Plant items that are assessed to be defective and/or of an unsuitable quality grade are sorted out.
10. A particular coating composition, applied thickness, or combination thereof is determined by the computing device and is applied to the plant items based on the plant item ripeness.
11. The coating may optionally be dried on the fruit item and then packaged or stored.

G1. A method of treating (e.g., coating) fresh fruit or vegetables at a retail point of sale to extend the quality and/or shelf-life, the method comprising:

providing either a liquid composition or a dry or liquid concentrate for use in forming a liquid composition (e.g., any of the compositions of any preceding embodiment), wherein if a dry or liquid concentrate is used the liquid composition is prepared from it; applying the liquid composition to at least a portion of surfaces of the fruit or vegetables.

G2. The method of embodiment G1, wherein the liquid composition comprises a liquid barrier coating composition (e.g., any of those disclosed herein such as in any preceding embodiment).

G3. The method of embodiment G2, wherein the liquid composition comprises a wash solution (e.g., any of those disclosed herein such as in any preceding embodiment).

G4. The method of any of embodiments G1 to G3, wherein the liquid composition is applied via a misting system.

G5. The method of embodiment G4, wherein the misting system is configured to mist fruit or vegetables at the retail point of sale (e.g., while on display for purchase by a retail consumer).

G6. The method of any of embodiments G1 to G5, wherein a misting system and/or dosing device and/or process is used such as, for example, any of those described in U.S. Pat. Nos. 4,179,900, 7,438,537, 8,628,028, and/or U.S. Publ. No. 2007/0227961.

G7. The method of any of embodiments G1 to G6, wherein the liquid composition includes one or more additives selected from a plasticizer, a wax, a lipid, an amino acid, a dispersing agent, an anti-microbial agent, an anti-browning or -yellowing agent (e.g., ascorbic acid or citric acid), a probiotic, a vitamin, an enzyme, a plant hormone (e.g., a plant growth regulator), a colorant, a flavorant, an aromatic, an oxygen-scavenging agent, a leveling agent, a wetting agent, an adhesion promoter, a compatibilizer, a rheology modifier, or an antifoaming agent.

G8. The method of any of embodiment G1 to G7, wherein the liquid composition includes a ripening inhibitor.

G9. The method of G8, wherein the ripening inhibitor comprises an ethylene inhibitor (e.g., an ethylene scavenger, ethylene receptor antagonist or an ethylene biosynthesis inhibitor).

G10. The method of embodiment G8 or G9, wherein the ripening inhibitor comprises a terpene (e.g., 3-carene, camphene, caryophyllene, humulene, isoprene, limonene, myrcene, pinene (e.g. alpha pinene and beta pinene), terpinene (e.g., alpha-terpinene), terpinolene, valencene, or a mixture thereof), a derivative thereof (e.g. a terpenoid such as alpha-bisabolol, trans-cinnamaldehyde, carveol, carvone, caryophyllene, cinnamyl alcohol, eucalyptol, estragole, eugenole, geraniol, cis-2-hexene-1-ol, trans-2-hexene-1-ol, linalool, nerolidol (e.g. cis and trans nerolidol, perillaldehyde), or a mixture thereof.

G11. The method of any of embodiments G8 to G10, wherein the ripening inhibitor comprises limonene, typically d-limonene.

G12. The method of any of embodiments G8 to G10, wherein the ripening inhibitor comprises a mono-terpene.

G13. The method of any of embodiments G8 to G10, wherein the ripening inhibitor comprises a cyclic terpene.

G14. The method of any of embodiments G1 to G13, wherein the liquid composition has a pH of at least about 9.5 or at least about 11. (See, e.g., the wash solutions described in U.S. Pat. No. 6,831,050 or U.S. Pat. No. 6,662,813.)

G15. The method of any of embodiments G1 to G14, wherein liquid composition has a pH of less than about 12.5.

G16. The method of any of embodiments G1 to G13, G14, G15 where the liquid composition has a neutral or acidic pH (e.g., pH of 7 or less, 6 or less, 5 or less, 4 or less, or 3 or less).

G17. The method of any of embodiments G1 to G16, wherein the liquid composition is edible.

G18. The method of embodiment G17, wherein the liquid composition is a no-rinse wash solution (see, e.g., the Antimicrobial Fruit and Vegetable Treatment (AFVT) wash solution product from Ecolab).

G19. The method of any of embodiments G1 to G18, wherein the liquid composition includes an antimicrobial agent.

G20. The method of embodiment G19, wherein the liquid composition is a wash solution, and wherein the antimicrobial agent (e.g., sodium dodecylbenzenesulfonate ("SDBS", CAS Number 25155-30-0)) is preferably present in the wash solution at a concentration of less than 111 milligrams per kilogram of wash solution, more preferably the wash solution includes SDBS in an amount of about 76 to about 111 ppm).

G21. The method of any of embodiments G1 to G20, wherein the wash solution includes lactic acid (e.g., in an amount of about 100 to about 5,000 ppm, about 750 to about 2,500 ppm, about 1,000 ppm to about 1,500 ppm, or about 1,061 ppm to about 1,391 ppm.)

G22. The method of any of embodiments G1 to G21, wherein the liquid composition includes lactic acid and sodium dodecylbenzenesulfonate as active ingredients, preferably each in an efficacious amount.

G23. The method of any of embodiments G1 to G22, wherein the liquid composition includes one or more of citric acid, limonene, ethanol, potassium hydroxide, sodium citrate, decyl glycoside, caprylyl/myristyl glycoside, calcium ascorbate, glycerin, potassium sorbate, a derivative thereof, or a combination thereof.

H1. A method of coating a plant-based meat product comprising:

providing a plant-based meat product; and applying a composition comprising a film-forming component, one of more non-film forming additives, or combination thereof to at least a portion of a surface of the plant-based meat product or inserted into the bulk of the plant-based meat product.

H2. The method of embodiment H1, wherein the composition comprises a coating composition such as, e.g., liquid barrier coating compositions.

H3. The method of embodiment H1 or H2, wherein the plant-based meat product is a beef-like product.

H4. The method of any of embodiments H1 to H3, wherein the plant-based meat product contains no animal product prior to coating (and preferably after coating).

H5. The method of any of embodiments H1 to H4, wherein the plant-based meat product is a ground meat-like product (e.g., ground beef-like).

H6. The method of any of embodiments H1, H2, H4, or H5, wherein the plant-based meat product is a poultry-like, pork-like, or seafood-like product.

H7. The method of any of embodiments H1 to H6, wherein the plant-based meat product includes heme.

H8. The method of embodiment H7, wherein the plant-based meat product includes a heme-containing protein. (See, e.g., the heme-containing proteins and plant-based meat products described in U.S. Pat. No. 9,808,029 or U.S. Publ. No. 2019/0133163.)

H9. The method of embodiment H8, wherein the plant-based meat product includes 0.01% to 5% by weight of the heme-containing protein.

H10. The method of any of embodiments H1 to H9, wherein the composition comprises any of the barrier coating compositions disclosed herein (e.g., any of the barrier coating compositions of embodiments A1 to 208, 239 to 244, or 249 to 267).

H11. The method of any of embodiments H1 to H10, wherein the composition comprises any of the barrier coating compositions disclosed herein (e.g., any of the barrier coating compositions of embodiments A1 to 208, 239 to 244, or 249 to 267) and reacts with the heme-containing protein.

H12. The method of any of embodiments H1 to H11 wherein the composition contains one or more amino acids, a vitamin, a probiotic, an essential oil, an edible plant extract, a *cannabis* compound or extract such as, for example, a cannabinoid (e.g., cannabidiol ("CBD") or tetrahydrocannabinol ("THC"), or a combination thereof.

H13. The method of embodiment H12, wherein the composition includes the one or more amino acids, and wherein the amino acids are selected from alanine, arginine, asparagine, aspartic acid, cysteine, glutamine, glutamic acid, glycine, histidine, isoleucine, leucine, lysine, methionine, phenylalanine, proline, serine, threonine, tryptophan, tyrosine, valine, asparagine/aspartic acid, glutamine/glutamic acid, or a combination thereof.

H14. A plant-based meat product resulting from the method of any of embodiments H1 to H13.

H15. The plant-based meat product of embodiment H14, wherein the product is an at least partially coated, or substantially or fully coated, plant-based meat product.

I1. A kit for use by a consumer comprising:

an absorbent article comprising a wipe, a pad, a sponge, foam, or a cloth impregnated with a liquid composition for use in preserving (e.g., preventing from browning) a food (e.g., a harvested or soon-to-be harvested fresh fruit or vegetable, a cut fresh fruit or vegetable, a prepared food such as guacamole, or another prepared food such as sushi, a seafood, a cell-cultured seafood product, a meat, a cell-cultured-meat product, or a plant-based meat product such as a plant-based meat product front Impossible Meat or Beyond Meat); and instructions for treating (e.g., wiping, sealing, or wrapping) the food with the absorbent article.

I2. The kit of embodiment I1, wherein the liquid composition comprises a composition in accordance with GRAS Notice No. 648 or GRAS Notice No. 886.

I3. The kit of any embodiment I1 to I2, wherein the liquid composition is a fruit or vegetable wash solution that preserves food. Examples of commercially available fruit or vegetable wash solutions include the VEGGIE WASH line of consumer produce wash products from Beaumont Products, Inc., the FIT ORGANIC line of consumer produce wash products, the PURELY ESSENTIAL produce wash product from Environne, and the Antimicrobial Fruit and Vegetable Treatment (AFVT) line of food-service-worker produce wash products from Ecolab.

I4. The kit of any of embodiments I1 to I3, wherein the liquid composition has a pH of at least about 9.5 or at least about 11. (See, e.g., the wash solutions described in U.S. Pat. No. 6,831,050 or U.S. Pat. No. 6,662,813.)

I5. The kit of any of embodiments I1 to I4, wherein the liquid composition has a pH of less than about 12.5.

I6. The kit of any embodiment I1 to I5, wherein the liquid composition includes an antimicrobial agent (e.g., sodium dodecylbenzenesulfonate ("SDBS", CAS Number 25155-30-0)), which is preferably present in the wash solution at a concentration of less than 111 milligrams per kilogram of wash solution, more preferably the wash solution includes SDBS in an amount of about 76 to about 111 ppm).

I7. The kit of embodiments I1 or I6, wherein the liquid composition includes lactic acid (e.g., in an amount of about 100 to about 5,000 ppm, about 750 to about 2,500 ppm, about 1,000 ppm to about 1,500 ppm, or about 1,061 ppm to about 1,391 ppm.)

I8. The kit of embodiment 17, wherein the liquid composition includes lactic acid and sodium dodecylbenzenesulfonate as active ingredients, preferably each in an efficacious amount.

I9. The kit of any of embodiment I1, I2, or I5 to I8, wherein the liquid composition has a neutral or acidic pH (e.g., pH of 7 or less, 6 or less, 5 or less, 4 or less, or 3 or less).

I10. The kit of any of embodiments I1 to I9, wherein the liquid composition includes one or more of citric acid, malic acid, limonene, ethanol, potassium hydroxide, sodium citrate, decyl glycoside, caprylyl/myristyl glycoside, calcium ascorbate, glycerin, potassium sorbate, or a combination thereof.

I11. The kit of any of embodiments I1 to I10, wherein the liquid composition is edible.

J1. A factory-applied (e.g., for use at a high throughput produce processing facility) wash solution comprising a ripening inhibitor; and water.

J2. The wash solution of embodiment J2, wherein the ripening inhibitor comprises an ethylene inhibitor (e.g., an ethylene scavenger, ethylene receptor antagonist or an ethylene biosynthesis inhibitor).

J3. The wash solution of embodiments K1 or K2, wherein the ripening inhibitor comprises a terpene (e.g., 3-carene, camphene, caryophyllene, humulene, isoprene, limonene, myrcene, pinene (e.g. alpha pinene and beta pinene)), terpinene (e.g., alpha-terpinene), terpinolene, valencene, or a mixture thereof), a derivative thereof (e.g. a terpenoid such as alpha-bisabolol, trans-cinnamaldehyde, carveol, carvone, caryophyllene, cinnamyl alcohol, eucalyptol, estragole, eugenole, geraniol, cis-2-hexene-1-ol, trans-2-hexene-1-ol, linalool, nerolidol (e.g. cis and trans nerolidol, perillaldehyde)), or a mixture thereof.

J4. The wash solution of embodiments J1 to J3, wherein the ripening inhibitor comprises limonene, typically d-limonene.

J5. The wash solution of embodiments J1 to J4, wherein the ripening inhibitor comprises a mono-terpene.

J6. The wash solution of embodiments J1 to J5, wherein the terpene comprises a cyclic terpene.

17. The wash solution of embodiments J1 to J6, wherein the ripening inhibitor comprises 1-methylcyclopropene (which may optionally be encapsulated), a complex thereof (e.g., a complex with a cyclodextrin), or a mixture thereof.

J8. The wash solution of embodiments J1 to 17, wherein the ripening inhibitor includes, based on total solids, at least 1 ppm, at least 10 ppm, at least 20 ppm, at least 50 ppm, at least 100 ppm, at least 500 ppm, at least 1,000 ppm, at least 2,000 ppm, at least 3,000 ppm, at least 5,000 ppm, or at least 10,000 ppm of ripening inhibitor.

J9. The wash solution of embodiments J1 to J8, wherein the coating composition includes, based on total solids, less than 50,000 ppm, less than 20,000 ppm, less than 10,000 ppm, less than 5,000 ppm, less than 3,000 ppm, less than 2,000 ppm, less than 1,000 ppm, less than 500 ppm, less than 300 ppm, less than 200 ppm, or less than 100 ppm of ripening inhibitor.

J10. The wash solution of embodiments J1 to J9, wherein the plant item is a climacteric fruit.

J11. The wash solution of embodiments J1 to J0, wherein the plant item is selected from apples, apricots, avocado, bananas, broccoli, carnations, carrots, cucumber, eggplant, grapes, green leafy vegetables, pears, plantains, or potatoes.

J12. The wash solution of embodiments J1 to J11, wherein the ripening inhibitor is present in an efficacious amount sufficient to delay ripening (e.g., as indicated using a ripening parameter comparison relative to an analogous coated plant item with an otherwise identical coating lacking the ripening inhibitor).

J13. The wash solution of embodiments J1 to J12, wherein the wash solution may be a sanitizing solution and is preferably capable of removing dirt, herbicides, pesticides or combinations thereof from the plant item.

J14. The wash solution of embodiments J1 to J13, wherein the wash solution is a fruit or vegetable wash solution. Examples of commercially available fruit or vegetable wash solutions include the VEGGIE WASH line of consumer produce wash products from Beaumont Products, Inc., the FIT ORGANIC line of consumer produce wash products, the PURELY ESSENTIAL produce wash product from Environne, and the Antimicrobial Fruit and Vegetable Treatment (AFVT) line of food-service-worker produce wash products from Ecolab.

J15. The wash solution of embodiments J1 to J14, wherein the wash solution has a pH of at least about 9.5 or at least about 11. (See, e.g., the wash solutions described in U.S. Pat. No. 6,831,050 or U.S. Pat. No. 6,662,813.)

J16. The wash solution of embodiments J1 to J15, wherein the wash solution has a pH of less than about 12.5.

J17. The wash solution of embodiments J1 to J16, wherein the wash solution is a no-rinse wash solution (see, e.g., the Antimicrobial Fruit and Vegetable Treatment (AFVT) wash solution product from Ecolab).

J18. The wash solution of embodiments J1 to J17, wherein the wash solution is edible.

J19. The wash solution of embodiments J1 to J18, wherein the wash solution includes an antimicrobial agent (e.g., sodium dodecylbenzenesulfonate ("SDBS", CAS Number 25155-30-0)), which is preferably present in the wash solution at a concentration of less than 111 milligrams per kilogram of wash solution, more preferably the wash solution includes SDBS in an amount of about 76 to about 111 ppm).

J20. The wash solution of embodiments J1 to J19, wherein the wash solution includes lactic acid (e.g., in an amount of about 100 to about 5,000 ppm, about 750 to about 2,500 ppm, about 1,000 ppm to about 1,500 ppm, or about 1,061 ppm to about 1,391 ppm.)

J21. The wash solution of embodiments J1 to J20, wherein the wash solution includes lactic acid and sodium dodecylbenzenesulfonate as active ingredients, preferably each in an efficacious amount.

J22. The wash solution of embodiments J1 to J13, or J18 to J21, wherein the wash solution has a neutral or acidic pH (e.g., pH of 7 or less, 6 or less, 5 or less, 4 or less, or 3 or less).

J23. The wash solution of J1 to J22, wherein the wash solution includes one or more of citric acid, limonene, ethanol, potassium hydroxide, sodium citrate, decyl glycoside, caprylyl/myristyl glycoside, calcium ascorbate, glycerin, potassium sorbate, or a combination thereof.

K1. A method comprising;

providing a plant item packaging container;

applying a composition comprising one or more of: a ripening inhibitor, a plant hormone (e.g., a plant growth regulator), a barrier component (e.g., any of the AHC disclosed in any preceding embodiment such as, e.g., any of embodiments A1 to 267), or a mixture thereof, to the plant item packaging container, or plant items located inside the packaging container, or both;

placing one or more plant items into the container; and optionally shipping the container.

K2. The method of embodiment K1, wherein the composition is added to the container before or after the plant item is added.

K3. The method of embodiment K1 or K2, wherein the composition includes a solvent (e.g., water and/or organic solvent such as, e.g., ethanol).

K4. The method of any of embodiment K1 or K3, wherein the ripening inhibitor is present and comprises an ethylene inhibitor (e.g., an ethylene scavenger, ethylene receptor antagonist or an ethylene biosynthesis inhibitor).

K5. The method of any of embodiments K1 to K4, wherein the ripening inhibitor is present and comprises a terpene (e.g., 3-carene, camphene, caryophyllene, humulene, isoprene, limonene, myrcene, pinene (e.g. alpha pinene and beta pinene), terpinene (e.g., alpha-terpinene), terpinolene, valencene, or a mixture thereof), a derivative thereof (e.g. a terpenoid such as alpha-bisabolol, trans-cinnamaldehyde, carveol, carvone, caryophyllene, cinnamyl alcohol, eucalyptol, estragole, eugenole, geraniol, cis-2-hexene-1-ol, trans-2-hexene-1-ol, linalool, nerolidol (e.g. cis and trans nerolidol, perillaldehyde), or a mixture thereof.

K6. The method of any of embodiments K1 to K5, wherein the ripening inhibitor is present and comprises limonene, typically d-limonene.

K7. The method of any of embodiments K1 to K6, wherein the ripening inhibitor is present and comprises a monoterpene, a cyclic terpene, or a combination thereof.

K8. The method of any of embodiments K1 to K7, wherein the ripening inhibitor is present and comprises a substituted cyclopropene compound (which may optionally be encapsulated), a complex thereof (e.g., a complex with a cyclodextrin), or a mixture thereof.

K9. The method of embodiment K8, wherein the substituted cyclopropene compound comprises 1-methylcyclopropene (which may optionally be encapsulated), a complex thereof (e.g., a complex with a cyclodextrin), or a mixture thereof.

K10. The method of any of embodiments K1 to K9, wherein the composition includes at least 0.1 ppm, at least 1 ppm, at least 10 ppm, at least 20 ppm, at least 50 ppm, at least 100 ppm, at least 500 ppm, at least 1,000 ppm, at least 2,000 ppm, at least 3,000 ppm, at least 5,000 ppm, or at least 10,000 ppm of ripening inhibitor.

K11. The method of any of embodiments K1 to K10, wherein the composition includes less than 50,000 ppm, less than 20,000 ppm, less than 10,000 ppm, less than 5,000 ppm, less than 3,000 ppm, less than 2,000 ppm, less than 1,000 ppm, less than 500 ppm, less than 300 ppm, less than 200 ppm, or less than 100 ppm of ripening inhibitor.

K12. The method of any of embodiments K1 to K11, wherein the one or more plant item is a climacteric fruit.

K13. The method of any of embodiments K1 to K12, wherein the one or more plant item is selected from apples, apricots, avocado, bananas, broccoli, carnations, carrots, cucumber, eggplant, grapes, green leafy vegetables, pears, plantains, or potatoes.

K14. The method of any of embodiments K1 to K13, wherein the ripening inhibitor is present in an efficacious amount sufficient to delay ripening (e.g., as indicated using a ripening parameter comparison relative to an analogous coated plant item with an otherwise identical coating lacking the ripening inhibitor).

K15. The method of any of embodiments K1 to K11, wherein the one or more plant item comprises a plant cutting for subsequent rooting (e.g., a plant stem cutting typically including a stem portion with a cut end, a plurality of leaves (typically at least three or at least four leaves), and no roots or a leaf cutting).

K16. The method of embodiment K15, wherein the plant cutting does not include any roots.

K17. The method of any of embodiments K1 to K11, wherein the one or more plant items comprises a plant liner.

K18. The method of any of embodiments K15 to K17, wherein the plant cutting or plant liner comprises a cutting or plant liner selected from: an *Aster*, a Boxwood, a Chrysanthemums, a *Poinsettia*, a *Lantana*, a *Bracteantha*, a *Calibrachoa*, a *Dahlia*, a *Dipladenia*, a Heliotrope, a *Geranium*, a *Pelargonium*, a *Mandevilla*, an *Argyranthemum*, a *Lavandula*, an *Aubrieta*, a *Verbena*, an *Impatiens*, a *Vinca*, a *Lobelia*, a *Nemesia*, a *Diascia*, an *Osteospermum*, a *Penstemon*, a *Scaevola*, an Ivy, an Authurium, a *Kalanchoe*, a Rose, a Callus, a Carnation, a *Petunia*, a cactus, a conifer, or the like.

K19. The method of any of embodiments K1 to K11, wherein the one or more plant item comprises a cut flower.

K20. The method of any of embodiments K1 to K19, wherein the barrier component is present and comprises one or more of a lipid, a polypeptide, a polysaccharide or a mixture thereof.

K21. The method of any of embodiments K1 to K20, wherein the barrier component is present and comprises one or more of a drying oil, a semi-drying oil, a dimer fatty acid, an alkyd, or a mixture thereof.

K22. The method of any of embodiments K1 to K21, wherein the barrier component is present and comprises one or more mono-glyceride (e.g., 2,3-dihydroxypropyl palmitate, 1,3-dihydroxypropan-2-yl palmitate, or a mixture thereof).

K23. The method of any of embodiments K1 to K22, wherein one or more plant hormones are present, with one or more plant growth regulators being preferred such as, for example, benzyladenine, gibberellins (e.g., gibberellin acid such as gibberellin acid A4 and/or A7), cytokinins (e.g., kinetin), abscisic acid, salts or derivatives thereof, or combinations thereof.

K24. The method of any of embodiments K1 to K23, wherein the composition includes one or more fungicides, one or more rooting hormones (e.g., IBA), one or more pigments, one or more colorants, one or more gloss additives, one or more bases, one or more acids, glycerol, one or more metal driers, one or more PMCA disclosed herein, one or more ethylenically unsaturated components (e.g., any of those disclosed herein), or a mixture thereof.

K25. The method of any of embodiments K1 to K24, wherein the container comprises a plastic bag or plastic liner (optionally located inside a box).

K26. The method of embodiment K25, wherein the composition is added to the container (e.g., via spray application) to coat at least a portion of plant items located inside the container.

K27. The method of any of embodiments K15 to K26, wherein the composition is present in an amount sufficient to reduce leaf yellowing (e.g., as indicated using comparison to an identical container filled with identical plant items in which no composition was applied).

K28. The method of any of embodiments K1 to K28, wherein the composition comprises any of the coating compositions described herein (e.g., in any of embodiments A1 to 264).

K29. The container resulting from the method of any of embodiments K1 to K26.

K30. A plant cutting (e.g., a stem plant cutting having a cut stem portion and a plurality of leaves) or plant liner with a coating composition of any of embodiments K3 to K29 applied to thereon.

L1. A disposable article comprising:
- a substrate; and
- a coating applied to the substrate, wherein the coating is formed from a coating composition referenced herein (e.g., a liquid coating composition referenced herein such as an aqueous coating composition referenced herein);
- wherein the disposable article comprises a disposable food-storage, food-handling, or food-serving article, typically a single-use such article.

L2. The disposable article of embodiment L1, wherein the coating is disposed on an interior surface (e.g., so as to form a food or beverage-contact coating).

L3. The disposable article of embodiment L1 or L2, wherein the substrate comprises a fibrous substrate.

L4. The disposable article of any of embodiments L1 to L3, wherein the substrate comprises cellulose fibers (e.g., from wood and/or non-wood fiber sources such as grasses, cereal straws, corn stalks, bamboo, bagasse, flax, hemp, jute, kenaf, cotton, sisal, abaca, or combinations thereof), which may be, for example, virgin cellulose fiber, recycled cellulose fiber (e.g., from recycled wastepaper), or a combination thereof.

L5. The disposable article of any of embodiments L3 or L4, wherein the fibrous substrate is formed from pulp fiber (e.g., wood pulp fiber or other plant pulp fiber).

L6. The disposable article of any of embodiments L1 to L5, wherein the substrate comprises one or more paperboard layers (e.g., the substrate can be formed from single ply or multi-ply paperboard stock).

L7. The disposable article of embodiment L6, wherein the one or more paperboard layer comprises unbleached kraft paperboard or bleached paperboard (e.g., solid bleached sulfate paperboard).

L8. The disposable article of any of embodiments L5 to L7, wherein the substrate has a mass per unit area (often referred to as "basis weight") of at least about 80 pounds per 3,000 square feet, at least about 100 pounds per 3,000 square feet, at least about 125 pounds per 3,000 square feet, or at least about 150 pounds per 3,000 square feet. The mass of material present in an area of paperboard is often expressed in a ream context such as, for example, pounds of material present per 3,000 square feet of paperboard, with 3,000 square feet being a convenient area for consideration as it is a common ream size for paperboard stocks used, for example, to make pressware plates and bowls. Sometimes the "basis weight" is expressed in terms of pounds per ream, with ream meaning 3,000 square feet.

L9. The disposable article of any of embodiments L5 to L8, wherein the substrate has a mass per unit area (often referred to as "basis weight") of no than about 400 pounds per 3,000 square feet, no more than about 350 pounds per 3,000 square feet, no more than about 3,000 pounds per square feet, or more than about 250 pounds per 3,000 square feet.

L10. The disposable article of any of embodiments L1 to L7, wherein the substrate comprises an insulated paperboard.

L11. The disposable article of embodiment L10, wherein the insulated paperboard used to form the substrate has a basis weight (in grams per square meter—"gsm") of at least about 200 gsm, at least about 250 gsm, at least about 300 gsm, or at least about 350 gsm.

L12. The disposable article of embodiment L10 or L11, wherein the insulated paperboard used to form the substrate has a basis weight (in grams per square meter—"gsm") of less than about 500 gsm, less than about 450 gsm, less than about 425 gsm, or less than about 400 gsm.

L13. The disposable article of any of embodiments L5 to L12, wherein the disposable article comprises paperboard pressware (e.g., pressware made from flat paperboard blanks or paperboard rolls).

L14. The disposable article of any of embodiments L1 to L5, wherein the disposable article comprises a thermoformed or molded pulp article.

L15. The disposable article of any of embodiments L1 to L14, wherein the substrate is a monolayer substrate.

L16. The disposable article of any of embodiments L1 to L14, wherein the substrate is a multilayer substrate.

L17. The disposable article of any of embodiments L1 to L16, wherein the substrate is at least about 0.008 inches thick (i.e., it has a "caliper" of about 0.008 inches), at least about 0.010 inches thick, at least about 0.012 inches thick, at least about 0.014 inches thick, or at least about 0.015 inches thick.

L18. The disposable article of any of embodiments L1 to L17, wherein the substrate is no more than about 0.05 inches thick (i.e., it has a "caliper" of about 0.05 inches), no more than about 0.04 inches thick, no more than about 0.035 inches thick, no more than about 0.030 inches thick, or no more than about 0.025 inches thick.

L19. The disposable article of any of embodiments L1 to L18, wherein the disposable article comprises a frozen food package (e.g., a box for frozen vegetables such as spinach), a drink box, a beverage carton (e.g., a milk or juice carton), an aseptic carton (e.g., an aseptic container for liquid foods, e.g., such as those manufactured by Tetra Pak), a beverage cup or container (e.g., a water cup or hot beverage cup such as a coffee cup), a cup lid, a cereal box, a cake mix box or a box for other dry goods, a plate, a serving tray or platter, a bowl, a baking cup or liner, a French fry carton, a cigarette or cigar container (e.g., pack) or wrapper or any other container or wrapper for tobacco or *cannabis* products, a confectionary container, a baked good container (e.g., a fresh cake or donut box), a food separator (e.g., "paper" separators position between food that may stick together such as, for example, packaged cheese slices), a serving cone or pouch for hot foods (e.g., for serving fair food or street food such as min-donuts, fried cheese curds, or fresh-baked cookies), a snow-cone or shave-ice cup, a clamshell container, an oyster pail (often referred to as a "Chinese" takeout container) or other takeout food container, a fast-food wrapper or bag, or a fresh fruit or vegetable box or package.

L20. The disposable article of embodiment L19, wherein the disposable article comprises a plate, wherein the plate preferably has an overall diameter of about 6 to about 12 inches. See, e.g., U.S. Pat. No. 9,655,461 for specifications and methods for making pressware paperboard plates.

L21. The disposable article of embodiment L20, wherein the plate includes an angled outer brim section, optionally including a plurality of flutes or pleats.

L22. The disposable article of embodiment L19, wherein the disposable article comprises a beverage cup (e.g., a beverage cup for hot and/or cold beverages), and wherein the cup has a volume capacity of from about 3 fluid ounces up to about 20 fluid ounces (e.g., about 4 fluid ounces, about 6 fluid ounces, about 7.5 fluid ounces, about 12 fluid ounces, about 16 fluid ounces, or a volume capacity falling between any of the aforementioned volume capacities (e.g., between 7.5 and 12 fluid ounces, between 12 and 16 fluid ounces, between 7.5 and 16 fluid ounces, and so on)).

L23. The disposable article of embodiment L19, wherein the disposable article comprises a beverage cup (e.g., a beverage cup for hot and/or cold beverages), and wherein the cup has a volume capacity of from about 100 millimeters ("ml") up to about 400 ml (e.g., about 100 ml, about 150 ml, about 180 ml, about 300 ml, about 400 ml, or a volume capacity falling between any of the aforementioned volume capacities (e.g., between 100 and 150 ml, between 300 and 400 ml, between 100 and 300 ml, and so on)).

L24. The disposable article of any of embodiments L19, L22, or L23, wherein the disposable article comprises a beverage cup (e.g., a beverage cup for hot and/or cold beverages) having a total height of from about 60 millimeters ("mm") up to about 140 mm (e.g., about 62 millimeters mm, about 80.5 mm, about 90 mm, about 95.2 mm, about 112 mm, about 115 mm, about 136.2 mm, or any height falling between any of the aforementioned heights (e.g., between 62 and 80.5 mm, between 115 and 136.2 mm, between 80.5 and 115 mm, and so on)).

L25. The disposable article of any of embodiments L19 or L22 to L24, wherein the disposable article comprises a beverage cup (e.g., a beverage cup for hot and/or cold beverages) having a brim diameter of from about 60 mm up to about 90 mm (e.g., about 62.3 mm, about 69.9 mm, about 70.06 mm, about 80 mm, about 80.2 mm, about 89.8 mm, or any brim diameter falling there between (e.g., between about 62.3 and 69.9 mm, between about 80.2 and 89.8 mm, and so on)).

L26. The disposable article of any of embodiments L1 to L5 or L19, wherein the article is flexible.

L27. The disposable article of embodiment L26, wherein the substrate comprises paper.

L28. The disposable article of embodiment L26 or L27, wherein the disposable article is parchment paper (also referred to as "baking paper"), kraft paper, or butcher paper.

L29. The disposable article of embodiment L26 or L27, wherein the disposable article comprises a food wrapper such as, for example, a candy wrapper or a fast-food wrapper (e.g., a burger wrapper, a deli sandwich wrapper, or other sandwich wrapper).

L30. The disposable article of any of embodiments L1 to L29, wherein the substrate is wax or starch infused or coated (e.g., on an at least side such as the outer surface).

L31. The disposable article of embodiment L30, wherein the wax or starch is plant-based (e.g., any of those referenced herein).

L32. The disposable article of embodiment L30 or L31, wherein the substrate is wax-infused.

L33. The disposable article of any of embodiments L30 to L32, wherein the substrate is formed from paperboard that includes a wax composition in an amount of at least 3 pounds of wax per 3000 square feet, or at least 5 pounds of wax per 3,000 square feet up to about 20 pounds of wax per 3,000 square feet.

L34. The disposable article of embodiment L30 or L31, wherein the substrate is starch-infused.

L35. The disposable article of any of embodiments L30, L31, or L34, wherein the substrate is formed from paperboard that includes from at least 1 pound of starch per 3,000 square feet, or at least 3 pounds of starch per 3,000 square feet up to about 12 pounds of starch per 3,000 square feet, or up to about 6 pounds of starch per 3,000 square feet.

L36. The disposable article of any of embodiments L1 to L35, wherein the disposable article includes printing or ink (e.g., visible on an interior surface, an exterior surface, or both). For example, the disposable article may include printing or ink disposed under the coating on an interior surface of the substrate, but which is visible because the coating is transparent.

L37. The disposable article of any of embodiments L1 to L36, wherein the coating, and preferably the disposable article, is not made using any vinyl polymers (e.g., styrene-acrylic copolymers, acrylonitrile styrene-acrylic copolymers, polyvinyl alcohol polymers, acrylic acid ethylene vinyl alcohol copolymers, ethylene-vinyl chloride copolymers, ethylene vinyl acetate copolymers, vinyl acetate acrylic copolymers, styrene-butadiene copolymers, or acetate ethylene copolymers).

L38. The disposable article of any of embodiments L1 to L37, wherein the coating, and preferably the disposable article, is not made using any polyolefin polymers (e.g., polyethylene, polypropylene, copolymers thereof, and the like).

L39. The disposable article of any of embodiments L1 to L38, wherein the coating, and preferably the disposable article, is not made using any ingredients from feedstocks derived from petroleum. For example, paraffin is an example of such a material that is derived from petroleum.

L40. The disposable article of any of embodiments L1 to L39, wherein the coating, and preferably the disposable article, is not made using any halogenated materials (e.g., chlorinated or fluorinated materials).

L41. The disposable article of any of embodiments L1 to L40, wherein the coating composition includes one or more pigments or fillers (e.g., kaolin clay, delaminated clay, structured clay, calcined clay, alumina, silica, aluminosilicate, talc, calcium sulfate, ground calcium carbonate, precipitated calcium carbonate, or a combination thereof).

L42. The disposable article of any of embodiments L1 to L41, wherein the coating composition includes glyceride, preferably a mono-glyceride or mixture of mono-glycerides (e.g., in an amount of at least 10 wt-%, or more than 50 wt-%, based on the total solids of the coating composition), with the EDIPEEL product commercially available from Apeel Sciences of Goleta, California being an example of such a mixture of mono-glycerides.

L43. The disposable article of embodiment L42, wherein the mono-glyceride comprises one or more of the below compounds:

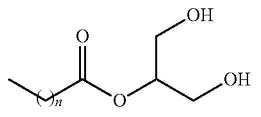

n = 2 - 20

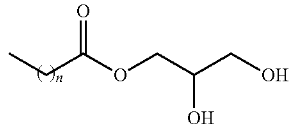

n = 2 - 20

L44. The disposable article of embodiment L42 or L43, wherein the glyceride comprises 2,3-dihydroxypropyl palmitate, 1,3-dihydroxypropan-2-yl palmitate, or a mixture thereof (e.g., the EDIPEEL product from Apeel Sciences. (See, e.g., the coating composition of GRAS Notice No. 648 accessible on the FDA website at https://www.accessdata.fda.gov/scripts/fdcc/index.cfm?set=GRASNotices&id=648). According to GRAS Notice No. 648, the EDIPEEL product is a mixture of monoacylglycerides and primarily containing 2,3-dihydroxypropyl palmitate and 1,3-dihydroxypropan-2-yl palmitate.

L45. The disposable article of any of embodiments L42 to L44, wherein the glyceride comprises 2,3-dihydroxypropyl stearate (e.g., CAS Registry No. 123-94-4) or 1,3-dihydroxpropan-2-yl stearate (e.g., CAS Registry No. 621-61-4), or a mixture thereof. In some embodiments one or more of the glycerides are derived from grape seeds. A representative manufacturing process for preparation of a mixture of monoacylglycerides is provided in FIG. 2.3 of GRAS Notice No. 886 accessible on the FDA website at https://www.accessdata.fda.gov/scripts/fdcc/?set=GRASNotices&id=886.

L46. The disposable article of any of embodiment L1 to L45, wherein the coating is edible. For example, the coating composition can be any of the edible coating compositions disclosed in WO2015/017450 (Rogers et al.), WO2016/187581 (Perez et al.), WO2017/048951 (Kaun et al.), WO2017/100636 (Perez et al.), WO2017/132281 (Holland et al.), WO2017/172951 (Rogers et al.), WO2018/009846

(Kaun et al.), WO2018/094269 (Bakus et al.), WO2019/028043 (Holland et al.), WO2019/036686 (Frazier et al.), WO2020//023319 (Hegel at. al.), or WO2020/051238 (by Braden et al.), which may be used as described or optionally modified to include any of the ingredients disclosed herein (e.g., PMCA, carboxyl-functional AHC, and/or ethylenically unsaturated component, etc.) in any of the amounts disclosed herein.

L47. The disposable article of any of embodiments L1 to L46, wherein the coating has an average thickness of at least about 0.01 micron, at least about 0.100 micron, at least about 0.5 micron, at least about 1 micron, at least about 1.5 microns, at least about 2 microns, at least about 5 microns, at least about 10 microns, at least about 15 microns, or at least about 20 microns.

L48. The disposable article of any of embodiments L1 to L47, wherein the coating has an average thickness of less than about 100 microns, less than about 50 microns, less than about 20 microns, less than about 15 microns, less than about 10 micros, or less than about 5 microns.

L49. The disposable article of any of embodiments L1 to L48, wherein the disposable article is compostable in its entirety.

L50. The disposable article of any of embodiments L1 to L49, wherein the disposable article is recyclable (e.g., prior to soiling with food or beverage product). To be recyclable using conventional recycling processes, for example, the disposable article should be free of layers that have been laminated together using glue, should be free of foil layers, and should be free of polyolefin layers.

L51. The disposable article of any of embodiments L1 to L50, wherein the coating, and preferably the disposable article, do not include styrene or any structural units formed therefrom.

L52. The disposable article of any of embodiments L1 to L51, wherein the coating, and preferably the disposable article, does not include any materials in an amount (e.g., outside any safe harbor amounts that may be allowed) that require either the coating, or the disposable article, to include a State of California Proposition 65 warning if marketed in California on Jun. 1, 2020 (pursuant to the Jan. 3, 2020 Proposition 65 List am on the California's State website at https://oehha.ca.gov/). More preferably, the coatings, and preferably also the disposable article, are not made using any of the compounds included in the Jan. 3, 2020 Proposition 65 List L53. A method comprising, causing the coating composition recited in any preceding embodiment (e.g., recited in any of embodiments 1A to 267, D1 to D70, or L1 to L52) to be applied to a substrate of any of embodiments L1 to L52 (e.g., to form a disposable article of any of embodiments L1 to L52).

L54. The method of embodiment L53, wherein causing comprises marketing a coating composition for such use or providing instructions for using a coating composition in such an end use.

L55. A method for forming a disposable article comprising: applying any coating composition referenced herein on a substrate of any of embodiments L1 to L52, and wherein the finished disposable article comprises a disposable food-storage, food-handling, or food-serving article, typically a single-use such article.

L56. The method of embodiment L55, wherein the liquid coating composition is applied using a spray process (which may involve misting), a curtain-coating process, a roll coating process, or a wave coating process.

Representative Test Methods and Procedures

DOUBLE RUBS: Coating cure can be demonstrated through improved resistance properties. A modification of ASTM D4752 can be used where methyl ethyl ketone (MEK) is replaced with either isopropanol or water. The test involves rubbing the surface of a 25 micron, 50 micron, 75 micron or 100 micron dried film with cheesecloth soaked with isopropanol or water until failure or breakthrough of the film occurs. The type of cheesecloth, the stroke distance, the stroke rate, and approximate applied pressure of the rub are specified in ASTM D4752. The rubs are counted as a double rub, one rub forward and one rub backward constitutes a double rub. Films are tested after 7 and 14 days drying at 23+/−2° C. and 50+/−5% humidity. It is expected a more crosslinked film will exhibit a higher number of MEK double rubs in the test.

FILM HARDNESS: Hardness of the film can be tested as reported in ASTM D2134 with a Sward hardness rocker. The Sward rocker is placed on the film, rotated to the left, past the counter and released. Count the number of swings until the amplitude drops below the low set limit. Preferably a Gardner GS3 Sward Rocker is used. It is expected a harder, more crosslinked film will also have improved abrasion resistance. Films are tested after 7 and 14 days drying at 23+/−2° C. and 50+/−5% humidity.

IODINE VALUE: Prepare Starch Solution by dissolving 5 grams of soluble starch with 100 milliliters (ml) of deionized (D.I.) water. Add 400 ml of boiling D.I. water, stir until clear, and allow to cool. This solution will not keep for more than a few days and should be made fresh as needed. Prepare Potassium Iodide Solution by dissolving 150 grams of Potassium Iodide in 1,000 ml of D.I. water. A small portion of the sample under test shall be weighed by difference into an Erlenmeyer iodine flask, the amount of sample taken being such that from 10 to 30% of an iodine solution (Wijs Iodine Monochloride Solution—Fisher Scientific Co. Cat. No. SI106-4) will be absorbed. Pipette 20 ml of chloroform into each sample flask. Stopper the flasks, add a Teflon stirring bar and stir until the samples dissolve. Prepare two flasks for blanks by pipetting 20 ml of chloroform into separate flasks. Pipette into each flask (2 flasks for each sample and 2 flasks for blanks) 25 ml of the iodine solution. Stopper the flasks, stir for 30 seconds, then let stand with occasional swirling for 30 minutes in a dark place at room temperature. At the end of the standing time, pipette 20 ml. of Potassium Iodide Solution and 80 ml of D.I. water, stopper and stir. Add 2 ml of the Starch Solution and immediately titrate with 0.1 N sodium thiosulfate (Fisher Scientific Cat. No. SS368-1). Calculate the iodine value as the difference in the average volume (in milliliters) of 0.1 N sodium thiosulfate required for the blank less the average volume (in milliliters) required for the sample, multiplied by 1.269 and divided by the sample weight in grams. The iodine value is calculated using the following equation: [(Average volume blank−Average volume sample)×1.269]/[Sample Weight in grams]. The iodine value is reported as the centigrams of iodine absorbed per 1 gram of the material.

GEL FRACTION: Prior to the analysis, the samples are dried overnight in a circulation oven at 50° C. Procedure: 1 gram of sample and 50 ml of xylene are added to a 50 ml crimp cap vial and the vial is capped. The vial is shaken for at least 10 hours at room temperature. A filter paper (Schleicher & Schuell No. 597, 45 mm) is washed with 5 ml of dichloromethane (DCM) using a Buchner funnel, a filtering conical flask, and a water aspirator to provide suction for speeding up the filtration process. The cleaned filter paper is placed on a petri dish, dried for 1 hour at 130° C., and cooled to room temperature in a desiccator. The petri dish, including the dried filter paper, is weighed. Next, a vacuum is applied to the Buchner funnel and the sample solution is poured into the funnel. The filter paper including the residue is placed in the petri dish again, dried for 2 hours at 130° C., and cooled to room temperature in a desiccator. The petri dish including the dried filter paper and the residue is weighed again and the weight of the residue is calculated. The gel content is defined as the weight of the residue, relative to the initial weight of the sample (1 gram). A gel fraction of less than 0.2 wt % indicates the absence of gel formation.

VISCOSITY CHANGE: The viscosity change of a coating composition is measured by initially measuring its viscosity, and then storing the coating composition at 40° C. for one month (e.g., in a sealed vessel to avoid changes in viscosity due merely to evaporation). After the one-month period, the viscosity of the aged coating composition is measured and compared to the initial viscosity measurement. An increase in viscosity is believed to be indicative of the occurrence of crosslinking reactions (e.g., the coordination/chelation believed to occur in certain preferred embodiments that include efficacious amounts of PMCA and AHC capable of coordinating with the PMCA).

CAST FILM PREPARATION: Cast films can be prepared by applying and drying the liquid coating composition to be evaluated on release paper with, e.g., a suitable wire-wound rod to achieve average dry film thicknesses of about 25 microns, about 50 microns, about 75 microns, or about 100 microns. Small amounts of a wetting agent, such as BYK 347 may be required. Film may also be made by casting a film in a mold to achieve average dry film thicknesses of about 25 microns, about 50 microns, about 75 microns, and about 100 microns. Small amounts of a wetting agent, such as BYK 347 may be required. Films are dried for seven days at 23+/−2° C. and 50+/−500 humidity.

Water Vapor Permeability (WVP):

Test methods for assessing the water-vapor permeability (WVP) of plant coatings and films for use with plant items are well known in the art. See, for, example, the below test method described in WO2017083749A1 and Ghanbarzadeh, Babak & Almasi, Hadi & Entezami, Ali. (2011). Improving the barrier and mechanical properties of corn starch-based edible films: Effect of citric acid and carboxymethyl cellulose. Industrial Crops and Products—IND CROPS PRODUCTS. 33. 229-235. 10.1016/j.indcrop.2010.10.016. The below test method is a slightly modified version of that described in WO2017083749A1 to allow for testing of cast films form from a liquid coating composition. See also, for example, ASTM F-1249.

Water Vapor Permeability (WVP) is tested according to ASTM method E96-95 (1995) with some modifications (Ghanbarzadeh, Almasi, & Entezami, 201 1). Gas-tight amber glass vials (40 ml, o.d. 28×98 mm height) with propylene screw caps and Teflon-faced silicone septa (o.d. 22 mm) are used to determine the WVP of the films. The films (see below Cast Film Preparation) are cut into round discs that were the same size and shape as the septa. On each septum, a 14 mm outer diameter (o.d.) hole is cut through at the center. The test film is placed between the screw cap and the septum. The cap is tightly screwed to the vial so that the only water vapor exchange pathway between the inside and the outside of the vial is through the 14 mm o.d. film area. Three (3) grams of anhydrous CaS04 (Cat No: AC217525000, Fisher Scientific, USA) is added in each cup to maintain 0% RH (relative humidity) inside the cup. Cups are then placed in a desiccator containing saturated K2SO4 solution so that the RH inside the desiccator is maintained at about 97% at 25° C. The cups are weighed every 2 hours for the first day and then every 12 hours thereafter. Changes of weight are recorded as a function of time. Slopes (weight vs. time) are calculated by linear regression. Water vapor transmission rate (WVTR) is calculated as slope (grams/hours) divided by the transfer area (m3). Water vapor pressure (WVP) (gPa−1 h−1 m−1) is calculated as:

$$WVP = \frac{WVTR \times T}{P(R1 - R2)}$$

where T is the film thickness (m), P is the saturation vapor pressure of water (Pa) at the test temperature, R1 is the RH inside the desiccator, and R2 is the RH inside the vial. Further, P(R1-R2) is the driving force and, under the RH settings of this experiment at 25° C., the driving force was 3074 Pa.

OXYGEN PERMEABILITY: See, e.g., ASTM D3985, which may be used to assess oxygen permeability for cast films (see, e.g., the above cast film methodology).

WATER-SOLUBLE CONTENT AND WATER-INSOLUBLE CONTENT: The coating composition to be tested is applied to a suitable substrate (e.g., clean and washed aluminum panel) of known mass (i.e., the substrate has been weighed prior to coating) to achieve a suitable average coating thickness. A suitable wire-round bar may be used to apply the coating composition to the substrate. An average overall dry film thickness of about 125 microns is an example of a suitable coating thickness for assessment. After application, the coated substrate is allowed to dry for 7 days at 23+/−2° C. and 50+/−5% humidity. The coated sample is then weighed and fully immersed in deionized water for 8 hours. The coated sample is removed from the water and allowed to dry at least 24 hours at 23+/−2° C. and 50+/−5% humidity. The dry coated test sample is then again weighed and the difference in sample weight of the dry coated test sample before and after water immersion is indicative of the amount of water-soluble content of the coating. The amount of water-insoluble content in the coating can be calculated by factoring in the weight of the substrate prior to coating (e.g., [weight of dried coating sample after water immersion]−[weight of dry substrate prior to coating]). Percentage changes in water-soluble content and water-insoluble content can be calculated using suitable reference test samples.

EXAMPLES

These Examples are merely for illustrative purposes and are not meant to be overly limiting on the scope of the appended embodiments. Notwithstanding that the numerical ranges and parameters setting forth the broad scope of the present disclosure are approximations, the numerical values set forth in the specific examples are reported as precisely as possible. Any numerical value, however, inherently contains certain errors necessarily resulting from the standard deviation found in their respective testing measurements. At the very least, and not as an attempt to limit the application of the doctrine of equivalents to the scope of the embodiments, each numerical parameter should at least be construed in light of the number of reported significant digits and by applying ordinary rounding techniques.

Unless otherwise noted, all parts, percentages, ratios, etc. in the examples and the rest of the specification are by weight, and all reagents used in the examples were obtained, or are available, from general chemical suppliers such as, for example, Sigma-Aldrich Company, Saint Louis, Mo., or may be synthesized by conventional methods.

| Chemical | Trade Name/Further Description | Supplier |
|---|---|---|
| Agar Agar | Agar Agar Powder | Living Jin, Gangnam-gu, Korea from Amazon.com |
| Gum Arabic; Carboxy Methyl Cellulose | Carboxy Methyl Cellulose | Modernist Pantry, Eliot, MN from Amazon.com |
| Hyaluronic acid | Pure Hyaluronic Acid Serum Powder | Micro Ingredients, from Amazon.com |
| Linseed oil | Klean Strip Transparent Clear Boiled Linseed Oil | Ace Hardware |
| Manganese drier | 9% Manganese Hydro-Cure ® III | Borchers America, Westlake, OH |
| Monolaurin | Colonial Monolaurin | Colonial Chemicals, South Pittsburgh, TN |
| Psyllium | Psyllium Husk Powder, 95% purity | AEP Colloids, Hadley, NY |
| Zinc Ammonium Carbonate | Zinplex 15 | Munzing, Bloomfield, NJ |
| Amidated Pectin | AM520 | AEP Colloids |

Example 1-9: Coated Strawberries

The strawberries used in these experiments were taken from strawberry fields. The strawberries were not treated with any pesticides, but the berries are not considered organic because the surrounding fields use pesticides. Strawberries were picked, the dirt rinsed off, and stored in an ice chest until they were coated, within 24 hours of harvest.

Strawberries were weighed and sorted based on size to achieve uniform samples. Five to six berries were used per run. The coating treatments of Examples 1-9 were prepared using the ingredients (in grams) shown below in Table 1. Each of the treatments were poured into a spray bottle and the strawberries were spray coated. The strawberries were spray coated on a drying rack and flipped halfway through the coating process to insure even coating. The berries were moved to another drying rack and allowed to dry at room temp.

TABLE 1

| Ingredients | Example | | | | | | | | | |
|---|---|---|---|---|---|---|---|---|---|---|
| (amounts in grams) | 1 | 2 | 3 | 4 | 5 | 6 | 7 | 8 | 9 | Control |
| Linseed oil | 1 | | | | | | | | | |
| Manganese drier | 0.05 | | | | | | | | | |
| Agar Agar | | 0.5 | 0.5 | | | | | | | |
| Methyl cellulose | | | | 0.5 | 0.5 | | | | | |
| Psyllium | | | | | | 0.5 | 0.5 | | | |
| Hyaluronic acid | | | | | | | | 0.25 | 0.25 | |
| Zinc Ammonium Carbonate | | 0.11 | | 0.11 | | 0.11 | | 0.06 | | |
| 95% ethanol | 99 | | | | | | | | | |
| Deionized Water | | 99.5 | 99.5 | 99.5 | 99.5 | 99.5 | 99.5 | 99.5 | 99.5 | |

Each berry was individually accessed visually for appearance and rated per the scale below. The test was stopped at 88 hours, as over half the control berries were molding. The average appearance data per the rating scale at 88 hours post-treatment is provided in Table 2 below. As shown in Table 2, a comparison of all the treated strawberries versus the control demonstrates that all treated strawberries were still edible, on average, whereas the control berries were not. A comparison of treatments with and without the divalent metal demonstrates the divalent metal improves visual appearance.

Appearance Scale:

10 Edible, no mold, no soft areas
9 Edible, no mold, limited soft areas (<10%)
8 Edible, no mold, some soft areas (<25%)
7 Edible, no mold, larger soft areas (<50%)
6 Not edible, mold, (<10%)
5 Not edible, mold (<25%)
4 Not edible, mold (<50%)
3 Not edible, mold (<75%)
2 Not edible, mold (>75%)
1 Not edible, mold (>90%)

TABLE 2

| Average Strawberry Rating at 88 Hours Post-Treatment | | | | | | | | | |
|---|---|---|---|---|---|---|---|---|---|
| Ex. 1 | Ex. 2 | Ex. 3 | Ex. 4 | Ex. 5 | Ex. 6 | Ex. 7 | Ex. 8 | Ex. 9 | Control |
| 8 | 8 | 7.5 | 8 | 7 | 8 | 7 | 8 | 7 | 6 |

Figure 4:
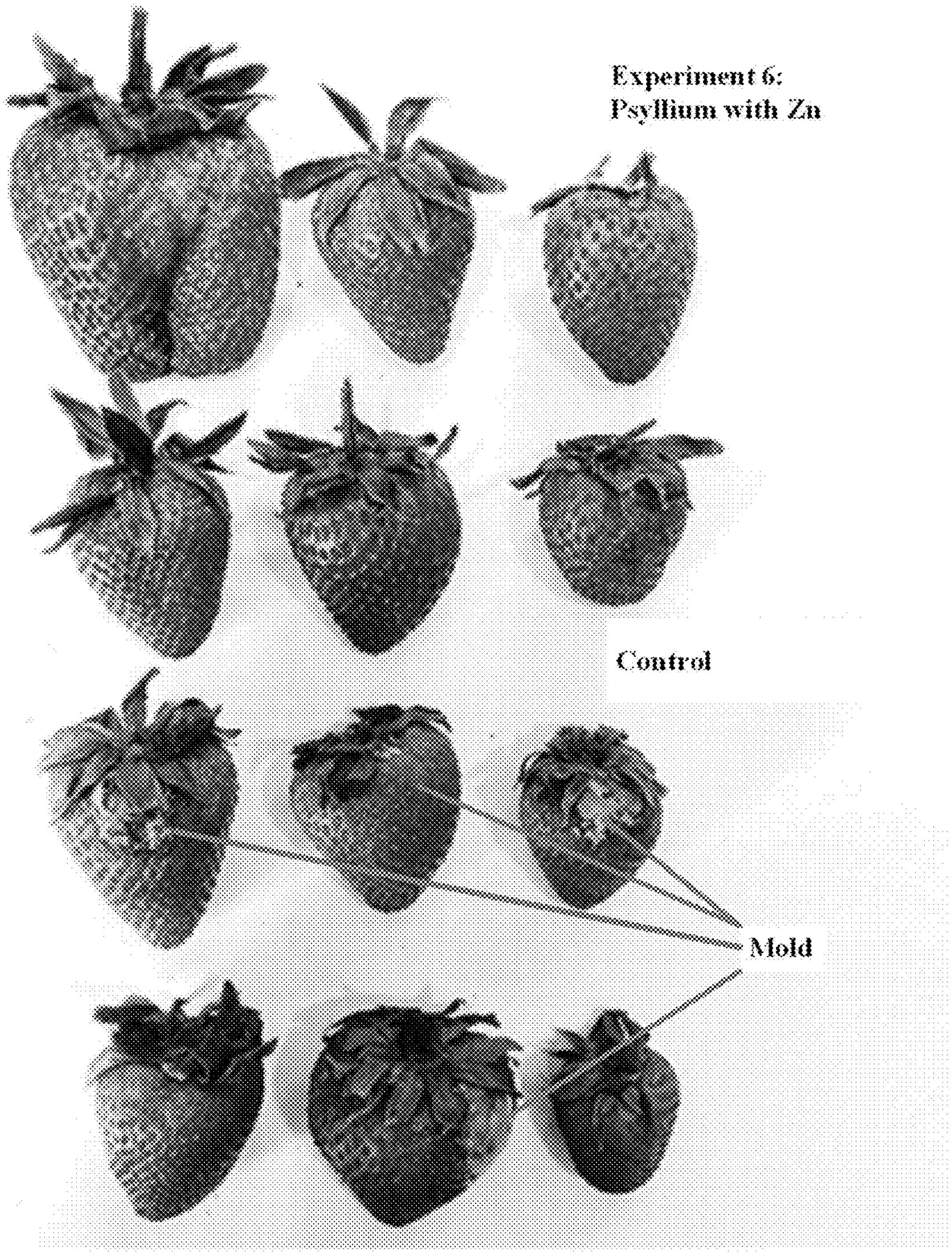
FIG. 4 is a photograph of strawberries treated with a barrier coating composition of the present disclosure as compared to untreated control strawberries after being stored under ambient conditions for 88 hours.

FIG. 4 is a photograph taken at 88 hours post-treatment that shows another run of strawberries coated with a coating composition of Example 6 (using the coating methods described above) and compared relative to control strawberries. Both the treated and control strawberries of FIG. 4 were fresh, newly-arrived store bought organic strawberries from the same carton. As can be seen, at 88 hours post-treatment the control berries had significant amounts of visible surface mold, whereas the strawberries coated with the coating composition of Example 6 did not.

To confirm that the divalent metal zinc was not the sole reason for the improvements (e.g., those shown in Table 2 relative to the control berries), strawberries were treated with a zinc solution (0.23 grams zinc ammonium carbonate mixed into 100 grams of deionized water) and tested as described above versus a non-treated control. The zinc on its own did not yield any improvement over the control berries. Rather, the strawberries treated with the zinc solution showed mold sooner than the control strawberries, resulting in a lower averaged score.

Examples 10: Coated Avocados

Bacon avocados were picked fresh, lightly washed, and stored in an ice chest until coated, and coated within 24 hours of harvest. The avocados were not treated with pesticides. Avocados were weighed and sorted based on size to achieve uniform samples. Five avocados were used per run (i.e., five for Example 10 and five for the control). The coating treatment of Example 10 shown below in Table 3 was prepared (within 24 hours prior to use) and poured into a spray bottle and the avocados were spray coated. The avocados were spray coated on a drying rack and flipped halfway through the coating process to insure even coating. The avocados were moved to another drying rack and allowed to dry at room temperature (about 21° C. to 24° C.).

TABLE 3

| Ingredients | Run 1 (grams) | control |
|---|---|---|
| Amidated Pectin | 1 | |
| Zinc Ammonium Carbonate | 0.45 | |
| Deionized Water | 99 | |

The avocados were periodically scored using the below ripeness scale. All of the avocados at time zero (i.e., at treatment) had a score of “10”.

Ripeness Scale

| | | |
|---|---|---|
| Unripe | 10 | Very Solid/Rock Like |
| Unripe | 9 | Some give |
| Unripe | 8 | Very firm |
| Unripe | 7 | Firm, watery tasting |
| Edible | 6 | A little firm, edible |
| Edible | 5 | Ideal for eating |
| Edible | 4 | Soft, good for guacamole |
| Not Edible | 3 | Starting to turn black around edges |
| Not Edible | 2 | Softness and mainly black exterior, dark interior |

Due to the low surface energy of the bacon avocado skins, and the low solids of the treatment of Example 10, poor wetting out of the treatment onto the avocados was observed. Nonetheless, as shown in the ripeness scale data of Table 4, the results still demonstrated a positive effect relative to the control, and further formulation optimization with higher solids and optional wetting agents should further improve performance.

TABLE 4

| Avocado rating ripeness | | |
|---|---|---|
| Hours Post-Treatment | Avocados treated with the coating composition of Example 10 | Control |
| 276 hours | 6 | 4 |
| 300 hours | 5 | 3.5 |
| 325 hours | 5 | 3 |
| 348 hours | 4 | 2.5 |

For Examples 10-13 that follow, all Bacon and Haas avocados were picked fresh, lightly washed with water, and stored in an ice chest until coated, and coated within 24 hours of harvest. The avocados were not treated with pesticides. Avocados were weighed and sorted based on size to achieve uniform samples.

Example 11: Coated Bacon Avocados

Figure 5:
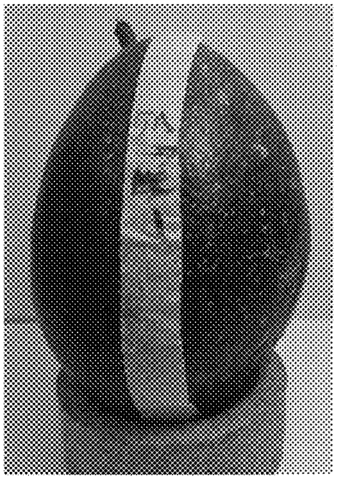
FIG. 5 is a photograph of an avocado taped with masking tape to divide a coated half of the avocado from an uncoated half.

A homogenous treatment was prepared with 1 gram ascorbyl palmitate and 99 grams deionized (DI) water. The DI water was first heated to around 60-70° C. The ascorbyl palmitate was weighed out and put into a glass beaker. The heated DI water was then poured over the mixture while stirring on a hot plate at low stir rate for about 10 minutes. The mixtures was allowed to cool fully before being poured into a glass jar. A piece of % inch masking tape was applied all the way around four bacon avocados from stem to tip and back as shown in FIG. 5. The treatment was prepared (within 24 hours prior to use) and poured into a spray bottle for application. The avocados were positioned on a drying rack and were each spray coated on one used using the spray bottle. The treated avocados were allowed to dry at room temperature overnight (about 21° C. to 24° C.).

The treated avocados were then placed outside in the city of Arroyo Grande, CA on the days of Jul. 15, 2021 (at 10:30 AM PST) through Jul. 17, 2021 (4:00 PM PST). The avocados were placed such that the uncoated and the coated sides would be exposed to similar amounts of sun. At the end of the time period, the uncoated sides of the avocado had visibly started to ripen and turn darker than the coated sides. The visual data was confirmed with a Colorimeter, with the data provided below in Table 5.

TABLE 5

| | Uncoated Side | | | Coated Side | | |
|---|---|---|---|---|---|---|
| Ex. 11 Trials | L* | a* | b* | L* | a* | b* |
| Avocado 1 | 19.99 | 4.52 | 3.86 | 23.44 | 3.81 | 5.23 |
| Avocado 2 | 31.19 | −3.08 | 17.48 | 33.57 | −4.03 | 19.48 |
| Avocado 3 | 28.41 | −0.86 | 11.38 | 33.02 | −3.70 | 17.59 |
| Avocado 4 | 31.70 | −1.89 | 18.41 | 38.09 | −6.30 | 23.89 |

The average change (subtracting values coated−uncoated) for four avocados in L* was 4.21, in a* was −2.23, and in b* was 3.77, confirming the coated side of each avocado maintained its initial color and were lighter (L*), greener (a*), and bluer (b*), as compared to its uncoated side, which had visibly darkened. For reference, L* indicates lightness, a* is the red/green coordinate, and b* is yellow/blue coordinate. (Konica Minolta Sensing Americas Inc. 2006-2022. "Identifying Color Differences Using L*a*b* or L*C*H* Coordinates.", https://sensing.konicaminolta.us/us/blog/identifying-color-differences-using-l-a-b-or-l-c-h-coordinates/.)

Example 12: Coated Haas Avocados

The treatment of Example 12 was prepared from 1 gram ascorbyl palmitate and 99 grams distilled water. The deionized (DI) water was first heated to around 60-70° C. The ascorbyl palmitate was weighed out and put into a glass beaker. The heated DI water was then poured over the mixture while stirred on a hot plate at a low stir rate for about 10 minutes. The mixture was allowed to cool fully before being poured into a glass jar. A piece of % inch masking tape was applied around five Haas avocados from stem to tip and back, as shown in FIG. 5. The treatment was prepared (within 24 hours prior to use). One side of each of the avocados was brush coated on a drying rack and allowed to dry at room temperature (about 21° C. to 24° C.).

Figure 6:
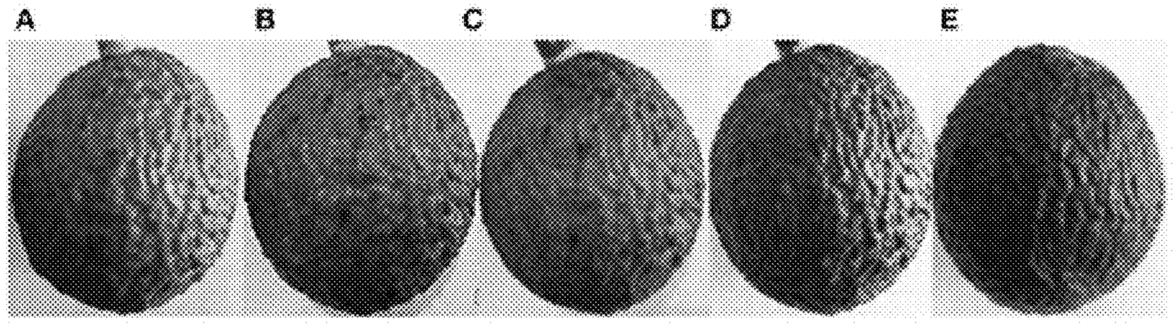
FIG. 6 shows a series of photographs of reference avocados for use in visually scoring the coloration of Haas avocados.

As Haas avocados have an uneven surface, colorimeter analysis was not possible. Instead, a visual analysis was made using color scoring scale for Haas avocados shown in FIG. 6. A value of 1 to 5 was assigned per the scoring scale of FIG. 6, with the "A" reference avocado showing a rating of "1", the "B" reference avocado showing a "2", the "C" reference avocado showing a "3", the "D" reference avocado showing a "4", and the "E" reference avocado showing a "5". All of the Haas visual ripeness color scores in Table 6 below were assigned based on the reference scoring standards illustrated in FIG. 6. The treated avocados were then placed outside in the city of Arroyo Grande, CA on the days of Jul. 15, 2021 (at 10:30 AM PST) through Jul. 17, 2021 (4:00 PM PST), with the measurements in Table 6 taken promptly at the end point time. In Table 6, "uc" indicates the score from the uncoated side and "c" indicates the score from the coated side, with "Δ" indicating the difference between the two.

TABLE 6

Darkening protection for Haas avocados over time

| Avocado 1 | | | Avocado 2 | | | Avocado 3 | | | Avocado 4 | | | Avocado 5 | | |
|---|---|---|---|---|---|---|---|---|---|---|---|---|---|---|
| uc | c | Δ | uc | c | Δ | uc | c | Δ | uc | c | Δ | uc | c | Δ |
| 2 | 1.5 | 0.5 | 3 | 1.5 | 1.5 | 2 | 1.5 | 0.5 | 2 | 1.5 | 0.5 | 1.5 | 1.25 | 0.25 |

The average change in color for all five avocados during the testing period, per the rating scale was 0.65 and, in all cases, the side coated with the coating composition of Example 12 was visibly lighter and greener.

Example 13: Coated Avocados

Five bacon avocados were used per run (i.e., five for each of Examples 13A, 13B, and 13C and five for the uncoated control). The coating treatments of Example 13A-C shown below in Table 7 were prepared (within 24 hours prior to use) and brushed onto the avocados. DI water was first heated to around 60-70° C. All the coating ingredients were weighed out and put into a glass beaker. The heated DI water was then poured over the mixture while stirring on a hot plate at low stir rate for about 10 minutes. The mixtures were allowed to cool fully before being poured into glass jars. The avocados were brush coated on a drying rack and flipped halfway through the coating process to ensure even coating. The avocados were moved to another drying rack and allowed to dry overnight at room temperature (about 21° C. to 24° C.).

TABLE 7

| | Ex 13. A (Weight Parts) | Ex. 13B (Weight Parts) | Ex. 13C (Weight Parts) |
|---|---|---|---|
| Amidated Pectin | 5 | 3 | 3 |
| Ascorbyl Palmitate | | 1.5 | 2 |
| Ferulic Acid | | 0.3 | 0.45 |
| Zinc (Zinplex 15) | | 0.094 | 0.094 |
| Deionized Water | 95 | 95.106 | 94.456 |

The avocados were left out under indoor ambient temperature and light conditions (e.g., as would be encountered on a kitchen counter) and were periodically scored using the below ripeness scale. All of the avocados at time zero (i.e., at treatment) had a score of "10".

Ripeness Scale

| | | |
|---|---|---|
| Unripe | 10 | Very Solid/Rock Like |
| Unripe | 9 | Some give |
| Unripe | 8 | Very firm |
| Unripe | 7 | Firm, watery tasting |
| Edible | 6 | A little firm, edible |

-continued

| | | |
|---|---|---|
| Edible | 5 | Ideal for eating |
| Edible | 4 | Soft, good for guacamole |
| Not Edible | 3 | Starting to turn black around edges |
| Not Edible | 2 | Softness and mainly black exterior, dark interior |

As shown in the ripeness scale data of Table 8, the results demonstrated a positive effect relative to the control. A rating below 4 was considered a fail.

TABLE 8

| Avocado Ripeness Rating | | | | |
|---|---|---|---|---|
| Hours Post Treatment | Avocados treated with Ex. 13A coating composition (average rating for 5 avocados) | Avocados treated with Example 13B coating composition (average rating for 5 avocados) | Avocados treated with Example 13C coating composition (average Rating for 5 avocados) | Control (average rating for 5 avocados) |
| 0 | 10 | 10 | 10 | 10 |
| 48.5 | 10 | 10 | 10 | 9.8 |
| 71.5 | 10 | 9.9 | 10 | 9.2 |
| 95.5 | 9.9 | 9.8 | 10 | 8.5 |
| 119.5 | 9.5 | 9.5 | 9.4 | 7.9 |
| 143.5 | 9 | 8.6 | 8.8 | 6.8 |
| 168 | 8.6 | 8.3 | 8.2 | 5.7 |
| 191.5 | 8.1 | 8.1 | 7.3 | 5.2 |
| 215.5 | 7.4 | 7.9 | 7.1 | 4.3 |
| 240.5 | 7.2 | 7.4 | 6.7 | 3.7 (Fail) |
| 263.5 | 6.5 | 7 | 6 | 3 |
| 288.5 | 6.3 | 6.5 | 5.8 | 2.6 |
| 312.5 | 5.7 | 6.4 | 5.5 | 1.7 |

The average weight loss of the avocados from Table 8 was also determined at 312.5 hours post-treatment for the treatments of Examples 13A-13C versus the untreated Control. The results are shown in Table 9.

TABLE 9

| Percent water loss less than the control | | | |
|---|---|---|---|
| Hours Post Treatment | Avocados treated with Ex. 13A coating composition | Avocados treated with Example 13B coating composition | Avocados treated with Example 13C coating composition |
| 312.5 | 14.60% | 41.90% | 40.20% |

The results from Table 9 show that the two treatments containing ascorbyl palmitate (Examples 13B and 13C) had less moisture loss versus Example 13A and versus the Control.

The complete disclosures of the patents, patent documents, and publications cited herein are incorporated by reference in their entirety as if each were individually incorporated. To the extent that there is any conflict or discrepancy between this specification as written and the disclosure in any document that is incorporated by reference herein, this specification as written will control. Various modifications and alterations to this disclosure will become apparent to those skilled in the art without departing from the scope and spirit of this disclosure. It should be understood that this disclosure is not intended to be unduly limited by the illustrative embodiments and examples set forth herein and that such examples and embodiments are presented by way of example only with the scope of the disclosure intended to be limited only by the claims set forth herein as follows.

The entire contents of the PCT international applications PCT/US2021/036202 and PCT/US2021/036239, each filed on Jun. 7, 2021 by DeMaster et. al. and entitled, respectively, "SELECTIVELY TREATING PLANT ITEMS" and "SHELF-LIFE EXTENDER COMPOSITIONS FOR LIVE PLANT ITEMS AND METHODS, KITS, AND COATED LIVE PLANT ITEMS RELATING THERETO", are each incorporated herein by reference in their entireties. The entire contents of US2022/0095638 are also incorporated herein by reference.

The invention claimed is:

1. A method comprising:

causing an aqueous barrier coating composition to be applied to at least a portion of a skin of a whole fruit or vegetable to form a coated whole fruit or vegetable, wherein the as-applied aqueous barrier coating composition comprises:

an active hydrogen component comprising a lipid, wherein the lipid comprises a monoester of (i) a C12 to C20 fatty acid and (ii) a hydroxyl-functional compound other than glycerol, and wherein the monoester has a plurality of active hydrogen groups selected from carboxyl groups, acidic hydroxyl groups, salt groups thereof, or any combination thereof;

at least 50% by weight of water;

optionally a polyvalent metal crosslinking agent; and optionally an antimicrobial agent;

wherein the as-applied aqueous barrier coating composition is edible, includes at least 25% by weight, based on total solids, of the monoester, and includes 10% by weight or less of total solids.

2. The method of claim 1, wherein the hydroxyl-functional compound is one or both of: (i) more polar than glycerol and (ii) more soluble in water than glycerol at ambient temperature.

3. The method of claim 1, wherein a structural unit of the monoester, which is derived from the hydroxyl-functional compound, includes an active hydrogen group capable of forming a salt.

4. The method of claim 1, wherein the hydroxyl-functional compound is unsaturated.

5. The method of claim 1, wherein the monoester of (i) the C12 to C20 fatty acid and (ii) the hydroxyl-functional compound other than glycerol has three or more active hydrogen groups.

6. The method of claim 1, wherein the hydroxyl-functional compound comprises ascorbic acid, an ascorbic acid salt, or a mixture thereof.

7. The method of claim 1, wherein the monoester of (i) the C12 to C20 fatty acid and (ii) the hydroxyl-functional compound other than glycerol comprises ascorbyl palmitate, ascorbyl stearate, ascorbyl laurate, ascorbyl myristate, a salt thereof, or a combination thereof.

8. The method of claim 1, wherein more than 50% by weight of total lipid solids present in the coating composition comprises the monoester of (i) the fatty acid and (ii) the hydroxyl-functional compound other than glycerol.

9. The method of claim 8, wherein the active hydrogen component further comprises, as an additional ingredient, a fatty acid salt.

10. The method of claim 1, wherein causing the aqueous barrier coating composition to be applied to at least a portion of a skin of a whole fruit or vegetable comprises spray applying the aqueous barrier coating composition to the skin of the fruit or vegetable.

11. The method of claim 1, wherein the active hydrogen component further includes a polysaccharide in an amount, based on solids, which is greater than that of the monoester of (i) the C12 to C20 fatty acid and (ii) the hydroxyl-functional compound other than glycerol.

12. The method of claim 11, wherein the coated whole fruit or vegetable comprises a coated fruit or vegetable that, relative to an otherwise identical uncoated fruit or vegetable, exhibits a reduced mass loss rate.

13. The method of claim 12, wherein the fruit or vegetable comprises an avocado.

14. The method of claim 1, wherein the coating composition, based on total solids, includes 0-10% by weight, wax.

15. The method of claim 1, wherein the hydroxyl-functional compound comprises ascorbic acid, an ascorbic acid salt, or a mixture thereof, and wherein the active hydrogen component further includes a polysaccharide in an amount, based on solids, which is greater than that of the monoester.

16. The method of claim 1, wherein the coated whole fruit or vegetable comprises a coated fruit or vegetable that, relative to an otherwise identical uncoated fruit or vegetable, exhibits a reduced mass loss rate.

17. The method of claim 16, wherein the fruit or vegetable comprises an avocado.

18. The coated whole fruit or vegetable resulting from the method of claim 1.

19. The coated whole fruit or vegetable of claim 18, wherein the coated whole fruit or vegetable comprises a fruit, and wherein the fruit exhibits a reduced rate of softening relative to an otherwise identical uncoated fruit.

* * * * *